United States Patent
Yoshida et al.

(10) Patent No.: US 11,755,867 B2
(45) Date of Patent: Sep. 12, 2023

(54) COMPOSITE CODE PATTERN, GENERATING DEVICE, READING DEVICE, METHOD, AND PROGRAM

(71) Applicant: I.P SOLUTIONS, LTD, Tokyo (JP)

(72) Inventors: Kenji Yoshida, Tokyo (JP); Masakatsu Morii, Tokyo (JP)

(*) Notice: Subject to any disclaimer, the term of this patent is extended or adjusted under 35 U.S.C. 154(b) by 0 days.

(21) Appl. No.: 16/958,743

(22) PCT Filed: Jan. 4, 2019

(86) PCT No.: PCT/JP2019/000028
§ 371 (c)(1),
(2) Date: Dec. 15, 2020

(87) PCT Pub. No.: WO2019/132047
PCT Pub. Date: Jul. 4, 2019

(65) Prior Publication Data
US 2021/0103786 A1    Apr. 8, 2021

Related U.S. Application Data

(60) Provisional application No. 62/681,354, filed on Jun. 6, 2018.

(30) Foreign Application Priority Data

Dec. 29, 2017  (JP) .................................. 2017-255256
Apr. 23, 2018  (JP) .................................. 2018-082672
(Continued)

(51) Int. Cl.
G06K 19/06    (2006.01)
H04L 9/06     (2006.01)
H04L 9/08     (2006.01)

(52) U.S. Cl.
CPC . *G06K 19/06037* (2013.01); *G06K 19/06075* (2013.01); *G06K 19/06131* (2013.01); *H04L 9/0643* (2013.01); *H04L 9/0861* (2013.01)

(58) Field of Classification Search
CPC ....... G06K 19/06037; G06K 19/06075; G06K 19/06131; G06K 1/12; G06K 7/12;
(Continued)

(56) References Cited

U.S. PATENT DOCUMENTS 5,410,609 A    4/1995  Kado et al.
5,726,435 A    3/1998  Hara et al.
(Continued)

FOREIGN PATENT DOCUMENTS

JP    H06-231466 A    8/1994
JP    H8-123634 A     5/1996
(Continued)

OTHER PUBLICATIONS

ISR; Japan Patent Office; Tokyo; Feb. 26, 2019.
ESR: European Patent Office; Munich; Mar. 9, 2002.
First Examination Report; dated Sep. 5, 2022.

*Primary Examiner* — Matthew Mikels
(74) *Attorney, Agent, or Firm* — Patshegen IP; Moshe Pinchas

(57) ABSTRACT

For one-dimensional or two-dimensional images in which cells identified as bright-colored cells and cells identified as dark-colored cells are arranged in a matrix, the amount of information is further increased while the difficulty in reading information expressions are reduced.

For this purpose, invented is a composite code comprising a first code, in which a plurality of cells each having a predetermined area are orderly arranged, and in which data is defined by each of the predetermined areas having one of two or more colors that can be distinguished from each other, and a second code in which special cells having an
(Continued)

area other than the predetermined area form at least a part of the plurality of cells, and in which data is defined by distinguishable marks arranged at predetermined positions in the area other than the predetermined area.

14 Claims, 64 Drawing Sheets

(30) Foreign Application Priority Data

Jun. 6, 2018 (JP) .................................. 2018-109090
Oct. 31, 2018 (JP) .................................. 2018-206168

(58) Field of Classification Search
CPC .... G06K 7/14; G06K 19/06; G06K 19/06046; H04L 9/0643; H04L 9/08; H04L 9/0825
See application file for complete search history.

(56) References Cited

U.S. PATENT DOCUMENTS

| | | | |
|---|---|---|---|
| 5,896,403 A | 4/1999 | Nagasaki et al. | |
| 6,267,296 B1 | 7/2001 | Ooshima et al. | |
| 6,398,117 B1 | 6/2002 | Oakeson | |
| 2005/0016026 A1 | 7/2005 | Long et al. | |
| 2009/0015965 A1 | 1/2009 | Sunwoo | |
| 2012/0013867 A1 | 1/2012 | Kolesnychenko et al. | |
| 2012/0187193 A1* | 7/2012 | Endo | G06K 19/06037 235/469 |
| 2015/0172288 A1* | 6/2015 | Terwilliger | H04W 4/02 726/7 |

FOREIGN PATENT DOCUMENTS

| | | |
|---|---|---|
| JP | H10-302034 A | 11/1998 |
| JP | 2938338 B2 | 6/1999 |
| JP | H11-272816 A | 10/1999 |
| JP | 2000-030016 A | 1/2000 |
| JP | 2000-76411 A | 3/2000 |
| JP | 2001-52142 A | 2/2001 |
| JP | 2001-256501 A | 9/2001 |
| JP | 2002-140742 A | 5/2002 |
| JP | 2002-281275 A | 9/2002 |
| JP | 2003-237265 A | 8/2003 |
| JP | 2004-310313 A | 11/2004 |
| JP | 2005-095229 A | 4/2005 |
| JP | 2005-204250 A | 7/2005 |
| JP | 2005-222157 A | 8/2005 |
| JP | 2007-272320 A | 10/2007 |
| JP | 2009 087286 A | 4/2009 |
| JP | 2009-105652 A | 5/2009 |
| JP | 2009-163731 A | 7/2009 |
| JP | 2011-048464 A | 3/2011 |
| JP | 2012-179288 A | 9/2012 |
| JP | 2015-052839 A | 3/2015 |
| JP | 2016-133909 A | 7/2016 |
| JP | 2016-540329 A | 12/2016 |
| JP | 6061075 B2 | 12/2016 |
| WO | 2013/162577 A1 | 10/2013 |
| WO | 2015/067725 A1 | 5/2015 |
| WO | 2018/155148 A1 | 8/2018 |

* cited by examiner

PLACEMENT OF A SECOND CODE ONLY IN THE DATA
AND ERROR CORRECTION CODE PLACEMENT AREA

FORMATION OF A SECOND CODE WITH DOTS

PLACEMENT OF DOTS ONLY IN WHITE CELLS IN
THE DATA AREA

COORDINATE VALUES OF THE CENTER OF CELL n ($X_{nS0}$, $Y_{nS0}$)

END POINT OF THE OVERLAP RANGE OF A LINE AND A DOT ($X_{nS1-2}$, $Y_{nS1-2}$)

DOT PLACEMENT CANDIDATE POSITIONS ($X_{nS1}$, $Y_{nS1}$)

STARTING POINT OF THE OVERLAP RANGE OF A LINE AND A DOT ($X_{nS1-1}$, $Y_{nS1-1}$)

BOUNDING BOXES CENTERED ON DOT PLACEMENT CANDIDATE POSITIONS (a) 2 X 2 DOT FORMATION (b) 3 X 3 DOT FORMATION

FIG. 111
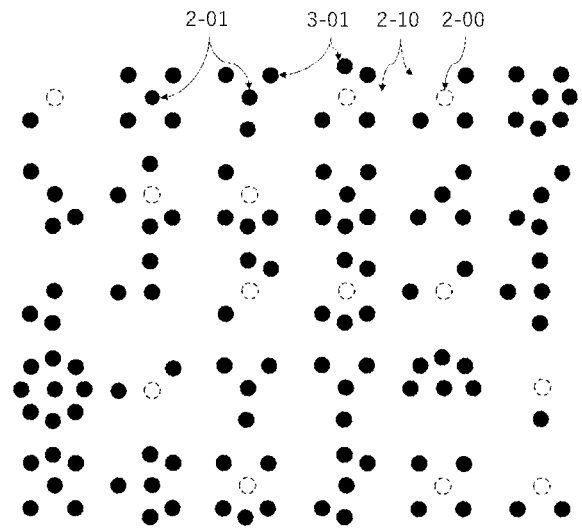
FIG. 112
FIG. 113
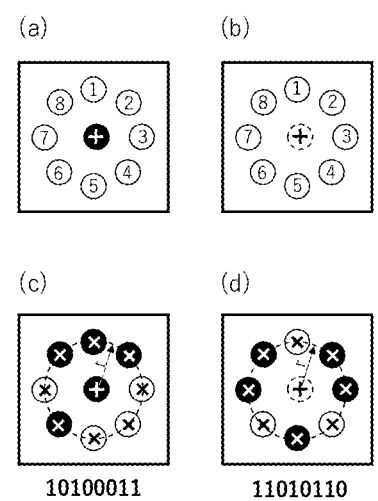

COMPOSITE CODE PATTERN, GENERATING DEVICE, READING DEVICE, METHOD, AND PROGRAM

FIELD OF THE INVENTION

The present invention relates to a composite code pattern, a generation apparatus, a reading apparatus, a method, and a program.

BACKGROUND OF THE INVENTION

Conventionally, various information expressions using images, such as one-dimensional codes such as the barcode and two-dimensional codes such as the QR code (registered trademark), have been proposed. For example, one-dimensional or two-dimensional images in which cells or spaces identified as bright-colored cells or spaces and cells or bars identified as dark-colored cells or bars are arranged in a matrix are used for these information expressions.

Furthermore, for example, the use of enhanced cells in which at least a part of the cells of a QR code (registered trademark) are subdivided into finer subcells in a matrix form has been proposed

PRIOR ART DOCUMENTS

Patent Literature

Patent Literature 1: Japanese Patent No. 6061075.
Patent Literature 2: Japanese Patent No. 2938338.

SUMMARY OF THE INVENTION

Problems that the Invention is to Solve

By the way, in these information representations, the information of the code is expressed by arranging two or more kinds of cells which can be mutually distinguished by color elements such as color intensity. In the current information expressions, the amount of storable information is often small. Originally, in these information expressions, the size of the cells is set small to improve the amount of information per unit area (hereinafter, information density) on the medium face on which an image is formed. For information expressions in which the cell size is set small, a high-resolution code reader is required. Furthermore, when the cells are subdivided, it becomes more difficult to distinguish the subdivided cells.

Therefore, according to conventional technology, in one-dimensional or two-dimensional code images in which spaces or cells identified as bright-colored and bars or cells identified as dark-colored are orderly aligned, for information expressions in which the sizes of cells or spaces/bars are set small, when the amount of information is further increased, no consideration is given towards the difficulty of reading from the information expression. Therefore, one aspect of the present invention is to reach the goal of reducing the difficulty of reading from a code information expression of a one-dimensional or two-dimensional image, and further increase the amount of storable information.

Solution to the Problems

In one aspect, the present invention can be exemplified as a composite code pattern. The composite code pattern includes a first code in which each of a plurality of cells arranged in an orderly shape has any one of two or more identifiable colors in at least a part of their areas, and a second code in which marks are arranged in at least any one of the special cells among the said arranged cells.

Advantageous Effect of the Invention

In the present composite code pattern, it is possible to further increase the amount of information in an image of a one-dimensional or two-dimensional code while reducing the difficulty of reading from the information expression.

BRIEF DESCRIPTION OF THE DRAWINGS

FIG. 111 is an example showing a part of a composite code in which the brightness or darkness of a predetermined area indicates the brightness or darkness of the cell and the information dots are shown in dark color.

FIG. 112 is an example showing a part of a composite code in which the brightness or darkness of a predetermined area indicates the brightness or darkness of the cell and the information dots are shown in dark color.

FIG. 113: (a) shows an example in which numbers are set at candidate arrangement positions for information dots in a dark-colored cell, (b) shows an example in which numbers are set at candidate arrangement positions for information dots in a bright-colored cell, (c) shows a specific arrangement example of FIG. 113(a) along with corresponding numerical data, and (d) shows a specific arrangement example of FIG. 113(b) along with corresponding numerical data.

FIG. 133(f) is a diagram showing a specific arrangement example of FIG. 133(d) along with corresponding numerical data.

FIG. 141 is an example showing a part of a composite code where dark reference cells having a deformed predetermined area are arranged.

FIG. 142 is a diagram exemplifying a part of a grid formed by connecting with virtual lines the reference points of the dark reference cells which define a reference pattern.

FIG. 143 is an example showing a part of a composite code in which bright-colored and dark-colored reference cells in which a reference pattern is defined are arranged.

FIG. 144 is a diagram exemplifying a part of a grid formed by connecting with virtual lines reference points of bright-colored and dark-colored reference cells in which a reference pattern is defined.

Figure 145:
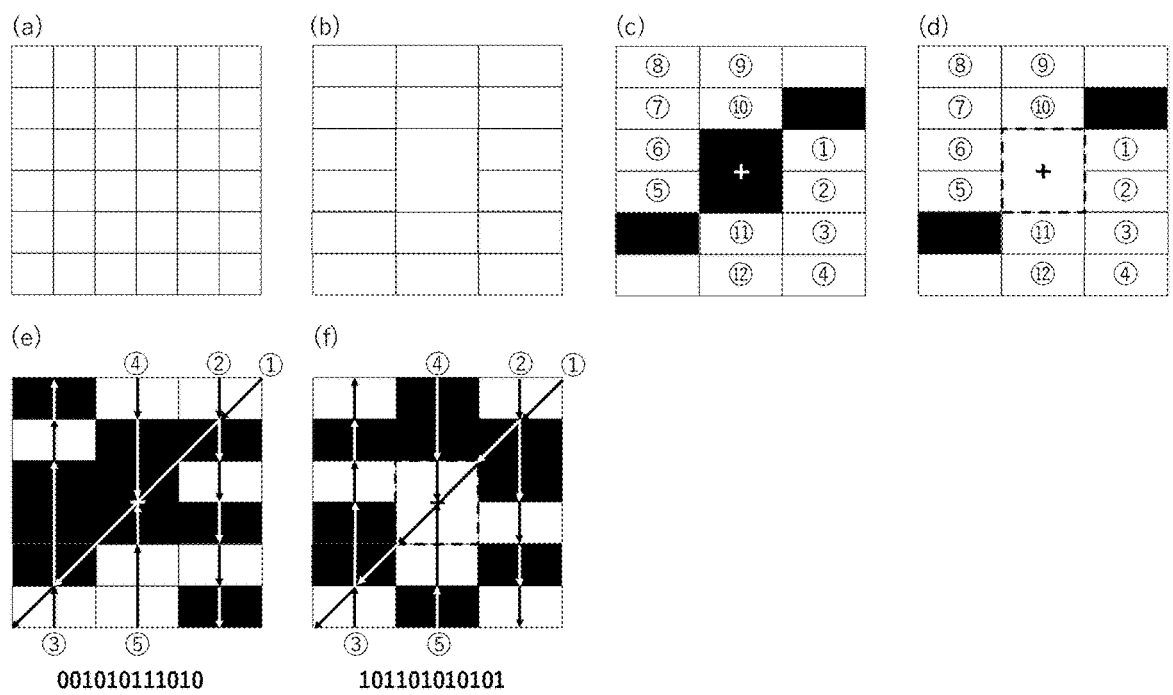

FIG. 145: (a) is a diagram showing a cell by 6×6 pixels, (b) is a diagram showing a cell by subdivisions of 1×2 pixels, (c) is a diagram showing a predetermined area of FIG. 145(b) in a dark color, (d) is a diagram showing a predetermined area of FIG. 145(b) in a bright color, (e) is a diagram showing a specific arrangement example of FIG. 145(c) along with corresponding numerical data, and (f) is a diagram showing a specific arrangement example of FIG. 145(d) along with corresponding numerical data.

Figure 146:
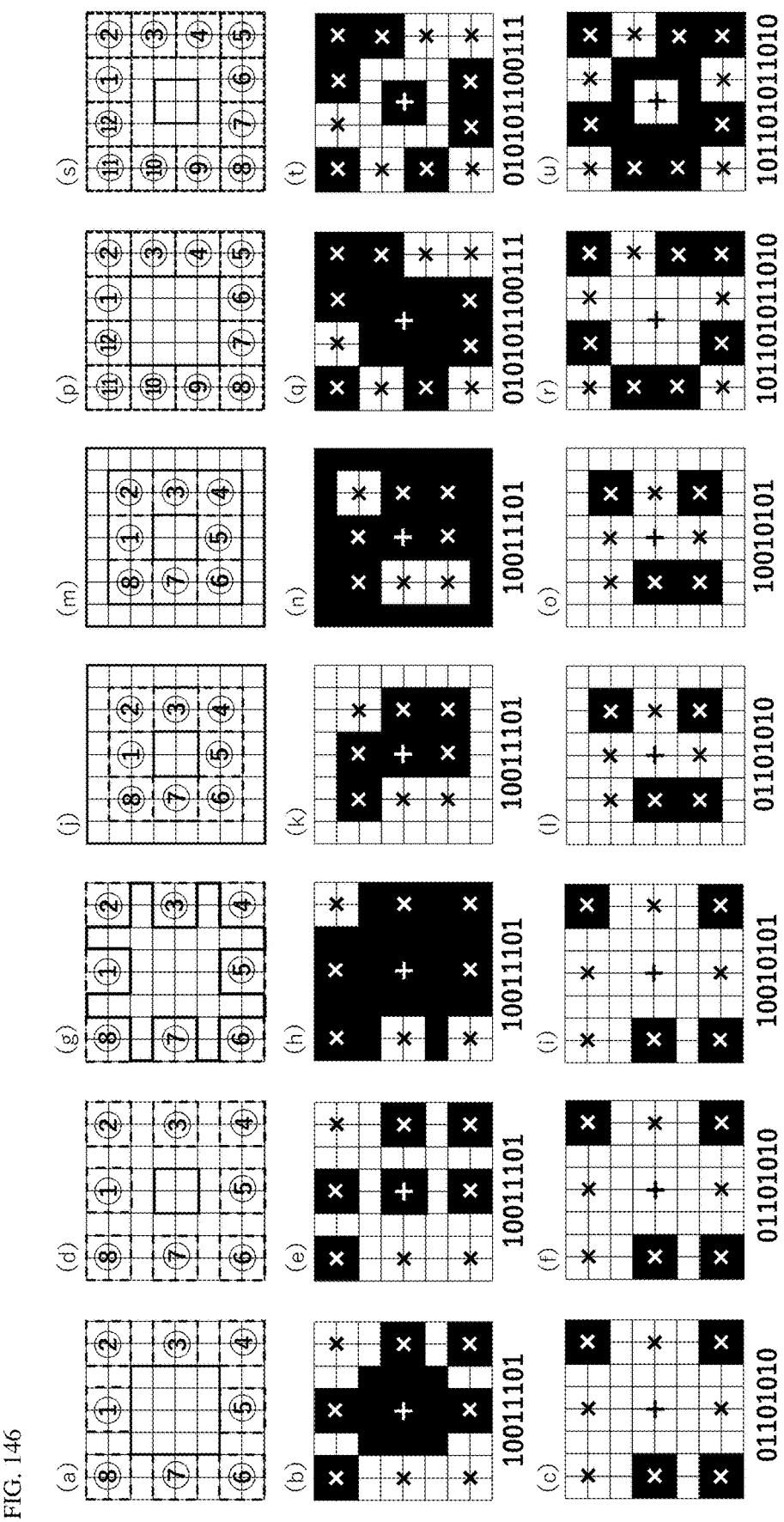

FIG. 146 is a diagram showing cells by 8×8 pixels. (a) is a diagram showing an example where the predetermined area is of 4×4 pixels and there is a void area between marks, (b) is a diagram showing the predetermined area of (a) in a dark color, (c) is a diagram showing the predetermined area of (a) in a bright color, (d) is a diagram showing an example where the predetermined area is of 2×2 pixels and there is a void area between marks, (e) is a diagram showing the predetermined area of (d) in a dark color, (f) is a diagram showing the predetermined area of (d) in a bright color, (g) is a diagram showing a deformed predetermined area, (h) is a diagram showing the predetermined area of (g) in dark color. (i) is a diagram showing the predetermined area of (g) in bright color, (j) is a diagram where the predetermined area is of 2×2 pixels and the mark arrangement area is surrounded by a bright-colored area, (k) is a diagram showing the predetermined area of (j) in dark color, (l) is a diagram showing the predetermined area of (j) in bright color, (m) is a diagram where the predetermined area is of 2×2 pixels and the mark arrangement area is surrounded by an area with the same color as the predetermined area, (n) is a diagram showing the predetermined area of (m) in dark color, (o) is a diagram showing the predetermined area of (m) in bright color, (p) is a diagram showing an example where the predetermined area is of 4×4 pixels and there are 12 candidate mark arrangement positions, (q) is a diagram showing the predetermined area of (p) in dark color, (r) is a diagram showing the predetermined area of (p) in bright color, (s) is a diagram showing an example where the predetermined area is of 2×2 pixels and there are 12 candidate mark arrangement positions, (t) is a diagram showing the predetermined area of (s) in dark color, and (u) is a diagram showing the predetermined area of (s) in bright color.

Figure 147:
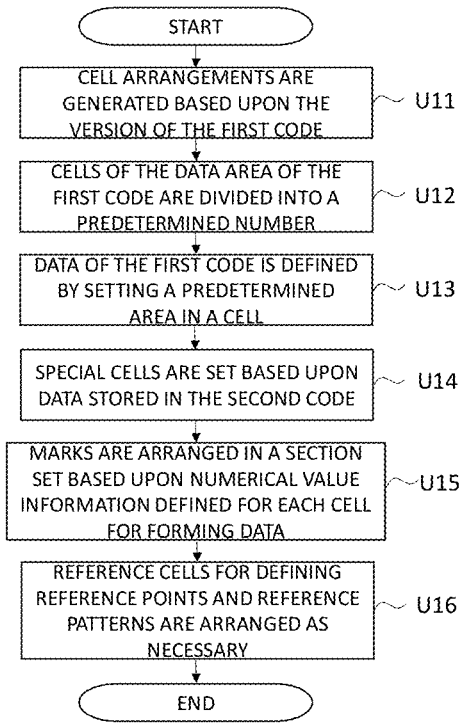

FIG. 147 is a flowchart exemplifying a composite code generation processing.

Figure 148:
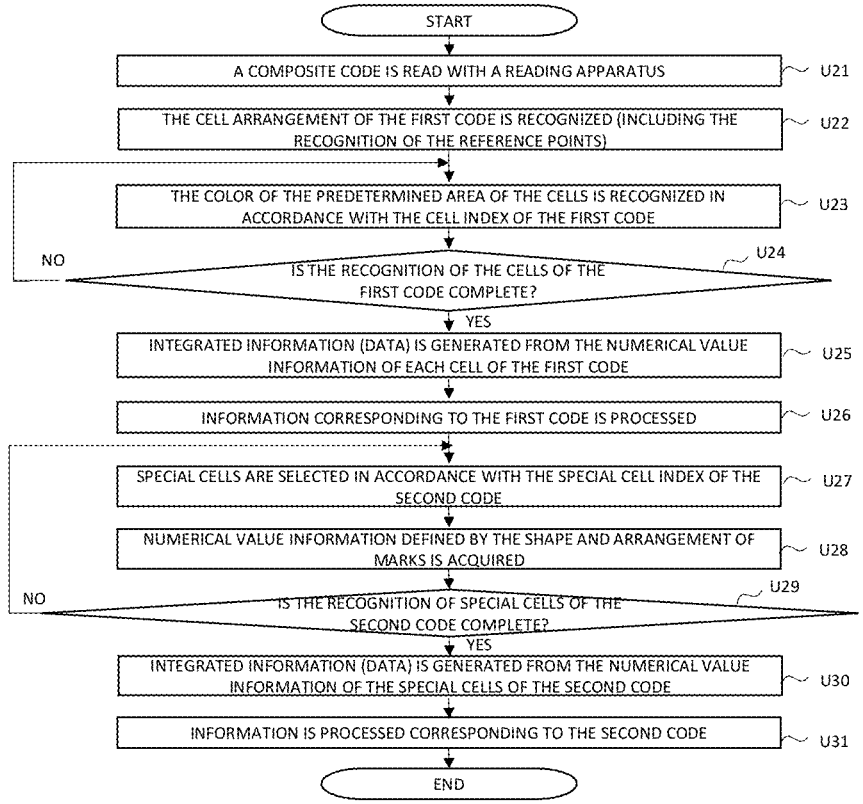

FIG. 148 is a flowchart exemplifying a composite code reading processing.

Figure 149:
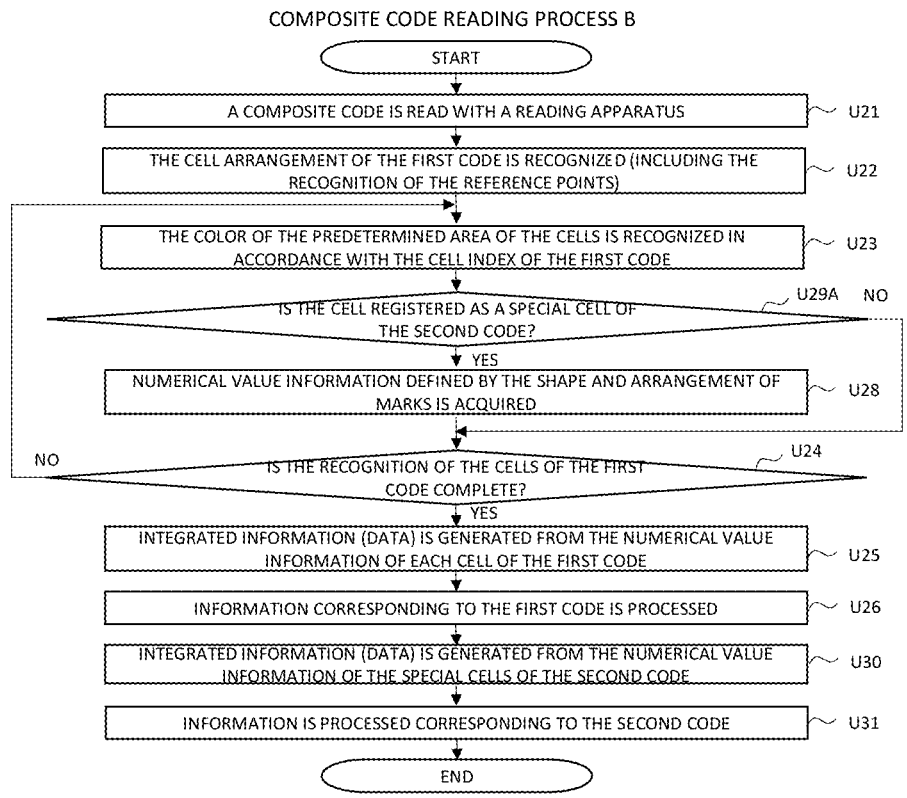

FIG. 149 is a flowchart exemplifying a composite code reading processing.

Figure 150:
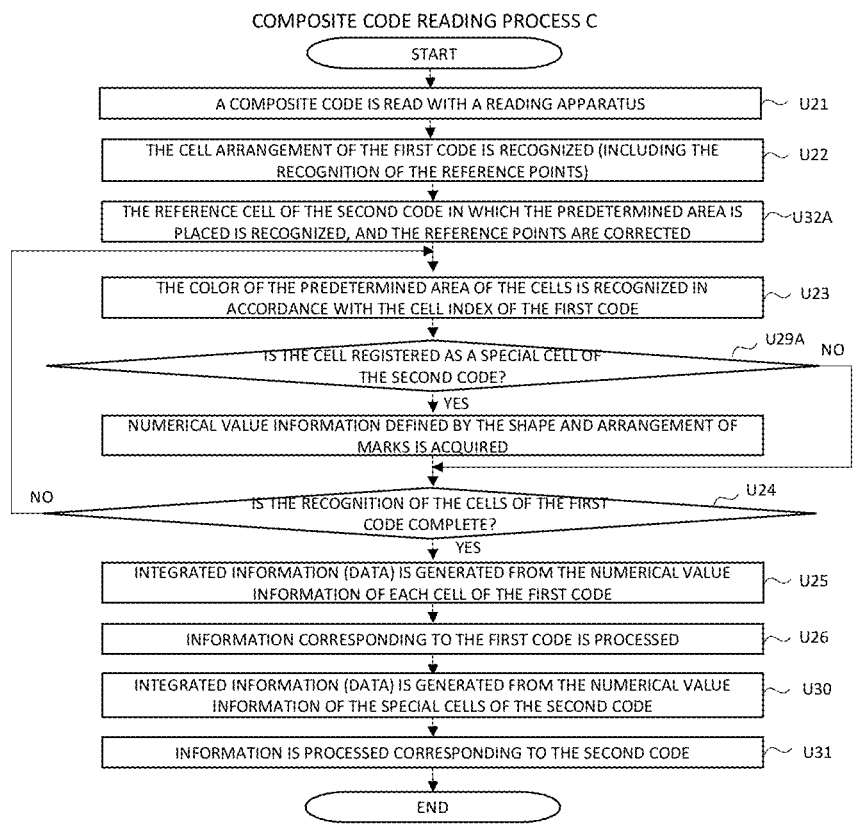

FIG. 150 is a flowchart exemplifying a composite code reading processing.

Figure 151:
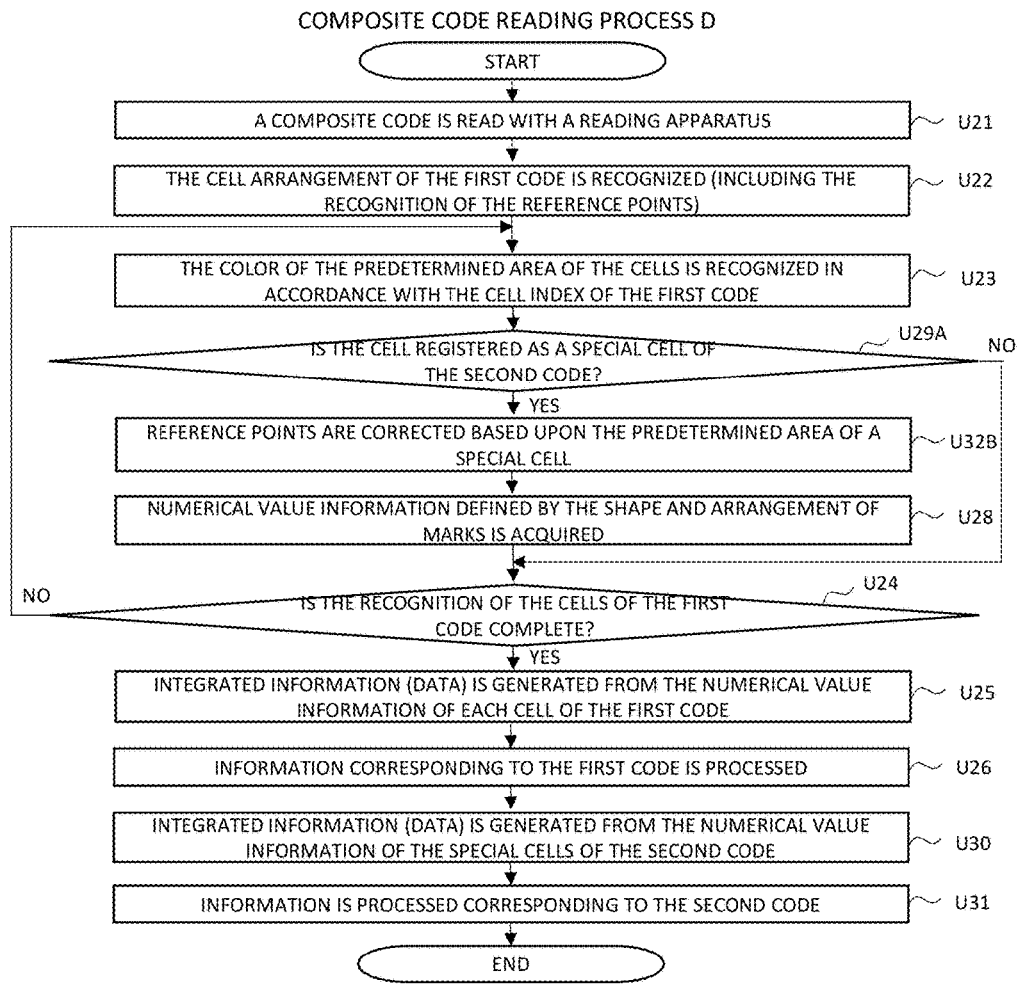

FIG. 151 is a flowchart exemplifying a composite code reading processing.

Figure 152:
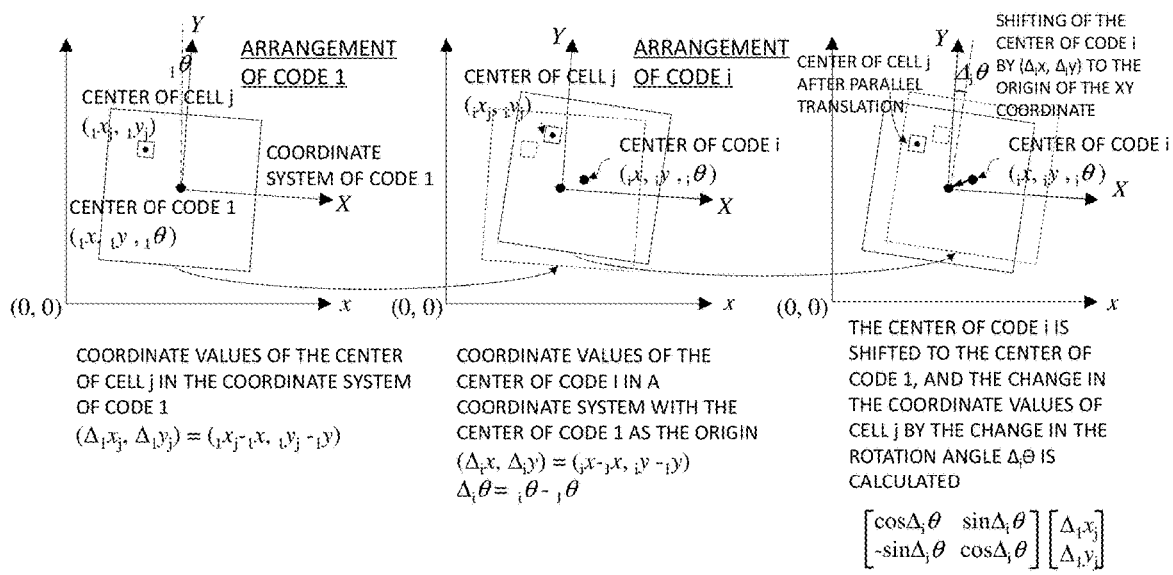

FIG. 152 is a diagram exemplifying a method of correcting reference coordinates in a specific frame of a time series composite code.

Figure 153:
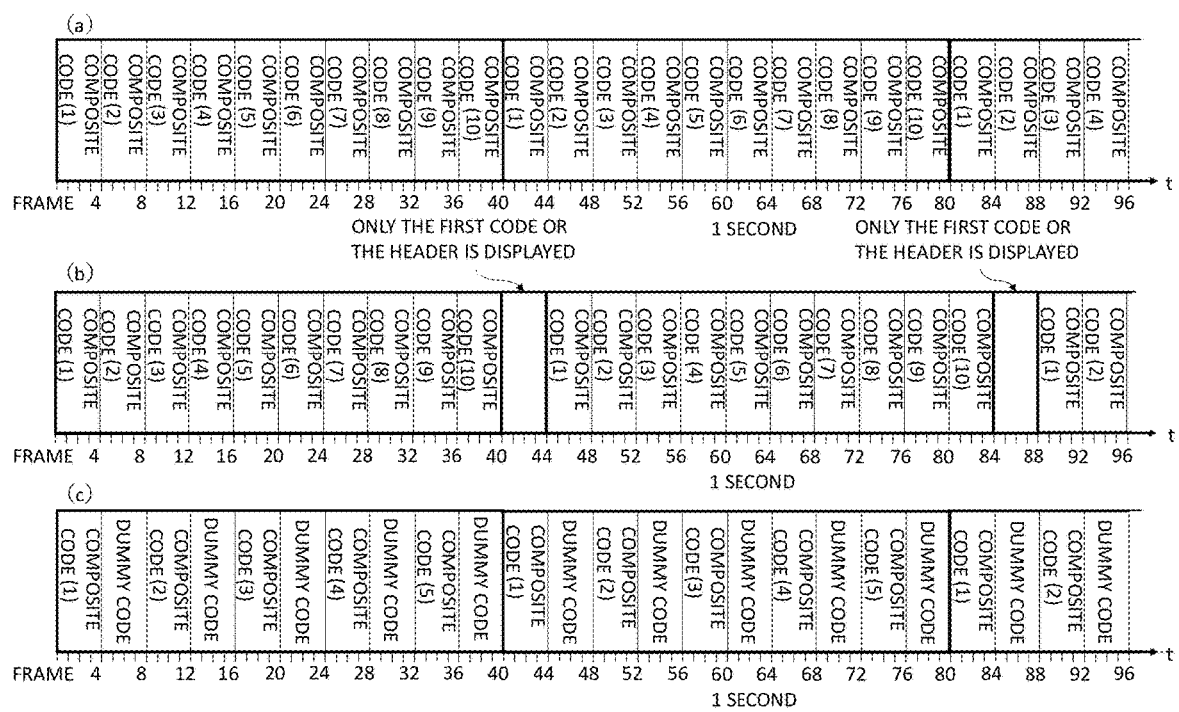

FIG. 153 shows graphs where the horizontal axis corresponds to a time axis (frame number) for showing what is displayed in a time series composite code.

DESCRIPTIONS OF THE EMBODIMENTS

Hereinafter, information processing apparatuses according to each embodiment will be described with reference to the figures. The configurations of the following embodiments are mere examples, and the information processing apparatus of the present invention is not limited to configurations of the embodiments.

Comparative Example

Figure 1:
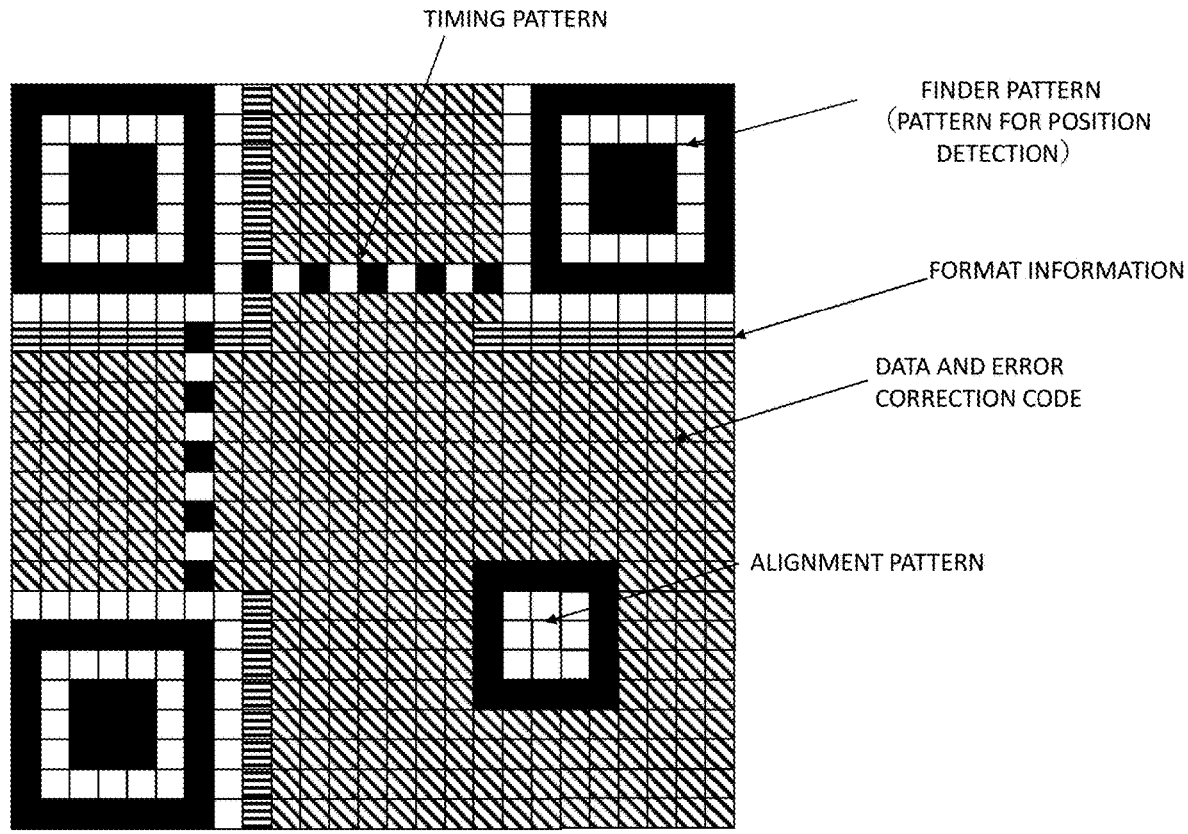
FIG. 1 is a diagram exemplifying the structure of a QR code.

The structure of a QR code is exemplified in FIG. 1. The QR code includes position detection patterns (finder patterns), an alignment pattern, timing patterns, format information, data, and an error correction code. The finder patterns are used for the extraction of data and detecting inclination and the like. The alignment patterns are used to correct the positional deviation of each cell caused by distortion. The timing patterns are formed with white cells and black cells alternately arranged, and they are used for determining module coordinates within a symbol. Stored in the format information sections are information on the used error correction rate and mask pattern. Data and the error correction code are arranged in the area other than the areas of the patterns or the areas where information is arranged as described above, the area indicated by oblique lines in FIG. 1.

Figure 2:
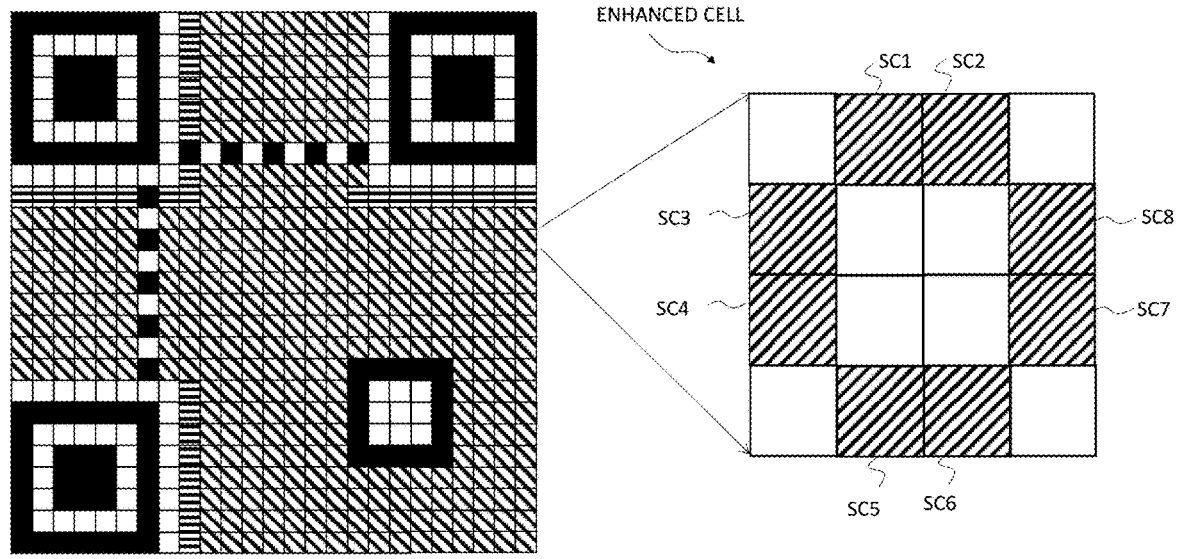
FIG. 2 is a diagram exemplifying the structure of a QR code including subcells formed by further subdividing a part of the information cells.

FIG. 2 exemplifies the structure of a QR code having subcells obtained by further subdividing a part of the information cells. As shown in the figure, the subcells have a structure corresponding to a cell divided into four each in the horizontal and vertical directions, thus corresponding to one cell being divided into 16. And, in a subcell area in which the cell is divided into 16, for example, by providing dark color to the eight subcells (illustrated in gray in FIG. 2) remaining due to the exclusion of the four corner cells and the four center cells, the original 1 bit of information based on bright and dark is increased to a total of 8 bits of information upon addition of the 8 areas.

However, in the configuration shown in FIG. 2, it is possible that two adjacent subcells are integrated into one area of the same color, such as with subcells SC1 and SC2. Furthermore, as in the case of the subcells SC1 and SC3, it is possible that two dark-colored areas may come into contact with each other at one of the four corners. Furthermore, all of the subcells SC1 to SC8 are in contact with adjacent cells. Therefore, when the same color as that of an adjacent cell is specified in any of the subcells SC1 to SC8 (for example, the subcell SCk), the subcell SCk and the adjacent cell may be integrated into a continuous area of the same color As described above, when a plurality of dark-colored areas are connected, it may be difficult to distinguish a single subcell from a group of a plurality of subcells at the limit of the reading resolution. On the other hand, as in a case where the subcell SC1 is combined with the subcells SC4 to SC8, in an information expression formed by the combination of dark subcells arranged with at least one bright-colored area interposed therebetween, each single dark subcell is separated by bright-colored areas, and the outlines of the dark-colored areas can easily be identified. Therefore, it can be said that a combination of a plurality of dark-colored subcells arranged with at least one bright-colored area interposed therebetween is less difficult to read even at the limit of reading resolution. However, by adding such a restriction, the number of bits that can be expressed is reduced.

For example, if dark-colored areas and bright-colored areas are arranged in the 16 subcells, to distinguish the cell from the original dark-colored cells (such as black cells of a QR code) other than the subcells, according to the above-mentioned Patent Literature 1, dark-colored subcells can be arranged in only 25% of the cell. Therefore, a maximum of four subcells out of the 16 subcells can be dark-colored cells, and the number of combinations of subcell arrangements that can be defined is $_{16}C_4 + _{16}C_3 + _{16}C_2 + _{16}C_1 = 1,820 + 560 + 120 + 16 = 2,516$. Furthermore, by considering a case where there are no subcells by division (that is, there are no black division cells), a case where the background is white is added.

With this addition, there are theoretically 2,517 combinations of subcell arrangements. Therefore, the amount of information with the subcells in FIG. 2 corresponds to 11 bits $< _{16}C_4 + _{16}C_3 + _{16}C_2 + _{16}C_1 + 2 < 12$ bits. However, according to Patent Literature 1, information settable subcells (variable sections) are limited to the eight locations SC1 to SC8 in FIG. 2, and data can be recorded with a total of 70 different color patterns. According to the above-mentioned Patent Literature 1, such a limitation enables a QR code reader to reliably identify the color of the extended cells.

First Embodiment

In the present embodiment, an information expression that subdues the problem of the comparative example is proposed.

<Composite Code>

In the present embodiment, information is expressed with a composite code defined by a first code exemplified by a QR code and a second code exemplified by a dot pattern in the first code. In the present embodiment, a QR code is exemplified as the first code, but the first code is not limited to the QR code. The first code may be, for example, a one-dimensional barcode or a code represented by a character string. Furthermore, in the present embodiment, a code represented by a dot pattern is exemplified as the second code, but the second code is not limited to a code based on a dot pattern (also referred to as a dot code).

<Example of a Configuration of a Second Code>

Figure 3:
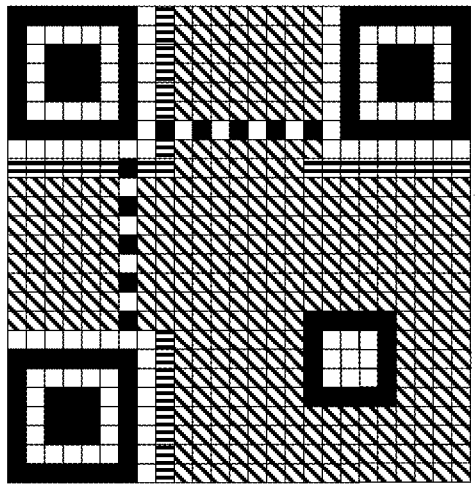
FIG. 3 is a diagram exemplifying a pattern representing a second code with dots smaller than subcells.
Figure 3:
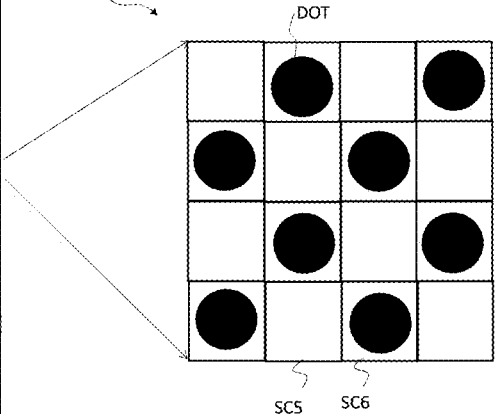

FIG. 3 exemplifies a pattern in which the second code is represented by dots smaller than the subcells. Hereinafter, a cell in which the second code is set is referred to as a special cell. In the example of FIG. 3, dots having an area smaller than that of the subcells are arranged at the center of the 16 subcells. Thus, in the example of FIG. 3, the centers of the 16 subcells are virtual points. Information is expressed by combinations of the presence and the absence of dots at the virtual points. A dot is an example of a mark. Note that in FIG. 3, the dots are arranged at the centers of the subcells, but the positions of the dots are not limited to the centers of the subcells. Therefore, as shown in FIG. 3, it can be said that one or more virtual points are arbitrarily set at positions having coordinate information in special cells. Furthermore, as shown in FIG. 3, since information is expressed by combinations of the presence and the absence of dots at the virtual points, it can be said that numerical data is defined by mark arrangements based on the virtual points.

For example, if the size of the cell is 0.250 mm×0.250 mm, the size of a subcell upon dividing into 16 is 0.0625 mm×0.0625 mm. On the other hand, the minimum size that can be printed by a printer having a resolution of 600 dpi is 25.4 mm/600=0.042 mm, and thus a dot is 0.042 mm×0.042 mm. It has been empirically known that the size of a dot is less than 0.050 mm×0.050 mm even in consideration of the deviation of the ink contour due to the seepage of ink during printing. Of course, if the printing precision is high, it goes without saying that it approaches 0.042 mm×0.042 mm. Note that when printing is performed by a printer having a higher resolution, for example, a resolution of 1200 dpi, finer printing can be performed.

In the example of FIG. 3, the cell area is 0.250× 0.250=0.0625 square mm, and the area of up to eight dots is 0.0249×0.0249×3.14×8=0.0156 square mm. In such a case, when dots are printed with an ordinary high precision printing machine, even in a case where printing is poor, the ratio of the dot area to the cell area is 24.96%, which is a value substantially close to 25% of the above-mentioned Patent Literature 1. Therefore, for the dot pattern of FIG. 3, it is possible to select $_{16}C_8+_{16}C_7+_{16}C_6+_{16}C_5+_{16}C_4+_{16}C_3+_{16}C_2+_{16}C_1+_{16}C_0$=39,203 patterns. The dot pattern in FIG. 3 can also be regarded as a group of marks that is not an obstacle for reading the first code.

The feature of the dots in FIG. 3 as compared with the subcells in FIG. 2 is that there is a bright-colored area between the dots. That is, in the case of the subcells in FIG. 2 as in the comparative example, by setting the same color for two adjacent subcells or for a subcell and an adjacent cell, areas of the same color become continuous or integrated. Then, at the limit of the reading resolution, it may be difficult to distinguish a single subcell from a group of subcells in plurality. On the other hand, in the configuration shown in FIG. 3, dark-colored dots are clearly distinguished in bright-colored areas, and it becomes easy to identify dark-colored dots even at the limit of reading resolution. The dot pattern in FIG. 3 can be said to be an example of a pattern that excludes an arrangement in which marks are in contact with each other. In addition, for the dot pattern of FIG. 3, it can be said that excluded are arrangements in which marks are in contact with the boundary between the special cell and cells adjacent to the special cell. Note that black can be exemplified as an example of a dark color and white can be exemplified as an example of a bright color. However, the colors used for codes, patterns, or marks in the present embodiment are not limited to black and white. For example, dark-colored cells are not limited to black cells, and bright-colored cells are not limited to white cells.

Figure 4:
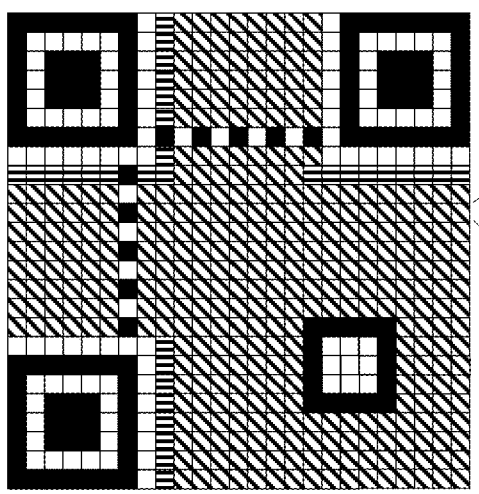
FIG. 4 is a diagram showing an example of a second code.
Figure 4:
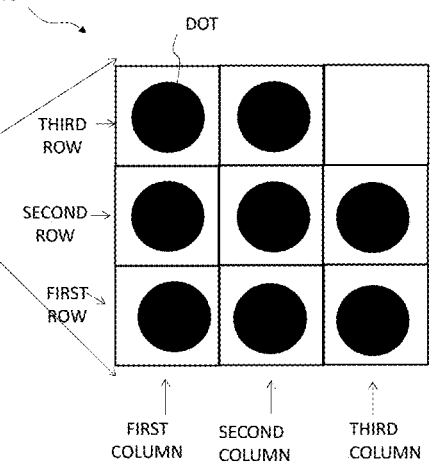

Another example of the second code is shown in FIG. 4. FIG. 4 shows an example in which dots are arranged in three rows and three columns at the center of each area obtained by dividing a cell into nine areas. Thus, also in the example of FIG. 4, the centers of the nine subcells are virtual points. Information is expressed by whether or not dots are arranged at the virtual points.

Now, as in FIG. 3, if the size of a cell is 0.25 mm×0.25 mm and the diameter of a dot is 0.05 mm, the distance between the boundaries of dots is 0.25/3−0.05=0.03 mm, and the distance between the dots is further increased as compared with the case of FIG. 3, making it easier to distinguish a dot from a dot. In the case of FIG. 4 as well, when a maximum of eight dots are arranged, the ratio of the dot area to the cell area is 25.12%, which is a value substantially similar to the condition of Patent Literature 1. Also, the amount of information that can be represented by the dots in FIG. 4 is $_9C_8+_9C_7+_9C_6+_9C_5+_9C_4+_9C_3+_9C_2+_9C_1+_9C_0$=511, which is almost close to 9 bits. The dot pattern in FIG. 4 can be said to be an example of a pattern that excludes an arrangement in which marks are in contact with each other. In addition, for the dot pattern of FIG. 4, it can be said that excluded is an arrangement in which marks are in contact with the boundary between the special cell and cells adjacent to the special cell. Therefore, the dot pattern in FIG. 4 can also be regarded as a group of marks that is not an obstacle for reading the first code.

Figure 5:
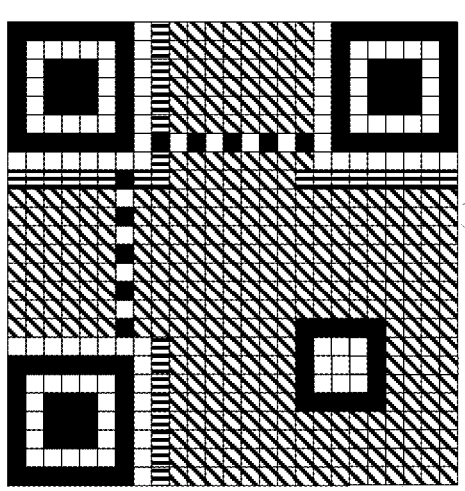
FIG. 5 is a diagram showing an example of a second code.
Figure 5:
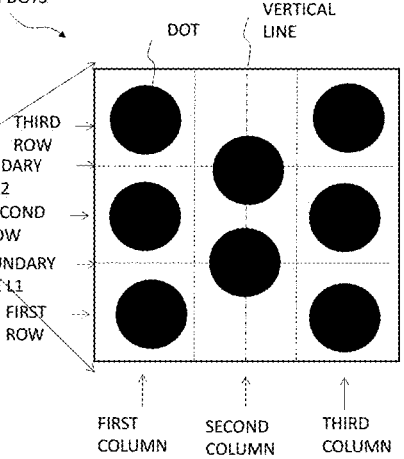

FIG. 5 shows a modification example of FIG. 4, in which the dots are arranged in three columns, with three dots in the first column, two dots in the second column, and three dots in the third column. The dots are arranged so that the positions of the dots in the second column are between the first row and the second row and between the second row and the third row in the row direction. That is, in the example of FIG. 5 as well, the centers of the three subcells in the first column, the centers of the three subcells in the third column, the intersection point between the boundary line L1 of the first row and the second row and the vertical line of the second column orthogonal to the boundary line passing through the center of a cell (exemplified by a dashed-dotted line), and the intersection point between the boundary line L2 of the second row and the third row and the vertical line of the second column orthogonal to the boundary line passing through the center of a cell are each virtual points. Information is expressed by combinations of the presence and the absence of dots at the virtual points.

Therefore, in the case of FIG. 5, the distance between the dots is further increased as compared with the case of FIG. 4, making it easier to distinguish a dot from a dot. In the case of FIG. 5 as well, when a maximum of eight dots are arranged, the ratio of the dot area to the cell area is 25.1%, which is a value substantially similar to the condition of Patent Literature 1. Also, the amount of information that can be represented by the dots in FIG. 4 is $_8C_8+_8C_7+_8C_6+_8C_5+_8C_4+_8C_3+_8C_2+_8C_1+_8C_0$=256, which is 8 bits. The dot pattern in FIG. 5 can be said to be an example of a pattern that excludes an arrangement in which marks are in contact with each other. In addition, for the dot pattern of FIG. 5, it can be said that excluded is an arrangement in which marks are in contact with the boundary between the special cell and cells adjacent to the special cell. Therefore, the dot pattern in FIG. 5 can also be regarded as a group of marks that is not an obstacle for reading the first code.

Figure 6:
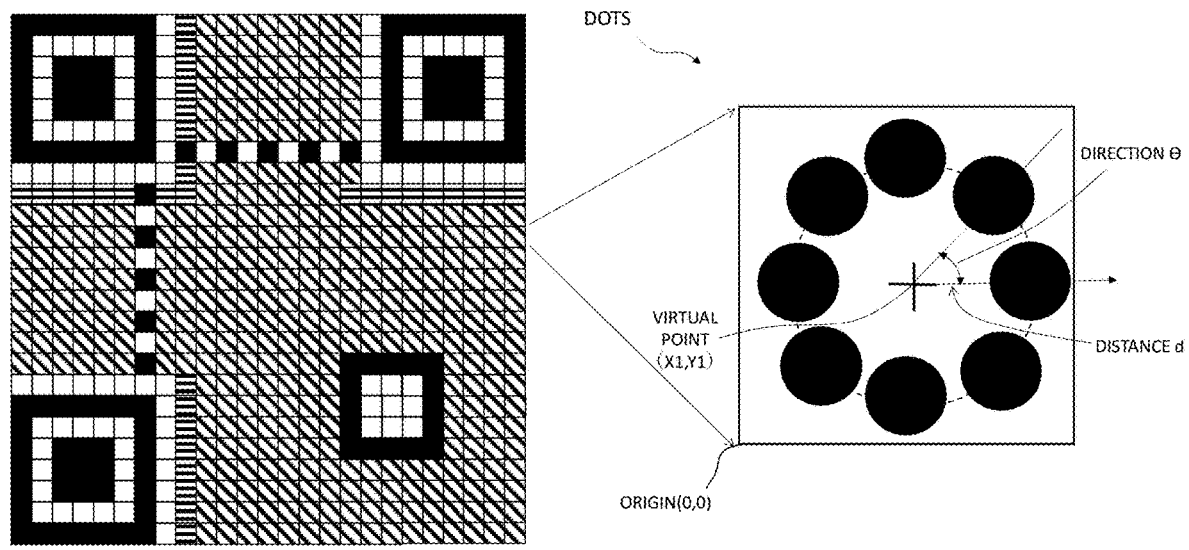
FIG. 6 is a diagram showing an example of a second code.

FIG. 6 shows still another example of the second code. In the example of FIG. 6, a virtual point (X1, Y1) is set in one cell. The virtual point (X1, Y1) is specified by, for example, coordinate values when the lower-left point of the cell is set to the origin (0, 0). However, a mark indicating a virtual point is not necessarily placed at the position of a virtual point. Note that a mark indicating a reference point may be placed at the position of a virtual point. And, information can be defined by arranging dots at a predetermined angle θ, for example, at intervals of 45 degrees, on a virtual circumference having a radius d with a virtual point as the center. In such a case, if the distance d is fixed, and the number of dots is limited to one, 3-bit information can be defined around one virtual point. The amount of information that can be expressed when a maximum of eight dots are used is the same as in the case of FIG. 5. Therefore, as shown in FIG. 6, it can be said that numerical data is defined by arranging marks with respect to virtual points. The dot pattern in FIG. 6 can be said to be an example of a pattern that excludes an arrangement in which marks are in contact with each other. In addition, for the dot pattern of FIG. 6, it can be said that excluded is an arrangement in which marks are in contact with the boundary between the special cell and cells adjacent to the special cell. Also in FIG. 6 as well, the virtual point can be set arbitrarily in the cell. Therefore, it can be said that one or more virtual points are arbitrarily set at positions having coordinate information in a special cell. The dot pattern in FIG. 6 is an example in which a part of a numerical data is defined by at least one of a direction and a distance of marks arranged with a virtual point as a point of origin.

As described above, in the present embodiment, a pattern of dark-colored dots surrounded by a bright color is adopted instead a pattern of cells or subcells obtained by dividing the cells adopted by a code filled with a dark color for a one-dimensional bar code or a two-dimensional code such as a QR code of the comparative example. By arranging such dots in, for example, a bright-colored cell, the second code can be defined in the cell at a higher density than the code of the comparative example.

Note that the reading resolution of the reading apparatus varies, but generally, when the total area of the dots is about 50% of the area of a special cell, you cannot tell which of the two or more distinguishable colors it will be judged to be (white and black cells when white and black of a QR code or the like are used). In general, if the area is 33% or less (one third), the special cell is determined to have the intended color of the special cell. It is more preferable if it is 25% or less.

Although FIGS. 3 to 6 exemplify a composite code in which dark-colored dots are surrounded by a bright color, the same applies to a case where bright-colored dots are arranged in dark-colored cells. In such a case, the bright-colored dots are clearly separated in the dark-colored area, and the bright-colored dots can be easily distinguished even at the limit of the reading resolution.

<Arrangement Positions of the Second Code in the First Code>

Below, the arrangement position of a second code in a first code will be described with reference to FIGS. 7 to 13 with the QR code as the first code. Here, the arrangement position of the second code in the first code refers to the positions in a cell (a special cell as described above) where the second code is defined when the first code is represented by a combination of dark-colored cells and bright-colored cells like a QR code. Here, using the QR code as the first code is merely an example, and the first code is not limited to the QR code.

In the QR code of the present embodiment, the upper-left is set as the origin, the horizontal right direction is set as the x direction, the vertical down direction is set as the y direction, and the position information (x, y) is expressed as x=0, 1, 2 to m, y=0, 1, 2 to n using natural numbers m and n. On the other hand, the data of the QR code (first code) is arranged starting from the lower-right. In the present embodiment, data is arranged from right to left based on units of two cells in the x direction.

Figure 7:
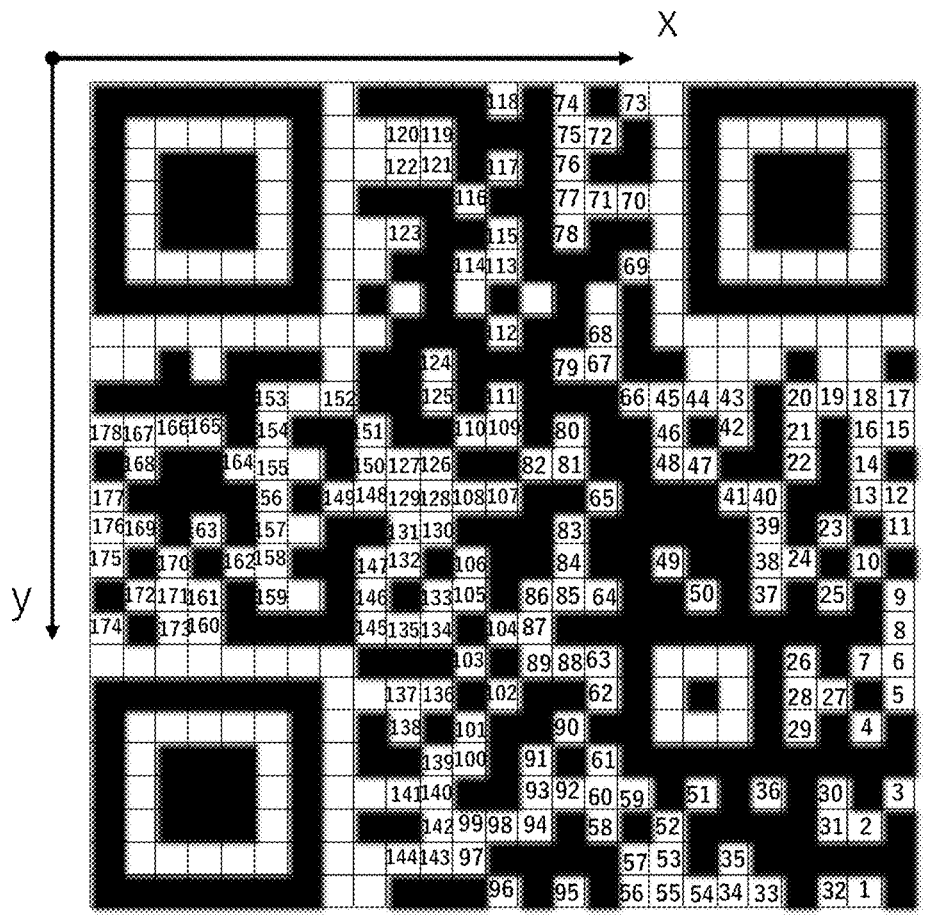
FIG. 7 is a diagram describing arrangement positions of a second code in a first code.

FIG. 7 shows an example in which the second code is arranged only in bright-colored cells (white cells in the figure) in the data and error correction code arrangement area. As shown in FIG. 7, the bright-colored cells where the second code is formed are numbered sequentially from 1 to 178. These serial numbers are signs for identifying the second code based on the arrangement of dots in each cell for the purpose of describing the present embodiment and are not patterns (graphic shapes) formed in an actual cell.

However, the serial numbers can be considered to be unique identification information of cells with the second code. For example, the serial numbers can be regarded as numbers used in information processing in generation apparatuses for composite code generation or reading apparatuses for composite code reading. In each of the numbered cells, a second code of dots exemplified in FIGS. 3 to 6 is formed. Hereinafter, a configuration representing a second code with dots in a cell is referred to as a dot pattern. In each of FIGS. 7 to 13, the numbers assigned to each cell can be referred to as numbers for identifying a dot pattern in a cell.

Shown in FIG. 7 is a second code arranged in the same order as the arrangement of the first code. That is, for the cells of a QR code, starting from the lower-right, two cells in the X direction are arranged side by side, scanning is performed in the order of first the right cell and then the left cell, and a second code with dark-colored dots in bright-colored cells is set. Examples of the second code include those shown in FIGS. 3 to 6. However, the second code is not limited to those shown in FIGS. 3 to 6.

As described above, the serial numbers assigned to each cell in FIG. 7 do not specify the type of dot pattern in the cells, but can be regarded as information for identifying the cells to which a dot pattern is assigned. The cells to which the second code is assigned among the bright-colored cells in FIG. 7 can be said to be examples of what are referred to as special cells. Furthermore, the identification information provided to the bright-colored cells in FIG. 7 is referred to as the special cell indices. The special cell indices are identification information that is uniquely associated with the coordinate values of each cell in the scanning order described above. It can be said that numerical data ordered by the special cell indices are formed from a plurality of special cells defined with numerical data. Also, it can be said that a sequence of a second code is formed by a plurality of special cells that can be mutually identified by the special cell indices.

Note that when generating a composite code, the composite code generation apparatus scans cells in the same scanning order as the cell scanning order of the first code, for example, a QR code, and when a second code based on a dot pattern is set, the composite code reading apparatus may scan the cells in the same order as the composite code generation apparatus and decode information from the second code based on the dot pattern. Therefore, a composite code generated in the same scanning order as the cell scanning order of the first code, for example, the QR code, can be read by the reading apparatus alone without having to obtain information from the generation apparatus. This is because the reading apparatus may associate the special cell indices with the coordinates in the same scanning order as the generation apparatus.

On the other hand, when generating a composite code, in a case where the composite code generation apparatus scans cells in a scanning order different from the cell scanning order of the first code, for example, a QR code, and sets a second code formed of a dot pattern, for a composite code reader to decode information from the composite code, information that associates the special cell indices with coordinate values is required. In the following embodiment, exemplified are a processing example in which a composite code reading apparatus decodes information from a composite code without information for associating the special cell indices with coordinate values, and a processing example in which a composite code reading apparatus decodes information from a composite code with information for associating the special cell indices with coordinate values.

Furthermore, as information for associating special cell indices with coordinate values, exemplified are a case where the special cell indices are directly associated with coordinate values, and a case where reference indices are given to the coordinates of all of the cells, and the special cell indices are indirectly associated with coordinate values by associating the special cell indices with the reference indices.

For reading the composite code, there is a method of performing the reading of the first code and the reading of the second code in parallel, and a method of performing the reading of the first code and the reading of the second code separately in two steps. In the method of performing the reading of the first code and the reading of the second code in parallel, after the bright and dark colors of one cell forming the first code are determined, before determining the bright and dark colors of the next cell, the presence or absence of a dot pattern forming the second code is determined for cells for which the determination of the bright and the dark colors has been completed. Then, the decoding of dot patterns into numerical values is performed for cells having a dot pattern. Then, the numerical values are integrated in set units of numerical values obtained by combining a predetermined number of cells, and the second code is decoded.

Figure 8:
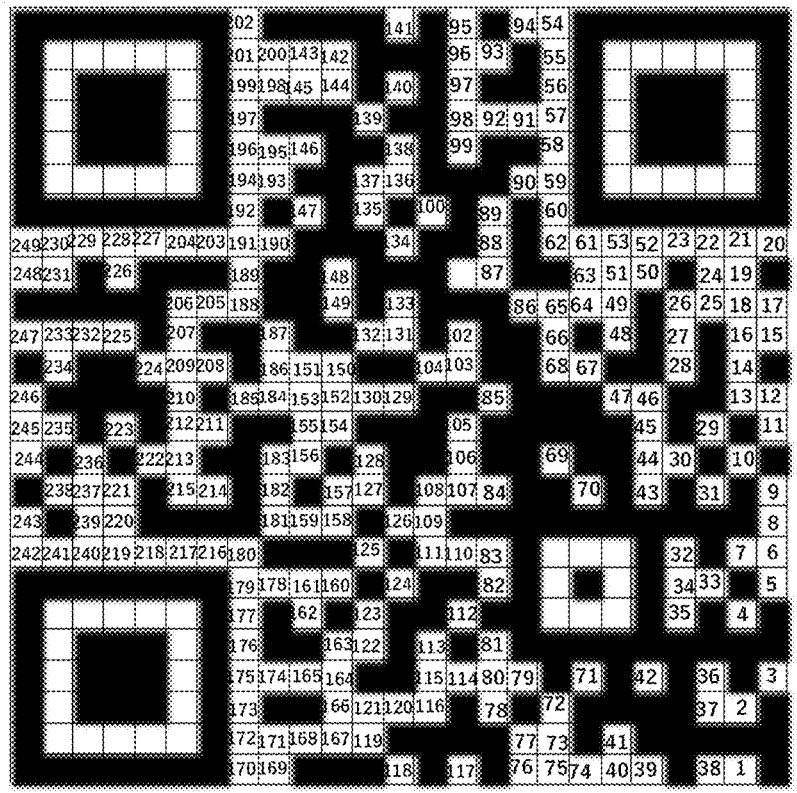
FIG. 8 is a diagram describing arrangement positions of a second code in a first code.

FIG. 8 shows an arrangement example of a composite code in which the second code is also arranged in white cells around the finder patterns. As shown in FIG. 8, as in FIG. 7, the columns of the cells (the rows of cells in the vertical direction with respect to the paper surface) are grouped into two each. In regards with the first two columns, when scanning is performed from bottom to top, serial numbers are given to bright-colored cells, with priority given to the right side cells among the left side and right side cells. For example, in the lowermost row of the two columns on the right end, since there is a bright-colored cell on the left side, the serial number 1 is assigned to it. In the second row from the bottom, since there are only dark-colored cells, serial numbers are not assigned. Also, for example, in the eighth row from the bottom, since both the left side and right side cells are bright-colored, serial numbers 6 and 7 are assigned with priority given to the right side cell. The same applies hereinafter. For the third and fourth columns from the right, the cells are scanned from top to bottom, and for the two cells on the left side and right side, serial numbers are given to bright-colored cells also with priority given to the right side cell.

Figure 9:
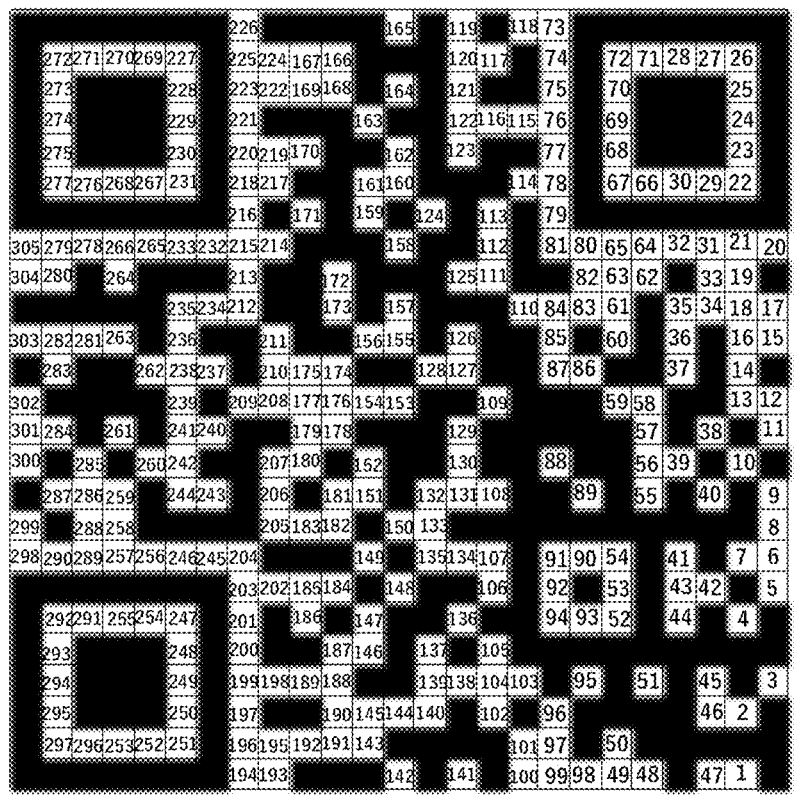
FIG. 9 is a diagram describing arrangement positions of a second code in a first code.

FIG. 9 shows a case where the second code is arranged in all of the white cells including those of the finder patterns and the alignment pattern described in FIG. 1. Therefore, a second code is arranged in the bright-colored cells around the finder patterns, the bright-colored cells in the timing pattern, and the bright-colored cells in the format information sections described in FIG. 1, similarly to the cells in which data is placed in FIGS. 7 and 8.

Figure 10:
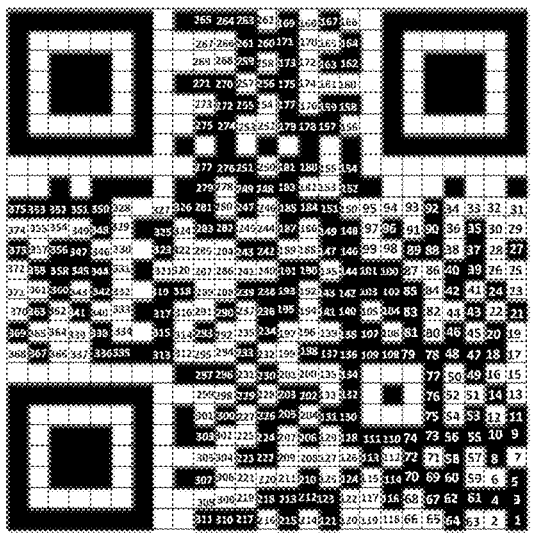
FIG. 10 is a diagram showing arrangement positions of a second code in dark-colored cells of a first code.
Figure 10:
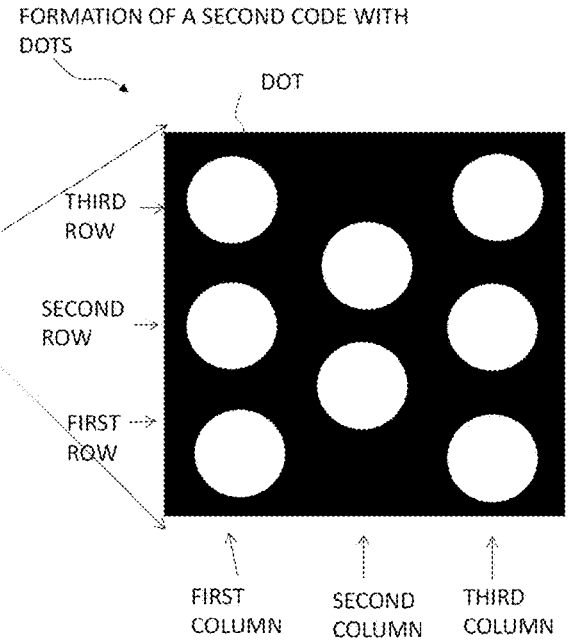

FIG. 10 shows an example of a composite code in which the second code is arranged not only in bright-colored cells but also in dark-colored cells. Also in such a case, the second code may be arranged not only in the data and error correction code area but also in cells other than those of the finder patterns and the alignment pattern. Furthermore, the second code may be arranged in all of the cells including those of the finder patterns and the alignment pattern (bright-colored cells and dark-colored cells). Here, when the second code is arranged in a dark-colored cell, the dots are bright-colored. FIG. 10 exemplifies a configuration similar to the configuration exemplified in FIG. 5, with bright-colored dots arranged in a dark-colored cell having a special cell index of 27.

Figure 11:
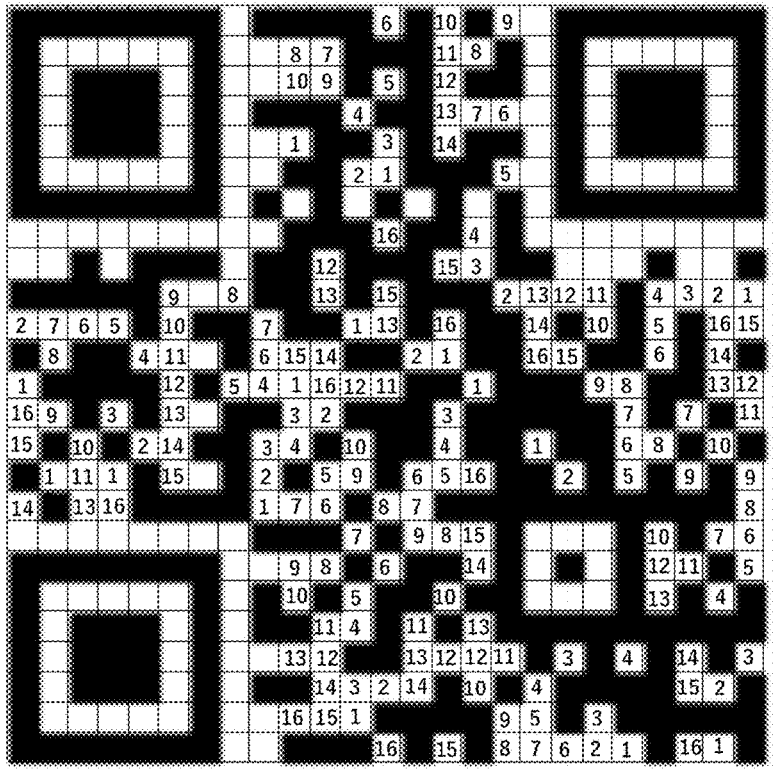
FIG. 11 is a diagram describing arrangement positions of a second code in a first code.

FIG. 11 shows an arrangement example of a composite code in which the dot pattern for each cell forming the second code is repeated for every predetermined number of plural cells. In FIG. 11, the specific cell indices, which is a serial of numbers for cells, is arranged repeatedly with numbers 1 to 16. In FIG. 11, starting from the lower-right, dot patterns corresponding to the special cell indices of 1 to 16 are arranged from right to left based on units of two cells in the x direction. In this manner, by repeatedly arranging a predetermined number of cells of the second code (dot patterns), it is possible for the reading apparatus to read the second code from a part of the first code (for example, a predetermined number of cells of the QR code). As exemplified in FIG. 11, a portion of the second code grouped by a predetermined number of special cell indices (numbers 1 to 16) is called a subcode.

In the case of the composite code of FIG. 11, a table associating a number (for example, a number from 1 to 16) indicating the type of the second code in the cell with the position coordinates of each cell (or a serial number of each cell) may be generated on the side of the composite code generation apparatus and delivered to the reading apparatus. However, by setting an arrangement rule of the second code in advance, the reading apparatus may generate serial numbers (special cell indices) in the cells in which the second code is set according to the same rule as that of the generation apparatus. In accordance with the above rules, the composite code reading apparatus may arrange the values read from the second code in each cell in the order of serial numbers and integrate the numerical values.

Note that as shown in FIG. 11, when a predetermined number of serial numbers (special cell indices) are repeatedly set to the cells, the second code itself in each cell may be confirmed to also match with the repetition of the serial numbers (special cell indices). For example, among N (for example, 16) cells to which special cell indices 1 to 16 are given, the head cell may be given a dot pattern indicating the beginning of the second code, and the end cell may be given a dot pattern indicating the ending of the second code may be added.

Figure 12:
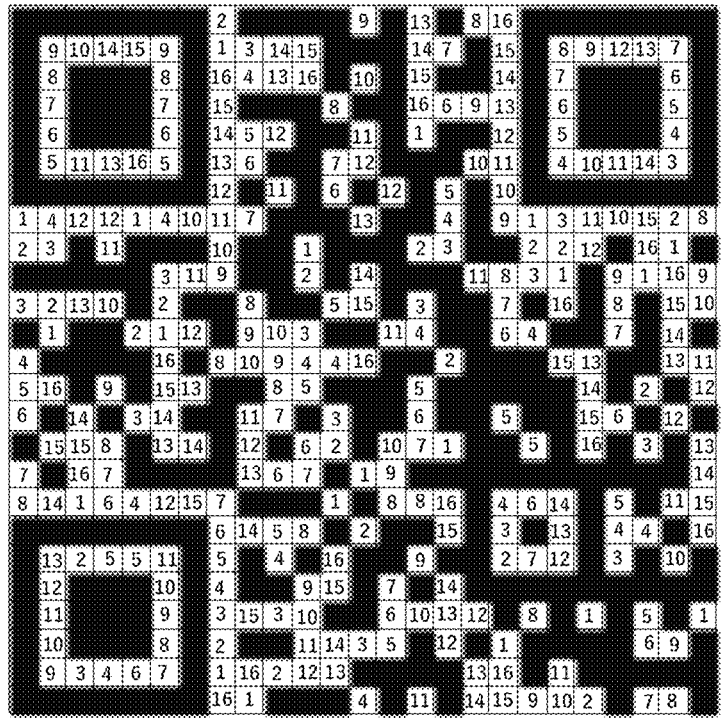
FIG. 12 is a diagram describing arrangement positions of a second code in a first code.

FIG. 12 shows an arrangement example of a composite code in which a predetermined number of dot patterns constituting the second code are repeatedly arranged in all of the bright-colored cells in a QR code which is an example of the first code. That is, as shown in FIG. 12, the second code is arranged in all of the bright-colored cells while adopting the rule for assigning serial numbers (special cell indices) exemplified in FIG. 11. Accordingly, as shown in FIG. 12, as in FIG. 9, the second code can be arranged in all of the bright-colored cells in a QR code, that is, including bright-colored cells of the finder patterns, the alignment pattern, and the like.

In such a case, it is not necessary to execute the QR code reading process and the second code reading process in parallel. For example, the second code may be read after the first code is read. Thus, when the second code of the composite code is generated and when it is read, the cells are scanned downward starting from the origin in the upper-left, and the bright-colored cells detected during the scanning are given the indices of 1 to 16. In the example of FIG. 12, in the process of scanning, moving is in accordance with the cell coordinate changing from a minimum value to a maximum value with respect to the X coordinate, and changing from a maximum value to a minimum value and then changing back from a minimum value to a maximum value and repeating this process with respect to the Y coordinate.

Furthermore, as shown in FIG. 12, the special cell indices are assigned in order from the minimum value (1) to the maximum value (16), and then assigned from the maximum value (16) to the minimum value (1). In such a case, the composite code generation apparatus sets dot patterns in accordance with the special cell index for each cell to generate a composite code. On the other hand, the composite code reading apparatus may search for the special cells by the same procedure as that of the generation apparatus, set special cell indices by the same rule as the generation apparatus, determine the order of the cells in the composite code, and decode the second code.

However, even when the second code is arranged in all of the white cells of a QR code, the generation apparatus may arrange the second code (set special cell indices) in accordance with the arrangement order of the first code (scanning order of the QR code), as described in FIGS. 7 to 10. Also, the reading apparatus may execute the QR code reading process and the second code reading process in parallel.

Figure 13:
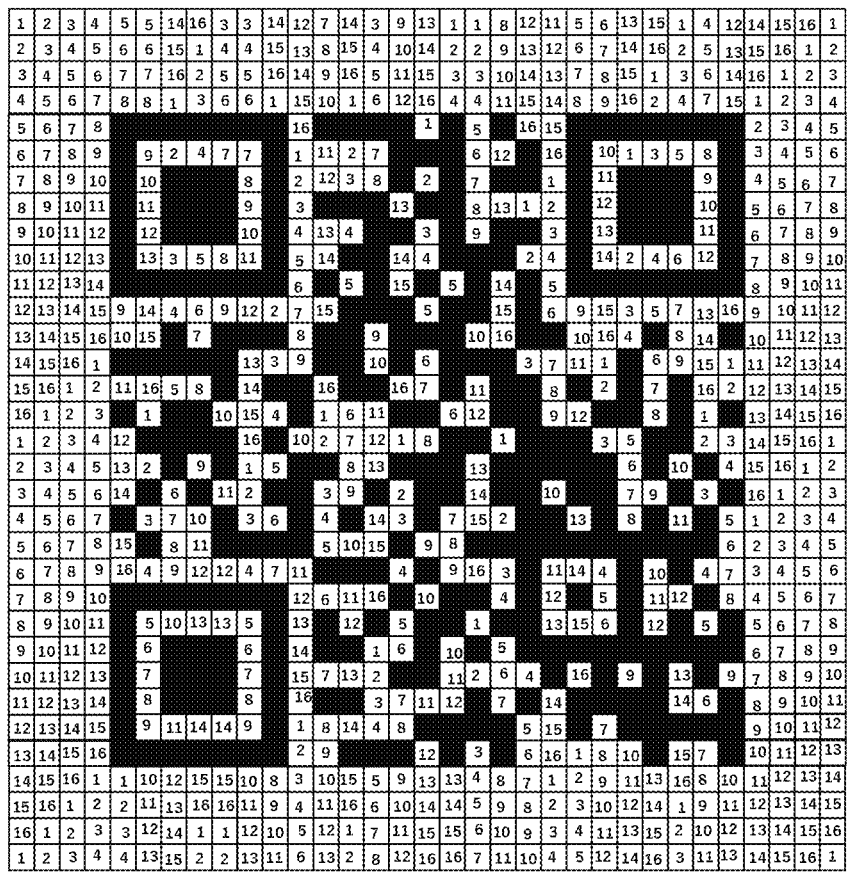
FIG. 13 is a diagram describing arrangement positions of a second code in a first code.

FIG. 13 shows an example of a composite code in which dots are arranged in the margin around a QR code. In addition to all of the white cells in the QR code, the second code may be arranged in the quiet zone (the blank area around the QR code). In addition, as in the example of FIG. 13, the generation apparatus and the reading apparatus search for special cells as the cell are scanned, and when special cells in which the second code is set are found, the special cell indices are set in order from the minimum value (1) to the maximum value (16).

<Arrangement of a Dot Pattern in a Cell>

Figure 14:
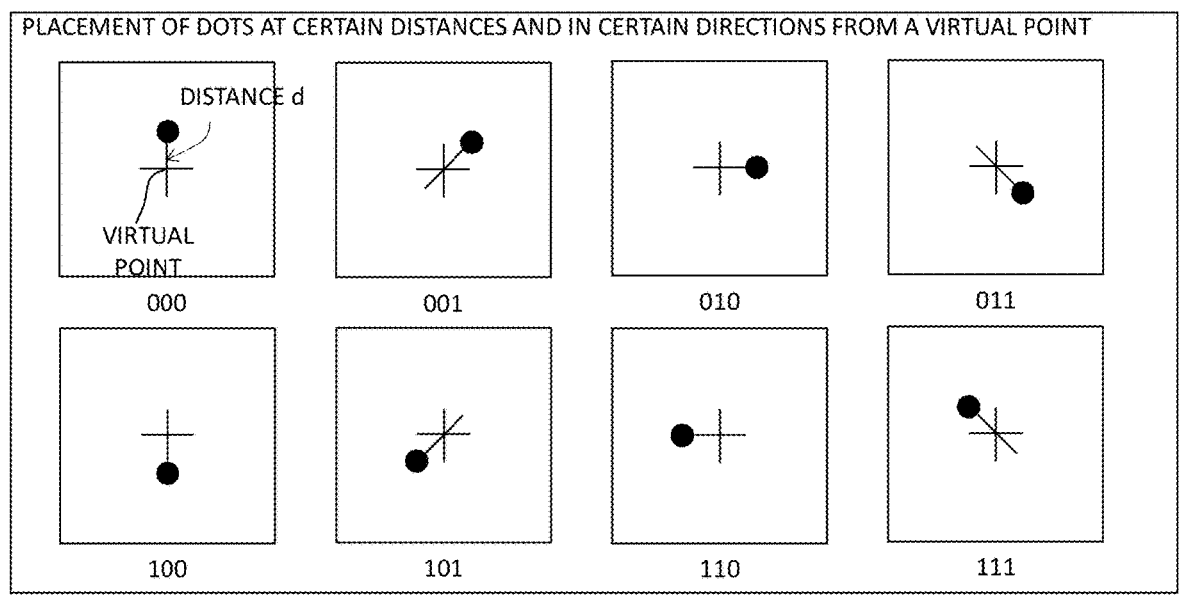
FIG. 14 is a diagram describing an arrangement of a pattern in a cell to form a second code.

With reference to FIGS. 14 to 23, the arrangement of a dot pattern in a cell for forming the second code will be described. FIG. 14 shows arrangement examples of dot patterns where information is defined by the distance and the direction from a virtual point. The dot pattern where information is defined by the distance and direction from the virtual point is the dot pattern exemplified in FIG. 6.

For the second code, a virtual point is set in the cells, and information is defined by at least one of the distance d from the virtual point to a dot and the direction of a straight line from the virtual point to a dot. The position of the virtual point is set with respect to the origin of the cell. The origin of a cell may be exemplified, for example, by the lower-left point of the cell. However, the definition of the origin of a cell is not limited. FIG. 14 exemplifies a case where the distance d has a fixed value. However, information may be defined by having the distance d take a plurality of values. Also in FIG. 14, dots are arranged with 45-degree intervals around the virtual point (distance d), and numerical data 000 to 111 are assigned.

Note that the orientation of the cells is determined by a shape element serving as a reference in the first code, for example, the finder patterns of a QR code (see FIG. 1). Therefore, the directions in which the dots in the cell are arranged with respect to the virtual point is set with reference to the coordinate axes determined by the finder patterns. For example, for each of the cells of FIG. 14, if the axis in the right direction from the virtual point is used as the reference for directions, the numerical value 000 corresponds to the 90-degree direction. Furthermore, numerical values 001 to 111 correspond respectively to the directions attained by rotation in the clockwise direction by 45-degree units from the direction of the numerical value 000 (for example, from the 90-degree direction).

Therefore, the generation apparatus that generates composite codes may set virtual points in the cells, form dots corresponding to numerical data at positions determined by distance and direction, and printers may print the composite codes, and electronic media, broadcast media, storage media, and communication media may output the composite codes to displays. On the other hand, the reading apparatus for reading the composite code may identify the virtual points in the cells and orientation on the basis of the above-described shape element of the first code as the reference, recognize the distances and directions of the dots detected in the cell with respect to the virtual point, and decode the dot patterns to numerical values.

Figure 15:
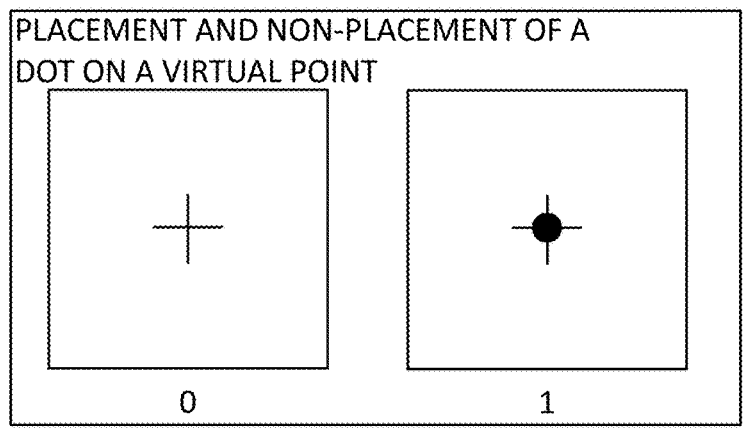
FIG. 15 is a diagram describing an arrangement of a pattern in a cell to form a second code.

FIG. 15 shows an example in which information is defined by the presence and absence of a dot on a virtual point. Dot patterns where information is defined by the presence and absence of a dot on the virtual point are the dot patterns exemplified, for example, in FIGS. 3 to 5.

Therefore, the generation apparatus that generates the composite codes may set virtual points in the cells, form dots corresponding to numerical data on the virtual points, or form images without dots, and printers may print the composite codes, and electronic media, broadcast media, storage media, and communication media may output the composite codes to displays. On the other hand, the reading apparatus for reading the composite code may identify the virtual points in the cells and orientation on the basis of the above-described shape element of the first code as the reference, recognize the presence or absence of a dot on each virtual point, and decode the dot patterns to numerical values. Furthermore, the composite code may be stored on a storage medium, and be decoded by a program. That is, the composite code can be generated and decoded in virtual space.

Figure 16:
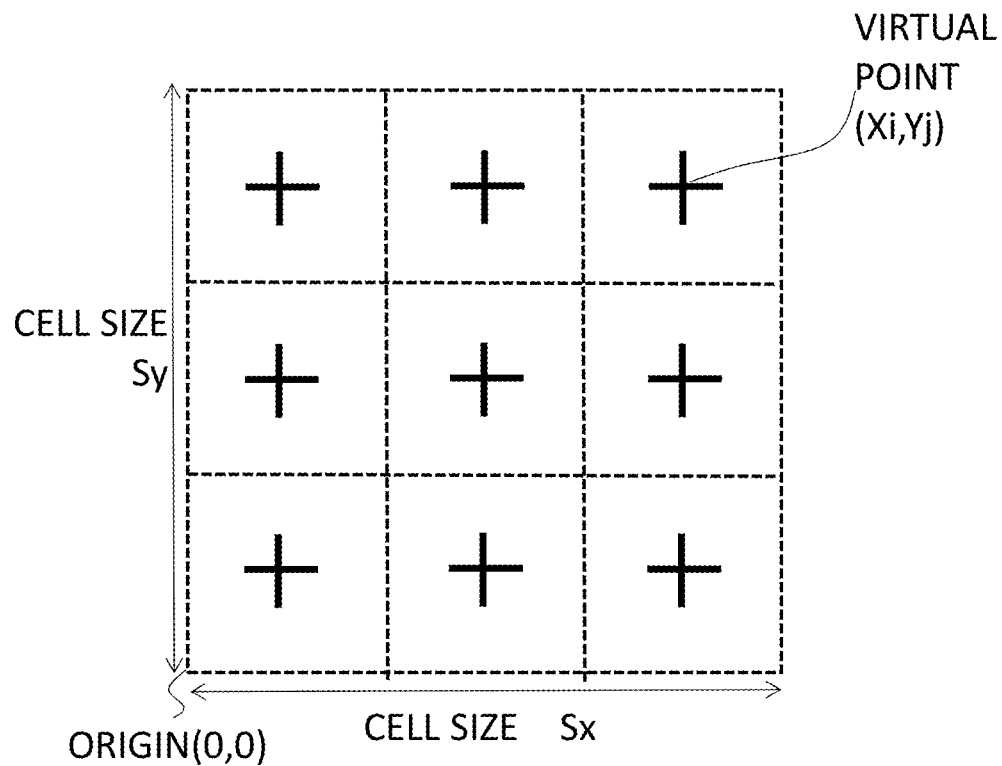
FIG. 16 is a diagram describing an arrangement of a pattern in a cell to form a second code.

FIG. 16 shows an example of the setting of virtual points in the second code exemplified in FIG. 4. In FIG. 16, virtual points ($X_i$, $Y_j$) are set at the center of the areas obtained by dividing a cell into 3×3=9. As already described with reference to FIG. 4, in a case where dark-colored dots are arranged in bright-colored cells, by arranging dots at a maximum of eight virtual points out of the nine virtual points, the entire cell can be judged to be a bright-colored cell and dark-colored dots can be arranged at the virtual points.

Figure 17:
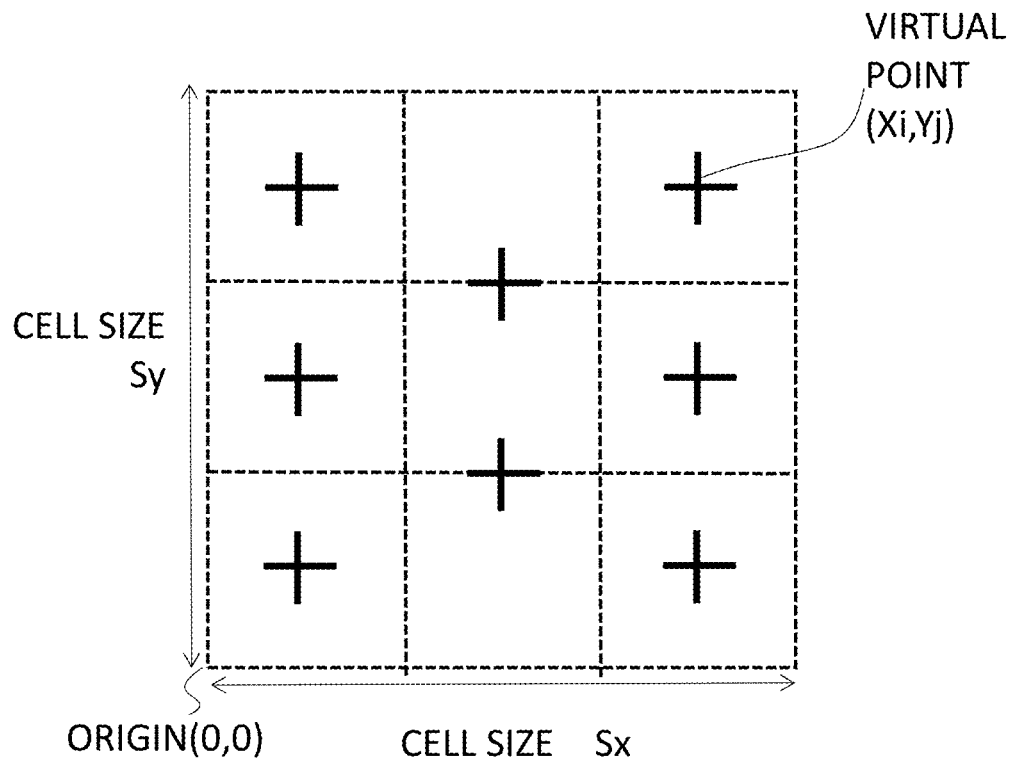
FIG. 17 is a diagram describing an arrangement of a pattern in a cell to form a second code.

FIG. 17 shows an example of the setting of virtual points in the second code exemplified in FIG. 5. In FIG. 17, among the virtual points of the three-row three-column area in FIG. 16, the row positions of the two virtual points in the center column are arranged so that they are at intermediate positions between the row positions of the three virtual points in the first column and the three virtual points in the third column.

Figure 18:
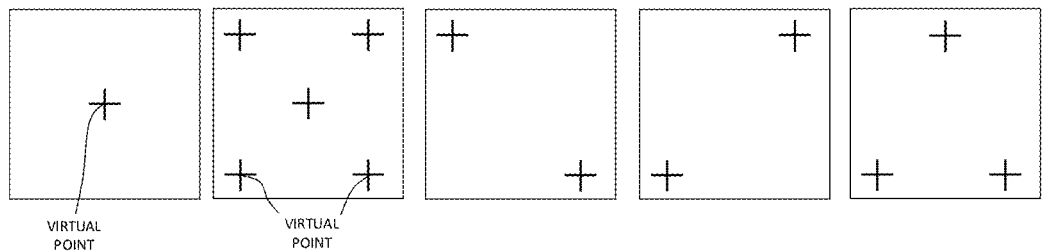
FIG. 18 is a diagram describing an arrangement of a pattern in a cell to form a second code.

FIG. 18 shows modifications of virtual point positions. The virtual point position is not limited to those in FIGS. 16 and 17, and various virtual points can be used. For example, the number of virtual point positions in a cell may be one or two or more. For example, the virtual point positions may be provided at the center of a cell and on positions of oblique lines from the center of the cell to the four corners of the cell. When two virtual points are provided in a cell, the virtual points may be provided on one oblique line passing through the center of the cell and positioned close to opposite corners. Furthermore, in a case where three virtual points are provided in a cell, one of the virtual points may be provided at a position close to one side of two opposing sides of a cell on a line connecting the center of the cell with the midpoint of the side, and the remaining two virtual points may be provided at positions near both ends of the side opposing the side with the single virtual point nearby (2 corners formed by the intersection of a side and two sides orthogonal to the side that oppose each other).

Figure 19:
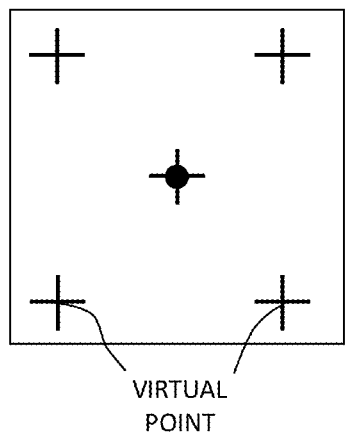
FIG. 19 is a diagram describing an arrangement of a pattern in a cell to form a second code.

FIG. 19 is an example of a dot pattern in a cell that clearly indicates that information based on a dot pattern is not set. For example, when a plurality of virtual points are provided in a cell, and when a dot is arranged at a virtual point at the center of a cell, it may mean that information is not defined.

Figure 20:
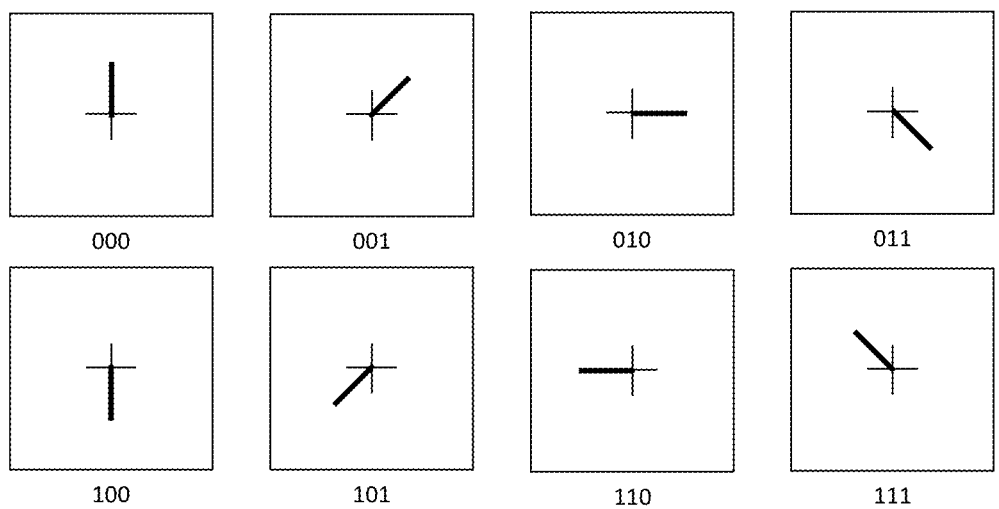
FIG. 20 shows an example of a second code based on line segments where tips of the line segments are virtual points.

FIG. 20 is an example of a second code based on line segments whose tip is located at a virtual point. That is, instead of arranging dots around a virtual point as shown in FIG. 14 and defining information by distance and direction, line segments may be arranged around the virtual points and information may be defined by the length and the direction of the line segments, as shown in FIG. 20. Line segments are examples of marks. The patterns of the line segments in FIG. 20 can be said to constitute an example of patterns that excludes arrangements in which marks are in contact with each other. In addition, for the line segment pattern of FIG. 20, it can be said that excluded are arrangements in which marks are in contact with the boundary between the special cell and cells adjacent to the special cell. Also as shown in FIG. 20, a part of the numerical data can be defined by at least one of the direction and the length of a line segment.

Figure 21:
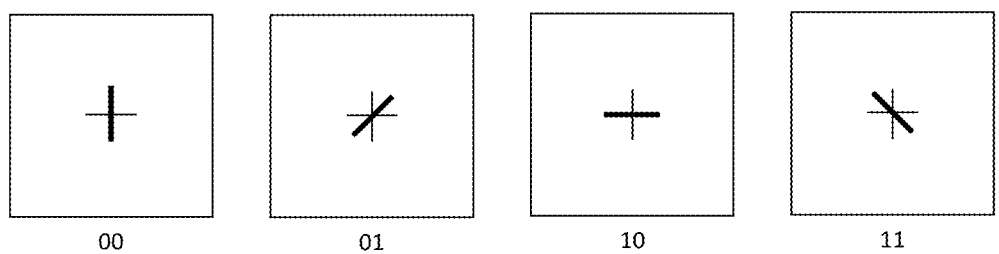
FIG. 21 shows an example of a second code based on line segments where centers of the line segments are virtual points.
Figure 22:
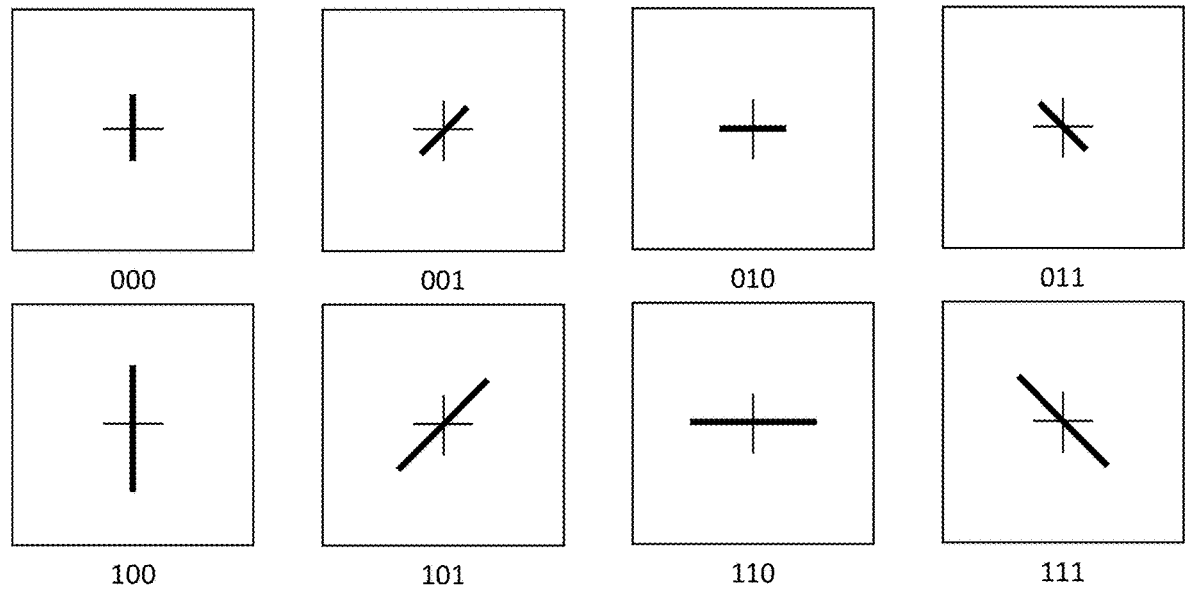
FIG. 22 shows an example of a second code where line segment lengths are changed in a plurality of stages.
Figure 23:
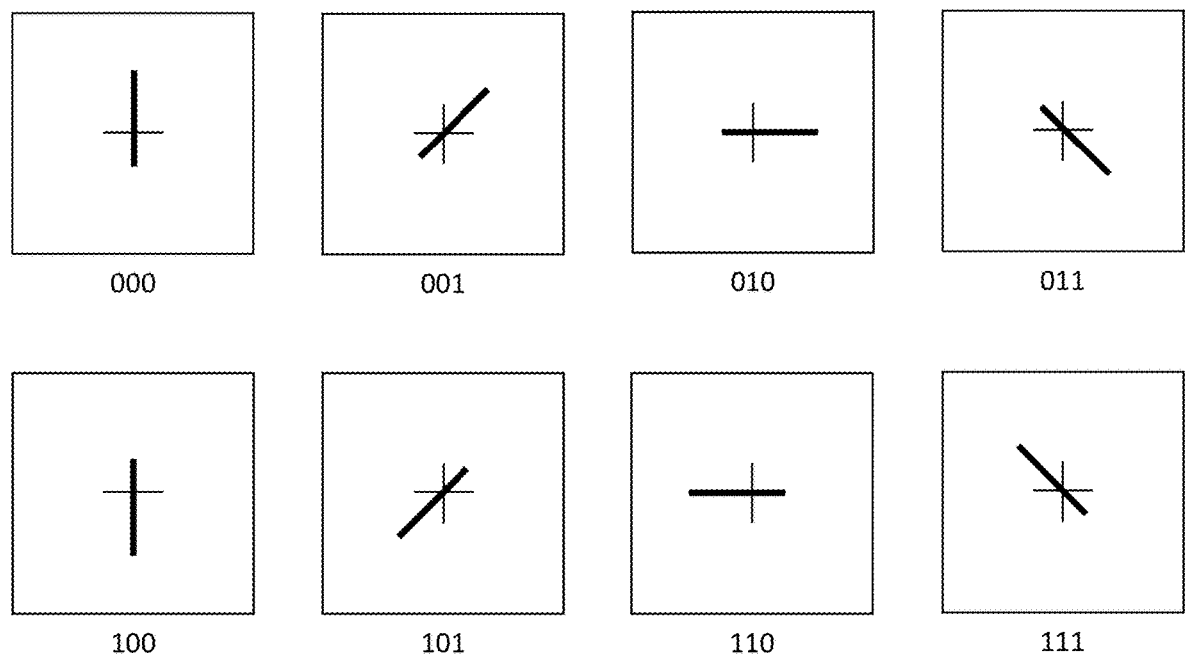
FIG. 23 shows an example of a second code based on line segments where positions at which line segments are internally divided at predetermined ratios are virtual points.

FIG. 21 is an example of a second code based on line segments whose centers are positioned at virtual points. Also in FIG. 21, a part of a numerical data can be defined by at least one of the direction and the length of the line segment. Furthermore, as shown in FIG. 22, the length of the line segments is changed in a plurality of stages, and the length of a line segment is one element that defines information. Note that when a line segment is arranged as the second code, the position of the virtual point is not limited to the center of the line segment. For example, FIG. 23 shows an example of a second code in which not the center of a line segment but a position at which a line segment is internally divided at a predetermined ratio (for example, at a position ⅓ from the end of a line segment) is located at a virtual point. Therefore, also in FIG. 22 or FIG. 23, a part of the numerical data can be defined by at least one of the direction and the length of a line segment. Also, for FIGS. 20 to 23, it can be said that a part of the numerical data is defined by arranging any position of the line segment on a virtual point.

As described above, as shown in FIGS. 14 to 23, it can be said that one or more virtual points are arbitrarily set at positions having coordinate information in special cells. Furthermore, as shown in FIGS. 14 to 23, it can be said that numerical data is defined by arranging marks in regards with virtual points. Note that as shown in FIGS. 14 to 23, the marks are defined with respect to the bright-colored area and the dark-colored area. However, the marks may be defined, for example, by any two of R (red), G (green), and B (blue). Therefore, it can be said that FIGS. 14 to 23, constitute examples of the composite code in which a part of the numerical data is defined by at least one of the mark shape, the color, the mark arrangement method with respect to the virtual points, and the presence or absence of a mark. Furthermore, as shown in FIGS. 14 to 23, the second code is defined by dots or line segments. However, the shape of the mark may be any polygonal shape or a substantially circular shape.

<Example of a QR Code Actually Arranged with Dots>

Figure 24:
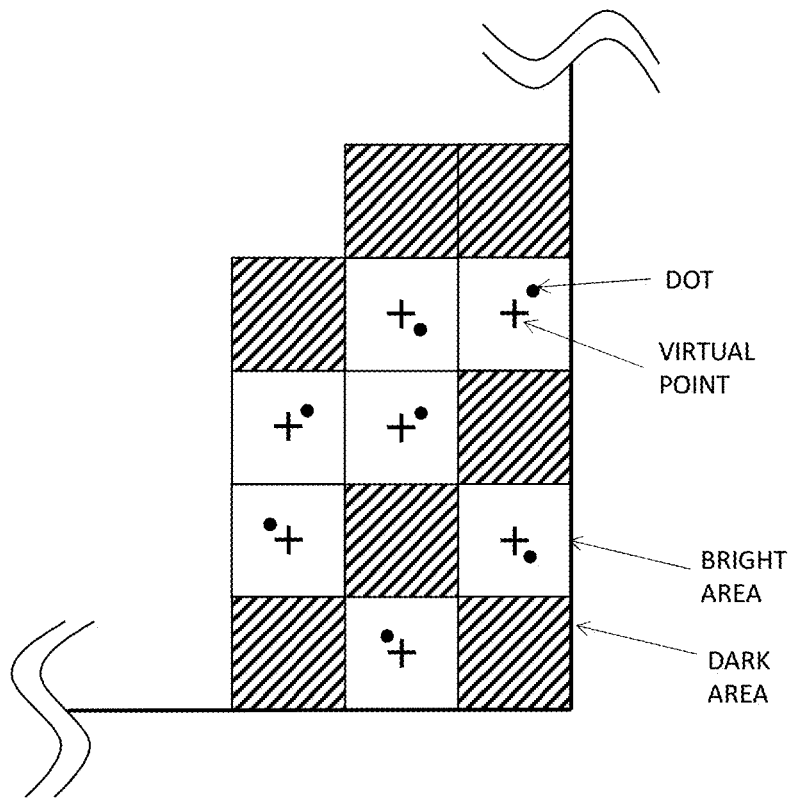
FIG. 24 is a diagram showing an example of a configuration (1) of a composite code in which a dot pattern is arranged in a cell of a QR code.

FIG. 24 is a diagram showing a configuration example (1) of a composite code in which dot patterns are arranged in cells of a QR code as an example of a first code. In the configuration example (1), as an example of the second code, dot patterns that define information by distance and direction from a virtual point is exemplified. A dot pattern where information is defined based on distance and direction from a virtual point is as described with reference to FIG. 14. In FIG. 24, dark-colored areas filled with a hatching pattern and bright-colored areas without a hatching pattern are formed in the QR code portion. In addition, virtual points are exemplified by plus ("+") marks substantially near the center in the bright-colored areas. Note that marks such as plus ("+") are shown to exemplify the positions of virtual points in the drawing, and marks such as plus ("+") are not drawn in the actual composite code. In addition, exemplified in each bright-colored area is one dot around the virtual point in one of the directions defined by dividing directions by approximately 45 degrees.

Figure 25:
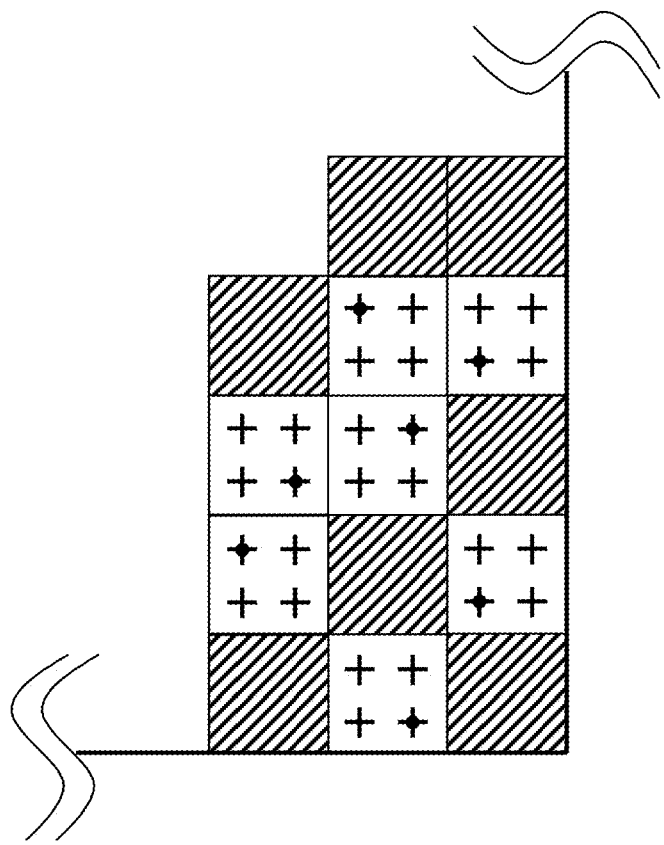
FIG. 25 is a diagram showing an example of a configuration (2) of a composite code in which a dot pattern is arranged in a cell of a QR code.

FIG. 25 is a diagram showing a configuration example (2) of a composite code in which dot patterns are arranged in cells of a QR code as an example of a first code. In the configuration example (2), as an example of the second code, a plurality of virtual points are provided in bright-colored areas, and information is defined by combinations of the presence and the absence of dots at the virtual points. In FIG. 25, four virtual points are provided in one bright-colored area, but according to the present embodiment virtual points are not limited to four.

Figure 26:
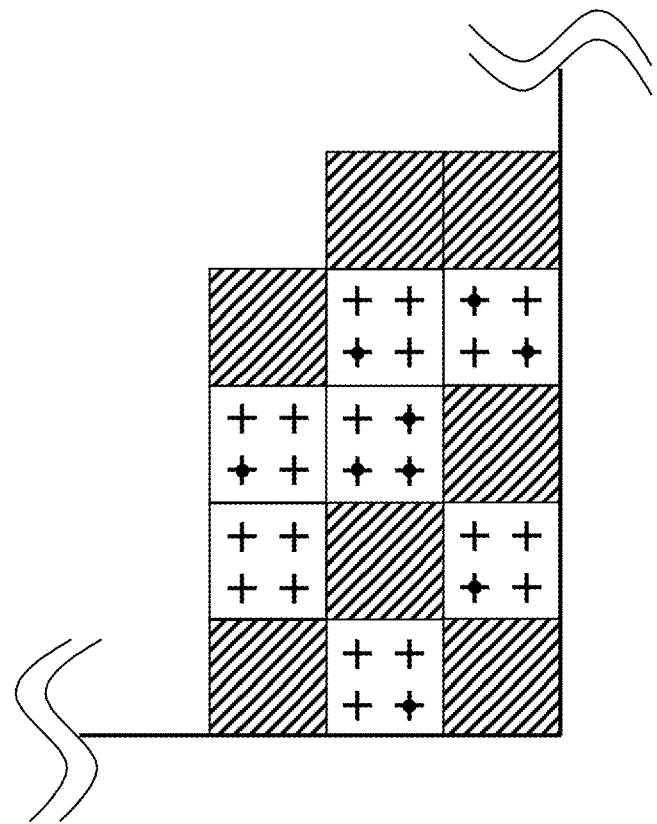
FIG. 26 is a diagram showing an example of a configuration (3) of a composite code in which a dot pattern is arranged in a cell of a QR code.

FIG. 26 is a diagram showing a configuration example (3) of a composite code in which dot patterns are arranged in cells of a QR code as an example of a first code. In the configuration example (3), as an example of the second code, a plurality of virtual points are provided in bright-colored areas, and information is defined by combinations of the presence and the absence of dots at the virtual points. In FIG. 25, one dot is arranged in each bright-colored area. In FIG. 26, zero to three dots are provided in one bright-colored area.

Figure 27:
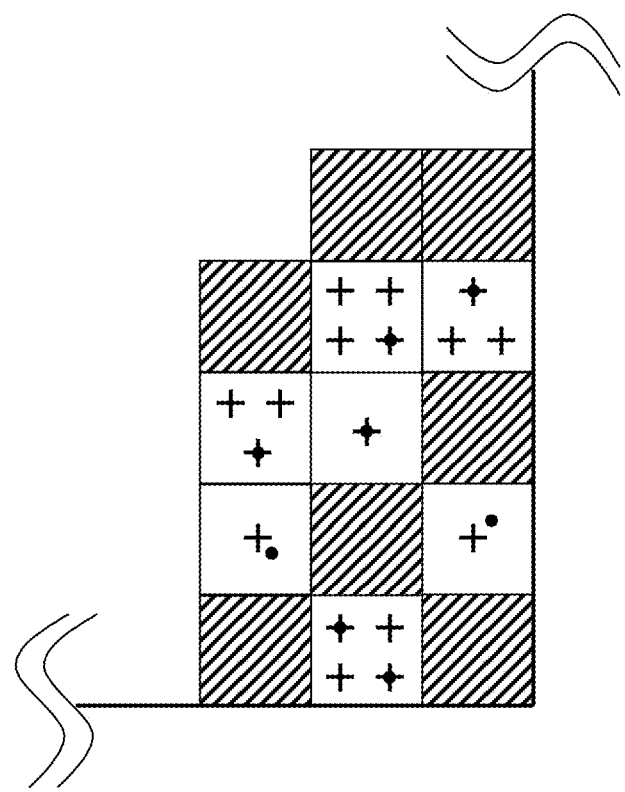
FIG. 27 is a diagram showing an example of a configuration (4) of a composite code in which a dot pattern is arranged in a cell of a QR code.

FIG. 27 is a diagram illustrating a configuration example (4) of a composite code in which dot patterns are arranged in cells of a QR code as an example of a first code. In the configuration example (4), as an example of the second code, the number of virtual points and the dot arrangement method differ depending on the special cell in which the dot pattern is defined. That is, the number of virtual points, the arrangement position of the virtual points, and the way of arranging dots with respect to the virtual points may be different depending on the position of the special cell. As for methods of arranging dots with respect to virtual points, for example, as exemplified in FIG. 24, is an arrangement of dot patterns where information is defined by distance and direction in regards with a virtual point, and as exemplified in FIG. 25 and FIG. 26, is an arrangement of dot patterns where information is defined by whether or not there is a dot at a virtual point. Also, the number of dots in one bright-colored area may be one or plural.

In any case, the method in which the second code is defined may be common for each cell position between the generation apparatus that generates a composite code and the reading apparatus that acquires information from the composite code. Also, for example, information for specifying the method in which the second code is defined may be incorporated in the format information sections exemplified in FIG. 1.

Figure 28:
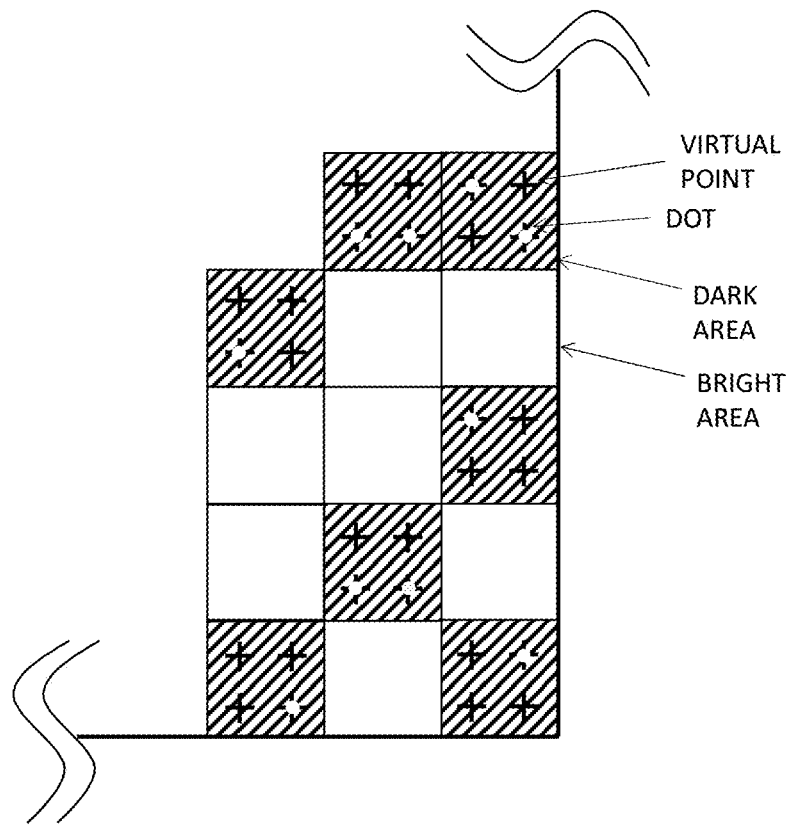
FIG. 28 is a diagram showing an example of a configuration (5) of a composite code in which a dot pattern is arranged in a cell of a QR code.

FIG. 28 is a diagram showing as an example of a second code, a configuration example (5) of a composite code in which dot patterns are arranged in cells of a QR code. In the configuration example (5), as an example of a second code, information is defined by arranging bright-colored dots in a dark-colored area. FIG. 28 exemplifies a dot pattern in which bright and dark colors are interchanged in regards with the dots used with respect to the dot pattern exemplified in FIG. 26 in which dark-colored dots are arranged in bright-colored areas.

Figure 29:
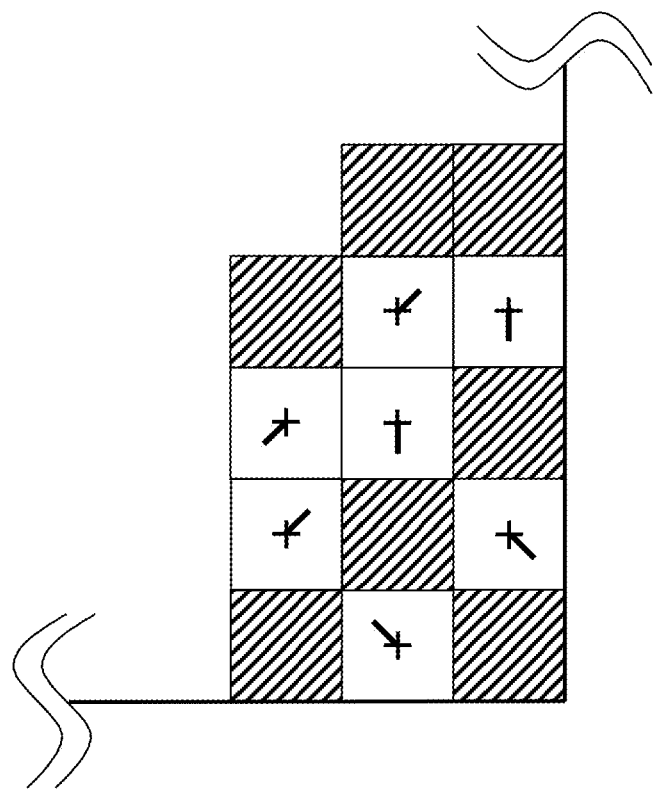
FIG. 29 is a diagram showing an example of a configuration (6) of a composite code in which a dot pattern is arranged in a cell of a QR code.

FIG. 29 is a diagram showing a configuration example (6) of a composite code in which a dot pattern is arranged in a cell of a QR code as an example of the second code. In the configuration example (6), as an example of the second code, information is defined by arranging a line segment in bright-colored areas. In the configuration example (6), as with FIG. 20, the line segments are arranged with the tip of the line segment positioned at the virtual points.

Figure 30:
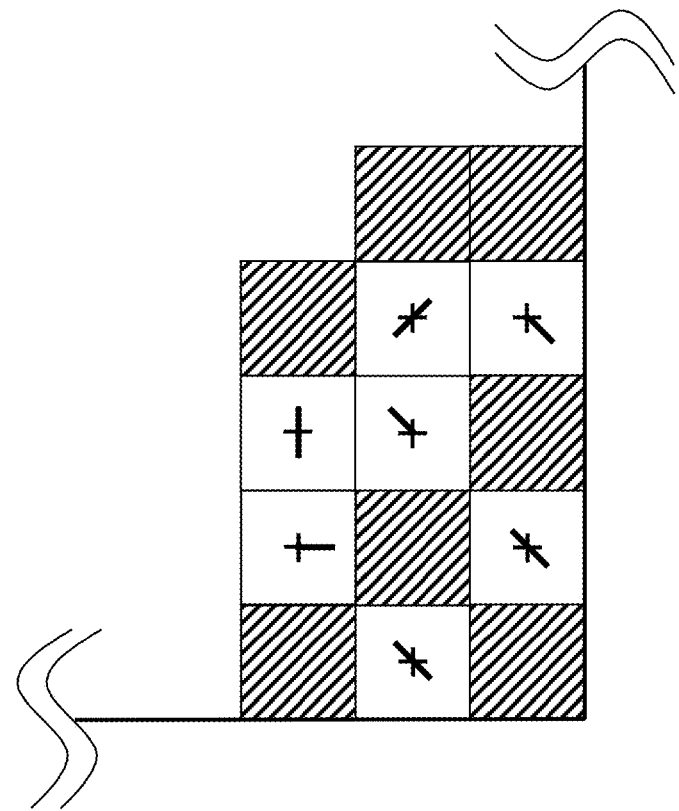
FIG. 30 is a diagram showing an example of a configuration (7) of a composite code in which a dot pattern is arranged in a cell of a QR code.

FIG. 30 is a diagram showing a configuration example (7) of a composite code in which line segment patterns are arranged in a cell of a QR code as an example of the second code. In the configuration example (7), the line segments are arranged in a different arrangement manner depending on the special cell in which the second code is arranged. For example, a line segment in which the tip of the line segment is a virtual point, a line segment in which the center of the line segment is a virtual point, a line segment in which the length of the line segment is changed in a plurality of steps and the length of the line segment becomes an element that defines information, a line segment in which the position where the line segment is divided at a predetermined ratio becomes a virtual point, and the like can be adopted.

Figure 31:
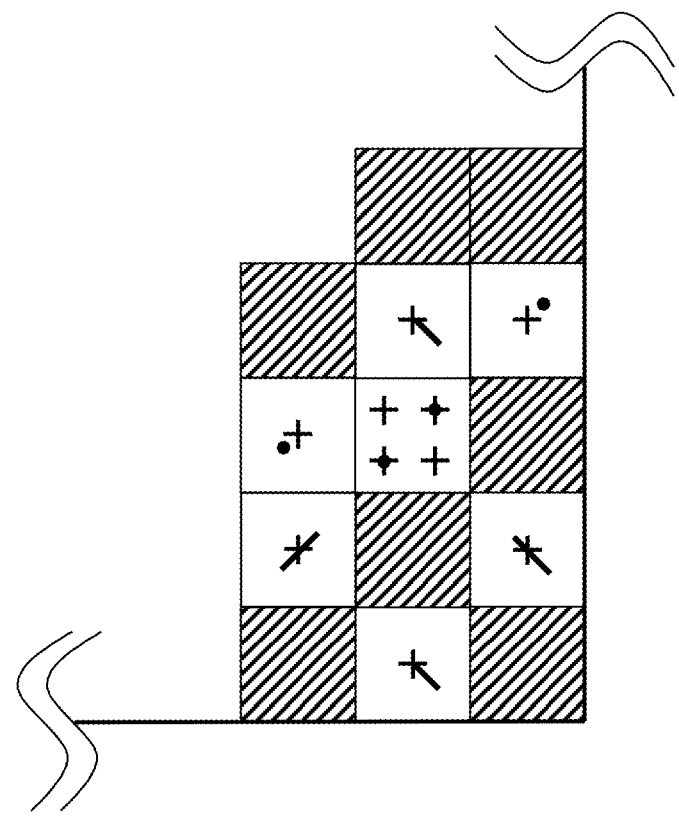
FIG. 31 is a diagram showing an example of a configuration (7) of a composite code in which a dot pattern is arranged in a cell of a QR code.

FIG. 31 is a diagram showing a configuration example (8) of a composite code in which line segment patterns are arranged in cells of a QR code as an example of the second code. In the configuration example (8), for each special cell in which the second code is arranged, either a line segment pattern or a dot pattern is selected and arranged as an example of the second code. Furthermore, the method of arranging a line segment pattern and the method of arranging a dot pattern is defined for each special cell. Such a method of arranging the second code may be shared between the generation apparatus that generates the composite code and the reading apparatus that reads the composite code.

Furthermore, although not shown in FIG. 24 to FIG. 31, a composite code may be formed by combining a second code (FIG. 24 or the like) defined in bright-colored areas and a second code (FIG. 28) defined in dark-colored areas.

<System Configuration>

Figure 32:
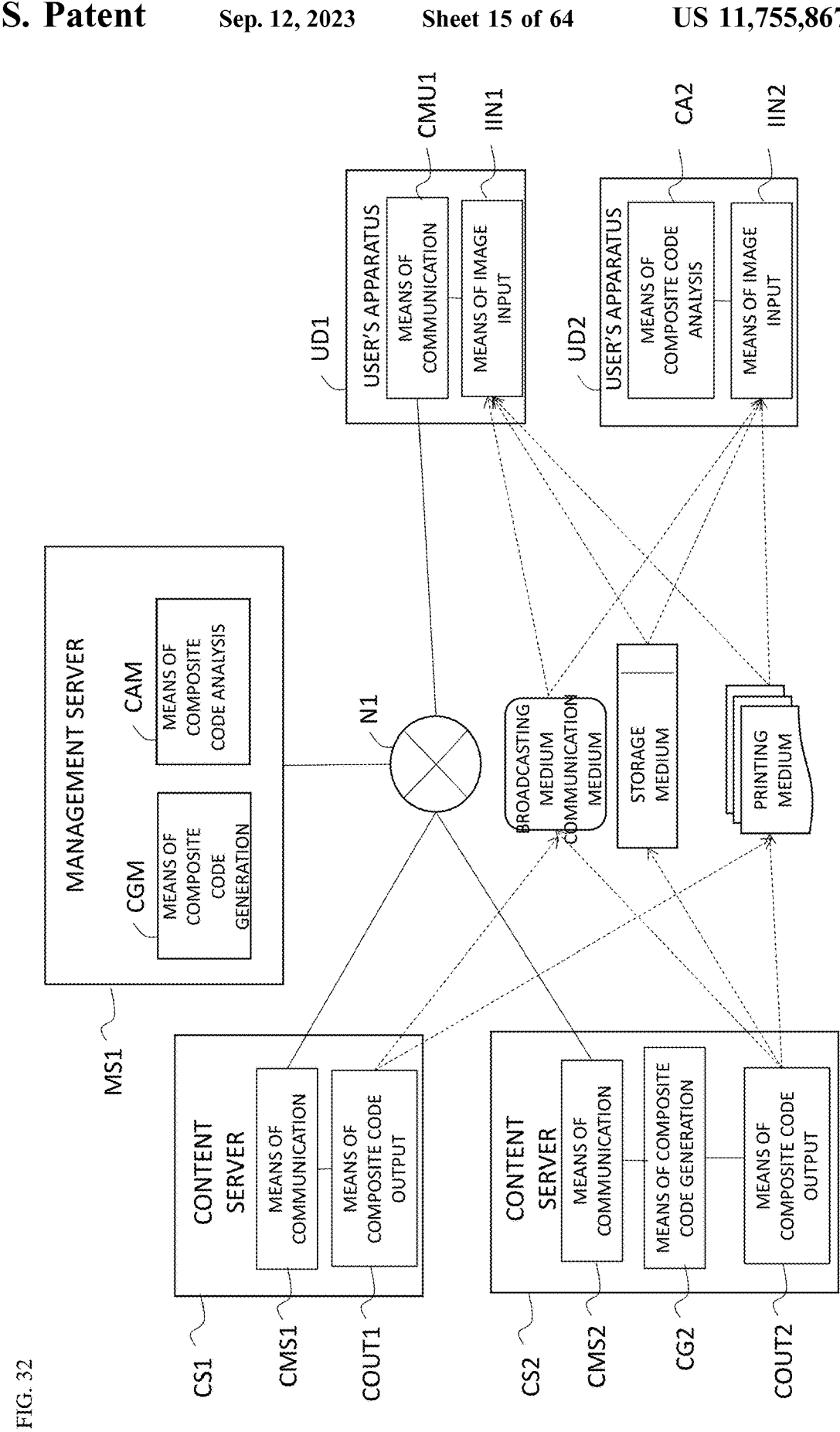
FIG. 32 is a diagram exemplifying a configuration of an information system that provides a service using a composite code according to the first embodiment.

FIG. 32 is a diagram exemplifying a configuration of an information system for providing a service using composite codes. In this information system, a management server MS1, content servers CS1 and CS2, and a user device UD1 are connected by a network N1. Furthermore, this information system may include a user device UD2 that is not connected to the network N1.

The management server MS1 has a composite code generation means CGM and a composite code analyzing means CAM. The composite code generation means CGM converts input digital data into a composite code. For example, the management server MS1 receives the digital data from the content server CS1 through the network N1, generates composite code image data by the composite code generation means CGM, and returns the image data to the content server CS1.

The composite code analyzing means CAM analyzes the input composite code and converts it into original digital data. The management server MS1 receives, for example, an image of a composite code from the user device UD1 via the network N1, generates the original digital data by the composite code analyzing means CAM, and returns the digital data to the user device UD1.

The content server CS1 has a communication means CMS1 and a composite code output means COUT1. The content server CS1 provides various contents or services to the user devices UD1, UD2, and the like. The contents provided by the content server CS1 are provided to the user device through, for example, a broadcast system or an electronic information communication system, which is a broadcast medium or a communication medium. The contents can be exemplified to include images (static images or motion pictures). The broadcast medium refers to, for example, a television broadcast or the like, and is a medium that distributes contents by using electromagnetic waves or the like. The communication medium refers to, for example, the Internet or the like, and is a medium that distributes contents over a wired or wireless network.

The content server CS1 can provide contents to the user devices UD1, UD2, and the like via recording media such as a CD, a DVD, a Blu-ray disc, and a USB memory. Furthermore, the content server CS1 can provide the contents to the user devices UD1, UD2, and the like via a print medium. The print medium is exemplified by, for example, paper and the surface of an object on which an image can be formed with ink.

The content server CS1 transfers digital data related to a content to be provided to the management server MS1 via the network N1, and converts the digital data into a composite code. Then, the content server CS1 acquires the composite data converted by the management server MS1 through the network N1, and provides the composite data together with the content to the user devices UD1, UD2, and the like. The digital data associated with the content includes various kinds of textual information related to the provided content, a URL related to the provided content, identification information related to the provided content, authentication information for access, and the like.

The content server CS2 has a composite code generation means CG2 in addition to the communication means CMS2 and the composite code output means COUT2. Therefore, the content server CS2 can convert digital data related to a content to be provided into a composite code by the composite code generation means CG2. Therefore, the content server CS2 does not need to transfer digital data to the management server MS1 for converting digital data into a composite code. Note that the functions of the communication means CMS2 and the composite code output means COUT2 are the same as those of the above-described communication means CMS1 and composite code output means COUT1 of the content server CS1. Note that the content servers CS1 and CS2 can be exemplified to be, for example, an information processing apparatus that is associated with a broadcasting apparatus of a broadcasting station, a server that provides contents on the Internet, a printing apparatus of a printing company or the like, a server that is associated with a printer, or a computer or the like built in a printing apparatus.

The user device UD1 has a communication means CMU1 and an image input means IIN1. The image input means IIN1 includes a television screen as a broadcast medium, a screen showing graphics objects of web contents as a communication medium, a screen showing graphics objects output from a recording medium, or an image input means for inputting an image from a printed matter formed by a print medium. The image input means is, for example, a scanner, a camera, or the like having an imaging device such as a charge-coupled device (charge-coupled device, CCD), a metal-oxide-semiconductor (MOS) image sensor, a complementary metal-oxide-semiconductor (CMOS) image sensor, or the like.

The user device UD1 transfers the input image itself or the composite code portion in the input image to the management server MS1 via the network N1, and restores digital data encoded in a composite code. Then, the user device UD1 executes a process corresponding to the digital data based on the obtained digital data and the content provided from the content servers CS1, CS2, and the like. The processing corresponding to digital data includes, for example, determining the validity of the content, determining whether or not to allow access to the content, changing the method of providing the content to the user, the provision of other contents related to the content, and the like.

The user device UD2 has a composite code analyzing means CA2 in addition to the image input means IIN2. The user device UD2 restores digital data encoded in a composite code from the input image using the composite code analyzing means CA2. Therefore, the user device UD2 does not need to transfer the input image and the composite code portion of the input image to the management server MS1 for restoring the digital data. Then, the user device UD2 executes a process corresponding to the digital data based on the obtained digital data and the content provided from the content servers CS1, CS2, and the like. Note that, as the user devices UD1 and UD2, a personal computer, a tablet terminal, a smartphone, and the like can be exemplified.

Figure 33:
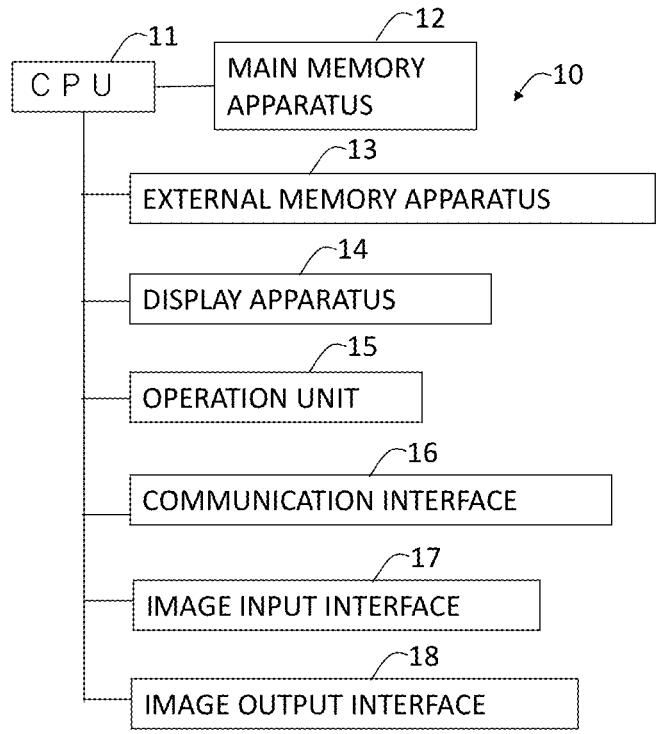
FIG. 33 is a diagram exemplifying a hardware configuration of an information processing apparatus.

FIG. 33 shows a diagram exemplifying a hardware configuration of the information processing apparatus 10. The information processing apparatus 10 is applicable to the management server MS1, the content servers CS1, CS2, and the user devices UD1, UD2 of the present embodiment. The information processing apparatus 10 includes a CPU 11, a main storage apparatus 12, and external devices, and executes information processing by a program. The CPU 11 is also referred to as a processor. Examples of the external device include an external storage apparatus 13, a display apparatus 14, an operation unit 15, a communication interface 16, an image input interface 17, and an image output interface 18.

The CPU 11 executes a computer program developed in the main storage apparatus 12 enabling execution, and provides functions of the information processing apparatus 10. The main storage apparatus 12 stores the computer programs executed by the CPU 11, data and the like processed by the CPU 11. The main storage apparatus 12 is a Dynamic Random Access Memory (DRAM), a Static Random Access Memory (SRAM), a Read Only Memory (ROM), or the like. Furthermore, the external storage apparatus 13 is used, for example, as a storage area that assists the main storage apparatus 12, and stores the computer programs executed by the CPU 11, data and the like processed by the CPU 11. The external storage apparatus 13 is a hard disk drive, a Solid State Disk (SSD), or the like. Furthermore, the information processing apparatus 10 may be provided with a drive unit for a removable storage medium. The removable storage medium is, for example, a Blu-ray disc, a Digital Versatile Disk (DVD), a Compact Disc (CD), a flash memory card, or the like.

The display apparatus 14 is, for example, a liquid crystal display, an electroluminescence panel, or the like. The operation unit 15 is, for example, a keyboard, a pointing device, or the like. In the present embodiment, a mouse is exemplified as a pointing device. The communication interface 16 exchanges data with other apparatuses on the network N1. For example, the CPU 11 communicates with other apparatuses on the network N1 via the communication interface 16. Furthermore, the communication interface 16 may be connected to a broadcasting apparatus. The broadcasting apparatus converts, for example, digital data from a baseband signal to a high-frequency signal, and transmits the high-frequency signal obtained by conversion as a broadcast wave via a high-frequency amplifier and an antenna.

A camera, a scanner, or the like is connected to the image input interface 17, and image data is acquired from various media. Various media can be exemplified to be a screen of a television receiver, a display of a computer, printed matter such as a book or the like, a visible pattern or the like formed on the surface of an object.

A printing apparatus, a printer, or the like is connected to the image output interface 18, and image data is output to a print medium. Note that although omitted in FIG. 33, the information processing apparatus 10 may include a camera, a scanner, or the like connected via the image input interface 17. Furthermore, the information processing apparatus 10 may include a printing apparatus, a printer, or the like connected via the image output interface 18.

Furthermore, when the information processing apparatus 10 is applied as the management server MS1, the image input interface 17 and the image output interface 18 does not have to be provided. Also, when the information processing apparatus 10 is applied as the content servers CS1 and CS2, the image input interface 17 does not have to be provided. Furthermore, when the information processing apparatus 10 is applied as a user device, the image output interface 18 does not have to be provided.

<Processing Flow>

The processing flow in the present information system will be described with reference to FIGS. 34 to 36. Hereinafter, the content servers CS1 and CS2 are collectively referred to simply as content servers CS. That is, any one of the content servers CS1 and CS2 may execute the following processing. Furthermore, the user devices UD1 and UD2 are collectively referred to simply as user devices UD. That is, any one of the user devices UD1 and UD2 may execute the following processing.

Figure 34:
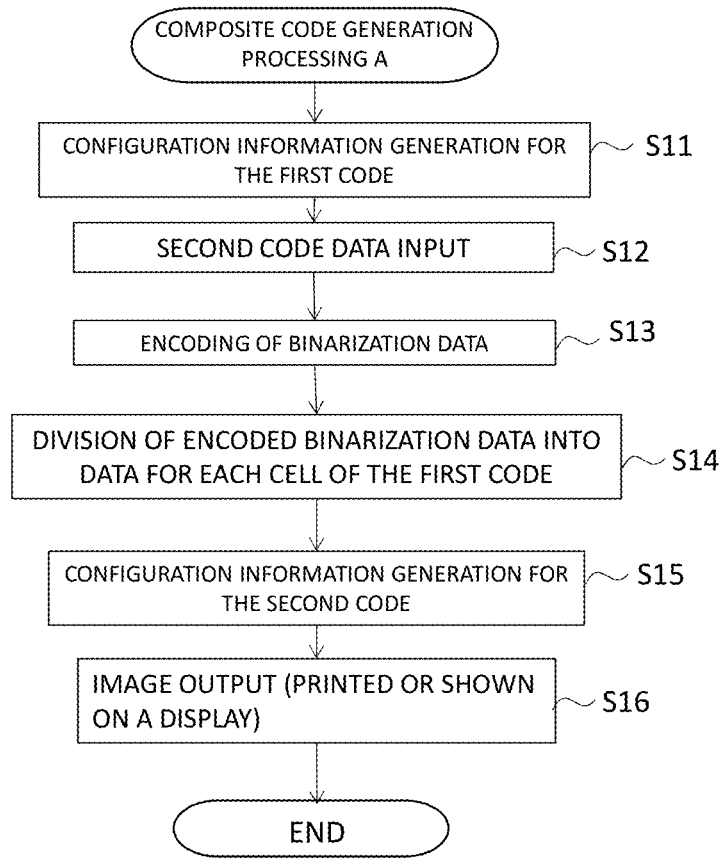
FIG. 34 is a flowchart exemplifying a composite code generation processing A by a content server.

FIG. 34 shows a flowchart exemplifying a composite code generation process A by a content server CS. The composite code generation process A is used to distinguish it from the composite code generation process B shown in FIG. 38. From the processing in FIGS. 34 and 38, it can be said that the content server CS executes processing as a composite code generation apparatus. In the process of FIG. 34, the content server CS generates first code shape information (S11). For example, when the first code is a QR code, the content server CS determines the arrangement of bright-colored cells and dark-colored cells in the QR code.

Next, the content server CS inputs the digital data to be converted into the second code (S12). The digital data is, for example, information related to a content provided by the content server CS. The digital data is input from, for example, a storage apparatus associated with the content provided by the content server CS.

Next, the content server CS performs binary encoding of the digital data (S13). Then, the content server CS divides the binary encoded data into data for each cell of the first code (S14). That is, the content server CS divides the binary encoded data by the maximum number of bits that can be represented by the dot pattern in each cell. Then, the content server CS assigns the divided data to cells in which the second code can be arranged in accordance with a predetermined rule.

Cells in which the second code can be arranged refer to, for example, bright-colored cells in a case where the first code is defined by a combination of bright-colored cells and dark-colored cells, and the second code is defined by a dark-colored dots. Cells in which the second code can be arranged refer to, for example, dark-colored cells in a case where the first code is defined by a combination of bright-colored cells and dark-colored cells, and the second code is defined by a bright-colored dots. The content server CS determines the cells to which the second code is assigned and the assignment order in accordance with a predetermined rule, for example, those in FIGS. 7, 8 to 13, and the like. Note that, as already exemplified in FIG. 11, the content server CS may repeatedly form the plurality of the special cells that constitute the second code, a plurality of times, and make assignments of the cells.

Then, the content server CS generates the shape information of the second code (S15). That is, in the process of S14, the content server CS converts the binary encoded data divided for each cell into image data that is encoded based on virtual points in the cells. The image data encoded based on the virtual points in the cells is, for example, those exemplified in FIGS. 3 to 6. Then, the content server CS outputs the image data (S16). The output destination is, for example, a print medium such as a printer or the like, a display apparatus of a user device UD by electronic information distribution via the network N1, or a broadcast medium by distribution or the like. It can be said that the content server CS that executes the processing of S11 and the processing of S16 has an example of a first generation means that generates the first code. In addition, it can be said that the content server CS that executes the processings from S12 to S16 has an example of a second generation means. Therefore, it can be said that the content server CS excludes, as a second generation means, arrangements in which marks are in contact with each other when a plurality of marks are arranged in a special cell. In addition, it can be said that the content server CS excludes, as a second generation means, arrangements in which marks are in contact with the boundary between a special cell and a cell adjacent to the special cell.

Note that when the content server CS is the content server CS1, the digital data is transferred to the management server MS1, and the processes from S13 to S15 are executed by the management server MS1. The content server CS1 may output the image data generated by the management server MS1 to a printer, a user device UD on a network, a broadcast medium, or the like.

Figure 35:
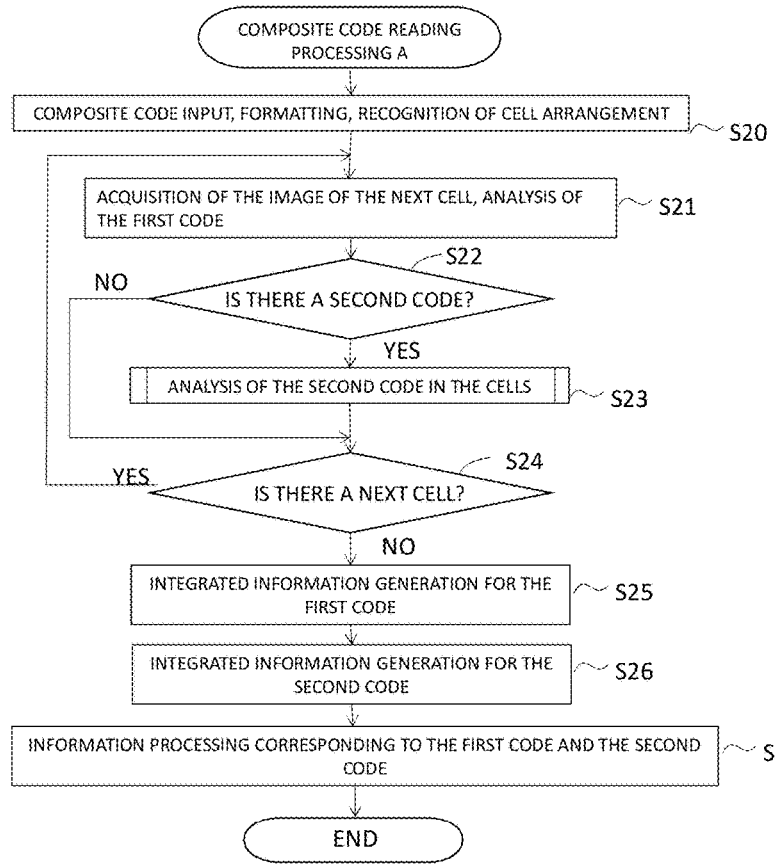
FIG. 35 is a flowchart exemplifying a composite code reading processing A by a user's apparatus.

FIG. 35 shows a flowchart exemplifying a composite code reading process A by a user device UD. The composite code reading process A is used to distinguish it from the composite code reading process B in FIG. 39. From the processing in FIGS. 35 and 39, it can be said that the content server CS executes processing as a composite code reading apparatus. In the processing of FIG. 35, the user device UD inputs an image of a composite code input from a scanner or a camera via the image input interface 17, and recognizes the format and the arrangement of the cells of the first code (S20). For example, the user device UD recognizes the orientation of a QR code using the finder patterns, and corrects image distortion using the alignment patterns. Furthermore, the user apparatus UD recognizes the cell arrangement width using the timing patterns, and specifies the arrangement positions of the QR code data and the error correction code. Thereafter, the user device UD processes the composite code in the arrangement order of the first code for each cell. For example, the user device UD sequentially processes the cells in the rightmost two columns from right to left proceeding in the upward direction from the cell in the lower-right corner of the QR code, and when processing for the two columns is completed, for the cells in the third and fourth columns, processings are performed sequentially from top to bottom. Thereafter, the data cells and the error correction code cells are similarly processed by two columns each. Below, processing for each cell will be described.

That is, the user device UD obtains the image of the next cell, analyzes the first code, and determines bright or dark (S21). Next, the user device UD determines whether or not a second code is defined in the cell being processed (S22). For example, the user apparatus UD recognizes the method in which the virtual points are arranged and the method in which the dots are arranged with respect to the virtual points from the format information acquired in S20, and determines whether or not there is at least one dot at the corresponding positions. Then, if a second code is defined in the cell, the second code in the cell is analyzed (S23). Note that the second code may be defined in bright-colored cells. Furthermore, the second code may be defined in dark-colored cells as shown in FIG. 10.

Then, the user apparatus UD determines whether or not the next cell remains unprocessed (S24). If the next cell is unprocessed, the user device UD returns the process to S21. On the other hand, when the processing of all of the cells is completed and there is no next cell, the user apparatus UD generates information in which the first code is integrated for each character from the bit string obtained by the determination of bright or dark of the first code (S25). For example, the user device UD separates the bit string obtained from the determination of bright and dark into characters and generates digital data (S25). It can be said that the user device UD that executes the processing of S20, S21, and S25 has a first acquisition means for acquiring numerical data from the first code.

Then, the user device UD restores digital data based on the bit string obtained from the second code (S26). For example, when the second code is composed of a combination of a predetermined number (for example, 16) of cells as shown in FIG. 11, a bit string based on a dot pattern from the first cell to the predetermined number of cells is integrated, and digital data is restored. It can be said that the user device UD that executes the processing of S23 and the processing of S26 has a second acquisition means for acquiring numerical data from the second code. Here, in S14, the user device UD determines the combination order of the second code in accordance with the same rule as that in which the content server CS assigns the divided data to the cells where the second code can be arranged. Therefore, it can be said that the user apparatus UD that performs the process of S26 has an example of a means of generating special cell indices for ordering special cells. Therefore, the user device UD may form special cell indices by, for example, repeatedly ordering a plurality of times the plurality of special cells constituting the second code, as exemplified in FIG. 11.

Then, the user device UD executes information processing corresponding to the digital data restored from the first code and the second code (S27). For example, the user device UD performs processing such as displaying, reproducing, outputting, or processing contents in accordance with the restored digital data, or performs adding data related to the contents or the like. However, in the present embodiment, there is no limitation to the information processing executed in the processing of S27. Note that when the user device UD is the user device UD1, the composite code is transferred from the user device UD1 to the management server MS1, and the processing from S20 to S26 is executed by the management server MS1. The user device UD1 may acquire the result from the management server MS1 and execute the process of S27.

Figure 36:
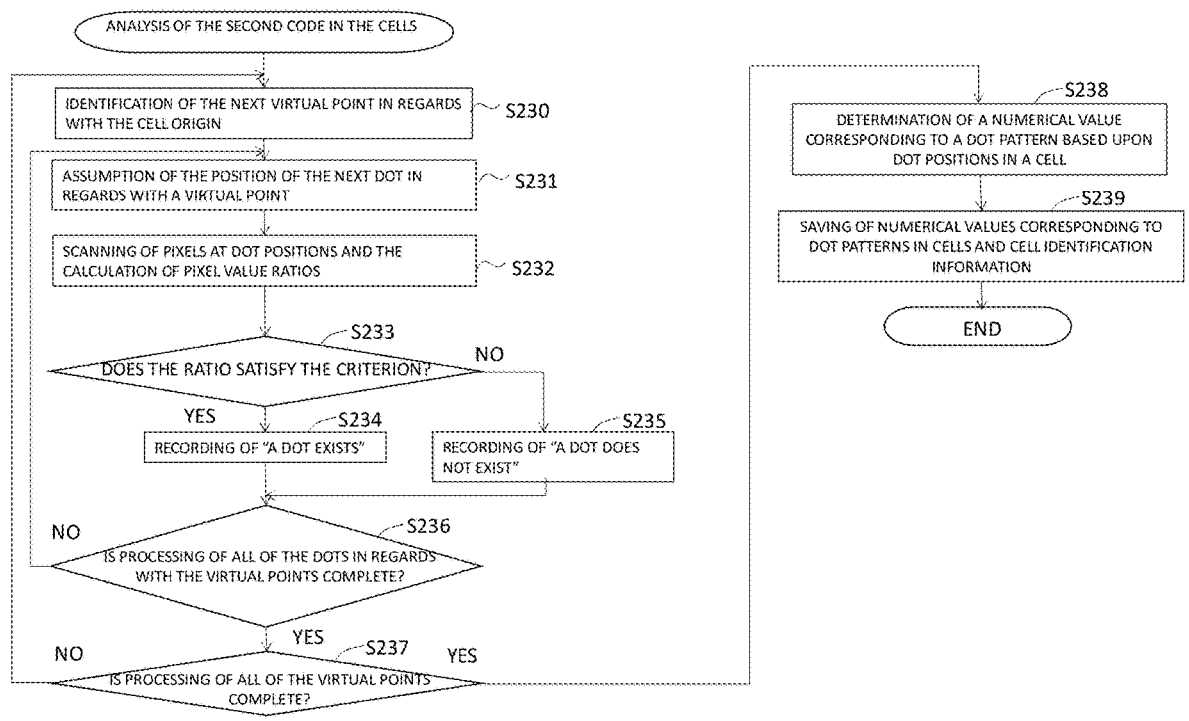
FIG. 36 is a flowchart exemplifying details of analytical processing of a second code in the cells.

FIG. 36 is a flowchart exemplifying the details of the analyzing process of the second code in a cell (S23 in FIG. 35). The following processing is described as being executed by the user device UD. However, as described above, when the user device UD is the user device UD1, the following processing is executed by the management server MS1. In this process, the user device UD specifies virtual points with respect to the cell origin (S230). Note that since the process of S230 is repeatedly performed, "next virtual point" is used in FIG. 36.

Then, the user device UD estimates the next dot position with respect to the virtual point (S231). For example, as exemplified in FIG. 6, when the dot positions are arranged at different distances and directions from the virtual point, each arrangement position is sequentially estimated. On the other hand, as shown in FIGS. 3 to 5, when a dot is placed on a virtual point, the virtual point itself is the estimated position.

Then, the user device UD scans a predetermined number of pixels for the pixels at the dot positions, and calculates the pixel value ratio $VP_n/VP_0$ (S232). Then, it is determined whether the ratio $VP_n/V_0$ is equal to or less than a criterion value (S233). Here, pixel refers to the array element of an image memory when an image obtained by scanning or obtained with a camera is stored in the image memory. Here, $VP_0$ is a pixel value at a position estimated as a dot center. $VP_n$ is a pixel value at a position n pixels away from the dot center. When $VP_n/VP_0$ is equal to or less than the criterion value, the ratio of the pixel value at the position n pixels away from the dot center to the pixel value at the position estimated as the dot center can be considered to be sufficiently small. Therefore, when the ratio $VP_n/V_0$ is equal to or less than the criterion value, the user device UD determines that the criterion value for estimating the presence of a dot is satisfied.

When the ratio satisfies the criterion value for estimating the presence of a dot, the user device UD records the presence of a dot (S234). On the other hand, when the ratio does not satisfy the criterion value for estimating the presence of a dot, that is, when the ratio $VP_n/VP_0$ is not equal to or less than the criterion value, the user device UD records the absence of a dot (S235).

Next, the user device UD determines whether or not the processing of all of the dot positions with respect to a virtual point has been completed (S236). If the processing of all of the dot positions for the virtual point has not been completed, the user device UD returns the processing to S230, and estimates the next dot position for the same virtual point. Note that when a dot is arranged on a virtual point, the determination in S236 is unnecessary.

On the other hand, when the processing of all of the dot positions for the virtual points has been completed, the user device UD determines whether or not the processing of all of the virtual points has been completed (S237). If the processing for all of the virtual points has not been completed, the user device UD returns the processing to S230, and executes processing for the next virtual point.

When the processing of all of the virtual points is completed, the user device UD determines the numerical value corresponding to the dot pattern in the cell based on the dot positions (S238). That is, the user device UD determines a numerical value restored from a dot arrangement. Then, the user device UD stores the numerical value corresponding to the dot pattern in the cell and the identification information of the cell (S238). The cell identification information may be a serial number assigned to the cell. The cell identification information may be, for example, the arrangement coordinates of the cell in a QR code. As in the example of FIG. 11, the cell identification information may be special cell indices among 1 to a predetermined number (for example, 16) that is repeatedly set. The user device UD may store the combination of a numerical value corresponding to a dot pattern in the cell, the cell identification information, and the special cell indices.

<Effect of the First Embodiment>

As described above, in the information system of the present embodiment, a composite code in which a second code defined by dot patterns in cells of a first code as exemplified by a QR code is adopted. For example, a content server CS generates a composite code, and provides the composite code to various media such as a broadcast medium, a communication medium, a storage medium, a print medium, and the like and distributes the composite code.

In the present composite code, dark-colored dots are used in bright-colored cells. In such a configuration, dots are separated from each other by the bright-colored area in the cell. Furthermore, the dots in the cell are separated from adjacent cells by the bright-colored area. Therefore, the user device UD, which is a reading apparatus, can clearly recognize the second code. As a result, it is possible to increase the amount of information to the first code and decoding can be performed stably. For example, when the second code has the format shown in FIG. 5, 256 combinations corresponding to 8-bit information can be defined in one cell.

Furthermore, in the above embodiment, the composite code analyzing means CA2 of the user device UD2 or the composite code analyzing means CAM of the management server MS1 determines whether or not a dot is present in accordance with whether or not the ratio between the pixel value $VP_0$ at the position where the presence of a dot in an image acquired from the image input means IIN1 and IIN2 is estimated to be (for example, the position where the dot center is estimated to be) and the pixel value $VP_n$ at a position a predetermined number of pixels (n pixels) away from the position where the dot center is estimated to satisfy a predetermined condition. By using such a ratio of pixel values, it is possible to accurately determine a boundary between a bright-colored area and a dark-colored area. In the determination based on the above ratio, for example, as an example of the first code, in the determination of bright color and dark color for a QR code, it is possible to perform a determination that is consistent with a case where cells in which 75% or more of all of the pixels are dark-colored pixels is determined to be dark-colored cells, and cells in which 25% or less of all of the pixels are dark-colored pixels is determined to be bright-colored cells. Furthermore, even if unevenness of illumination, the influence of shadows, a stain, or the like exists in an area in which the presence or absence of a dot is to be determined, and there is background fluctuation between a pixel at the position estimated to be the dot center and a pixel at a position separated by a predetermined number of pixels (n pixels) from the position estimated to be the dot center, the boundary between the bright-colored areas and the dark-colored areas can be accurately determined by calculating the ratio of the pixel values.

Furthermore, in the above embodiment, the composite code can be analyzed and a numerical value can be restored from the second code by at least one of a composite code analyzing means CA2 of the user device UD2 and a composite code analyzing means CAM of the management server MS1. Therefore, as with the user device UD1, even if there are no analyzing means CA2, a user device UD1 having an image input means IIN1 and a communication means CMU1 can easily provide service corresponding to a composite code to a user with only a light load through communication with a management server MS1.

Second Embodiment

In the first embodiment, the reading order of the second code is set to the reading order of the cells of the first code. However, the reading order of the cells in which the second code is set may be different from the reading order of the cells of the first code. For example, in the information system shown in FIG. 32, in the process (S14 in FIG. 34) in which the composite code generation means CGM and CG2 for generating a composite code divide a binary encoded bit string into data for each cell, the reading order of the cells in which the second code is set may be made different from that of the first code, and the reading order may be stored. For example, the reading order can be managed by associating the reading sequence numbers SEQ(k) of the cells with the center coordinates (Xi, Yj) of the cells. The composite code generation means CGM of the management server MS1 or the composite code generation means CG2 of the content server CS2 that generates a composite code may store the reading sequence numbers SEQ(k) of the cells in which the second code is set and the center coordinates ($X_i$, $Y_j$) of the cells in association with each other and pass them on to the user devices UD1 and UD2 that read the composite code.

Furthermore, for example, it is possible to assign serial number ID(n)s serving as a reference to all of the cells in accordance with a predetermined criterion, and manage the serial number ID(n) serving as identification information assigned to all of the cells and the reading sequence numbers SEQ(k) of the cells in which the second code is set in association with each other. The composite code generation means CGM of the management server MS1 or the composite code generation means CG of the content server CS2 that generates the composite code may store the reading sequence numbers SEQ(k) of the cells and the serial number ID(n)s for each cell in association with each other, and pass the information on to the user devices UD1 and UD2 for reading the composite code. In such a case, the relationship between the serial number ID(n)s for each cell and the center coordinates ($X_i$, $Y_j$) of each cell shall be set by a rule in advance.

Hereinafter, the reading sequence numbers SEQ(k) of the cells are also referred to as special cell indices. Furthermore, the relationship between the reading sequence numbers SEQ(k) of the cells in which the second code is set and the center coordinates ($X_i$, $Y_j$) of the cell or the relationship between the serial number ID(n)s which is identification information given to all of the cells and the reading sequence numbers SEQ(k) of the cells in which the second code is set, is referred to as cell reading order information.

Figure 37:
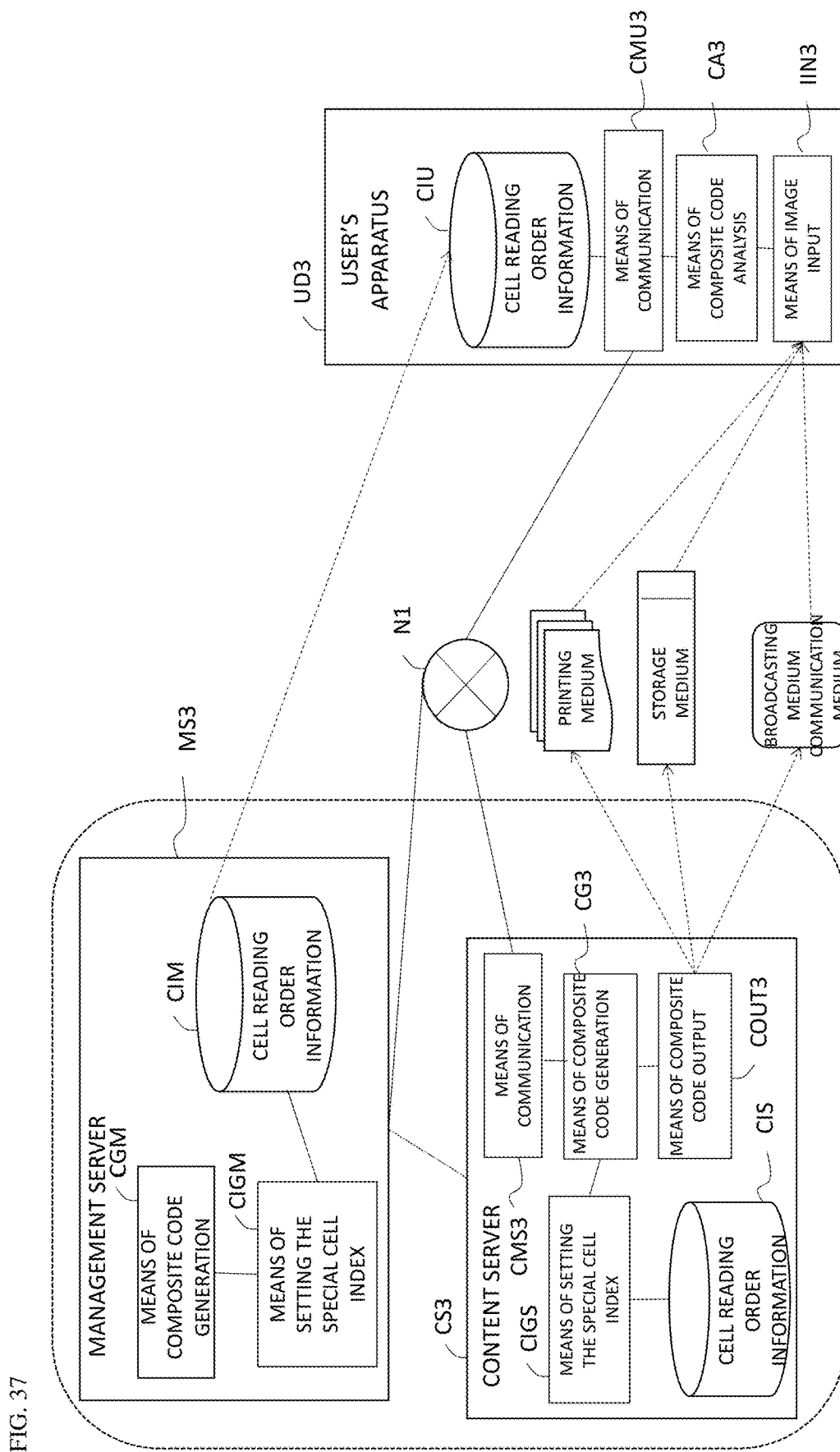
FIG. 37 is a diagram exemplifying a configuration of an information system according to the second embodiment.

FIG. 37 exemplifies a configuration of the information system according to the second embodiment. As shown in the figure, in this information system, a management server MS3, a content server CS3, and a user device UD3 are connected by a network N1. The management server MS3 has a composite code generation means CGM and a special cell index setting means CIGM. When generating a composite code, the composite code generation means CGM generates cell reading order information by the special cell index setting means CIGM and stores it in a cell reading order information file CIM.

In addition, the content server CS3 has a special cell index setting means CIGS. When generating a composite code, the content server CS3 generates cell reading order information by the special cell index setting means CIGS and stores it in a cell reading order information file CIS. Although omitted in FIG. 37, the present information system may include the content server CS1 of the first embodiment. The content server CS1 requests the management server MS3 to generate a composite code instead of generating the composite code by itself. Therefore, cell reading order information corresponding to the generated composite code is stored in a cell reading order information file CIM of the management server MS3. Note that since the communication means CMS3 and the composite code output means COUT3 are the same as the communication means CMS2 and the composite code output means COUT2 of the first embodiment, and thus description thereof is omitted.

The user apparatus UD3 acquires and holds, for example, cell reading order information from the management server MS3 or the content server CS3 via the network N1. The composite code analyzing means CA3 of the user device UD3 restores digital data from the second code by integrating in accordance with the cell reading order information the numerical values corresponding to the dot patterns set in each cell. Note that the image input means IIN3 and the communication means CMU3 are the same as the image input means IIN1, IIN2, the communication means CMU1, and the like of the first embodiment, and thus description thereof is omitted.

Figure 38:
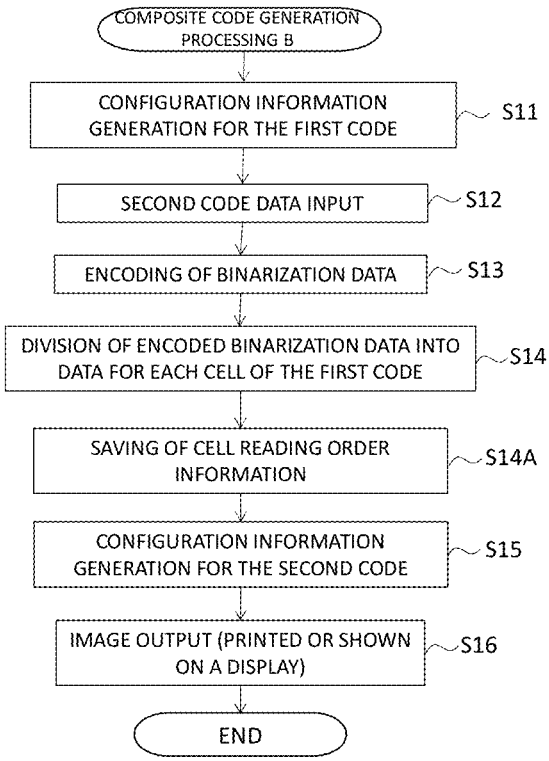
FIG. 38 is a flowchart exemplifying a composite code generation processing B.

FIG. 38 shows a flowchart exemplifying a composite code generation processing B performed by the content server CS3 or the management server MS3. This process differs from that in FIG. 32 in that the content server CS3 stores the cell reading order information in the process of S14A. Other procedures are the same as those in the first embodiment, and thus a description thereof is omitted. It can be said that the content server CS3 that executes the processings from S12 to S15 has a second-generation means that generates a second code.

Figure 39:
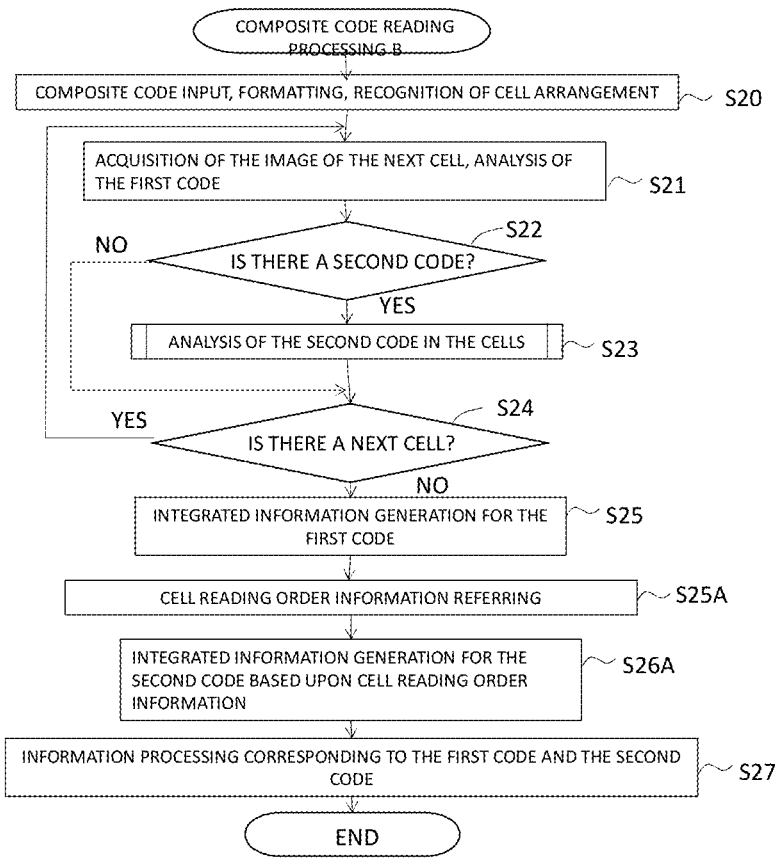
FIG. 39 is a flowchart exemplifying a composite code reading processing B.

FIG. 39 shows a flowchart exemplifying a composite code reading process B by the user device UD. This process differs from that in FIG. 35 in that the user device UD3 executes the processes of S25A and S26A. That is, the user device UD3 refers to the cell reading order information from the cell reading order information file CIU (S25A). Then, the user device UD3 integrates in accordance with the cell reading order information the numerical values assigned to the dot patterns in each cell, and restores digital data from the second code (S26A). Note that the user device UD3 may request the content server CS3 or the management server MS3 to generate the cell reading order information and refer to the generated cell reading order information instead of referring to the cell reading order information from the cell reading order information file CIU. It can be said that the user device UD that performs the processings of S22, S23, S25A, and S26A has a second acquisition means. In addition, it can be said that the user device UD3 that executes the processing of S25A has an acquisition means of acquiring special cell indices from a server that generates special cell indices for ordering the special cells or a server that stores the special cell indices. Furthermore, the content server CS3 or the management server MS3 can be said to constitute examples of a server that generates special cell indices for ordering special cells or a server that stores the special cell indices.

Note that the user device UD3 may acquire cell reading order information from the management server MS3 when executing the processing of S26A, or may acquire cell reading order information in advance from the management server MS3 and store it in a cell reading order information file CIU before executing the composite code reading processing of FIG. 39

As described above, in the second embodiment, the content server CS3 or the management server MS3 that generates composite codes stores the relationship between the reading sequence numbers SEQ(k) of the cells and the center coordinates (Xi, Yj) of the cells, or the relationship between the reading sequence numbers SEQ(k) of the cells and the serial number ID(n) for each cell in a cell reading order information file CIS, CIM, or the like. The cell reading order information stored in the cell reading order information file CIS, CIM, or the like is passed on to the user device UD3, and referred to when decoding the composite code. Then, the numerical values for each cell set in a dot pattern format are integrated and the second code is restored to the original digital data. Therefore, in accordance with the information system of the second embodiment, a dot pattern that constitutes the second code can be set in each cell in a reading order that does not depend on the reading order of the first code, for example, the QR code, and can be restored.

Such a reading order may be set by a rule in advance, or, for example, information specifying a reading order rule may be embedded in the format information sections or in the data (text) of the first code exemplified in FIG. 1. With such a configuration, the second code can be set in various ways.

Third Embodiment

In the above-described first and the second embodiments, in parallel with reading of the cells of the first code, the presence or absence of a dot pattern in each cell is determined, and the second code is decoded. However, the decoding of only the first code may be performed first, and then the cells may be scanned for a second time to restore digital data from the second code.

Furthermore, in the above-described second embodiment, processing in a case where the reading order of the cells of the first code and the reading order of the cells of the second code are different is exemplified. However, for example, when the first code is a QR code, even if the reading order of the data and the error correction code exemplified in FIG. 1 and the reading order of the cells encoded with dot patterns of the second code were the same, in a case where dot patterns (or line segment patterns and the like) of the second code are set in the format area, the finder patterns, the timing patterns, or the quiet zone as exemplified in FIG. 13, the reading order of the second code becomes different from the reading order of the cells of the first code. Thus, depending on the cells in which a dot pattern (or line segment patterns and the like) constituting the second code is set, it may not be possible to determine the presence or absence of a dot pattern in each cell in parallel with the reading of cells of the first code.

Thus, in the third embodiment, exemplified is a process of scanning the cells in the image of a composite code again in accordance with the above rule after scanning the cells for the analysis of the first code is completed. Configurations and processes of the third embodiment other than the reading order of the cells in which the second code is embedded, in the analysis of the composite code, are the same as those of the first embodiment.

Among the constituent elements of the third embodiment, constituent elements that are the same as those of the first and the second embodiments will not be described because these constituent elements of the first and second embodiments can be applied as those of the third embodiment. Thus, constituent elements of the first and the second embodiments will be referred to as needed.

Note that in the second embodiment, the reading order of the second code is different from the reading order of the cells of the first code, and the relationship between the reading sequence numbers SEQ(k) of the cells and the center coordinates (Xi, Yj) of the cells or the relationship between the reading sequence numbers SEQ(k) of the cells and the serial number ID(n)s for each cell is stored in a cell reading order information file CIS, CIM, or the like, and can be referred to during decoding. In the present embodiment, as in the second embodiment, the cell reading order information may be made referable to the user device UD3 or the like on the reading side, or the cell reading order information may be made not to be passed on to the user device UD3 or the like on the reading side.

For example, in the information system of FIG. 32, when generating a composite code, in the process of dividing a binary encoded bit string into data for each cell (S14 in FIG. 32), the order of the cells to which the divided bit string is assigned is to be determined in accordance with a specific rule. Then, when analyzing the composite code, numerical values assigned to the dot patterns constituting the second code may be integrated in accordance with the same rule. Therefore, even if the reading order of the second code is different from the reading order of the cells of the first code, cell reading order information is not always necessary.

Figure 40:
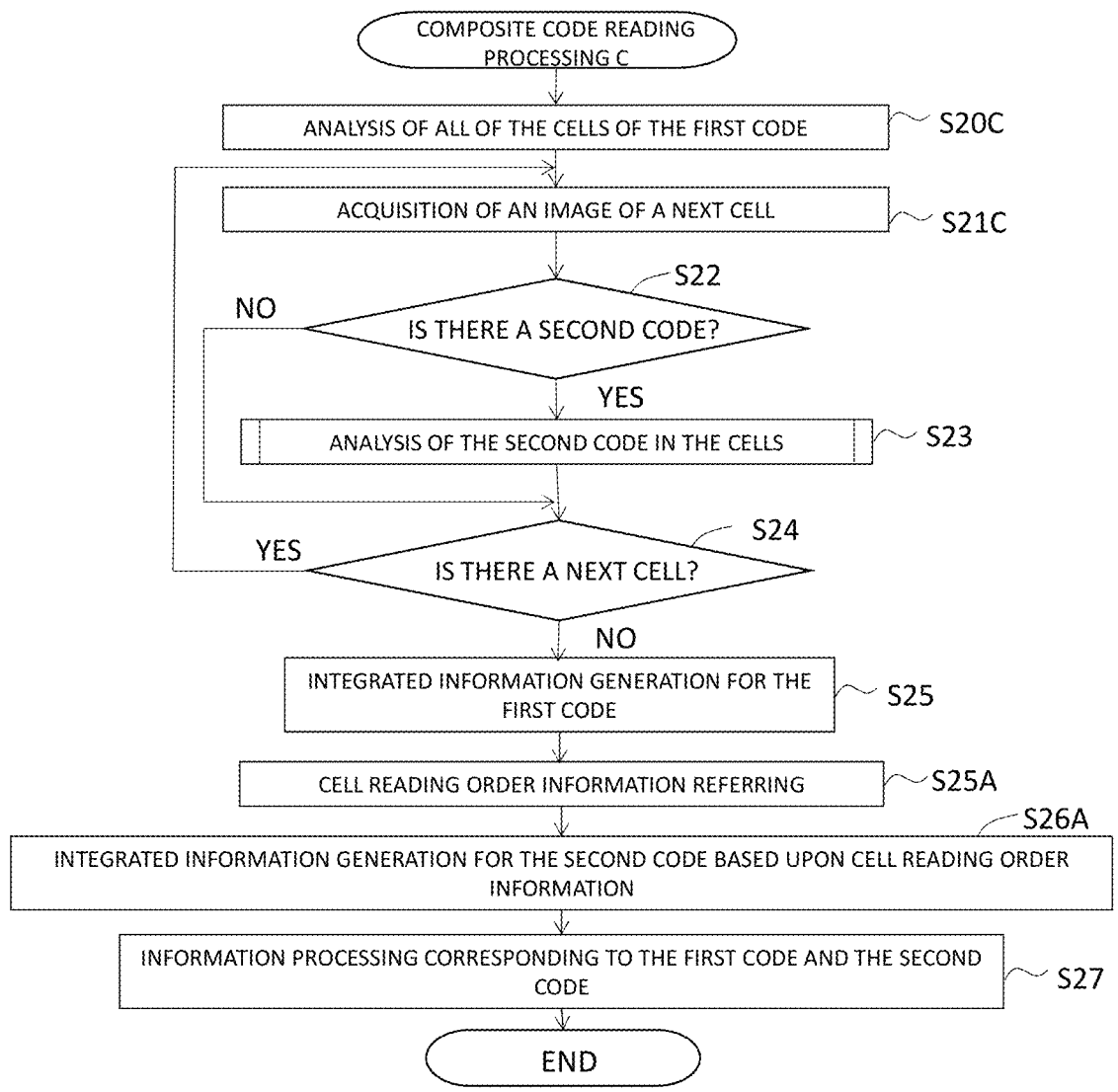
FIG. 40 is a flowchart exemplifying a composite code reading processing according to the third embodiment.

FIG. 40 shows a flowchart exemplifying a process of reading a composite code according to the third embodiment. The processing of FIG. 40 differs from that of FIG. 39 of the second embodiment in S20C and S21C. That is, for example, the user device UD3 first performs analysis of all of the cells of the first code (S20C). In the following, the processing of FIG. 40 is described as being executed by the user device UD3, but the management server MS3 that receives the composite code from the user device UD3 may execute the following processing.

The user device UD3 or the like (hereinafter simply referred to as a user device UD) inputs an image of a composite code input from a scanner, a camera or the like via an image input interface 17, and recognizes the format and the arrangement of the cells of the first code. For example, the user device UD recognizes the orientation of the QR code based on the finder patterns, and corrects image distortion using the alignment patterns. Furthermore, the user apparatus UD recognizes the cell arrangement width using the timing patterns, and specifies the arrangement positions of the QR code data and the error correction code. Then, the user device determines bright or dark for all of the cells in accordance with, for example, the reading order of a general QR code.

Next, the user device UD again scans all of the cells of the composite code in a predetermined order. The scanning order may be, for example, from the lower-right cell, with the first column scanned upward, the second column scanned downward, and similarly, the odd-numbered columns scanned upward and the even-numbered columns scanned downward. However, the scanning order is not limited in the third embodiment, and for example, the odd-numbered rows may be scanned rightward and even-numbered rows may be scanned leftward from the upper-left cell for each row. For all of the cells, all of the finder patterns, alignment patterns, timing patterns, format sections, data sections, and error correction code sections are scanned. Then, the user device UD acquires the image of the next cell (S21C). This processing is the same as in those in the first and the second embodiments except that the objects of processing include the finder patterns, alignment patterns, timing patterns, format sections, and the like.

Next, the user device UD determines whether a second code is defined in the cell being processed (S22). This processing is the same as those in the first and second embodiments except that the objects of determination include the finder patterns, alignment pattern, timing patterns, format sections, and the like. If a second code is defined in the cell, the second code in the cell is analyzed (S23). This processing is the same as in those the first and the second embodiments, except that the objects of analysis include the finder patterns, alignment patterns, timing patterns, format sections, and the like.

Then, the user apparatus UD determines whether or not the next cell remains unprocessed (S24). If the next cell is unprocessed, the user device UD returns the process to S21. This process is the same as in those the first and second embodiments except that the objects of determination include the finder patterns, alignment patterns, timing patterns, format sections, and the like.

Then, when the processing of all of the cells is completed and there is no next cell, the user apparatus UD generates information in which the first code is integrated for each character from the bit strings obtained by determination of bright or dark of the first code. (S25). This processing is the same as those in the first and second embodiments. However, the process of S25 may be executed in the process of S20C.

Then, the user device UD refers to the cell reading order information from the cell reading order information file CIU (S25A). Then, the user apparatus UD integrates the numerical values assigned to the dot patterns in each cell in accordance with the cell reading order information, and restores digital data from the second code (S26A). The processings of S25A and S26A are the same as those of the first and the second embodiments except that the objects of processing include the finder patterns, alignment patterns, timing patterns, format sections, and the like. Subsequent processings are the same as those in the first and the second embodiments, and thus descriptions thereof are be omitted. It can be said that the user device UD that performs the processings of S22, S23, S25A, and S26A has a second acquisition means.

Note that as described above, in the process of dividing the binary encoded bit string into data for each cell (S14 in FIG. 34), when the order of the cells to which the divided bit strings are assigned is determined to be in accordance with a specific, the process of S25A is unnecessary. That is, the user device UD may restore digital data from the second code by integrating the numerical values assigned to the dot patterns in each cell in accordance with the rule.

As described above, according to the third embodiment, the user device UD3, the management server MS3, and the like can read dot patterns constituting the second code from cells in which the second code is set in a reading order different from the cell reading order of the first code, for example, a QR code, and decode the composite code. Therefore, decoding can be performed even when a dot pattern is formed in a finder pattern, an alignment pattern, a timing pattern, a format section, or the like.

Fourth Embodiment

In the first to the third embodiments, a composite code in which the second code is statically arranged with respect to the cell arrangement of the first code and does not change with time has been exemplified. In the fourth embodiment, a composite code in which the second code changes with time with respect to the cell arrangement of the first code is exemplified. Such a composite code can be displayed, for example, on a display of an information apparatus. For example, the information apparatus may display a combination of a fixed first code and a different second code on a display for each frame. A different second code may be output for each frame, or the same code may be output continuously for a plurality of frames. The second code may be any of those exemplified in FIGS. 12 to 29.

Furthermore, by changing the display period for displaying the same second code, information may be defined in a manner similar to that of pulse width modulation. For example, for a dot pattern in which information is defined by distance and direction from a virtual point as exemplified in FIG. 12, the defined amount of information is 3 bits. However, for each frame in the time axis direction, by turning on and off a 3-bit fixed dot pattern, information of about 60 bits/sec can be transmitted with one cell. In such a case, for example, predetermined areas of a first code, for example, a QR code (finder patterns, an alignment pattern, and the like in FIG. 1) may also be turned on and off to form synchronization patterns for synchronizing frames. The reading apparatus may acquire dot patterns as the second code for each frame in accordance with the frame synchronization of the first code.

Furthermore, by setting the section in which one second code is displayed to one to several frames, it is possible to make the second code difficult for the human eye to visually recognize. Therefore, a composite code can be acquired from the display of an information apparatus by an image forming apparatus such as a camera or a scanner of another information apparatus in a state in which it is difficult for the human eye to recognize.

Note that in a case where the bright-dark patterns continue for a plurality of frames or more in the time change of a second code, an image input means (the image input means IIN1, IIN2 of the first embodiment, the image input means IIN3 of the third embodiment, and the like) may input the second code without having to use a synchronization pattern by storing data for a plurality of frames. Furthermore, by the second code itself having, for example, a sequence of bright-dark patterns indicating the start of a signal and a sequence of bright-dark patterns indicating the end of the signal, a synchronization pattern does not have to be formed in a predetermined area of the QR code.

Here, a case where the composite code is displayed on the display of the information apparatus will be described.

Since the QR code which is an example of the first code is assumed to be visually recognizable, the QR code is continuously displayed on a display for an arbitrary time. On the other hand, by having the second code be displayed only for about 1 to 2 frames per 10 to 30 frames at 30 frames/sec and about 1 to 4 frames per 20 to 60 frames at 60 frames/sec when an image is displayed on a display, the second code may be made difficult for the viewer to visually recognize. When it is desired to make the pixel color of the dots still more difficult to visually recognized, a pixel color in which dots are difficult to visually recognized may be used within a range in which the pixel color of the dots can be recognized with respect to the pixel color of the two or more distinguishable colors used in the cells.

[Other Modifications]

In the above-described first to the fourth embodiments, the first code and the second code are defined by bright-colored areas and dark-colored areas. And, the content servers CS1, CS2, CS32, and the like, which are the generation apparatuses, output the composite codes, and the user devices UD1, UD2, UD3, and the like, which are the reading apparatuses, restore digital data from the composite codes and execute predetermined processing. Here, the dark-colored areas are, for example, black areas, and the bright-colored areas are white areas. However, the composite code is not limited to a code formed by bright-colored areas and dark-colored areas. For example, any two colors of R (red), G (green), B (blue), C (cyan), M (magenta), Y (yellow), B (black), and W (white) may be used for colors of the cells of the first code and the second code. Furthermore, the first code and second code may be defined enabling the selection of any one of R (red), G (green), B (blue), C (cyan), M (magenta), Y (yellow), B (black), and W (white) for the color of the cells as color code information. In such a case, the identification of the cells forming the first code and the marks forming the second code can be made possible by combinations of different selectable colors. Also, the presence of the second code can be recognized based on whether or not there are marks formed in the second code. For the color of cells of the first code where no marks are arranged and the color of marks of the second code, the same color may be selected. Of course, for the color used for the marks, it must be from a range of colors that can be distinguished from the color of the cells of the second code. Furthermore, the color of the marks can be used as color code information provided that it is in a range of colors in which the color of the marks can be distinguished from the color of the cells of the second code. When the first code of the composite code is a QR code, the colors of the cells of the first code may be limited to colors in which a conventional QR code reader can read the first code, and the colors of the marks of the second code may be of the eight colors of R (red), G (green), B (blue), C (cyan), M (magenta), Y (yellow), B (black), and W (white). By enabling the number of colors that can be acquired at the mark arrangement positions to be eight, it is possible to define 3 bits at one mark arrangement position, and the amount of information of the second code can be tripled. Note that the color of the print medium may be the same as the color of any of the cells in which the first or second code marks are formed. Furthermore, the color of cells of the first code where no mark is formed may be the same as the color of any of the above-mentioned marks. In such a case, the color information of the marks may be 00 for 2 bits for 4 colors, and 000 for 3 bits for 8 colors. Of course, it is needless to say that the number of colors can be increased and the color code information can be increased in accordance with the performance of the composite QR code reader. For example, by the use of an encoding modulation technique for image identification, it is possible to realize the storage of about twice the amount of information, and thus by the use of colored marks, it is possible to define six times the amount of information.

Furthermore, in the first to the fourth embodiments, the QR code is exemplified as the first code. However, in the first to the fourth embodiments, the first code is not limited to the QR code. For example, as the first code, two-dimensional codes including color codes, the DataMatrix, and PDF417 can be used.

Fifth Embodiment

In the above-described first to the third embodiments, composite codes in which the second code is combined with the cell arrangement of the first code is exemplified. Furthermore, in the fourth embodiment, a time series composite code in which the second code changes with time with respect to the cell arrangement of the first code is exemplified. In the present embodiment, a modification of the second code and a modification of the method of reading the second code are exemplified. Note that it is needless to say that the composite code described in the fifth embodiment can be applied to those in the first to the fourth embodiments. Furthermore, it is needless to say that the method of reading a composite code described in the fifth embodiment can be applied to those in the first to the fourth embodiments.

(Printing Characteristics and Reading Method of a Composite QR Code)

In the following, an example in which dots are used as marks is described. Of course, the mark may have any shape such as a substantially circular shape, a rectangular shape, a cross shape, a polygonal shape, and the like. Note that it is needless to say that the dots shown below may be replaced with other marks.

Figure 41:
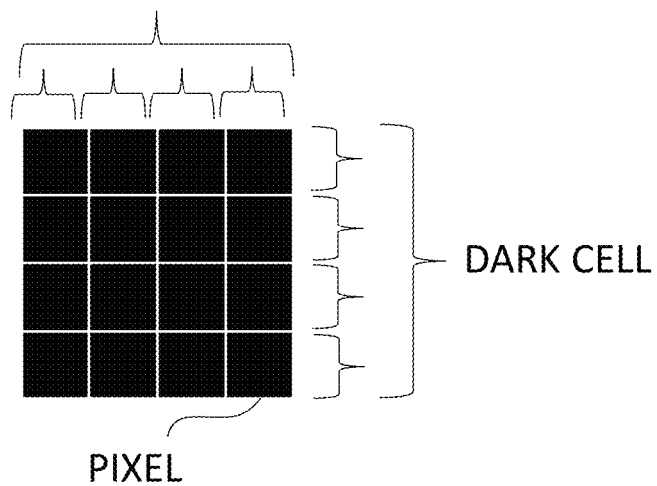
FIG. 41 is a diagram exemplifying a relationship between a printed dark-colored cell and pixels.
Figure 42:
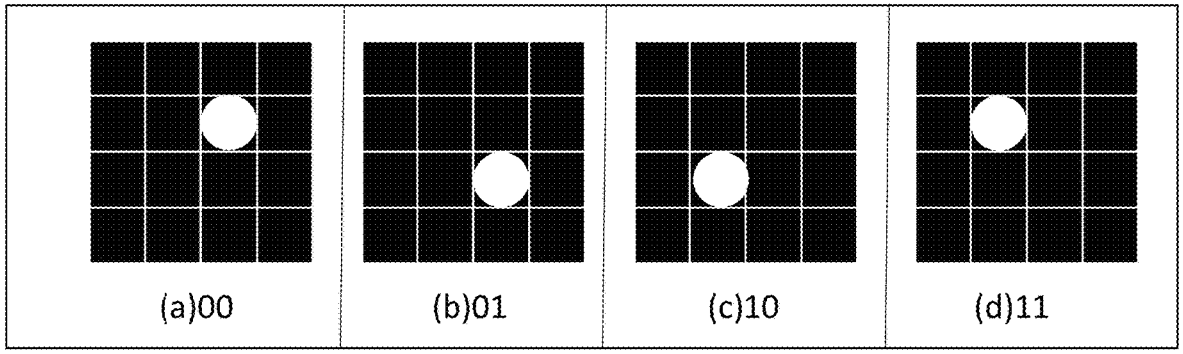
FIG. 42 shows examples of a bright-colored dot arranged in a dark-colored cell.
Figure 43:
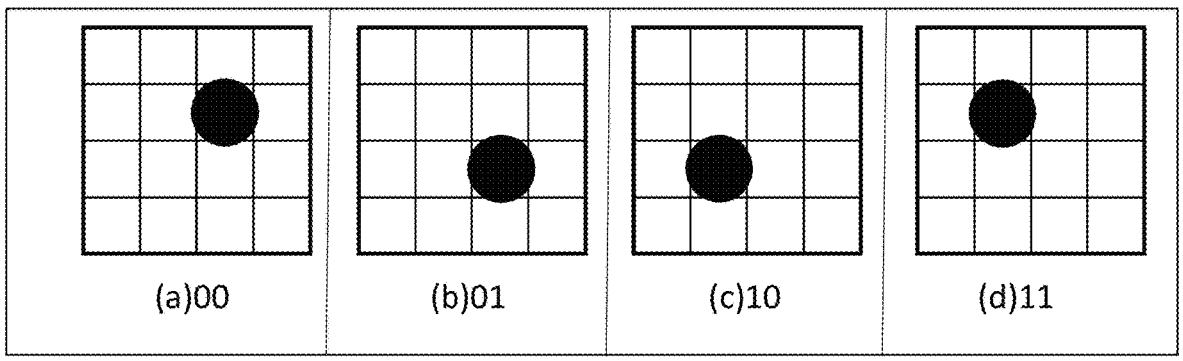
FIG. 43 shows examples of a dark-colored dot arranged in a bright-colored cell.

FIG. 41 exemplifies the relationship between dark-colored cells and pixels printed on a medium such as paper of the fifth embodiment. FIG. 42 shows an example in which bright-colored dots are formed in a dark-colored cell of 4×4 pixels. FIG. 43 shows an example in which dark-colored dots are formed in a bright-colored cell of 4×4 pixels. The size of a dark-colored cell of a printed QR code is usually 0.17 mm to 0.5 mm, and it is recommended that one cell be printed with 4×4 pixels or more as shown in FIG. 41. Note that the shape of one pixel may be either rectangular or circular. The minimum value of 0.17 mm comes from 4×25.4 mm/60≈0 0.17 mm when printing at a typical printing resolution of 600 dpi. On the other hand, the size of a dot in a dot code is of 600 dpi pixel size according to data, that is, 25.4 mm/600≈0.042 mm. Note that, there are many cases, in which the dot size becomes about 0.05 mm due to swelling caused by dot gain, expansion of ink, infiltration, or the like. Note that conversely, there are cases in which the fixation of ink is poor, and the size of the dot becomes about 0.04 mm or less (but not less than 0.03 mm). On the other hand, when dots are formed in dark-colored cells, the bright dots may be reduced to about 0.03 mm due to the expansion of peripheral dark-colored printed portions. Here, when a dot code is formed in a dark-colored cell where the minimum cell size (for example, 0.17 mm) is printed with the minimum number of pixels (4×4), as shown in FIG. 42, four dot patterns can be formed by printing in any one of the four pixels in the center of the dark-colored cell. That is, a 2-bit dot code can be defined for one cell. The reason why only the four in the center are considered is that if the cell is adjacent to a cell of the same color as the dot, it becomes difficult to recognize the dot if the accuracy of the cell outline is poor, and so it is desirable to eliminate arrangements where dots are in contact with the cell boundary area.

There are several ways for reading dot codes. The dot code is read by storing the image in which the composite code is imaged in the frame buffer, recognizing the dots with the coordinate system of the frame buffer and determining the center positions (coordinate values) thereof, or recognizing whether the dots are arranged at candidate dot arrangement positions and acquiring information defined by the dot arrangement pattern. Representative methods are the following two methods.

(Method 1)

Method 1 is a method of recognizing the center point of a dot. That is, in method 1, the dots are extracted from the captured image, the coordinate values of the dot centers are obtained, and the dot arrangement pattern is obtained. In such a case, the dots are detected from the brightness or darkness of the pixels forming the dots when the image is captured, by using the change rate of brightness as a threshold value in regards with the vicinity of the dots. Thus, it is difficult to recognize a dot when it is in contact with another dot or a cell of the same color. Accordingly, it is desirable to arrange adjacent dots with a predetermined distance between their edges so that the dots can be recognized.

By the way, in the captured image, since light may illuminate a QR code from the side and create a shadow or a shade, it is desirable to use the above-described change rate of brightness as a threshold value to extract a dot. However, to obtain the change rate of brightness, at least four pixels or more are required from edge to edge of adjacent dots, and photographing is required by a camera having a certain resolution. On the other hand, the brightness or darkness of the cells of the same color of a QR code may vary greatly depending on the cell position, but there is almost no change within each cell. Therefore, for the bright-colored cells, the average value $B_{LA}$ of the color intensity of several pixels from the brighter side of the imaged pixels of the cells is calculated, and at the same time, the average value $B_{DA}$ of the color intensity of several pixels from the darker side of the pixels is calculated. If $\Delta B_L = B_{LA} - B_{DA}$ falls within a predetermined range, it is determined that no dots exist in the cell, and if it exceeds the predetermined range, a dot is determined to exist. In such a case, the threshold value for determining whether or not a dot exists is calculated as $\alpha \times B_{DA}$ or less or $B_{DA} + \beta \times \Delta B_L$ or less. For the dark-colored cells, similar processing is performed, and the threshold value for determining whether or not a dot exists is calculated as $\alpha \times B_{LA}$ or more, or $B_{DA} + \beta \times \Delta B_L$ or more. Note that $\alpha$ and $\beta$ are determined by $B_{LA}$, $B_{DA}$, $\Delta B_L$, camera performance, characteristics of the captured image, and the like.

(Method 2)

Method 2 is a method of obtaining an overlapping portion between a dot obtained from an image, and a predetermined area (a candidate dot arrangement area) or a predetermined position (a candidate dot arrangement position) where a dot to be recognized is formed. Method 2 can be simply referred to as a method of determining whether or not a dot exists in a predetermined area or at a predetermined position. In the case of method 2, there is no need to determine the coordinate values of the dot centers. For determining whether or not the dot exists, it is important for the candidate dot arrangement areas or the candidate arrangement positions to be accurately recognized. If printing accuracy is high and the resolution of a composite QR code reader is high, the composite code reader can accurately recognize the coordinate values of the cell centers and the areas of the cells. In such a case, a dot arrangement position is determined by whether or not the center position of the dot is included in a predetermined area centered on a candidate dot arrangement position $(X_{nS1}, Y_{nS1})$ referred to as a bounding box set in advance, or whether or not the predetermined area of a dot having a certain amount of area in the area is included. Alternatively, recognition may be performed based on whether or not a part of a dot having a certain amount of area is superimposed on the candidate dot arrangement position $(X_{nS1}, Y_{nS1})$. Note that, when the medium on which the composite QR code is formed does not form a flat surface, or when the reading apparatus photographs the medium from an oblique direction, the cell center coordinate values may deviate. In such a case, it is desirable to correct the obtained cell center coordinate values to correct cell center coordinate values by a predetermined method. This method 2 enables recognition with higher accuracy than conventional methods even with a composite code in which extended cells divided into a matrix shape with fine subcells form the second code. The most important condition in such a case is that the arrangement position of each cell is such that the image in which the composite code is captured is stored in the frame buffer and can be recognized with accurate coordinate values in the coordinate system. To obtain accurate coordinate values, a reference mark serving as a reference is provided, and the reference mark is provided independently without being in contact with a subcell, and the reference mark is extracted for acquiring center coordinate values. As a result, the arrangement position of the subcells can be recognized based on the arrangement position relationship between the reference mark and the subcells.

Figure 44:
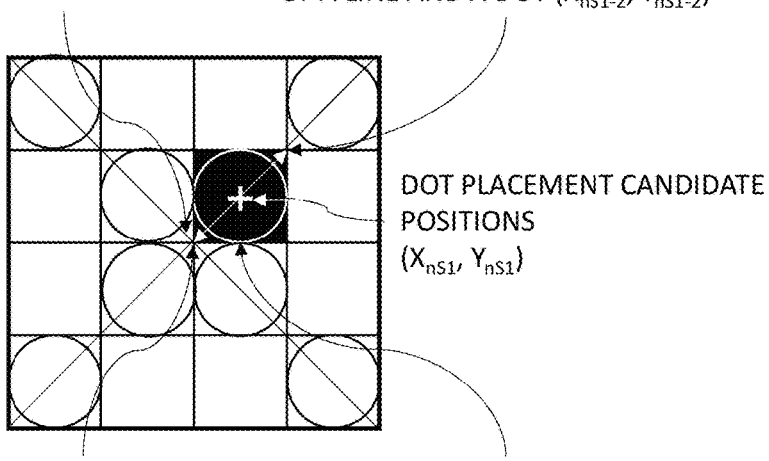
FIG. 44 is a diagram exemplifying a method of determining a dot position using a bounding box.

FIG. 44 is a diagram exemplifying a method of determining the position of a dot using a bounding box. As shown in FIG. 44, the reading apparatus draws straight lines from the cell center position toward the corners of the cell, and extracts pixels of dots overlapping with the straight lines. Note that the center position (coordinate values) of the cell can be generally obtained by reading the first code. However, if the center position (coordinate values) is obtained using a coordinate system different from the coordinate system of the frame buffer, a conversion is needed to coordinate values of the coordinate system of the frame buffer in which the captured image is stored. Then, the reading apparatus may determine by whether or not the coordinate values of the center of the area on the line overlapping with a dot (the area including the row of pixels overlapping with the straight lines) are included within a predetermined area (bounding box) set in advance centered on a candidate dot arrangement position $(X_{nS1}, Y_{nS1})$. The bounding box is desirably a circle having a diameter of about 25% (for example, about 20% to 30%) of the cell size and similar to the size of a dot, but may also be a rectangle or be of another shape, and the size thereof may be set as appropriate based on the level of error correction assuming a misidentification rate, printing accuracy, and imaging resolution. Note that in a case where a dot has a partially missing area, there is a case where the overlapping area is missing in the middle area or there is a scattering of ink, and it is desirable to determine them. For example, a case in which an area including a row of pixels overlapping with straight lines is separated into a plurality of areas can be assumed. In such a case, the reading apparatus may regard the maximum area as the dot area. In addition, when the distance between the separated areas is within a predetermined value, the reading apparatus may integrate the separated areas into one continuous area.

The dot coordinate values are obtained as $(X_{nS1}, Y_{nS1})$ from the coordinate values of the starting point position $(X_{nS1-1}, Y_{nS1-1})$ and the ending point position $(X_{nS1-2}, Y_{nS1-2})$ of the overlapping area of a straight line and a dot by the equations $X_{nS1} = (X_{nS1-2} + X_{nS1-1})/2$, and $Y_{nS1} = (Y_{nS1-2} + Y_{nS1-1})/2$. As a result, as shown in the example of FIG. 44, when dots are detected by using two oblique lines in a cell, since the arrangement positions of four dots can be set on one oblique line and be recognized, in one cell, the arrangement of a total of eight dots can be set with two oblique lines, and eight patterns, that is, three bits can be defined.

These eight patterns correspond to cases where only one of the eight candidate dot arrangement positions is arranged with a dot, and note that for the threshold value for determining whether or not there is a dot, the above-described change rate or the like of brightness, $\alpha \times B_{DA}$, $\alpha \times B_{LA}$, or $B_{DA} + \beta \times \Delta B_L$ may be used. If the cell arrangement positions can be recognized with a certain degree of accuracy, the bounding boxes may be set to a size slightly smaller than the size of a cell, and if dots are extracted within the bounding box, the dot is not affected by adjacent cells of the same color making contact.

If a dot code is formed in dark-colored and bright-colored cells in a QR code data area, even if about the same area as a QR code is used for the error correction of the dot code, by using the dot recognition method shown in FIG. 44, with a dot code in which 3 bits can be defined for each cell, three times the data of a QR code can be stored in the composite QR code. Even if a dot code is formed only in the bright-colored cells in the data area, about 1.5 times the amount of information can be stored. Note that dot codes can be formed in cells forming the finder patterns (cutout symbols), alignment patterns, quiet zone, timing patterns, and format information sections, and an amount of information about twice as large as that of a QR code can be stored. Furthermore, when dot codes are formed in all of the bright and dark-colored cells other than those of the data area, an amount of information four times or more of that of the corresponding QR code can be stored. Note that these differences in the arrangement of dots can be recognized without any problem even with current low-resolution smartphone cameras. In this embodiment, it is assumed that the printable area is 4×4. However, if the cell size is increased, dot arrangement patterns can be further increased. However, in such a case, it is desirable to photograph and analyze with a high-resolution camera. The use of a dedicated composite QR code reader with high imaging resolution can easily increase the amount of information that can be obtained.

Figure 45:
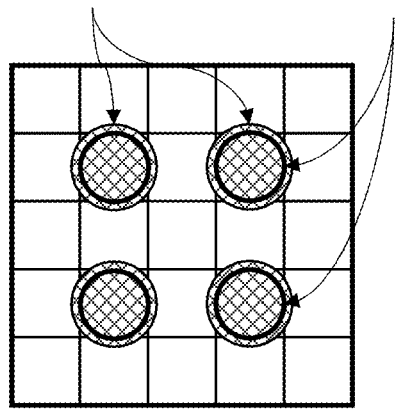
FIG. 45 shows an example of a dot code formed in a cell printed with 5×5 pixels.

FIG. 45 shows an example in which one cell is printed with 5×5 pixels at 600 dpi and the cell size is 5×25.4 mm/600≈0.21 mm, to further increase the amount of information storable in a dot code. The four positions with a mesh pattern indicate dot formation positions. Based upon the presence and absence of dots formed at these four positions, 4 bits can be defined in one cell.

Figure 46:
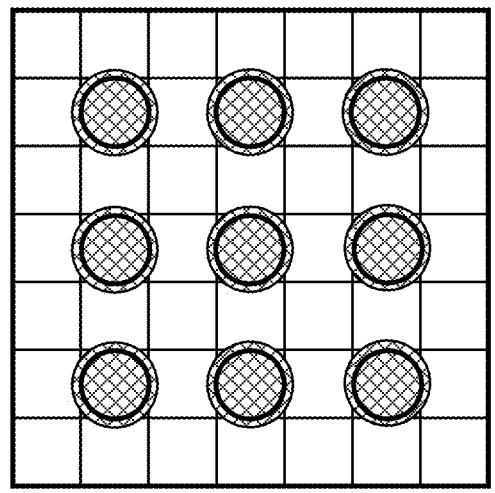
FIG. 46 shows an example of a dot code formed in a cell printed with 7×7 pixels.

FIG. 45 shows an example in which one cell is printed at 600 dpi and cells are printed with 5×5 pixels, and FIG. 46 shows an example in which cells are printed with 7×7 pixels. If a cell is printed with 7×7 pixels, the cell size will be 7×25.4 mm/600≈0.30 mm. The portions with a mesh (four positions for the 5×5 pixel layout and nine positions for the 7×7 pixel layout) indicate dot formation positions.

When a cell is printed with 7×7 pixels, a dot may always be formed in the one central pixel, and it may be used as an indicator that a dot code is formed in the cell. In such a case, 8 bits of information are defined for one cell. Note that when any one of the pixels is formed, there are eight patterns of arranging dots at the eight places (nine patterns including a case where a dot is formed at the center), and three bits may be defined for one cell. As a method of recognizing a dot code, the reading apparatus may set a bounding box for the area in which a dot is arranged based on the center position of the cell, and may recognize the arrangement of the dot based on whether or not the dot is arranged in the bounding box. It is desirable to have the bounding box be a circle with a diameter or a square with a side of about 20% (about 15 to 30%) of a cell size and similar to a dot size in FIG. 45, and about 14% (about 10% to 20%) of a cell size in FIG. 46. As a specific method of recognizing a dot, the reading apparatus may determine that a dot is located when the ratio of the recognized dark or bright colors in a bounding box exceeds a predetermined ratio (for example, 50% in consideration of the deviation of the center position of a cell and printing accuracy). Furthermore, the reading apparatus may obtain the coordinate values of a dot center and may determine the existence of a dot by determining the existence of a dot in a bounding box positioned closest to coordinate values of the dot originally to be arranged in the cell. Note that as the threshold value for determining whether or not a dot exists, the above-described change rate or the like of brightness, $\alpha \times B_{DA}$, $\alpha \times B_{LA}$, or $B_{DA} + \beta \times \Delta B_L$ may be used.

Note that it is needless to say that a similar dot code can be defined for dark-colored cells by using bright-colored dots. In this embodiment, even if dots are arranged in all four pixels in the 5×5 pixel cell of FIG. 45, the occupied area of the dots is only 4/(5×5)=16%, and the size of the dots is only about 1.1 times (about an increase to 18%) even if there were swelling of the dots. Furthermore, even if dots are arranged at all nine positions in the 7×7 pixel cell of FIG. 46, the occupied area of the dots is only 9/(7×7)=18%. and the size of the dots is only about 1.1 times (about an increase to 20%) even if there were swelling of the dots. Therefore, the presence of a dot code would not affect the recognition of the cells that constitute a QR code (recognition is adequate if the mixing of other colors is ⅓ or less). Furthermore, to increase the amount of information storable in a dot code, the number of pixels constituting a cell may be increased to increase positions for placing dots, and printing resolution may be increased to increase positions placing dots. In such a case, if the imaging resolution of the composite code reading apparatus is sufficiently high, the dot size may be reduced. As a result, a large number of dot arrangement positions can be set, and the amount of information storable in a dot code can be increased. Note that a dot code can be formed in cells constituting the finder patterns (cutout symbols), alignment patterns, quiet zone, timing patterns, and format information sections, and the amount of storable information can be further increased.

As described above, with the technology of the composite QR code in which a dot code is formed in the cells of a QR code, the amount of information that can be embedded in the same area as the conventional QR code is increased and effects on the recognition of the original QR code can be suppressed. With conventional technology, when cells are divided to increase the amount of storable information, recognition is difficult when division cells of the same color are adjacent to each other. Therefore, it is a prerequisite that printing and imaging are performed at ultrahigh-resolution, and thus versatility is poor. The major features of this technology over this conventional technology is that since the surroundings of a dot are of the opposite color (dark and light colors), even with a low-resolution camera recognition of dots is easy, and more information can be added as compared with conventional technology while ensuring the recognition of the QR code owing to the area occupied by dots being small. Thus, although only one bit of information can be defined in one cell forming a generally used QR code, with a composite QR code, by a dot code formed in one bright-colored cell and/or a dark-colored cell, at least about 2 to 8 bits can be defined in one cell. Furthermore, by using a color code described below, with a camera mounted on a mobile terminal such as a current smartphone or the like, 6 to 10 times or more than information definable in a QR code can be read from a composite QR code (a dot code recorded in a composite QR code).

Due to a large increase in the amount of information recordable in a dot code, not only text information but also audio information and image information can be stored. Also, the information recorded in a composite QR code can be obtained by simply photographing with a camera and reading with a dedicated application the composite QR code without having to use communication means such as telephone lines, the Internet, or wireless communication. This makes it possible to prevent a third party from performing hacking during the transmission of information, and thus the recording medium is extremely secure. Therefore, for the exchange of information using the composite QR code is more effective in protecting personal information, confidential information, and the like than conventional communication means. Furthermore, in the exchange of information using the composite QR code, information can be provided to those you desire to provide without having the information provider provide mail addresses or SNS personal information.

(How to Read a Dot Code in a Composite QR Code)

The lowest resolution of a camera of portable terminals such as smartphones which are most frequently used for reading a QR code is of VGA resolution (640×480). However, there are very few at present. Since the resolution of cameras of portable terminals increases year by year, the problem due to the VGA resolution can be ignored. When reading a composite QR code, it is desirable to capture the image of a dot with 2×2 pixels or more to make the recognition of a dot code from the captured image highly reliable. By doing so, it is possible to deal with a shifting of a pixel of an imaged dot in the left, right, up, and down directions. At present, the resolution of cameras, such as those of popular smartphones and the like, is increasing year by year, and now exceeds at least 1920×1080 to 2048×1536 (3,000,000 pixels). Therefore, in the present embodiment, it is assumed that a smartphone has a relatively low-resolution of 1920×1080 pixels, and that there is a peripheral margin of about 20%. Under this assumption, since the photographing range is 864×864 pixels, a composite QR code of the present embodiment can be read with sufficient accuracy. For the composite QR codes of FIGS. 42 and 43, when one cell is imaged with 8 pixels, the number of readable cells becomes 864/8=108, and reading of up to version 22 having 105×105 cells, (488 kanji characters or 0.779 KB at the M error correction level, and up to 1.558 KB can be stored in the dot code) is possible. Thus, the dot code can store about 1.5 to 2 times the data that can be stored in the corresponding QR code, and when printed, the range of 105×8×25.4/600 mm≈35.56 is read. Furthermore, the Japanese text is not compressed under QR code specifications. At present, by using Japanese text data compression technology, three times the number of characters storable in a QR code can be stored. As a result, 488 characters×2 (the increase in the amount information due to the dot code)×3 times (the amount due to compression of Japanese text)=2,928 characters can be stored. If the reading method as shown in FIG. 44 is implemented, a maximum of 2.337 KB can be stored in the dot code, which is about two to three times the amount the corresponding QR code can store. In addition, by using Japanese text data compression technology, 4,392 characters can be stored. In the composite QR code of FIG. 45, when one cell is imaged with 10×10 pixels, since 864/10=86, it is possible to read up to version 17 having 85×85 cells (310 kanji characters or 0.504 KB at the error correction level M, and a maximum of 2.016 KB can be stored in the dot code), and the dot code can store about 3 to 4 times the amount the corresponding QR code can store. When printed, a square with a side of 85×10×25.4/600 mm 35.98 mm is read. Furthermore, by using Japanese text data compression technology, 3,720 characters can be stored. In the composite QR code of FIG. 46, when one cell is imaged with 14×14 pixels, since 864/14≈61, it is possible to read up to version 11 having 61×61 cells (155 kanji characters or 0.251 KB at the error correction level M, and a maximum of 2.008 KB can be stored in the dot code) and the dot code can store about 6 to 8 times the amount of information the corresponding QR code can store. When printed, a square with a side of 61×14×25.4/600 mm≈36.15 mm is read. Furthermore, by using Japanese text data compression technology, 3,720 characters can be stored. In the above description, the error correction of the QR code is set to the level M, since the level M is a commonly used error correction level. Of course, it is needless to say that even more information can be stored in a dot code at the error correction level L.

Currently, the market share (2017) of popular smartphones with respect to display resolution is 34.93% for 375×667 pixels, 18.85% for 320×568 pixels, and 13.07% for 360×640 pixels, and thus about ⅔ are those of low-resolution displays. Therefore, even if the margin of the display area is set to 10%, it is necessary to display the hybrid QR code in the area of 288×288 pixels. Similarly to the printing of the dot code, in the views of the composite QR codes in FIGS. 42 to 44, one side of a cell is displayed with four pixels. Therefore, the number of cells that can be displayed is 288/4=72, corresponding to version 13 having 69×69 cells (204 kanji characters or 0.331 KB at the error correction level M, and a maximum of 0.662 KB can be stored in the dot code), and the dot code can store about 1.5 to 2 times the amount the corresponding QR code can store. Furthermore, 1,224 characters can be stored by using Japanese text data compression technology. If a reading method as shown in FIG. 44 is implemented, a maximum of 0.993 KB can be stored in the dot code, which is about two to three times the amount that can be stored in a corresponding QR. In addition, by using Japanese text data compression technology, 1,836 characters can be stored. In the composite QR code of FIG. 45, when one cell is represented by 5×5 pixels, since 288/5≈57, the corresponding version is 10 having 57×57 cells (131 kanji characters or 0.213 KB at the error correction level M, and a maximum of 0.852 KB can be stored in the dot code), which is about 3 to 4 times the amount that can be stored in a corresponding QR. In the dot code shown in FIG. 46, when one cell is represented by 7×7 pixels, since 288/7≈41, corresponding is the version 6 having 41×41 cells (65 kanji characters or 0.106 KB at the error correction level M, and a maximum of 0.848 KB can be stored in the dot code), the dot code can store about 6 to 8 times the amount the corresponding QR code can store. Furthermore, by using Japanese text data compression technology, 1,560 characters can be stored. However, this is not enough for storing content information such as Japanese text, audio, photos, or the like. However, a large capacity hybrid QR code can be easily realized because when displaying a hybrid QR code on a smartphone, a time series dot code in which the dot code that changes over time or a color dot code in which the displayed dots are colored as described later can be implemented.

On the other hand, it is clear that smartphones capable of displaying 1080×1920 pixels, that is full high definition, will gain popularity, and the display of a composite QR code with an increased amount of dot code information will be possible. Assuming that the area for displaying a composite QR code is 800×800 pixels, since one cell is displayed with 4 pixels for one side in the composite QR codes displayed in FIGS. 41, 42, and 43, the number of cells that can be displayed is 800/4=200, corresponding to version 40 having 177×177 cells (1,435 kanji characters or 2.331 KB at the error correction level M, and a maximum of 4.662 KB can be stored in the dot code), and the dot code can store about 1.5 to 2 times the amount the corresponding QR code can store. By using Japanese text data compression technology, 8,610 characters can be stored. Note that if a reading method as shown in FIG. 44 is implemented, a maximum of 6.993 KB can be stored in the dot code, which is about two to three times the amount a corresponding QR code can store. In addition, 12,915 characters can be stored by using Japanese text data compression technology. In the composite QR code shown in FIG. 45, when one cell is represented by 5×5 pixels, since 800/5=160, the corresponding version is 35 having 157×157 cells (1,113 kanji characters or 1.809 KB at the error correction level M, and a maximum of 5.427 KB can be stored in the dot code), the dot code can store about 3 to 4 times the amount the corresponding QR code can store. In addition, 1,836 characters can be stored by using Japanese text data compression technology. In the dot code of FIG. 46, when one cell is represented by 7×7 pixels, since 800/7≈114, the corresponding version is 24 having 113×113 cells (561 kanji characters or 0.991 KB at the error correction level M, and a maximum of 7.928 KB can be stored in the dot code), the dot code can store about 6 to 8 times the amount the corresponding QR code can store. Furthermore, 13,464 characters can be stored by using Japanese text data compression technology. When reading this large capacity composite QR code, it is desirable to use a dedicated composite QR code reader that can image and analyze at high-resolution if it is difficult to read with some smartphones with the current photographing resolution. In the above description, the error correction of the QR code is set to the level M, since the level M is a commonly used error correction level. Of course, it is needless to say that even more information can be stored in a dot code at the error correction level L.

When displaying a composite QR code on a smartphone, a large amount of information can be generated by displaying a plurality of different dot codes at predetermined time intervals. When a blinking dot code is read by a hybrid QR code reader, high-speed processing can be performed just by reading the QR code only once and then subsequently reading only the dot codes. In regards with camera shaking at the time of photographing, by tracking the change in the imaging position of the timing patterns or the alignment patterns and correcting detected dot positions each time, the dot code can be read accurately. When a hybrid QR code is displayed on a smartphone as in the fifth embodiment, the amount of information that can be changed about 12 times during one to three seconds, an amount of information of about 10 KB can be obtained. If this is reproduced as photographic data, when displayed on a smartphone, it can be viewed as a sufficiently high-quality image, and text information exceeding 70,000 characters can also be transmitted.

The error correction code used in a QR code is a Reed-Solomon code, which is a type of block code, but the error correction code used in the dot code may be a convolutional code.

A convolutional code differs from a block code in that there is no data delimiter and one piece of data is scattered around it, and the information is decoded by a statistical method. Therefore, if the error correction performance is high and the constraint length is small, the convolutional code can be processed at high speed.

However, as the error correction code, various decoding methods (including soft-decision decoding methods) using various error correction codes and second-order information (luminance information, time series, peripheral error information, or the like) for estimating errors can be applied depending on the information capacity and error rate of the dot code. Of course, it is needless to say that other error correction codes suitable for a dot code may be used.

In the past, research and development of large-capacity QR codes have been performed all over the world. The reason why none of them have gained popularity may be that the center coordinates of the cells could not be calculated accurately and judgment of division cells or the like could not be carried out accurately. Furthermore, there has been a problem that the recognition rate of the original QR code decreases when the amount of information of the division cell is increased. The hybrid QR code constitutes a revolutionary technology that solves these problems by the formation of a dot code having a small area ratio in a cell and the arrangement of reference dots and reference patterns at predetermined intervals.

Sixth Embodiment

In the following, with reference to FIG. 47 to FIG. 56, the authentication method, an information processing apparatus for the authentication, and a computer program for the authentication of the fifth embodiment will be described. In the first to the fourth embodiment, configurations, generation methods, and reading methods of the composite code, and a program for causing apparatuses and computers that execute these methods to execute these methods are described. In the present embodiment, a method for applying to the determination of authenticity of digital information (or detection of tampering of digital information) using the composite code, an apparatus for implementing the method, and a program for causing a computer to execute these methods will be described.

<Determination Procedure of an Offline Composite QR Code Authenticity Determination System>

Figure 47:
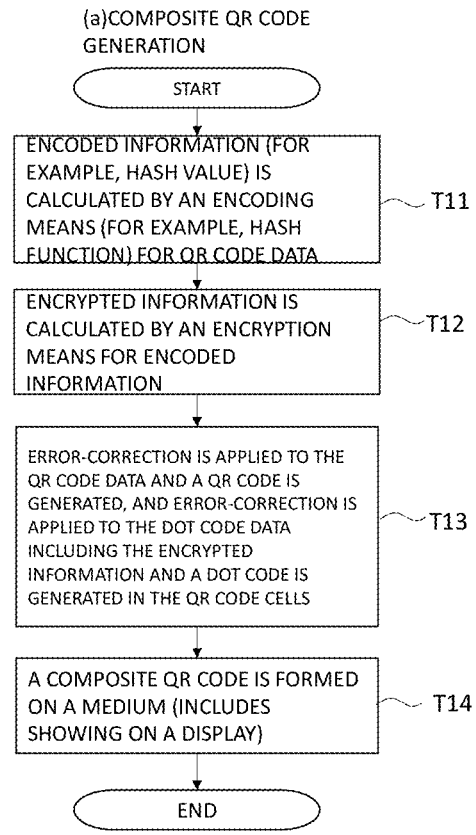
FIG. 47 is a diagram exemplifying a composite code generation processing for authenticity determination of processing example 1.

1) Generation of a Composite QR Code with Encrypted Information Formed in the Dot Code FIG. 47 exemplifies a composite code generation process for authenticity determination.

(1) In the generation of a composite QR code as exemplified in FIG. 47, information stored in the data area of the QR code is encoded. Here, the data area refers to the data area itself represented in the QR code excluding areas of the position detection patterns (finder patterns), the alignment patterns, the timing patterns, the format information sections, and the error correction code section in the QR code exemplified in FIG. 1. The reason why the information stored in the data area of the QR code is encoded is that there are many cases where the read QR code does not completely match with the QR code at the time it was created due to missing information or the presence of stain at the time the printed QR code was printed, the photographing conditions of the QR code, and the like. Similarly, the QR code displayed on a display may not match due to photographing conditions of the QR code. Therefore, it is meaningless to encode a whole QR code having an error correction code and compare the encoded information with each other. Here, the encoding includes obtaining a code string by performing irreversible conversion of data using a hash function. The code string includes plain text (data to be signed), and the encoded information encoded using a hash function includes a hash value.

(2) In the dot code, it is necessary to have at least necessary information such as the error correction code and format information (specification such as type and version of stored dot code) in addition to data (including encrypted information) be stored according to a predetermined specification.

(3) It is desirable to have the composite QR code be issued by a specified issuing organization that strictly manages the encryption means. As a result, an environment that can be used by any user can be constructed. Note that if there is a unique encryption means and a specified user uses it, the issuer may be the provider of a service to the user. For example, an issuance requester requesting the issuance of a composite QR code transmits a URL or data (information for storing in the data area of the QR code) to the issuing organization. It is desirable to have the issuance requestor be limited to corporations, administrative organizations, and the like or individuals that have been approved in advance by the issuing organization. It is desirable to authenticate whether or not to issue the composite QR code to the issuance requester by a predetermined method as needed. It is desirable to sequentially authenticate by a predetermined method whether to issue the composite QR code to the issue requestor. For open information such as URLs and the like, the issued composite QR code or the issue requester may be disclosed, and a third party may evaluate to improve reliability. The third party may be a general user.

(4) To ensure security, it is necessary to encrypt the encoded information by an encryption means so that a third party with respect to the issuing organization cannot issue a composite QR code. To encrypt the encoded information, a digital signature algorithm, that is, signature generation using a secret key may be used. For the digital signature algorithm, there are various methods including SHA256, and they are standardized by the National Institute of Standards and Technology (NIST) under the US Department of Commerce. Note that the encrypted information obtained by encrypting the encoded information by an encryption means includes a digital signature.

((5) A QR code is generated from information (not limited to a URL) stored in the data area received from a composite QR code issuance requester, and the encrypted information is stored in a data area of a dot code formed with a plurality of cells defined by the QR code. The data area does not have to be physically defined and may be logically defined. Note that the encrypted information may be stored in a QR code.

(6) The completed composite QR code is transmitted to the issuance requester, and the issuance requester forms the composite QR code on a medium (by any method enabling the recognition of the composite QR code including printing, engraving, displaying on a display, and the like), and provides it to a third party.

(7) For data stored in the data area of the first code and the second code of a composite QR code, one electronic signature (also called a digital signature) for both or one digital signature for each data may be generated, and the electronic signature may be stored in the data area of at least any one of the first code and the second code. For example, an electronic signature may be created for the first code and stored in the data area of the second code. Alternatively, an electronic signature may be created for the second code and stored in the data area of the first code. For the first code and the second code, one electronic signature may be generated, and the electronic signature may be stored in an additional first code or an additional second code in an adjacent area of the first code or the second code.

2) Reading and Authentication of a Composite QR Code with Encrypted Information Formed in the Dot Code (1) To read a composite QR code formed on a medium (by any method enabling the recognition of the composite QR code including printing, engraving, displaying on a display, and the like), it is assumed that a dedicated composite QR code reading apparatus or an information processing apparatus such as a smartphone, a tablet, or the like with a dedicated composite QR code reading application downloaded and installed is used.

(2) When a composite QR code is read by a dedicated reading apparatus or with a reading application, the center coordinate values of each cell, the size of the cells, and the orientation of the QR code can be recognized by the reading of the finder patterns (extraction symbols), alignment patterns, quiet zone, timing patterns, and format information sections according to a normal QR code reading procedure. When a cell is determined only by bright or dark, a binarized image is generated based on a predetermined threshold from the brightness or darkness of the imaged cell, and the QR code is read by determining the binarized information of each cell. The dot code is obtained by binarizing the dots in a similar manner and reading the dots. However, the dot arrangement may be recognized for every determination of a cell, or the dot arrangements formed in the cells may be read to recognize the dot code after the completion of the reading of each cell in which QR code information is defined. Note that when a cell is formed with the use of levels of brightness or darkness or the use of color to increase the amount of information of the QR code, 2 bits or more of information may be defined in the cell increasing in stages in accordance with the increase in levels of color intensity, hue, or the like.

(3) Next, only the information (not limited to the URL) stored in the data area of the read QR code is encoded. The concept of encoding is as shown in (1) of section 1). Furthermore, the dot code is read with error correction, and data including at least encrypted information is obtained. The concept of the encrypted information is as shown in (1) of section 1). Here, the encrypted information is decrypted by a decryption means into decrypted information. The decryption means includes signature verification by a verification algorithm for a digital signature, and it may be the signer's public key.

(4) Finally, if encoded information (for example, a hash value) obtained by encoding the QR code read in (3) by an encoding means (for example, a hash function) and decrypted information (for example, a hash value obtained when a QR code is generated by an issuing organization) obtained by decrypting encrypted information stored in the dot code by a decrypting means match, the composite QR code is authenticated as being a composite QR code issued by the issuing organization. Note that the decryption means includes a public key. However, the authentication method is not limited to the matching/mismatching between the encoded information and the decrypted information. It is only necessary to confirm that the encoded information and the decrypted information have a predetermined relationship.

<Processing Example of an Offline Composite QR Code Authenticity Determination System>

Processing Example 1

FIG. 47 shows a flowchart exemplifying a method of generating a composite QR code for authenticity determination. The generation of a composite code is executed by, for example, an information processing apparatus (hereinafter, represented with the management server MS1) such as the management server MS1, the content server CS1, or the like exemplified in FIG. 32.

In this processing, the management server MS1 calculates encoded information (for example, a hash value) using an encoding means (for example, a hash function) based on the QR code data (T11). Here, the QR code data refers to data of the QR code structure exemplified in FIG. 1 which is incorporated in the data and error correction code area.

Next, the management server MS1 encrypts encoded information calculated in T11 by an encryption means (T12). Here, encrypting the encoded information is also referred to as calculating encrypted information. More specifically, in T12, the management server MS1 has, for example, a pair of a secret key and a public key. For the management server MS1, it is assumed that an application to the electronic certification authority (CA) (or registration authority (RA)), registration of a public key, and reception of a public key certificate and a private key corresponding to the public key have been performed. The management server MS1 encrypts the encoded information using the secret key issued from the electronic certification authority (CA). As an encryption means, an encryption processing module for execution in the management server MS1 is exemplified.

Next, the management server MS1 applies error correction to the QR code data to generate a QR code. Furthermore, the management server MS1 applies error correction to the dot code data which includes encrypted information to generate a dot code in the QR code cells (T13). By the processing of T13, the same composite code as those in the first to the third embodiments is generated.

Then, the management server MS1 forms a composite QR code on a medium (T14). The medium on which it is formed includes display screens of displays and the like. That is, as exemplified in FIG. 32, the generated composite QR code is provided to a remote user device or a content server via a broadcast medium or a communication medium. In addition, the formed composite QR code is stored in a storage medium. Also, the formed composite QR code is printed on a print medium.

Figure 48:
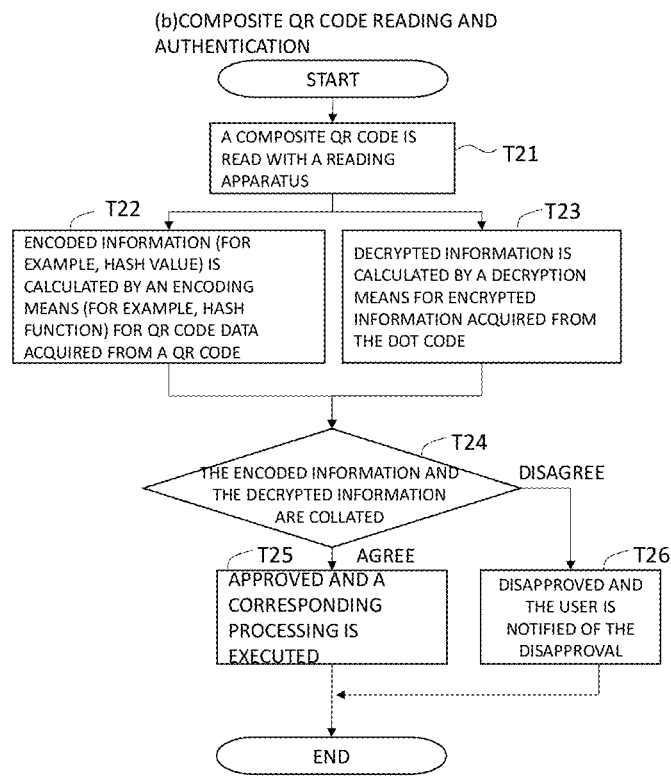
FIG. 48 is a flowchart exemplifying reading and authentication processing of a composite QR code of processing example 1.

FIG. 48 shows a flowchart exemplifying reading and authenticating processings of a composite QR code. Here, the apparatus that executes reading and authenticating processings of a composite QR code is, for example, the user devices UD1, UD2, and the like exemplified in FIG. 32 (hereinafter, simply represented with UD1).

In this processing, first, the user device UD1 reads a composite QR code with a reading apparatus (T21). Here, the reading apparatus is, for example, an imaging apparatus that acquires an image of a composite QR code. Also, reading of a composite QR code refers to capturing an image of a composite QR code on a medium, storing it in the main storage apparatus 12 (see FIG. 33) or an image memory, and acquiring data from both the QR code and the dot code. Here, of the composite QR code, the data encoded into the QR code is referred to as QR code data. And, of the composite QR code, the data encoded into the dot code is the encrypted information coded into the dot code generated in the processing of T13.

Next, the user device UD1 calculates encoded information (for example, a hash value) from the QR code data obtained from the QR code by using an encoding means (for example, a hash function) (T22). Along with the processing of T22, the user device UD1 calculates decrypted information from the encrypted information obtained from the dot code by a decryption means (T23).

Next, the user device UD1 collates the encoded information and the decrypted information (T24). Then, if the encoded information and the decrypted information match, the user device UD1 determines that authentication using the composite code is successful, and performs a corresponding processing. For example, the user device UD1 executes a processing specified by a QR code of a composite QR code (T25). Or, for example, the user device UD1 accesses a URL specified by a QR code of a composite QR code. Or, for example, the user device UD1 determines that the information specified by a QR code of a composite QR code is correct, and executes corresponding processing. The corresponding processing includes, for example, the reproduction of a content specified by a QR code in a composite QR code, the access to a financial institution account specified by a QR code, the processing with a credit card number or the like specified by a QR code, and the display of the result of authenticity determination of a medium on which a composite QR code is printed.

On the other hand, if the encoded information and the decrypted information do not match, the user device UD1 determines that authentication for the composite code is unsuccessful, and notifies the user of the result (T26).

As described above, according to the processing example 1, it is possible to perform various authentication processings, authenticity determination processings, tampering detection processing, and the like by using a composite QR code. In the above description, the process of embedding the encrypted information of the QR code data as a dot code is exemplified. However, the encrypted information may be encoded into a part of the QR code and be decrypted.

Processing Example 2

Figure 49:
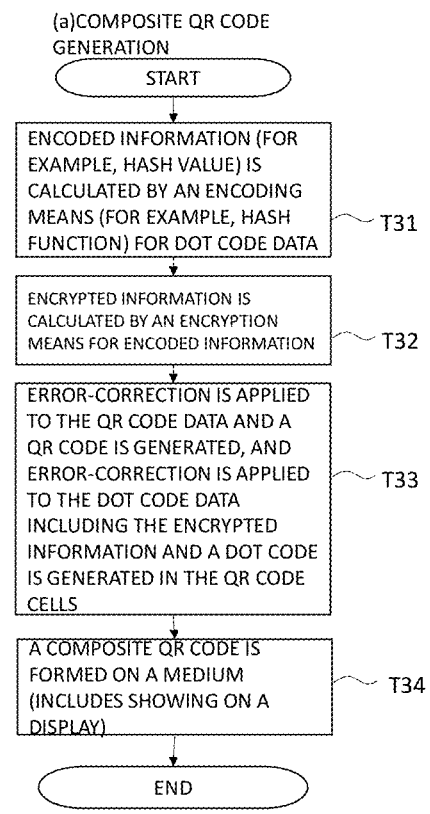
FIG. 49 is a diagram exemplifying a composite code generation processing for authenticity determination of processing example 2.

FIG. 49 shows a flowchart exemplifying a method of generating a composite QR code for authenticity determination by encoding the encrypted information of a dot code data into a QR code. In this processing, the management server MS1 calculates encoded information (for example, a hash value) using an encoding means (for example, a hash function) based on the dot code data (T31).

Next, the management server MS1 calculates encrypted information by an encryption means based on the encoded information (T32). Next, the management server MS1 applies error correction to the QR code data which includes the encrypted information to generate a QR code, and applies error correction to the dot code data to generate a dot code in the QR code cells (T33). That is, here, the management server MS1 incorporates encrypted information into the QR code. Then, a composite QR code is formed on a medium (T34). Here, the point that the medium on which the composite QR code is formed also includes a display screen of a display or the like, and includes a broadcast medium, a communication medium, a storage medium, and a print medium, is the same as in the case of FIG. 47.

Figure 50:
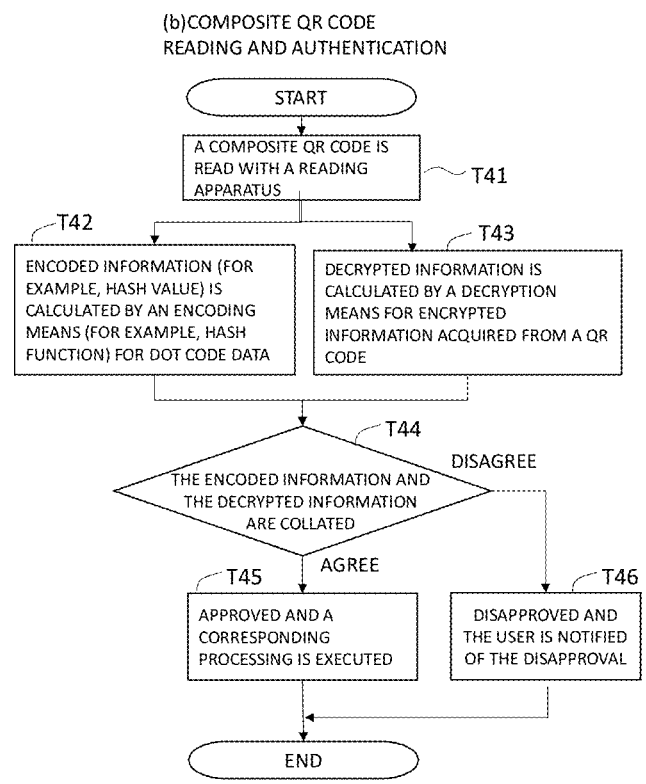
FIG. 50 is a flowchart exemplifying reading and authentication processing of a composite QR code of processing example 2.

FIG. 50 shows a flowchart exemplifying reading and authenticating processings of a composite QR code. In this processing, the user device UD1 reads a composite QR code with a reading apparatus (T41). Next, the user device UD1 calculates encoded information (for example, a hash value) of the dot code data using an encoding means (for example, a hash function) (T42). Next, the user device UD1 calculates decrypted information by a decryption means based on the encrypted information obtained from the QR code (T43).

Then, the user device UD1 collates the encoded information and the decrypted information (T44). If the encoded information and the decrypted information match, the user device UD1 determines that authentication for the composite code is unsuccessful, and performs corresponding processing (T45). For example, the user device UD1 performs processing specified by the dot code of a composite QR code. Or, for example, the user device UD1 accesses a URL specified by the dot code of a composite QR code. Or, for example, the user device UD1 determines that the information specified by the dot code of the composite QR code is correct, and executes corresponding processing. The corresponding processing includes, for example, the reproduction of a content specified by a dot code in a composite QR code, the access to a financial institution account specified by a dot code, the processing with a credit card number or the like specified by the dot code, and the display of the result of authenticity determination of a medium on which a composite QR code is printed.

On the other hand, if the encoded information and the decrypted information do not match, the user device UD1 determines that authentication of the composite code has failed, and notifies the user of the result (T46).

As described above, according to the processing example 2, it is possible to perform various authentication processings, authenticity determination processings, tampering detection processing, and the like by using a composite QR code. Note that in the above description, the management server MS1 registers the encrypted information of the dot code data in a QR code to form a composite code. However, instead of such processing, the management server MS1 may register the encrypted information of the first dot code data in the second dot code and decrypt it. The second dot code is, for example, a dot code of cells different from the cells in which the first dot code is formed.

Processing Example 3

Figure 51:
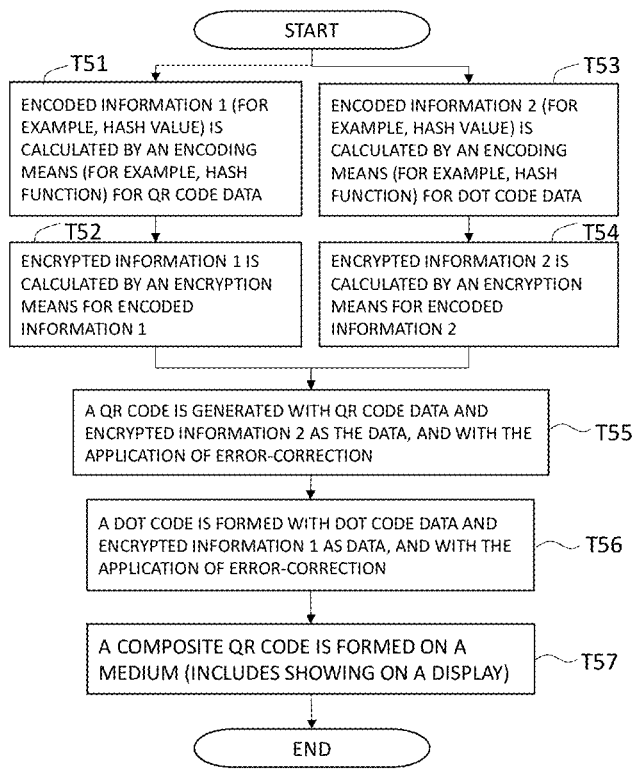
FIG. 51 is a diagram exemplifying a composite code generation processing for authenticity determination of processing example 3.

FIG. 51 shows a flowchart exemplifying a method of generating a composite QR code for authenticity determination by encoding the encrypted information of the QR code data into a dot code and encoding the encrypted information of a dot code data into a QR code.

In this processing, the management server MS1 calculates encoded information 1 (for example, a hash value) using an encoding means (for example, a hash function) based on the QR code data (T51). Next, the management server MS1 calculates encrypted information 1 by an encryption means based on the encoded information 1. That is, the management server MS1 encrypts the encoded information 1 with a secret key (T52).

Along with the processings of T51 and T52, the management server MS1 calculates encoded information 2 (for example, a hash value) by an encoding means (for example, a hash function) based on the dot code data (T53). Next, the management server MS1 calculates encrypted information 2 by an encryption means based on the encoded information 2. That is, the management server MS1 encrypts the encoded information 2 with a secret key (T54). Note that the secret key used in T54 may be the same as the secret key used in T52, or may be a different secret key. In any case, authentication is performed using the public key corresponding to a secret key.

Next, the management server MS1 applies error correction to the QR code data and the encrypted information 2 as data to generate a QR code (T55). Furthermore, using the dot code data and the encrypted information 1 as data, the management server MS1 applies error correction to the QR code cells to form a dot code (T56).

Then, the management server MS1 forms a composite QR code on a medium (T57). Here, the point that the medium on which the composite QR code is formed also includes a display screen of a display or the like, and includes a broadcast medium, a communication medium, a storage medium, and a print medium, is the same as in the cases of FIG. 47 and FIG. 49.

Figure 52:
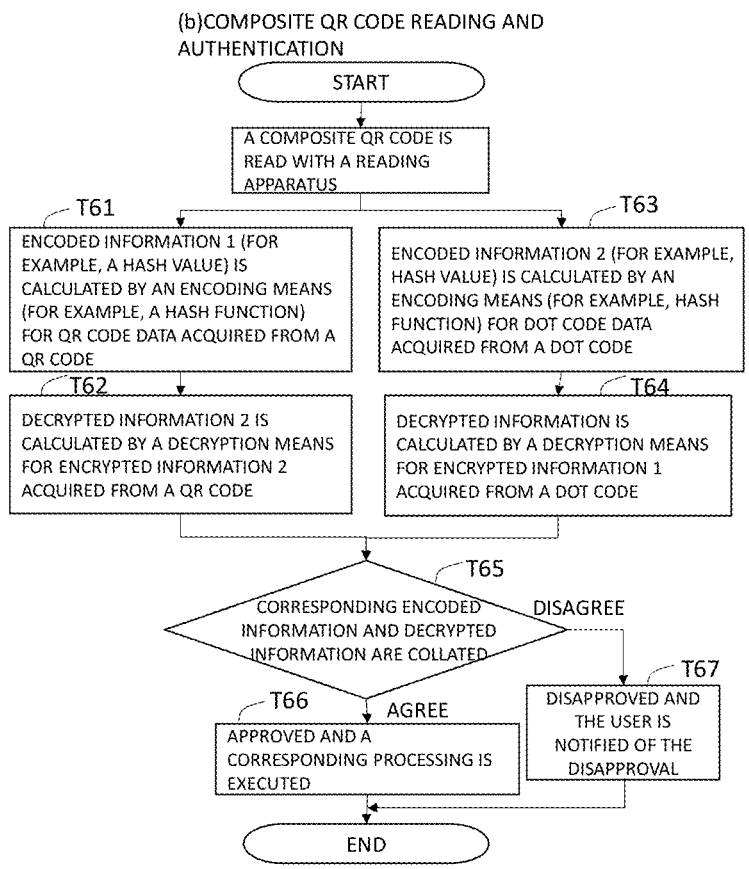
FIG. 52 is a flowchart exemplifying reading and authentication processing of a composite QR code of processing example 3.

FIG. 52 shows a flowchart exemplifying reading and authenticating processings of a composite QR code. In this process, the user device UD1 calculates encoded information 1 (for example, a hash value) with an encoding means (for example, a hash function) based on the QR code data obtained from a QR code (T61). Next, the user device UD1 calculates decrypted information 2 with a decryption means based on the encrypted information 2 obtained from the QR code (T62). That is, the user device UD1 decrypts the encrypted information 2 into the decrypted information 2.

Along with the processings of T61 and T62, the user device UD1 calculates encoded information 2 (for example, a hash value) of the dot code data obtained from the dot code by an encoding means (for example, a hash function) (T63). Next, the user device UD1 calculates decrypted information 1 by a decryption means based on encrypted information 1 obtained from the dot code (T64). That is, the user device UD1 decrypts encrypted information 1 into decrypted information 1.

Next, the user device UD1 collates the encoded information with the decrypted information, respectively (T65). In each case, the collation refers to collation between the encoded information 1 and the decrypted information 1, and the collation between the encoded information 2 and the decrypted information 2. If the collation of the two gives a match in T65, the user device UD1 determines that authentication for the composite code is unsuccessful, and performs corresponding processing (T66). The processing in T66 is the same as the processings in T25 and T44, and thus details are omitted.

On the other hand, if the collation of the two does not give a match in T65, the user device UD1 determines that authentication for the composite code has failed, and notifies the user of the result (T67).

As described above, according to the processing example 3, it is possible to perform various authentication processings, authenticity determination processings, tampering detection processing, and the like by using a composite QR code. Note that in the above description, the management server MS1 encodes the encrypted information of a dot code data into a QR code, and encodes the encrypted information of the QR code data into a dot code to form a composite code. However, instead of such processing, the management server MS1 may encode the encrypted information of the QR code data into a QR code and the encrypted information of a dot code data into a dot code, and the user device UD1 may decrypt both.

Processing Example 4

Figure 53:
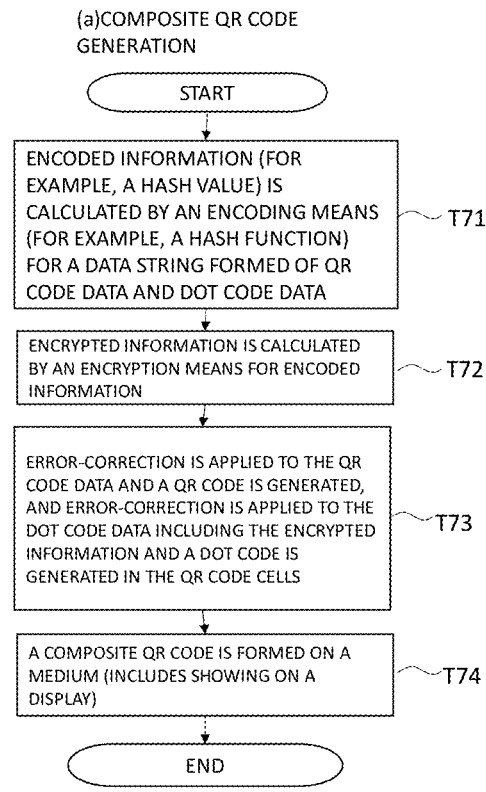
FIG. 53 is a diagram exemplifying a composite code generation processing for authenticity determination of processing example 4.

FIG. 53 shows a flowchart exemplifying an example of a method of generating a composite QR code for determining authenticity by encoding the encrypted information of a data string formed of QR code data and dot code data into a dot code.

In this processing, the management server MS1 calculates encoding information (for example, a hash value) by an encoding means (for example, a hash function) based on a data string formed of the QR code data and the dot code data. (T71).

Next, the management server MS1 calculates encrypted information by an encryption means based on encoded information (T72). That is, the management server MS1 encrypts encoded information into encrypted information. Next, the management server MS1 applies error correction to the QR code data to generate a QR code. Furthermore, the management server MS1 applies error correction to the dot code data which includes encrypted information to generate a dot code in the QR code cells (T73).

Then, the management server MS1 forms a composite QR code on a medium (T74). Here, the point that the medium on which the composite QR code is formed also includes a display screen of a display or the like, and includes a broadcast medium, a communication medium, a storage medium, and a print medium, is the same as in the cases of FIG. 47, FIG. 49, and FIG. 51.

Figure 54:
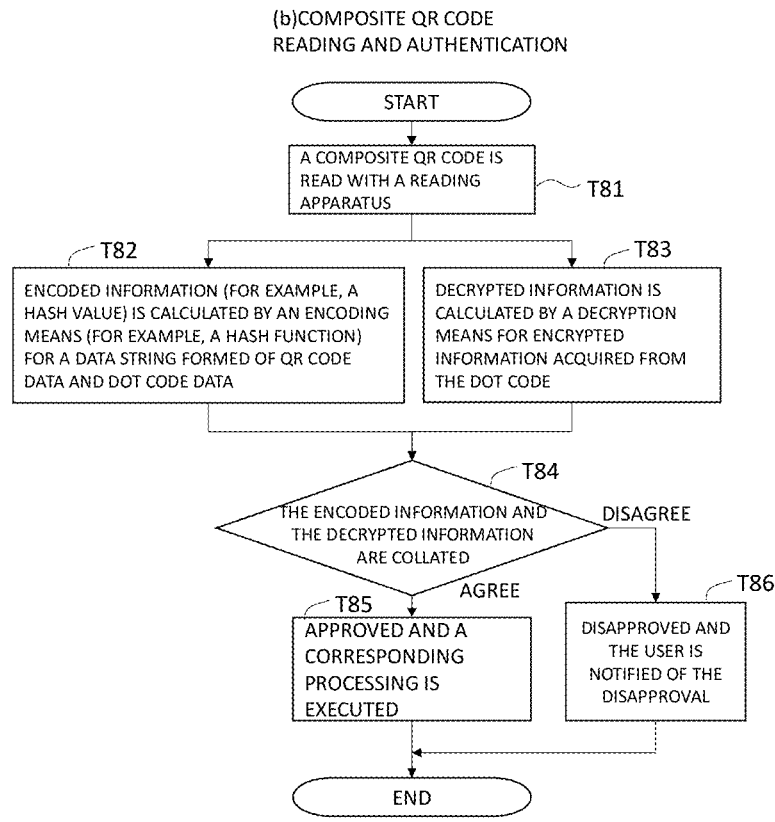
FIG. 54 is a flowchart exemplifying reading and authentication processing of a composite QR code of processing example 4.

FIG. 54 shows a flowchart exemplifying reading and authenticating processings of a composite QR code. In this process, the user device UD1 reads a composite QR code with a reading apparatus (T81). Next, the user device UD1 calculates encoded information (for example, a hash value) by an encoding means (for example, a hash function) using the QR code data and the dot code data as a data string (T82). Along with the processing of T82, the user device UD1 calculates decrypted information by a decryption means based on encrypted information obtained from the dot code (T83). That is, the user device UD1 decrypts encrypted information into decrypted information.

Next, the user device UD1 collates the encoded information and the decrypted information (T84). If the encoded information and the decrypted information match, the user device UD1 determines that authentication for the composite code is unsuccessful and performs the corresponding processing (T85). The processing in T85 is the same as the processings in T25, T44, and T66, and thus details are omitted.

On the other hand, if the collation of the two does not give a match in T85, the user device UD1 determines that authentication for the composite code has failed, and notifies the user of the result (T86).

As described above, according to the processing example 4, it is possible to perform various authentication processings, authenticity determination processings, tampering detection processing, and the like by using a composite QR code. Note that in the above description, the management server MS1 encodes the encrypted information of the data string formed of the QR code data and the dot code data into a dot code to form a composite code. However, instead of such processing, the management server MS1 may encode the encrypted information of the data string formed of the QR code data and the dot code data into a QR code, and the user device UD1 may decrypt both.

Processing Example 5

Figure 55:
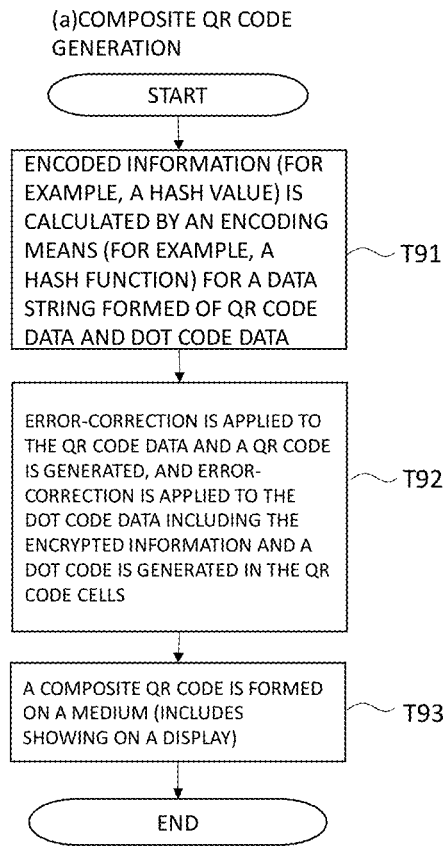
FIG. 55 is a diagram exemplifying a composite code generation processing for authenticity determination of processing example 5.

FIG. 55 shows a flowchart exemplifying a composite QR code generation method in which encoded information of a data string formed of QR code data and dot code data is encoded into a dot code. In this processing, a secret key and a public key are not used. In this processing, the management server MS1 calculates encoded information (for example, a hash value) of a data string formed of QR code data and dot code data by an encoding means (for example, a hash function) (T91). Next, the management server MS1 applies error correction to the QR code data to generate a QR code, and applies error correction to the dot code data which includes the encoded information generated in T91, to generate a dot code in the cells of the QR code (T92).

Then, the management server MS1 forms a composite QR code on a medium (T93). Here, the point that the medium on which the composite QR code is formed also includes a display screen of a display or the like, and includes a broadcast medium, a communication medium, a storage medium, and a print medium, is the same as in the cases of FIG. 47, FIG. 49, FIG. 51, and FIG. 53.

Figure 56:
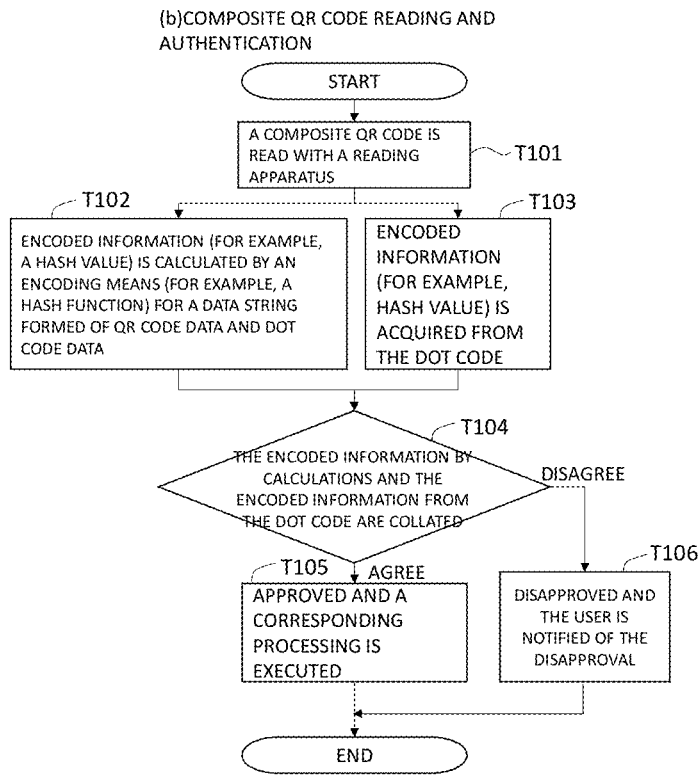
FIG. 56 is a flowchart exemplifying reading and authentication processing of a composite QR code of processing example 5.

FIG. 56 shows a flowchart exemplifying reading and authenticating processings of a composite QR code. In this processing, for example, the user device UD1 reads a composite QR code with a reading apparatus from information acquired from a content server (T101). Next, the user device UD1 calculates encoded information (for example, a hash value) by an encoding means (for example, a hash function) using the QR code data and the dot code data as a data string (T102). Next, the user device UD1 acquires encoded information (for example, a hash value) from the dot code (T103).

Next, the user device UD1 collates the calculated encoded information with the obtained encoded information (T104). Then, if the encoded information and the decrypted information match, the user device UD1 determines that authentication for the composite code is unsuccessful, and performs corresponding processing (T105). The processing in T105 is the same as the processings in T25, T44, T66, and T85, and thus details are omitted.

On the other hand, if the encoded information and the decrypted information do not match in T105, the user apparatus UD1 determines that authentication for the composite code has failed, and notifies the user of the result (T106).

Unlike the processing examples 1 to 4, in the processing example 5, it is possible to confirm whether or not the error correction was correct. When the encoding processing used in T91 and T102 is a process that can be specified only by the management server MS1 and the user device UD1, it is possible to perform various authentication processings, authenticity determination processings, tampering detection processing, and the like by using a composite QR code in the same manner as in the processing examples 1 to 4

For all of the electronic authentications described with reference to FIGS. 47 to 54, it is possible to authenticate whether or not the error correction is correct, including the following cases.

- In a case where the encoded information of QR code data is encrypted into encrypted information by an encryption means and stored in the dot code.
- In a case where the encoded information of QR code data is encrypted into encrypted information by an encryption means and stored in the QR code.
- In a case where the encoded information of dot code data is encrypted into encrypted information by an encryption means and stored in the QR code.
- In a case where the encoded information of dot code data is encrypted into encrypted information by an encryption means and stored in the dot code.
- In a case where the encoded information of QR code data is encrypted into encrypted information by an encryption means and stored in the dot code, and the encoded information of dot code data is encrypted into encrypted information by an encryption means and stored in the QR code.
- In a case where the encoded information of QR code data is encrypted into encrypted information by an encryption means and stored in the QR code, and the encoded information of dot code data is encrypted into encrypted information by an encryption means and stored in the dot code.
- In a case where encrypted information obtained by encrypting the encoded information of a data string formed of QR code data and dot code data by an encryption means is stored in the QR code.
- In a case where encrypted information obtained by encrypting the encoded information of a data string formed of QR code data and dot code data by an encryption means is stored in the dot code.

Similarly, for all of the electronic authentications described with reference to FIGS. 55 and 56, it is possible to authenticate whether or not the error correction is correct, including the following case.

In a case where the encoded information of QR code data is stored in the dot code.

In a case where the encoded information of QR code data is stored in the QR code.

In a case where the encoded information of dot code data is stored in the QR code.

In a case where the encoded information of dot code data is stored in the dot code.

In a case where the encoded information of QR code data is stored in the dot code and the encoded information of dot code data is stored in the QR code.

In a case where the encoded information of QR code data is stored in QR dot code and the encoded information of dot code data is stored in the dot code.

In a case where encoded information of a data string formed of QR code data and dot code data is stored in the QR code.

In a case where encoded information of a data string formed of QR code data and dot code data is stored in the dot code.

<Features and Applications of the Sixth Embodiment>

The offline features and applications (authentication system and content system) of a composite QR code in which encrypted information is formed in the dot code described in the sixth embodiment will be listed below.

(Characteristic Examples and Effects of a Composite QR Code)

With a composite QR code, it is possible to perform electronic authentication without having to perform authentication on the Internet, thus leading to the prevention of hacking or the like on the Internet. In addition, for service providers that provide contents and various services on the Internet, provided that a mechanism to download and install a composite QR code reading application can be provided to the users, there is no need to operate a server that requires cumbersome management and costs for various content services and electronic authentication using a composite QR code. Therefore, the service provider can continuously provide service to users at a low cost. In addition, even small-sized service companies can provide various content services using a composite QR code without having to install a server.

(Installment of Translation Functions and Language Data of Various Countries)

Furthermore, in the use of contents, if an application is provided with an output function such as those of translation and interpretation, various contents acquired with one hybrid QR code can be used in various countries all over the world. On the other hand, by storing a function that enables the identification of texts in various languages, and small volume voice and image data in a composite QR code formed on a medium, even if the application does not have a translation/interpretation function, the display of texts and images, and the reproduction of the audio data in the required language may be possible. Of course, if a composite QR code is displayed on a display and a time series dot code or a color dot code is used, small volume animations can also be acquired as contents corresponding to various countries by storing them in composite QR codes as data in various languages.

(Method of Storing Data in a Composite QR Code)

A feature of the composite QR code is that the QR code in which a URL or the like is stored can be read not only with a composite QR code reader but also with a common QR code reader. Since the area occupied by the dot code is 20% or less at the most, and in addition, the conventional QR code reader treats an image such as a dot as noise and disregards it, there are no problems in reading the QR code. Also, data may be stored in a dot code, and a digital signature may be stored in the data area of the QR code as shown in FIGS. 49 and 50. This is because the feature that a dot code can store much more information can be utilized. Therefore, data such as a URL having a small volume may be stored in the QR code, and data having a large capacity such as a content may be stored in the dot code. Furthermore, format information such as the type and version of the dot code, the version of the error correction code, and the like may be stored in the QR code, at least data and the error correction code may be stored in the dot code, and the dot code may be read based on the information acquired from the QR code. Thus, the data format of the dot code can be made variable, and versatility can be improved. That is, the data format of the dot code can be set for each field of use, enabling any composite QR code reader to properly read the dot code.

(Various Ticket Applications)

A ticket seller sends a composite QR code containing the ticket number of the purchased ticket. When the ticket is used, an application supporting the composite QR code displays dot codes sent from the cloud indicating one-time passwords changing with time, and upon entry, the dot code is read by a composite QR code reader, and only the person who purchased the ticket may be allowed to enter. In addition, it is possible to prevent the resale of a ticket by acquiring the smartphone ID of the ticket purchaser and sending one time passwords to the smartphone. If one time passwords are embedded in a dot code, since it is difficult to see the change of the dots, it is possible to make the users unaware that passwords are being used. On the other hand, if one time passwords are stored in the QR code, since the QR code changes, there is the effect of suppressing forgers if the user is informed that copy protection is being implemented. For current QR codes, anyone can read the contents and anyone can generate them. If the ticket is a print medium and the ticket number is embedded in the QR code, there is a high possibility that a third party can issue the ticket number by performing reverse engineering based on the information read from the QR code. If the ticket number issuing procedure is known, a different ticket number can be easily generated.

Although a composite QR code reading application is to be generally widely provided, the generation of a composite QR code may be allowed only to specified composite QR code issuing agencies or to composite QR code issuer by providing composite QR code generation applications that enable the encoding of only specific dot codes (limited unique dot codes) for use as ticket numbers. This disables the production of forged tickets having ticket numbers different from the ticket number of the acquired ticket. Note that when it is desired to issue composite QR codes to the world that are completely unique codes, composite QR codes generated by a composite QR code generation application limited to the encoding of only specific unique dot codes and composite QR codes generated by another such generation application may be controlled not to be duplicate composite QR codes. Note that a ticket is for receiving various services such as participation in an event, entry to a facility, use for transportation, use as a meal ticket, and use as a voucher for administrative service. In the present embodiment, a composite QR code generation application capable of encoding unique dot codes as ticket numbers is described. However, it is desirable to provide a service that provides a composite QR code generation application that can encode a limited number of specific unique dot codes in QR codes according to ongoing contracts whenever for any use kind of use in any kind of field. Of course, the composite QR code issuing organization is to always issue unique composite QR codes. Note that since a composite QR code is a code in which a QR code and a dot code are combined, it is needless to say that a unique composite QR code can be generated even if the dot code is the same provided that the QR code is unique.

(Use in Biometric Authentication)

An enormous amount of personal information (biometric information such as the face, fingerprints, irises, veins, and the like) is registered in a dot code with the application of error correction. An electronic signature is applied to either the QR code or the dot code so that the personal information is not tampered with. As a method of use, when making a payment or the like, personal identification can be performed even in an unattended state by having a composite QR code displayed and read, and checking whether or not the biometric information obtained by reading the composite QR and the biometric information obtained from the person on the spot (acquisition of face, fingerprint, iris, vein information, and the like using a camera or sensor) match, and financial settlements, the entry into important facilities, and the operation of important devices can be performed with high security. Note that the registration of personal information to smartphones or the like can be easily performed by photographing the face, fingerprints, and irises with a built-in camera. Note that the personal information may be raw data obtained by photographing the face, fingerprints, or irises with a smartphone, or feature point data obtained by analyzing the raw data with a dedicated application. In the case of feature point data, there is an advantage that the data amount is small. However, since the use of a specific collation system for generating the same feature points as the mentioned feature point data is a prerequisite, the use of feature point data is not sufficiently versatile. In the case of raw data, versatility is excellent because it does not matter what system is used to collate registered data with the biometric information obtained on the spot. Since the volume of raw data corresponds to a large amount of information, it cannot be stored in a conventional QR code. However, a composite QR code can sufficiently store this information. With current face recognition technology, this application can be implemented with pictures compressed to 2 to 3 KB.

(Use as a Settlement Payment Means and Remittance Means)

If financial information of a credit card, a prepaid card, a cash card, or the like is stored in a composite QR code with an electronic signature, financial settlements with extremely high security can be performed. Furthermore, if one-time passwords or the like are issued together with a QR code or a dot code, security is further improved. In particular, when passwords are displayed using dot codes, it is very unlikely for stealing by spy photographing such as shoulder hacking to occur, since passwords with a large amount of information can be issued, one-time passwords can be displayed several times or more per second, and the dots are small. In such an example of a financial settlement, the system on the store side may provide the purchaser with a print medium on which items for purchase, the unit prices, the total payment amount, and the like are printed, or display the contents on a display. After the purchaser confirms the displayed contents and financial settlement card information is displayed on the purchaser's smartphone, the store side system reads the information using a composite QR code reader (may be a smartphone), and the purchase settlement information is transmitted to the financial settlement server on the read financial settlement card information. And when the financial settlement server approves the settlement, the financial settlement server immediately notifies the POS of the store, and the purchase of the product is completed. Furthermore, settlement completion information such as settlement information on the purchased items, information on the store where the purchase was made, and the like, may be transmitted to the purchaser's smartphone. In this way, payment can be made without having a receipt be issued, and thus the store side can eliminate the operation of a printer, and the purchaser can manage the information of the purchased items as data. In addition, when payment cannot be made, there is an overuse of a credit card, or a prepaid card or a bank account is short of balance, such information may be displayed on the smartphone.

As an example of a financial settlement of a credit card, a prepaid card, a bank account, or the like, in a system using a composite QR code, a purchaser displays financial settlement card information on a smartphone with a composite QR code, the store side system reads the displayed contents of the smartphone with a composite QR code reader (may be a smartphone), and the purchase settlement information is transmitted to the financial settlement server based on the read financial settlement card information. When the financial settlement server approves the settlement, the financial settlement server immediately notifies the POS of the store of the settlement approval result, and the purchase settlement of the product is completed. Furthermore, information such as information on the purchased items, information on the store where the purchase was made, and the like, may be transmitted to the purchaser's smartphone, and icons such as "make payment," "cancel," "single payment," "installment payment," and the like may be displayed, and a selection and a settlement may be made. In addition, when payment cannot be made, there is an overuse of a credit card, or a prepaid card or a bank account is short of balance, such information may be displayed on the smartphone. The system on the store side may provide the purchaser with a print medium on which the purchased items, the unit prices, the total payment amount, and the like are printed, or display the contents on a display, and after the purchaser makes a confirmation, a settlement with a credit card or the like may be made.

In another example, the store side displays a composite QR code on the display of a POS (may be a smartphone), and when the purchaser reads the composite QR code, the items for purchase, unit prices, and the total payment amount are displayed, and when icons such as "make payment," "cancel," "single payment," "installment payment," are displayed and a selection is made, the payment information of them is transmitted to the financial settlement server, and if the payment is approved, the POS of the store is immediately notified, and the purchase is completed. If there is not enough money left in a prepaid card or a bank account, the balance, shortage, or the like are displayed. Note that not handing a card to another party means that the information on the card is not easily copied, and thus damage by impersonation can be suppressed.

(Application to Remittance Processing)

Furthermore, in a case where it is desired to make a remittance between individuals, when the sender inputs an amount into a smartphone, a composite QR code in which remittance information such as the sender, the amount, and the like is registered is displayed. When the other side reads the information on his/her smartphone and taps the "confirmed" icon, the sender is notified, and to whom and how much will be remitted is displayed, and by tapping the "make payment" icon, a remittance is executed to the other side, and a financial transaction between the individuals is established. As another method, a composite QR code in which remittance destination information and the like are registered is displayed on the other side's smartphone, the remittance destination information is displayed when it is read by the sender's smartphone, and when the amount is entered into the smartphone, and the "make payment" icon is tapped, a remittance is executed to the other side, and a financial transaction between the individuals is established. In such a case, if personal information such as a photograph or the like is registered in the composite QR code, it is easy to make a personal identification of the payee. In any case, the user may enter a password when the "make payment" icon is tapped to increase security so that a third party other than the user can make a remittance. Regarding these financial transactions, in addition to the amount and date, classifications such as 'loan', 'gift', 'consideration', and the like can be made and recorded.

(Use as a Coupon)

In the use of reward points, coupons and stamps, in a case where a customer acquires a special benefit, the system of the special benefit provider can form (print or display) a composite QR code for acquiring a special benefit, anywhere, and a customer can acquire it by reading with his/her smartphone. In addition, the system of the special benefit provider reads the composite QR code displayed on the customer's smartphone, sends a special benefit to the customer's smartphone or erases a used special benefit using various communication means such as the telephone line, WiFi, Bluetooth, or the like. The composite QR code may include a telephone number or address of a communication destination, a smartphone ID, a membership number, and the like.

(Use as a Certificate)

When the system identities a person with a license, health insurance card, student ID card, employee ID card, membership card, passport, or the like, even if the person does not present the card, such information may be stored in a dot code and the person may display the corresponding composite QR code on a smartphone. The system reads the dot code with a composite QR code reader, displays necessary information for the reading apparatus, has the person tell his/her date of birth, address, and the like, to confirm that the person is himself/herself in person. Note that the reading of the composite QR code formed on a print medium, a display, or the like can also be performed by a dedicated application installed on a smartphone. In particular, since a photograph can be stored in a dot code, personal identification can be performed by the viewing of a conventional photograph even without a card. It is customary for post offices and hospitals to copy a card. When a composite QR code is displayed or read with a smartphone (dedicated application) or a composite QR code is read with a dedicated reading apparatus, rather by having only a part of the information including a photograph, the date of birth, the address, and the like included in the read data be displayed, and having other information be hidden, security can be increased, even if card information is passed to the system of the other party that performs the checking. Furthermore, since a system that has read the QR code can trace the history of the scanned composite QR code along with the time and place, it can be used as big data. Note that not handing a card to another party means that the information on the card is not easily copied, and thus damage by impersonation can be suppressed.

(Use as a Recording Means)

It is obligatory to store information on paper media in various fields from materials for the medical and legal fields, to contracts for the fields of real estate, finance, and the like. The system can acquire text information by digitizing with OCR, record it in the cloud, and retrieve it, but it is cumbersome for a person to look at paper media and search for such information. The composite QR code can store a text (about 4,000 characters or 10,000 characters if color dots can be used) of several pages of a paper medium, and thus a system can read a composite QR code printed on the spot, and can easily obtain the information. As an attachment of a composite QR code, i) it may be printed at any position together with the data obtained and read by OCR by the system, ii) the system may print the composite QR code on a sticker or the like, and it may be attached to the original document or the printed document, or iii) note that if a predetermined area (near or insider the document) for printing a composite QR code is formed in the original document, the system may print the composite QR code in the predetermined area of the printed document based on the original document (superimposed printing on the original document) or data obtained by OCR.

Furthermore, by storing and printing a document or the like in a hybrid QR code on various print media such as newspapers, magazines, catalogs, flyers, and the like, it is possible to provide the described information and also further information without having to use the Internet.

(Use as an Information Exchanging Means)

In the exchange of various kinds of information, the composite QR code improves security. For example, a user can easily transmit and receive a photograph, audio data, text, and the like by using a composite QR code without having to tell the other party a mail address or SNS contact information. For example, if it is a photograph, a high-quality photo for viewing on a smartphone, 10 minutes of audio data, and a text of tens of thousands of characters or more can be stored. In regards with the number of characters in the text, since it has been described above, the description is omitted here. For audio data, ADPCM (Adaptive Differential Pulse Coding Modulation) and data compression technology provide 0.3 kbps, but MELP (Mixed Excitation Linear Prediction) and data compression technology enable 0.1 kbps, and since the dot code can store information of about 2 kb at the maximum, it is possible to store audio data of about 20 seconds. Note that, in the case of an image, it is possible to acquire a content such as a photograph of about 2 KB by JPEG (at a level that personal identification can be performed by the human eyes). Furthermore, quality sufficient for face image recognition can be maintained by the latest still image compression technology (BPG, JPEG XL which is the next generation JPEG, or the like). Note that, by using a dedicated high-resolution composite QR code reader, a composite QR code corresponding to version 40 having 177×177 cells, which can store the maximum information amount for a printed QR code, can store about 24 KB bytes of information, which is 8 times as large. With smartphones, although there are many functions that can be used to exchange information such as IR and Bluetooth, the functions cannot be used with all smartphones. However, if the user downloads and installs on a smartphone a dedicated reading application for the composite QR code, since the display and reading of a composite QR code can be performed with almost all smartphones, the possibility of widespread use is extremely high. For example, after taking a group photo, if the corresponding composite QR code is printed or displayed on the display, and if each reads the composite QR code, it is possible for each to obtain the group photo on a smartphone even if not everyone gives their address or the like. If a composite QR code is printed, a commemorative photo or message, such as that of a graduation album, can be obtained anytime, anywhere forever without having to upload it on a server or the like. In the past, it has been necessary to utilize a server environment in which photographic information could be browsed and downloaded for many years. However, in the present embodiment, such server management and waste of cost can be done away with. Such an effect of the present invention can be utilized in various content fields, and there is the great merit of being freed from the responsibility of continuing server construction and management. That is to say that a business model for selling out can be promoted.

Note that when a smartphone or other system stores a high-quality photograph, about 10 minutes of audio data, or a text of tens of thousands of characters or more, and when a corresponding composite QR code is displayed on the smartphone, for example, by fixing the display of a first code (QR code), and by displaying a plurality of different second codes (dot codes) at predetermined time intervals, a large amount of information can be generated. When a reading apparatus reads a blinking time series dot code with a composite QR code reader, it is possible to perform high-speed processing by having the QR code read only once and then having only the dot codes be read. In regards with camera shaking at the time of photographing, by tracking the change in the imaging position of the timing patterns or the alignment patterns and correcting detected dot positions each time, the dot code can be read accurately. When a composite QR code is displayed on a smartphone and the composite QR code is read by a reading apparatus such as another smartphone, the amount of information that can be stored in the dot code at a time is about 0.85 K, but the reading apparatus can acquire the amount of information of 20 KB or more with a time series dot code in which the dot code changes about 24 times during 2 to 3 seconds or with a color dot code. If this is reproduced as photograph data, when it is displayed by a smartphone on the reading side, the user can view the image as a sufficiently high-quality image, and a smartphone on the display side can transmit text information exceeding as much as 70,000 characters.

(Dot Code Colorization)

As described above, the amount of information of the composite QR code can be further increased by the colorization of the dots. Since the reading apparatus reads the color of the dots in RGB, at least red (R), green (G), blue (B), yellow (mixed color of RG), cyan (mixed color of GB), magenta (mixed color of RB), black, and white (no dots) can be distinguished with any display even if the color display is different for each model, and that alone leads to an increase of 3 bits per dot. That is, the amount of information per cell is tripled. At present, if the code variable-length technology is used, there is a high possibility that the amount of information can be further increased two times, that is, a total increase to about six times. As a result, the system can transmit a large amount of information exceeding several hundred times that of a QR code by a time change of a color dot code in combination with a time change of a time series dot code. Thus, the system can also transmit animations if the resolution is low, the number of colors is small, and the length is short. In a case where the system changes the composite QR code with time, the execution of electronic authentication may be performed just with the corresponding content stored in the first composite QR code. Furthermore, there may be a case where the content part is not electronically authenticated. These processings may be applied not only to the exchange of animations but also to that of a large amount of text or high-resolution images.

(Application to Information Acquisition and Information Provision Services)

As an example of information acquisition, for example, the user can acquire various kinds of information immediately from a composite QR code printed on a poster printing or displayed on a display as a signage. Usually, a user obtains information using a wireless communication line, a wired communication line, a dedicated line, a public line, or the like such as the Internet or the like. However, a user can obtain information free of charge anywhere by reading composite QR codes on various media even if there is no such communication environment. Furthermore, if the application is provided with an output function such as translation/interpretation function or the like, various contents acquired with one composite QR code can be used by people from various countries all over the world. On the other hand, to identify the text of various languages, small volume audio data, and images, they are stored in a composite QR code formed on a medium, and by having a reading apparatus read the composite QR code from the medium, it is possible to display texts and images, or reproduce audio data in the required language, even if the application does not have a translation/interpretation function. Of course, if a composite QR code is displayed on a display and time series dot codes or color dot codes are used, small volume animations can be similarly localized into language data for various languages and stored in the composite QR code. Thus, the user can acquire the contents of various countries without having to use the Internet or a translation application.

As an example of an acquisition of a photograph, a photograph of a user such as a Purikura (registered trademark), an ID photo, or the like taken in a photo booth is stored in a composite QR code, and by displaying the composite QR code on the photo booth display and photographing it with the user's smartphone, photographic data can be acquired. There is a service for providing taken photographs via the Internet, but the photographs taken are personal information and may be leaked on the Internet. However, the composite QR code can prevent leakage. To provide high-quality photographs, it is desirable to use color dot codes and time series dot codes.

As an example of audio information acquisition, the system on the information providing side prints and distributes a composite QR code in which audio information is stored on various print media such as books, magazines, textbooks, picture books, catalogs, flyers, newspapers, posters, packages, seals, prescriptions, or the like, so that a user can read and reproduce the audio information on a smartphone. Note that the audio information may be reproduced in the language set on the smartphone, or the audio information may be reproduced by setting another language. Note that it is needless to say that the system on the information providing side can store information such as texts and images as well as audio data, and the user can obtain such information. Furthermore, if the application is provided with an output function such as a translation/interpretation function, it becomes possible to use various audio contents acquired by one composite QR code in various countries all over the world. On the other hand, by storing audio data in various languages in a composite QR code formed on a medium so that it can be identified, a system such as a smartphone can reproduce audio data in the language desired by a user even if the application does not have a translation/interpretation function. Of course, if the system displays a composite QR code on a display and uses time series dot codes or color dot codes, it is possible to similarly convert small volume animations into data for various languages and store it in the composite QR code. Thus, the user can acquire contents of various countries by reading the composite QR code with a mobile terminal such as a smartphone. Note that in the present embodiment, a composite QR code is described with respect to a print medium. However, a composite QR code may be generated by engraving in various media. Furthermore, simple braille may be formed in a part of a dot code, and the stored information may be expressed in braille.

(Use in Games)

As an example of use in games, the user can display on the user's smartphone a composite QR code in which a character or an item is stored, and by having the other party to whom it is to be provided read it with the other party's smartphone, an exchange can be performed. As a result, a game with a new feel with face to face communication between people can be developed. Furthermore, in addition to characters and items, the system of the information may print a composite QR code on at least one of the front side or the back side of a trading card on which an athlete, an entertainer, or the like is printed on the front side or a game card, and store in the card a text, an image, audio information, or the like specific to the card, thus enabling a user to acquire the information. Furthermore, when the system of the sender side prints a composite QR code on a greeting card, it is possible to obtain a photograph or a motion picture showing the sender, a diagram, a considerable amount of text, or the like at the sending destination. Here, the system of the sender may upload information to be sent via the Internet into a composite QR code. On the other hand, if the user can print a composite QR code storing such information, the information from the sender can be obtained at the sending destination via a paper medium without having to use the Internet. However, since the amount of information is limited in a printed composite QR code, it can be said that use for motion pictures and high-resolution photographs is difficult.

(Application Encoding)

Since a reading apparatus can acquire a huge amount of information using a time series dot code or a color dot code that changes with time, an application can be stored in a composite QR code, and the application can be easily installed without having to download. In other words, even in an environment where the Internet cannot be used, not only can an application be installed, but the application can also be continuously provided at no cost through various media (paper media, broadcast media, or the like) without having to have registration in the cloud or a server and operating one. That is to say that a business model for selling out can be promoted.

(Composite QR Code Issuing System)

Fake online shopping, hacking, or the like of credit card information, and forged QR codes have caused great damage.

Therefore, an official issuing organization for the composite QR code is established, and when a user of a composite QR code (a user-approved in advance by the official issuing organization) transmits data such as a URL to the official issuing organization, a composite QR code with an electronic signature in the dot code is generated and provided to the user. The user uses the composite QR code having a certification mark indicating that the composite QR code is genuine (the certification mark may be placed at the center of the QR code) by printing it or displaying it on a display. The official issuing organization provides users with an application for reading composite QR codes free of charge. If there is a certification mark, the user can read the composite QR code with the application and determine authenticity. As a business model, charging can be performed i) on the composite QR code user approval procedures, ii) on the issuance of composite QR codes, and iii) with fees or the like for advertisements when an application for reading a composite QR code is used.

When an individual is identified to provide electronic authentication and various services, a composite QR code may be issued as a personal ID from the official issuing organization. In the personal ID composite QR code, basic personal information such as the name, the date of birth, an address, and a photograph of the person is registered. In addition, credit card information, bank account information, certificate information such as those of a license, and a health insurance card may be registered. A composite QR code reader for personal ID may be provided only to corporations approved by the official issuing organization, and a dedicated reader may manage use records and the like so that strict follow up inspection may be performed to ensure security. For personal authentication, the system only needs to make a confirmation with the name, the date of birth, an address, a photo, and the like. Therefore, upon using a general-purpose composite QR code reader (application), personal information may be made to be deleted immediately after use to prevent leakage of personal information.

The flowcharts of FIGS. 47 to 54 show that encrypted information obtained by encrypting the encoded information of various data is stored in the composite QR code, and authenticity determination of the data corresponding to the encoded information is executed. On the other hand, there are many cases where the read QR code does not completely match with the QR code at the time it was created due to missing information or the presence of stain at the time the printed QR code was printed, the photographing conditions of the QR code, and the like. Similarly, the QR code displayed on a display may not match due to photographing conditions of the QR code. Therefore, the flowcharts of FIGS. 55 to 56 show a method in which it is possible to easily determine whether or not the error correction has been properly performed using the error correction code, although authenticity determination cannot be executed completely.

<Modification>

In the above-described FIGS. 47 to 56, the management server MS1 generates a composite QR code and the user device UD1 executes reading and authenticating processings of a composite QR code. However, the above-described processing is not limited to the combination of the management server MS1 and the user device UD1. That is, the above-described reading and authenticating processings of a composite QR code may be performed between the management server MS1 and the content servers CS1, CS2, and the like. Furthermore, the above-described reading and authenticating processings of a composite QR code may be performed between the content servers CS1 and CS2, and the user devices UD1 and UD2. Furthermore, the above-described reading and authenticating processings of a composite QR code may be performed between the user device UD1 and the user UD2. That is, the above-described reading and authenticating processings of a composite QR code can be applied to any processing between the information providing side and the data acquiring side for authenticating the validity of information represented by a QR code in a composite QR code.

Seventh Embodiment

In the following, with reference to FIGS. 57 to 60, an online authenticity determination system according to the seventh embodiment will be described.

<Online Composite QR Code Authenticity Determination System>

(1) If a composite QR code reading application is downloaded and installed on a smartphone, the smartphone ID can be acquired, and since an authentication server sequentially performs authentication, it is possible to perceive with which smartphone and when there was a read by a composite QR code reading application. In addition, if linked with GPS, it is also possible to know where the data was read, and by obtaining a log of the data, it can be used for detailed marketing.

(2) In the authentication of a composite QR code by an authentication server, since authentication by the authentication server is indispensable, it is possible to operate a business model of charging companies requesting the issuance of a composite QR code for each authentication.

(3) When a hash value and an electronic signature read from a composite QR code are transmitted to an authentication server, by collating a hash value obtained by decrypting the electronic signature with the received hash value, authenticity determination of the composite QR code is possible without having to use a public key.

Processing Example 6

Figure 57:
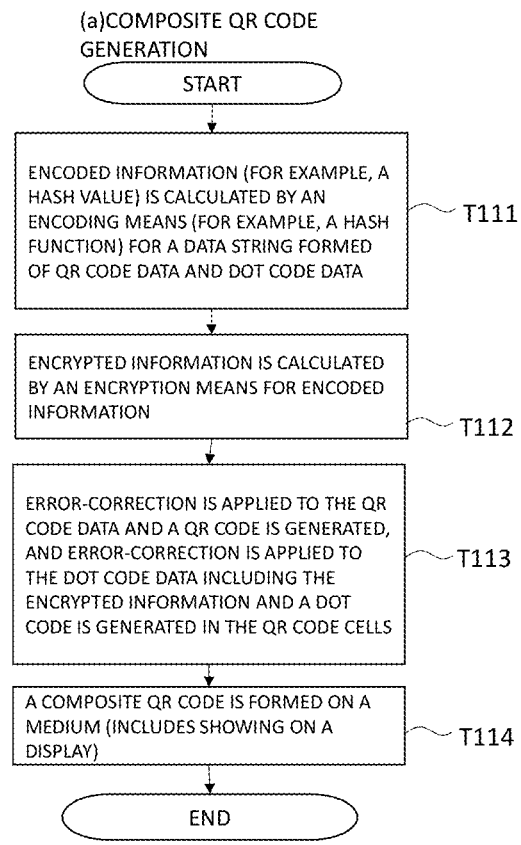
FIG. 57 is a diagram exemplifying a composite code generation processing for authenticity determination of processing example 6.

Processing example 6 is processing in a case where processing example 4 is applied to online authentication. FIG. 57 shows a flowchart exemplifying a method of generating a composite QR code for authenticity determination by encoding into a dot code encrypted information of a data string formed of QR code data and dot code data. In FIG. 57, the processing of T111, T112, T113, and T114 for generating a composite QR code are the same as T71 to T74 of FIG. 53. The generated composite code is provided to the user device UD1 via, for example, the management server MS1.

Figure 58:
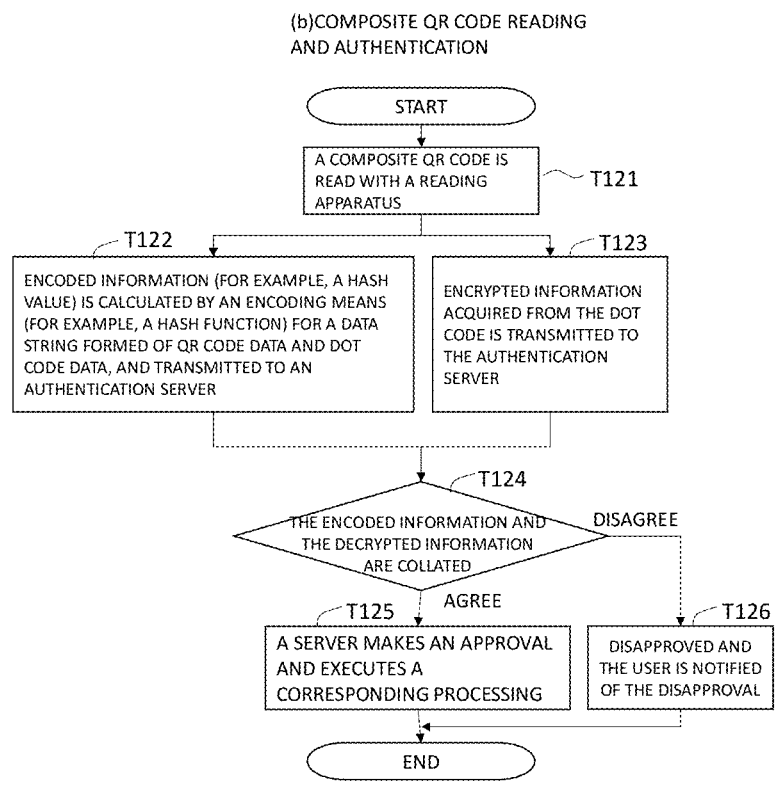
FIG. 58 is a flowchart exemplifying reading and authentication processing of a composite QR code of processing example 6.

FIG. 58 shows a flowchart exemplifying reading and authenticating processings of a composite QR code. In this processing, the user device UD1 reads a composite QR code with a reading apparatus (T121). Next, the user device UD1 calculates encoded information (for example, a hash value) by an encoding means (for example, a hash function) with the QR code data and the dot code data as a data string, and transmits the encoded information to an authentication server (T122). Here, the authentication server is, for example, a server apparatus that can be accessed over a network, such as the management server MS1 and the content server CS1 exemplified in FIG. 32. Next, the user device UD1 transmits the encrypted information obtained from the dot code to the authentication server (T123).

Next, the authentication server collates the encoded information and the decrypted information (T124). Then, if the encoded information and the decrypted information match, the authentication server determines that the authentication using the composite code is successful, and performs corresponding processing (T125). The processing in T125 is the same as the processings in T25, T44, T66, and T85, and thus details are omitted.

On the other hand, if the collation of the two does not give a match in T124, the authentication server determines that the authentication using the composite code has failed, and notifies the user of the result (T126).

As described above, according to the processing example 6, it is possible to perform various authentication processings, authenticity determination processings, tampering detection processing, and the like by using a composite QR code offline. Note that in the above description, the management server MS1 encodes into a dot code the encrypted information of a data string formed of the QR code data and the dot code data to form a composite code. However, instead of such processing, the management server MS1 may encode into a QR code the encrypted information of the data string formed of the QR code data and the dot code data, and the user device UD1 may decrypt both.

In the above processing, an authentication performed by an authentication server may be performed using a secret key. Furthermore, in the above, as in the processing example 4, the encrypted information of a data string formed of the QR code data and the dot code data is used. However, instead of such processing, the processing of processing examples 1 to 3 may be applied for online authentication.

That is, as in the processing example 1, the encrypted information of a QR code may be encoded into a dot code and applied to online authentication by the authentication server. Furthermore, the encrypted information of a QR code may be encoded into a QR code and applied to online authentication by an authentication server.

Furthermore, as in the processing example 2, the encrypted information of a dot code may be encoded into a QR code and applied to online authentication by the authentication server. Alternatively, the encrypted information of a dot code may be encoded into a dot code and applied to online authentication by an authentication server.

Furthermore, as in processing example 3, the encrypted information 1 of a QR code and the encrypted information 2 of a dot code may be encoded into a dot code and a QR code, respectively, and applied to online authentication by an authentication server. In such a case, the encrypted information 1 of a QR code may be encoded into a dot code, and the encrypted information 2 of a dot code may be encoded into a QR code. Conversely, the encrypted information 1 of a QR code may be encoded into a QR code, and the encrypted information 2 of a dot code may be encoded into a dot code. Furthermore, the encrypted information of a QR code and a dot code may be encoded into a QR code.

Processing Example 7

Figure 59:
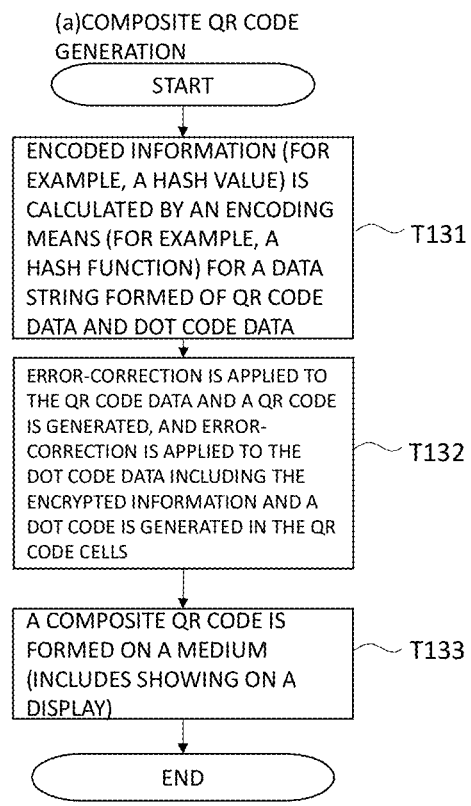
FIG. 59 is a diagram exemplifying a composite code generation processing for authenticity determination of processing example 7.

FIG. 59 shows an example of a processing of encoding encoded information of a QR code and a dot code into a QR code. In this processing, as in the processing example 5, no encryption is performed. In this processing, the processing of T131, T132, and T133 for generating a composite QR code are the same as T91 to T93 in FIG. 55. The generated composite QR code is provided to the user device UD1 via, for example, the management server MS1.

Figure 60:
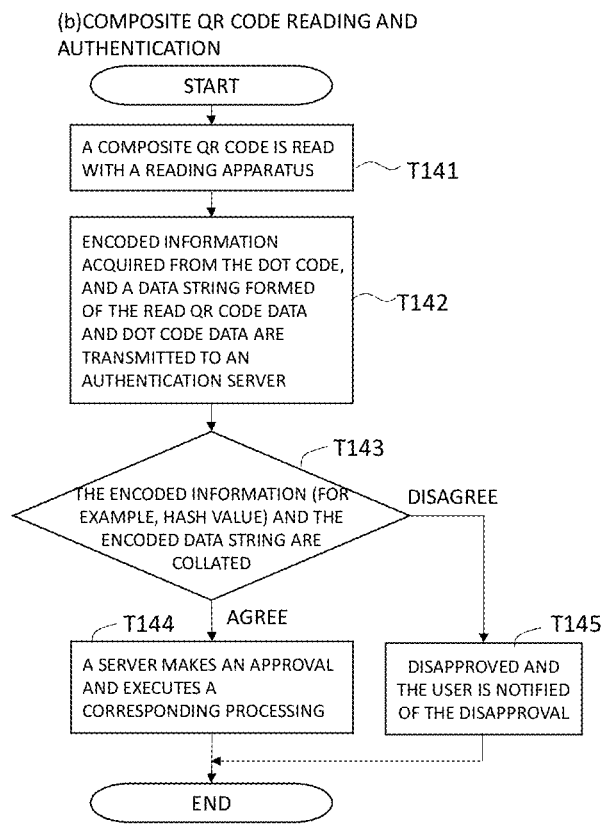
FIG. 60 is a flowchart exemplifying reading and authentication processing of a composite QR code of processing example 7.

FIG. 60 shows a flowchart exemplifying reading and authenticating processings of a composite QR code. In this processing, the user device UD1 reads a composite QR code with a reading apparatus (T141). Next, the user device UD1 transmits to the authentication server, the encoded information (for example, hash value 1) acquired from a dot code and a data string formed of the read QR code data and the read dot code data (T142).

Next, the authentication server encodes the data string formed of the QR code data and the dot code data read by the user device UD1 in the received data, and creates encoded information (for example, hash value 2). Then, the encoded information (for example, hash value 1) acquired from the dot code by the user device UD1 is collated with the data string (for example, hash value 2) encoded by the authentication server (T143). If the encoded information and the decrypted information match, the authentication server determines that the authentication using the composite code is successful, and performs corresponding processing (T144). The processing in T144 is the same as the processings in T25, T44, T66, T85, and T125, and thus details are omitted. Note that as corresponding processing, the same processings as T25, T44, T66, T85, and T125 may be allowed by the user device UD1 or by other servers on the network accessed by the user device UD1.

On the other hand, if the hash value 1 and the hash value 2 do not match in T143, the authentication server determines that the authentication using the composite code has failed, and notifies the user of the result (T145). That is, in such a case, the authentication server does not allow the user device UD1 or another server on the network accessed by the user device UD1 to perform the processing in T145.

In this processing example, if encoded information is created by a secret encoding means and electronic authentication is performed, encryption of the encoded information at the time of data creation is not necessary. That is, authentication can be performed using only a hash value.

Note that in regards with the electronic authentication by the server authentication in the processing example 7, the offline electronic authentications described in the processing examples 1 to 3 can be applied to all of the following cases.

That is, the encoded information of a QR code may be encoded into a dot code without encryption to create a composite code, which may be used for online authentication. Alternatively, the encoded information of a QR code may be encoded into a QR code to create a composite code, which may be used for online authentication. Furthermore, the encoded information of a dot code may be encoded into a QR code to create a composite code, which may be used for online authentication. Alternatively, the encoded information of a dot code may be encoded into a dot code to create a composite code, which may be used for online authentication. Alternatively, the encoded information of a QR code and a dot code may be encoded into a dot code and a QR code to create a composite code, which may be used for online authentication. Furthermore, the encoded information of a QR code and a dot code may be encoded into a QR code and a dot code to create a composite code, which may be used for online authentication. Furthermore, the encoded information of a QR code and a dot code may be encoded into a QR code to create a composite code, which may be used for online authentication.

Eighth Embodiment: Composite Code Patterns

In the above-described first to the seventh embodiments, exemplified is the processing of a composite QR code formed of a QR code and at least one of a dark-colored dot code (dot code of a second color) formed in bright-colored cells (cells of a first color) of a QR code and a bright-colored dot code (dot code of a first color) formed in dark-colored cells (cells of a second color) of a QR code.

However, the processing of the first to the seventh embodiments can be applied to codes other than a composite QR code. For example, a barcode may be used instead of a QR code. That is, a composite code may be formed by forming a dot code with dark-colored dots in the bright portions between dark patterns of a barcode. Alternatively, a composite code may be formed by forming a dot code with bright-colored dots in the dark portions between bright patterns of a barcode.

In addition, instead of a QR code and a barcode, a composite code may be formed simply by using a character string such as that of alphanumeric characters, kanji, katakana, and hiragana. That is, a composite code may be formed by forming a dot code with dark-colored dots in the bright portions between dark patterns of a character string such as that of alphanumeric characters, kanji, katakana, and hiragana. Alternatively, a composite code may be formed by forming a dot code with bright-colored dots in the dark portions between bright patterns of a character string such as that of alphanumeric characters, kanji, katakana, and hiragana. When using an infrared imaging apparatus, the dark patterns of a character string such as that of alphanumeric characters, kanji, katakana, and hiragana may be formed with ink that does not absorb ordinary infrared light, and the dot code may be formed of ink such as carbon black or the like that absorbs infrared light. Then, the dark pattern of the character string may be read with visible light, and the dot code may be read with infrared light.

Then, the data encoded with a barcode may be digitally signed and encoded with a dot code as in the fourth embodiment. Therefore, a reading apparatus can authenticate the validity of the information presented by a barcode or a character string. When a composite code is formed of a barcode and a dot code, a barcode reading apparatus and a dot code reading apparatus may be used. In a case where a composite code is formed of a character string and a dot code, an OCR (Optical Character Recognition/Reader) apparatus for reading the character string and a dot code reading apparatus may be used.

Thus, such a composite code is not necessarily limited to the QR code and can be defined as follows.

(Definition of a Composite Code)

A composite code is a composite code pattern comprising a first code patterned with two or more identifiable colors, and a second code in which one or more marks are arranged identifiable with the first color of the said pattern, and the second code is defined as a composite code having special information corresponding to at least a part of the said first code.

Here, a first code patterned with two or more identifiable colors refers to, for example, a bar code or a character string such as that of alphanumeric characters, kanji, katakana, and hiragana. Two or more identifiable colors refer to, for example, the color (one or more colors) of a bar code or character string such as that of alphanumeric characters, kanji, katakana, and hiragana, and the color of the background (the color of the medium surface). A second code in which one or more marks are arranged refers to a dot code exemplified in the first to the fifth embodiments. Furthermore, the second code having special information corresponding to at least a part of the said first code is exemplified by a second code with a digital signature to data expressed with a bar code or a character string such as that of alphanumeric characters, kanji, katakana, and hiragana which is a first code as in the fourth and the fifth embodiments.

Ninth Embodiment: Modification of Digital Signature

In the above-described sixth to the eighth embodiments, for example, if encrypted information encrypted with a secret key is decrypted with a public key, and the decryption result matches with the encoded information (a hash value or the like) before encryption, it was determined that the authentication was successful. However, the processing of the sixth to the eighth embodiments is not limited to such processing. For example, in various authentication processings, authenticity determination processings, tampering detection processing, and the like as described above, in addition to authentication using a secret key and a public key, authentication may be determined to be successful if encoded information generated from a QR code or the like and a digital signature created from encoded information are determined to be in a predetermined relationship. For such a digital signature procedure, a Digital Signature Algorithm (DSA), an elliptic curve DSA, an ElGamal signature, or the like may be used. In a case where these digital signature procedures are used, instead of determining whether or not the encoded information and the decrypted information match as shown in T24 of FIG. 48, the entity that performs authentication (user device UD1, authentication server, or the like) determines whether or not encoded information serving as the basis of a digital signature and the digital signature have a predetermined relationship.

[Tenth Embodiment] (Issues on Improving the Reading Accuracy of Composite Codes)

When the first code is a QR code, the area and orientation of a QR code are determined by the position detection patterns (finder patterns), and the XY coordinate values at the center of each cell are calculated based on the timing patterns. However, when the optical axis of a camera is not perpendicular to the medium surface on which the QR code is formed (when the camera is inclined with respect to the medium) or when the medium is curved, the QR code is imaged in a deformed state. Depending on the degree of deformation, the XY coordinate values at the center of each cell calculated by the timing pattern may deviate beyond the allowable limit, and the coordinate values of adjacent cells may be obtained. When such a deviation in the XY coordinate values at the center of a cell occurs, it may not be possible to accurately determine the color of bright or dark of a cell. Therefore, with a QR code, a method to improve the accuracy of the XY coordinate values at the center of each cell by correcting the coordinate values using the alignment patterns is devised. Thereafter, the color of bright or dark of the position of the coordinate values or of the area with a predetermined area in the vicinity is determined, and the numerical data stored in the QR code is acquired. In such a case, as for the level of accuracy, provided that the center coordinate values indicate a position within a cell for the determination of the color of bright or dark of the cell, it is not necessarily for the coordinate values to be coordinate values of the center of the cell. However, when numerical data is acquired from the arrangement of the marks of the second code formed in a cell, based on the coordinate values of the center of the cell of the first code, a degree of accuracy enabling the proper recognition of the arrangement of the marks is desired. Therefore, to enhance accuracy, it is desirable to correct the coordinate values of the center of the cell of the first code by a predetermined method, or separately, to obtain the coordinate values from the shape or arrangement of marks of the second code.

Figure 61:
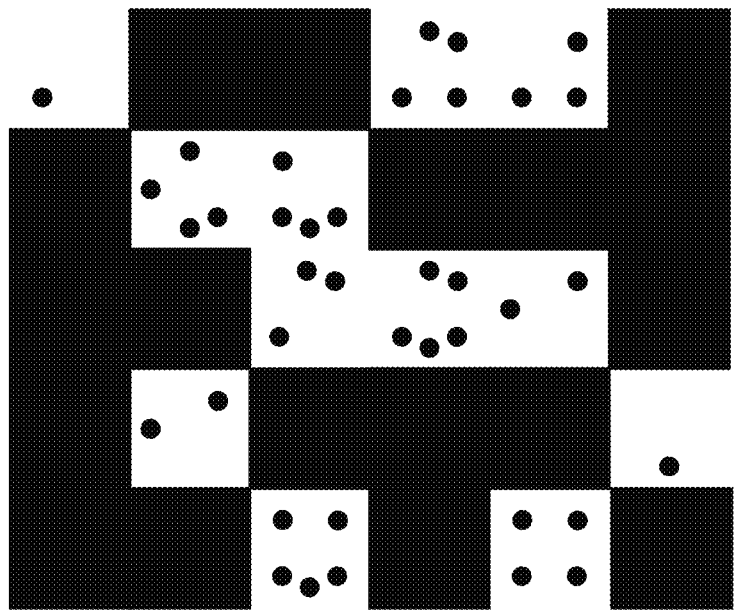
FIG. 61 shows an example in which eight positions are arranged for candidate information dot placement positions in a cell.
Figure 62:
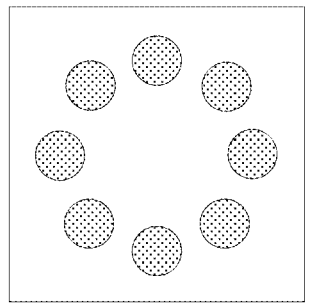
FIG. 62 is a diagram exemplifying eight placement positions for dots in a single cell.
Figure 63:
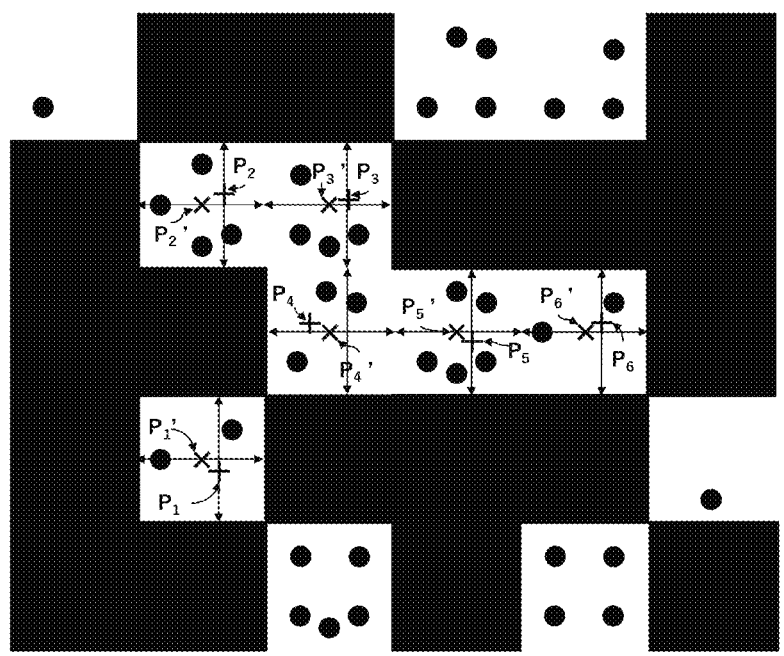
FIG. 63 shows an example of an image in which coordinate positions of the centers of the cells obtained according to specifications of the QR code are deviated from the original centers of the cells.

In the following, a method of calculating cell center coordinate values when dots are used as marks of the second code and a process of acquiring numerical data is described. FIG. 61 shows an example in which candidate information dot arrangement positions within a cell are arranged at eight positions as shown in FIG. 62. FIG. 62 shows a diagram exemplifying the arrangement positions of dots within one cell. It is possible to define 8-bit numerical data with the combinations of the presence and absence of the eight dots. Since the dots are arranged on the same circumference at approximately equal intervals (in the figure, every 45 degrees), to ensure accuracy of the arrangement positions, printing is to be performed with a high-resolution printing machine of about 2400 dpi or more. FIG. 61 is an example showing a part of a composite code, in which information dots are arranged only in bright-colored cells to form a dot code. Note that although not shown, information dots may be arranged in dark-colored cells, or information dots may be arranged in both. FIG. 63 shows an example of an image in which the center coordinate position of a cell obtained in accordance with the specifications of the QR code is deviated from the original center of the cell. In the example of FIG. 63, the position indicated by a cross is the coordinate position obtained as the center of the cell by a first code (in the figure, a QR code). However, as shown, the position is deviated from the center of the cell. In the present embodiment, a method of correcting the deviated position to the appropriate center coordinate position of the cell indicated by the mark x will be described.

(Calculation of Cell Center Coordinate Values)

In one cell, a boundary where the bright color and dark color of cells change in the vertical direction is searched from the cross mark at $P_1$ $(X_1, Y_1)$, and values of two boundary coordinates $B_{1U}$ $(X_1, Y_{1U})$ and $B_{1D}$ $(X_1, Y_{1D})$ are determined in the vertical direction. Here, since the value difference $Y_{1U}-Y_{1D}$ of the Y coordinate is substantially the same as the cell size obtained by the first code, it can be found that there is one bright-colored cell in the vertical direction, and the center position between the upper and lower boundaries $B_{1C}$ $(X_{1C}, Y_{1C})$ is obtained as $X_{1C}=X_1$, $Y_{1C}=Y_{1D}+(Y_{1U}-Y_{1D})/2$. Furthermore, two boundary coordinate values $B_{1L}$ $(X_{1L}, Y_{1C})$ and $B_{1R}$ $(X_{1R}, Y_{1C})$ are obtained in the horizontal direction starting from Bic. Here, since $X_{1R}-X_{1L}$ is substantially the same as the cell size acquired by the first code, it can be found that there is one bright-colored cell in the horizontal direction, and the center position between the left and right boundaries $B'_{1C}$ $(X'_{1C}, Y'_{1C})$ is obtained as $X'_{1C}=X_{1L}+(X_{1R}-X_{1L})/2$ and $Y'_{1C}=Y_{1C}$. And thus, coordinate values $P'_1$ $(X'_{1C}, Y'_{1C})$ of the cell center indicated by the mark x is obtained.

Next, in another cell, a boundary where the bright color and dark color of cells change in the vertical direction is searched from the cross mark of $P_2$ $(X_2, Y2)$, and values of two boundary coordinates $B_{2U}$ $(X_2, Y_{2U})$ and $B_{2D}$ $(X_2, Y_{2D})$ are determined in the vertical direction. Here, since the value difference $Y_{2U}-Y_{2D}$ of the Y coordinate is substantially the same as the cell size obtained by the first code, it can be found that there is one bright-colored cell in the vertical direction, and the center position between the upper and lower boundaries $B_{2C}$ $(X_{2C}, Y_{2C})$ is obtained as $X_{2C}=X_2$, $Y_{2C}=Y_{2D}+(Y_{2U}-Y_{2D})/2$. Furthermore, two boundary coordinate values $B_{2L}$ $(X_{2L}, Y_{2C})$ and $B_{2R}$ $(X_{2R}, Y_{2C})$ are obtained in the horizontal direction starting from $B_{2C}$. Here, since $X_{2R}-X_{2L}$ is about twice the cell size obtained by the first code, it can be found that there are two bright-colored cells in the horizontal direction and coordinate values $P'_2$ $(X'_{2C}, Y'^{2C})$ of the cell center indicated by the mark x is obtained as $X'_{2C}=X_{2L}+(X_{2R}-X_{2L})\times\frac{1}{4}$ and $Y'_{2C}=Y_{2C}$ by linear interpolation. Similarly, $P'_3$ $(X'_{3C}, Y_{1C})$ may be obtained as $X'_{3C}=X_{2L}+(X_{2R}-X_{2L})\times\frac{3}{4}$ and $Y'_{3C}=Y'_{2C}$ by linear interpolation. Note that $P'_3$ $(X'_{3C}, Y_{3C})$ may be obtained from $P_3$ ($X_3$, $Y_3$) in the same manner as described above. Furthermore, $P'_4$ to $P'_6$ can be obtained in the same manner as described above.

(Dot Extraction and Acquisition of Numerical Data)

Figure 64:
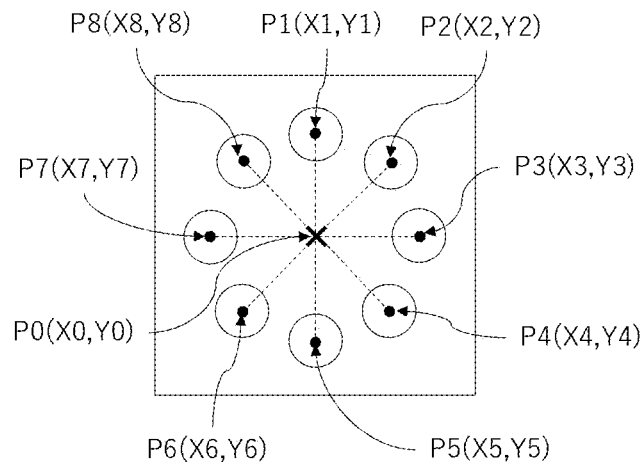
FIG. 64 is a figure showing the orientation of a second code and bounding boxes.

A method in which a reading apparatus extracts dots obtains the center points of the dots and acquires numerical data of a dot code will be described with reference to FIGS. 64 to 72. FIG. 64 is a diagram showing the orientation of a second code (as a rule of the second code, the orientation may be the same as the orientation of the first code) and bounding boxes centered on the virtual points P1 to P8 set by specified distances and directions from the corrected cell center position P0, having the size in the same order as the size of a dot. These virtual points are candidate information dot arrangement positions set in accordance with a rule of the second code. A reading apparatus determines whether or not the center coordinate of a dot is included in the bounding box and acquires numerical data. Note that the size of a bounding box may be larger than the size of a dot provided that it does not overlap with an adjacent bounding box. Recognition is possible even if the printing accuracy, the photographing environment, or the like are poor, and the accuracy of the center coordinate values of the dots of the captured image are poor. However, the larger the size, the higher the possibility is of being affected by noise (error printing) due to the scattering of ink or the like. Of course, if the accuracy of the acquired center coordinate values of the dot is sufficiently ensured, the size of a bounding box may be smaller than the size of a dot.

Figure 65:
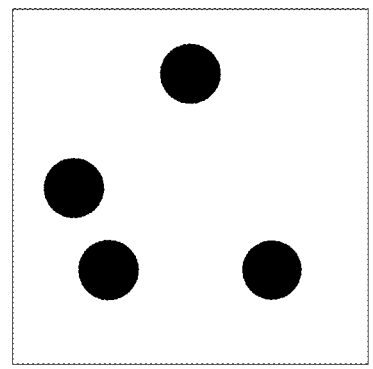
FIG. 65 shows an example of a bright-colored cell in which a dot code is formed.
Figure 66:
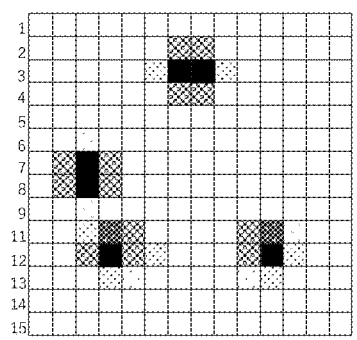
FIG. 66 shows an example of an image of an imaged cell.
Figure 67:
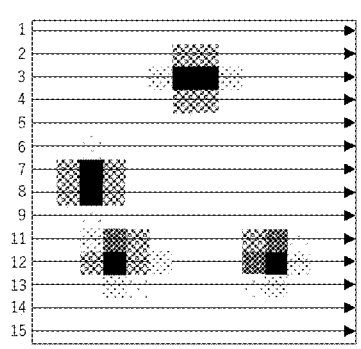
FIG. 67 shows an example of an image of an imaged cell.

FIG. 65 shows an example of a bright-colored cell in which a dot code defined 01101001 in binary is formed by increasing a digit clockwise starting from the candidate dot arrangement position at the top. FIG. 66 and FIG. 67 are examples of images obtained by imaging the cell using a C-MOS sensor or the like. The term "imaging" refers to an image captured in a storage medium such as a frame buffer or the like being recorded or performing an operation of recording. To simplify descriptions, the present image is shown in 65 shades of bright and dark (including white and black). Normally, when imaging is performed only with contrast, it is often recorded in 8 bits, that is, in 256 levels. As for color, images are often captured in 16.7 million colors with 8 bits each for R, G, and B. In FIGS. 66 to 69, numbers 1 to 15 added to the vertical axis are numbers indicating rows (scanning lines) of pixels of an image.

When extracting a dot from a captured image, the reading apparatus may determine that a spot having a gray value lower than a predetermined absolute threshold value (for example, in a case where the absolute threshold value is 60 when 255 corresponds to white and 0 corresponds to black, a gray value of 60 or less) is a dot. In such a case, it is desirable to set an absolute threshold value for each bright-colored cell based on the average value of the gray values in a predetermined range excluding the dots in the bright-colored cells. That is, the threshold value may be made variable, and the threshold value may be lowered when the gray value of the bright-colored area is low, and the threshold value may be raised when the gray value is high. The absolute threshold value is desirably set to, for example, 20% to 40% of the average value of the gray values in a predetermined range excluding the dots in the bright-colored cells.

Figure 69:
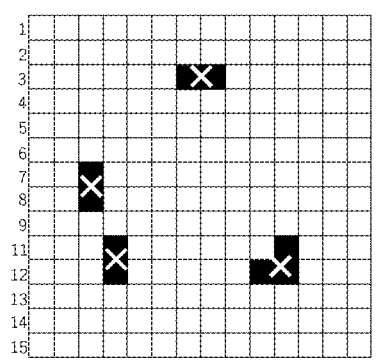
FIG. 69 shows an example where an image of an imaged cell is binarized.
Figure 70:
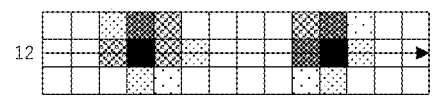
FIG. 70 is a processing example where an image is binarized.
Figure 70:
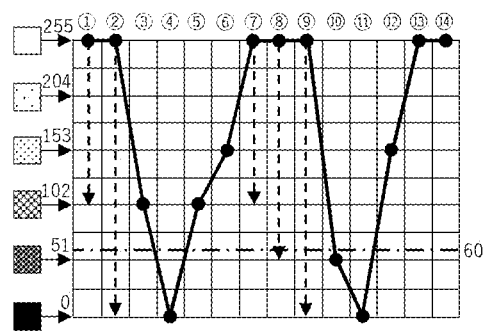

FIG. 70 shows an example of processing for binarizing an image based on the relationship between the gray value obtained from the image and the absolute threshold. In the figure, the vertical axis exemplifies, for example, the brightness value (gray scale value) of the pixels corresponding to the fourth-pixel row (scanning line 12) from the bottom in the image of FIG. 66, and the horizontal axis exemplifies the pixel positions of pixels aligned in the horizontal direction. Also, in FIG. 70, the numbers in the circles are numbers for identifying each pixel. In FIG. 70, assuming that the average value of the bright-colored area is 200 and assuming that 30% of the average value which is 60 (dashed-dotted line) is set as the absolute threshold, upon binarization, the pixels (4), (10), and (11) are determined to be dark, and thus as the pixels in the fourth row from the bottom of FIG. 69 show, they are determined to be dots.

On the other hand, as shown in FIG. 67, gray values may be acquired in the scanning line direction, and for the threshold, the change rate of the gray values from a bright color area to a dot area may be used as a relative threshold value. To make the change rate pronounced, it is desirable to use a pixel of about 2 to 3 pixels ahead as a pixel for comparing gray values of the captured image. It is desirable to set a relative threshold value for the change rate so that the gray value of pixels forming a dot is about 40% to 60% or less with respect to the gray value of a bright color pixel.

Figure 68:
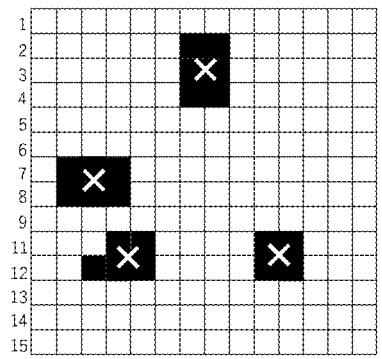
FIG. 68 shows an example where an image of an imaged cell is binarized
Figure 71:
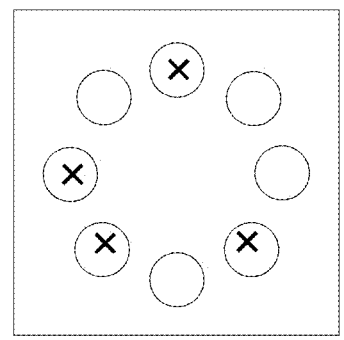
FIG. 71 is a diagram exemplifying center coordinates of information dots fitting in bounding boxes.
Figure 72:
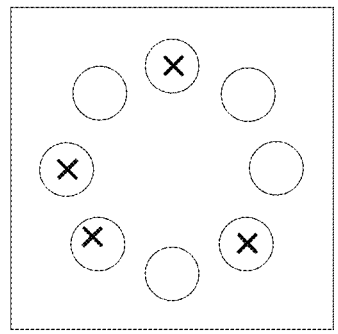
FIG. 72 is a diagram exemplifying center coordinates of information dots fitting in bounding boxes.

In FIG. 70, a relative threshold value is set by multiplying the gray values of the pixels in the bright-colored area by the change rate $\alpha=0.5$ (50%), and pixels with one pixel in between are compared in the scanning line 12, and in a case where a pixel has a grayscale value lower than the relative threshold value in the scanning line direction, the pixel is determined to be a black pixel with respect to binarization. Thus, from the comparisons of (1) (0.5×255=127.5) and (3) (102), (2) (0.5×255=127.5) and (4) (0), (7) (0.5×255=127.5) and (5) (102), (3), (4), and (5) are determined to be black, and from the comparisons of (8) (0.5×255=127.5) and (10) (51), and (9) (0.5×255=127.5) and (11) (0), (10) and (11) are determined to be black, as the dots in FIG. 68 show. As described above, grayscale pixels are determined to be black with respect to binarization. Note that if pixels with gray values lower than the change rate are in a row in the scanning line direction after the generation of a pixel determined to be black by binarization, the pixels are determined to be black by binarization. Assuming that the gray value of a subject pixel is Bi, there are two methods of making determinations: i) $\alpha B_{i-m} > B_i$ and $B_i < \alpha B_{i+n}$, and ii) $\alpha B_{i-m} > B_i$ or $B_i < \alpha B_{i+n}$. n is an indication for a pixel that is n pixels away from the subject pixel, and that a comparison is made between the subject pixel and a pixel that is n pixels away. With condition i), a subject pixel $B_i$ is determined to be black by having the relative threshold be satisfied from both the left and right sides of the scanning line, and the dots become slightly narrow. On the other hand, with condition ii), the subject pixel $B_i$ is determined to be black by having the relative threshold value (change rate) be satisfied from either the left side or the right side of the scanning line, and the dot becomes slightly wider. FIG. 68 shows the result of binarization with a loose threshold value (when the absolute threshold is increased or the relative threshold is decreased). FIG. 69 shows the result of binarization with a strict threshold value (when the absolute threshold value is reduced or the relative threshold value is increased). In either case, as shown in FIGS. 71 and 72, the center coordinate values of the information dots are within the bounding boxes, and a reading apparatus (see the first to the sixth embodiments) can acquire numeric data defined by the dot code.

Note that the center coordinate values $D_C$ ($X_C$, $Y_C$) of a dark-colored (or a bright-colored) dot are calculated from the center of a dot formed of pixels determined to be dark (or bright) pixels by binarization, and assuming that the coordinate values of n (i=1 to n) pixels determined to be dark (or bright) pixels are $D_i$ ($X_i$, $Y_i$), the center coordinate values can be obtained from $X_C = \Sigma_{i=1 \text{ to } n} X_i/n$ and $Y_C = \Sigma_{i=1 \text{ to } n} Y_i/n$. This calculation may be used for calculating the center coordinate values of dots in other embodiments.

(Calculation of the Center Coordinate Values of Bright-Colored Cells with Reference Dots Placed in Dark-Colored Cells)

Figure 73:
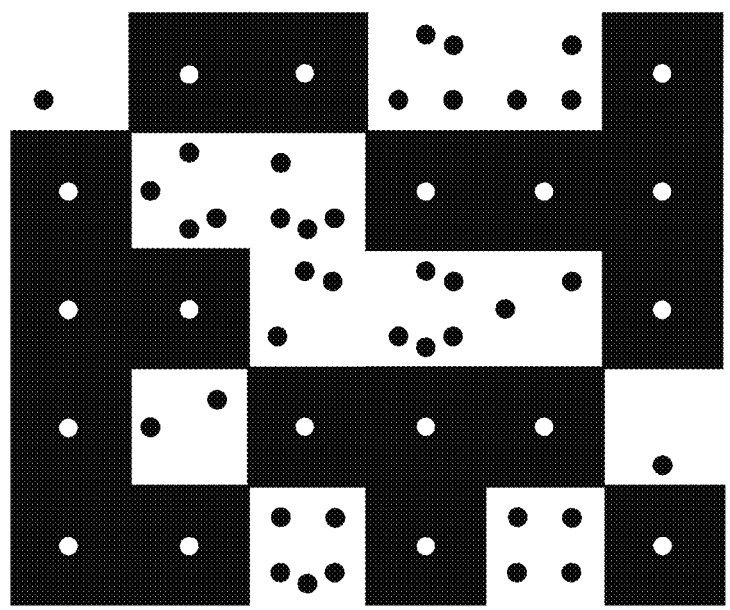
FIG. 73 shows an example of a composite code where reference dots are arranged only in dark-colored cells for forming a dot code.

A method of directly calculating the cell center coordinate values from the bright-colored reference dots arranged in the dark-colored cells, without using the cell center coordinate values calculated by the first code will be described with reference to FIGS. 73 and 74. FIG. 73 shows an example in which candidate information dot arrangement positions in a cell are set similarly to those in FIG. 62. In FIG. 73, as shown in FIG. 62, information dots are arranged only in the bright-colored cells. However, in FIG. 73, dot codes are formed by arranging reference dots only in dark-colored cells. Although not shown in FIG. 73, information dots may be arranged in dark-colored cells and reference dots may be arranged in bright cells. In FIG. 73, for the bright-colored reference dots arranged in a dark-colored cell, the bright-colored dots can be easily extracted from the continuous dark-colored area around the center coordinate position in a dark-colored cell of which center coordinate values are calculated from the first code. Instead of using the center coordinate values in a dark-colored cell calculated from the first code, a reading apparatus needs only to examine whether or not a bright-colored dot exists in an area where the dark-colored area is continuous.

Figure 74:
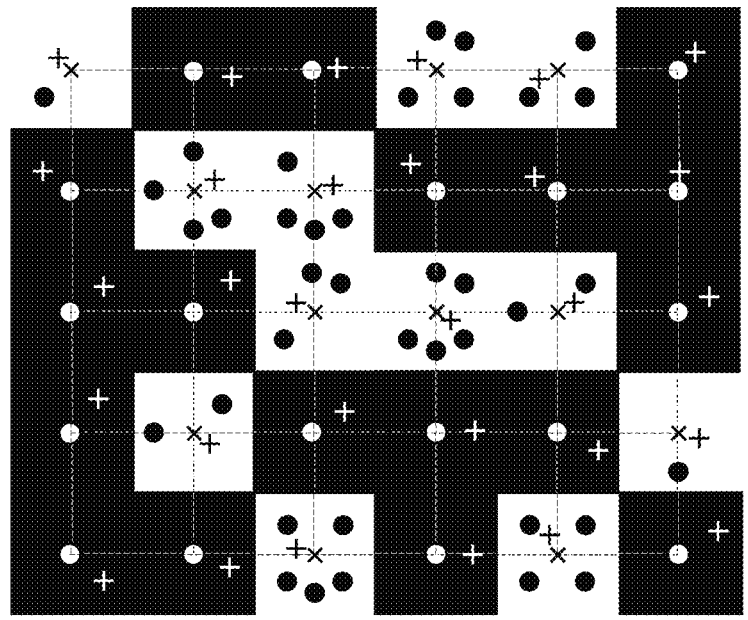
FIG. 74 shows an example of an image in which coordinate positions obtained as the centers of the cells by the first code are deviated from the original centers of the cells.

FIG. 74 shows an example of an image in which the coordinate positions obtained as the centers of the cells by the first code are deviated from the original centers of the cells. In FIG. 74, the positions indicated by crosses are the coordinate positions obtained as the centers of the cells by the first code, and it is apparent that the positions are deviated from the centers of the cells. A method for obtaining appropriate center coordinate values of the cells indicated by the marks x from the deviated positions is described below.

First, a reading apparatus searches for the positions of the reference dots arranged in the dark-colored cells. In a method of searching, using a predetermined threshold, the reading apparatus may search for a high-density area of the reference dots from surrounding dark-colored cells with the center positions of a dark-colored cell of which coordinate values are obtained from the first code used as starting points, and the center positions of such areas may be determined and the center positions may be used as the center positions of the reference dots. Next, the center positions of the reference dots are connected with virtual straight lines in the vertical and horizontal directions, and the coordinate values of the intersections are determined as the center coordinates values of the bright-colored cells. For bright-colored cells having no intersection, the center coordinate position may be obtained by interpolation or extrapolation using other intersections acquired in the vertical and horizontal directions.

(Calculation of Center Coordinate Values of Cells in which Reference Dots are Placed in Bright-Colored Cells)

Figure 75:
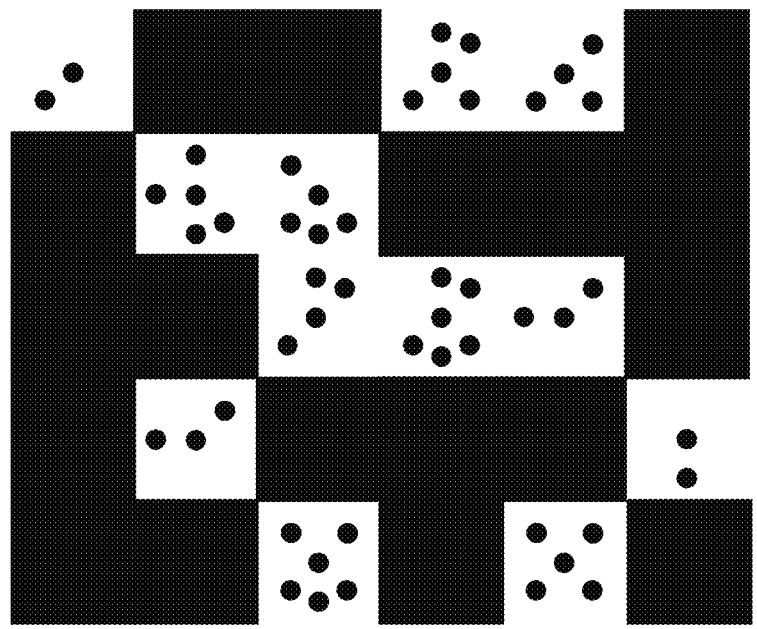
FIG. 75 is an example showing a part of a composite code.
Figure 76:
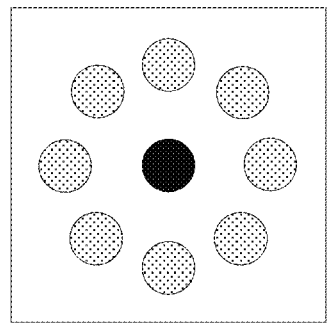
FIG. 76 shows an example in which candidate arrangement positions of information dots in the cells are set, and reference dots are arranged in the center.

A method in which reference dots are arranged at the center of bright-colored cells for a second code, the reference dots are searched for, and the cell center coordinate values are calculated is described with reference to FIGS. 75 to 78. FIG. 76 shows an example in which candidate information dot arrangement positions in a cell are set similarly to those in FIG. 62, and a reference dot is further arranged at the center. FIG. 75 is an example showing a part of a composite code, in which reference dots and information dots are arranged only in bright-colored cells to form a dot code. Although not shown, reference dots and information dots may be arranged in dark-colored cells. By recognizing the reference dots, it is possible to more accurately recognize the arrangement of information dots which are arranged at a specified distance and in a specified direction from the center position of a reference dot and defined with numerical data.

Figure 77:
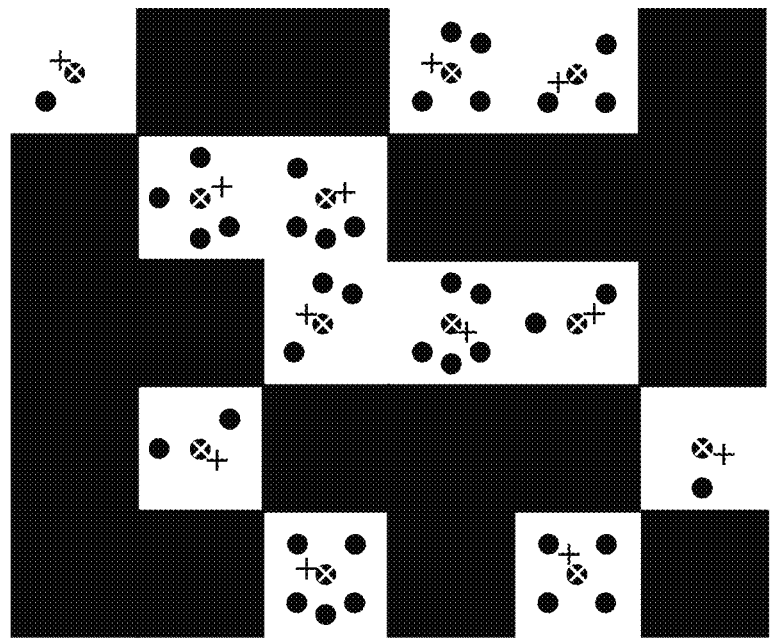
FIG. 77 shows an example of an image in which coordinate positions obtained as the centers of the cells by the first code are deviated from the original centers of the cells.

FIG. 77 shows an example of an image in which the coordinate positions obtained as centers of the cells by the first code are deviated from the original centers of the cells. In FIG. 77, the positions indicated by the crosses are the coordinate positions obtained as the centers of the cells by the first code, and it is apparent that the positions are deviated from the centers of the cells. A method for obtaining appropriate center coordinate values of the cells indicated by the mark x from the deviated position is described below.

First, the reading apparatus searches for the positions of the reference dots arranged in the bright-colored cells. In a method of searching, a reading apparatus determines whether or not a dot in the vicinity of the position of the central coordinate values of a bright-colored cell obtained by the selected first code is a reference dot, from the arrangement relationship with reference dots arranged in other bright-colored cells. That is, the reading apparatus may determine whether or not the dot corresponds to a dot arranged linearly at a predetermined interval. If this condition is not satisfied, the reading apparatus then repeatedly performs determinations of whether or not the next closest dot satisfies the above condition until a reference dot is recognized. On the other hand, the reading apparatus may calculate cell center coordinate values by the method described with reference to FIG. 63, and the dot closest to the position of the coordinate values may be determined to be the reference dot. Note that by making reference dots different from information dots in size, shape, color, or arrangement pattern (there may be a plurality of reference dots), it is possible for a reading apparatus to easily recognize a reference dot without having to apply correction to the cell center coordinate values as described above.

Figure 78:
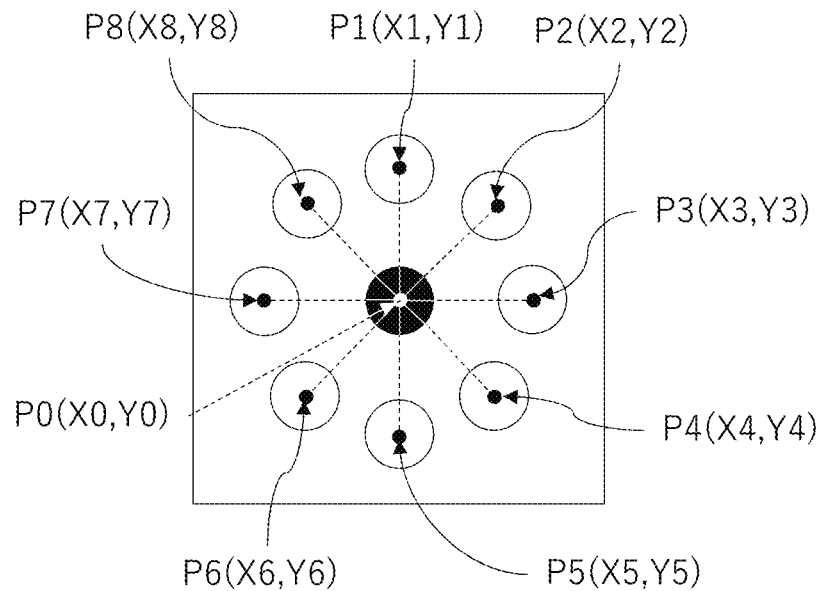
FIG. 78 is a figure showing the orientation of a second code and bounding boxes.

Note that the reference dot described above is not necessarily a dot arranged at the center of a cell, and may be arranged anywhere in the cell provided that it can be identified as a reference dot. FIG. 78 is a diagram showing the orientation of a second code (as a rule of the second code, the orientation may be the same as the orientation of the first code) and circular bounding boxes centered on the virtual points P1 to P8 set by specified distances and directions from the corrected cell center position P0, having the size in the same order as the size of a dot. These virtual points are candidate information dot arrangement positions set in accordance with a rule of the second code. Here, a reading apparatus determines whether or not the center coordinate of a dot is included in the bounding box and acquires numerical data. Note that bounding box specifications are the same as those described with reference to FIG. 64.

(Calculation of Cell Center Coordinate Values in which Reference Dots are Placed in Bright and Dark-Colored Cells)

Figure 79:
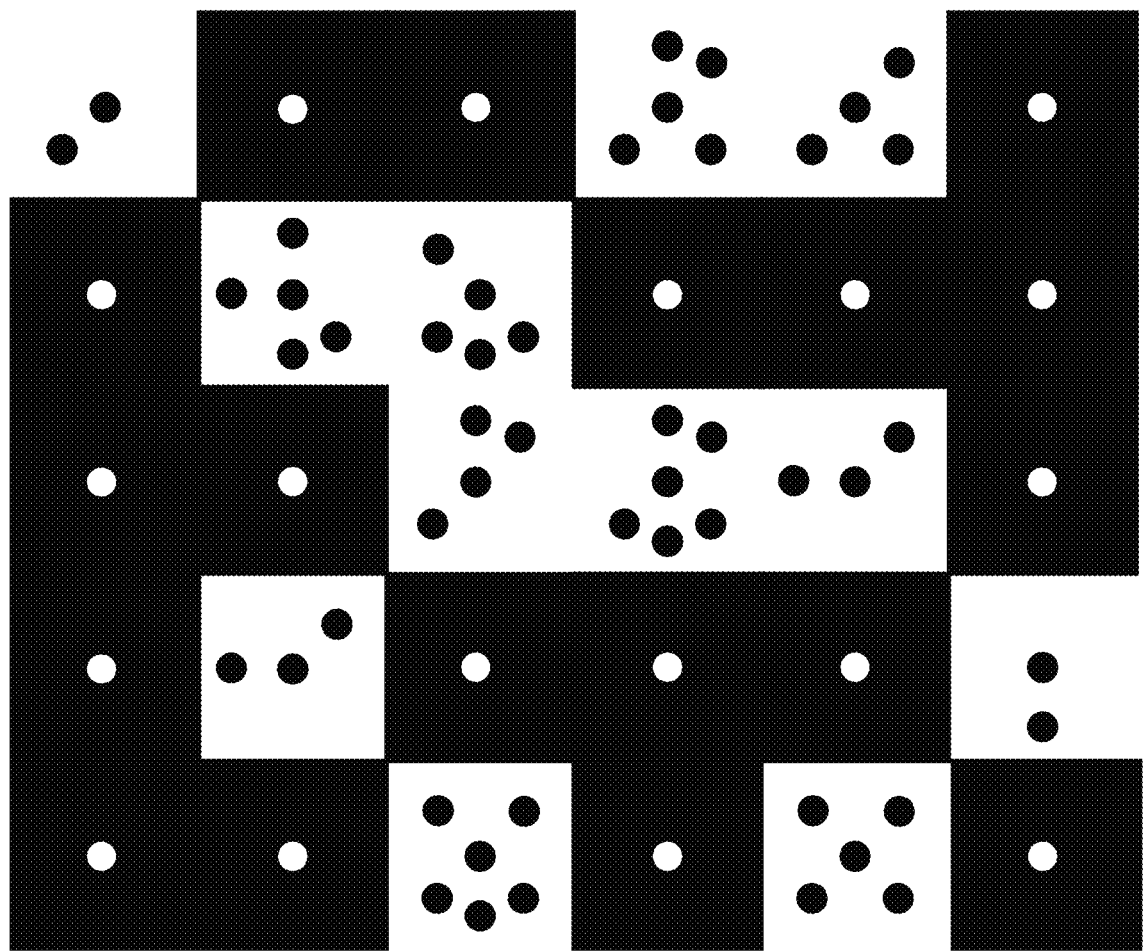
FIG. 79 is an example showing a part of a composite code.

A method in which reference dots are arranged at the center of bright-colored cells for a second code, the reference dots are searched for, and the cell center coordinate values are calculated will be described with reference to FIGS. 79 and 80. FIG. 79 is an example showing a part of the composite code, and a dot code is formed by arranging reference dots in bright and dark-colored cells and information dots only in bright-colored cells. Although not shown, information dots may be arranged in dark-colored cells, or information dots may be arranged in both. With respect to the bright reference dots arranged in dark-colored cells, a reading apparatus can easily extract the bright-colored dots from the continuous dark-colored area around the center coordinate position in a dark-colored cell of which center coordinate values are calculated from the first code. Instead of using the center coordinate values in a dark-colored cell calculated from the first code, a reading apparatus needs only to examine whether or not a bright-colored dot exists in an area where the dark-colored area is continuous. By recognizing the reference dots, it is possible to more accurately recognize the arrangement of information dots which are arranged at a specified distance and in a specified direction from the center position of a reference dot and defined with numerical data.

Figure 80:
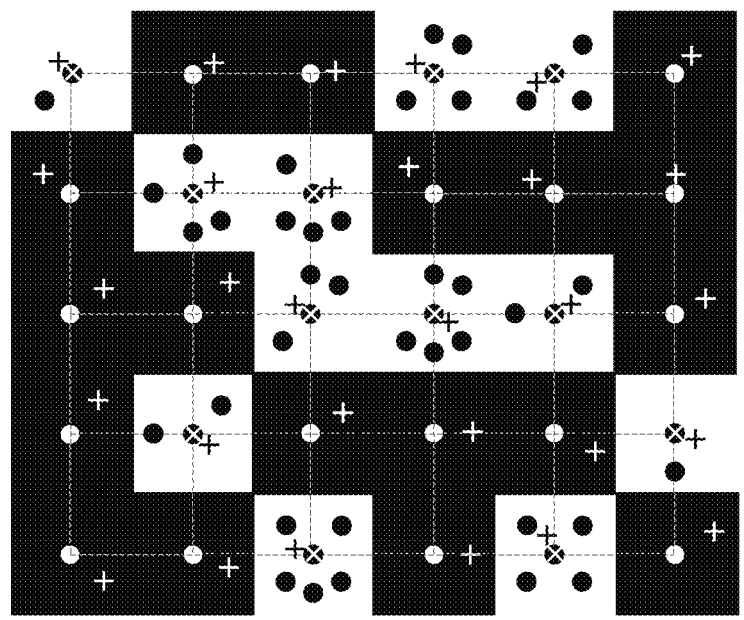
FIG. 80 shows an example of an image in which coordinate positions obtained as the centers of the cells by the first code are deviated from the original centers of the cells.

FIG. 80 shows an example of an image in which the coordinate positions obtained as the centers of the cells by the first code are deviated from the original centers of the cells. In FIG. 80, the positions indicated by the crosses are the coordinate positions determined as the centers of the cells by the first code, and it is apparent that the positions are deviated from the centers of the cells. A method for obtaining appropriate center coordinate values of the cells indicated by the marks x from the deviated positions is described below. The reading apparatus first searches for the positions of the reference dots arranged in the bright-colored cells. In a method of searching, using a predetermined threshold, the reading apparatus may search for a high-density area of the reference dots from surrounding dark-colored cells with the center positions of a dark-colored cell of which coordinate values are obtained from the first code used as starting points, and the center positions of such areas may be determined and the center positions may be used as the center positions of the reference dots. Next, the center positions of the reference dots are connected with virtual straight lines in the vertical and horizontal directions, and the coordinate values of the intersections are determined as the center coordinate values of the bright-colored cells. For bright-colored cells having no intersection, the center coordinate position may be obtained by interpolation or extrapolation using other intersections acquired in the vertical and horizontal directions. The reading apparatus determines the dots near the center coordinate position of the bright-colored cells to be the reference dots arranged in the bright-colored cells. Note that the reference dot described above is not necessarily a dot arranged at the center of a cell, and may be arranged anywhere in the cell provided that it can be identified as a reference dot.

(Calculation of Cell Center Coordinate Values in which Reference Dots are Placed in Bright-Colored Cells (in the Case of Information Division Cells))

Another example of a method in which reference dots are arranged at the center of bright-colored cells for a second code, the reference dots are searched for, and the cell center coordinate values are calculated will be described with reference to FIGS. 81 to 84. FIG. 82 shows an example in which 16 division cells are generated by dividing a bright-colored cell into 4 in the vertical and horizontal directions, candidate arrangement positions for the information division cells are arranged in 12 division cells excluding the 4 division cells in the center, and a reference dot is further arranged at the center of the bright-colored cell. Here, as shown in FIG. 82, when a bright-colored cell (or a dark-colored cell) is divided and information is defined by dark-colored areas (bright-colored areas for a dark-colored cell) formed in the divided area (also referred to as division cells) which are not in contact with the reference dot, the divided dark-colored areas (bright-colored areas for a dark-colored cell) are referred to as information division cells.

The number of information division cells that can be arranged when the dark-colored area included in the bright-colored cell is set to be 33% or less is (16/3)−1 (for a reference dot)=4, and thus the maximum number of information division cells that can be arranged one bright-colored cell is four, and the amount of information of numerical data that can be defined corresponds to $_{12}C_4+_{12}C_3+_{12}C_2+_{12}C_1+_{12}C_0=794$ combinations. Since this is $2^{9.63}$ numerical data of 9 bits or more can be defined. Since the reference dots are arranged at the centers, to ensure the accuracy of the arrangement positions, printing is to be performed by a high-resolution printing machine of about 1200 dpi or more.

Figure 81:
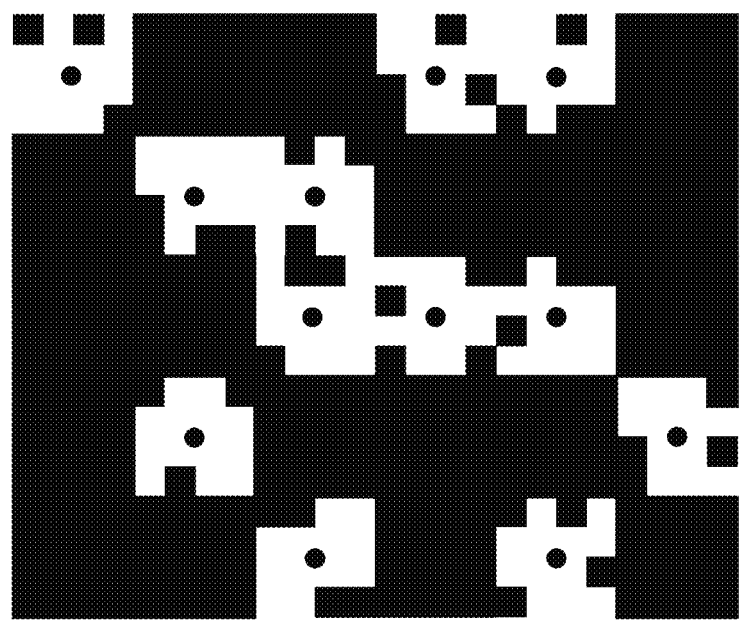
FIG. 81 is an example showing a part of a composite code.
Figure 82:
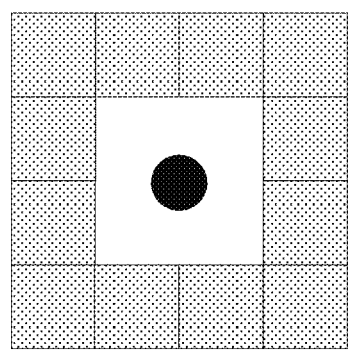
FIG. 82 is an example in which a bright-colored cell is divided vertically and horizontally each into four, and candidate arrangement positions for information division cells and a reference dot are arranged.

FIG. 81 is an example showing a part of a composite code, in which reference dots and information division cells are arranged only in the bright-colored cells to form a division cell code. Although not shown, the reference dots and the information division cells may be arranged in dark-colored cells. By recognizing the reference dots, it is possible to accurately recognize the arrangement of the information division cells which are arranged at a specified distance and in a specified direction from the center position of a reference dot and defined with numerical data.

Figure 83:
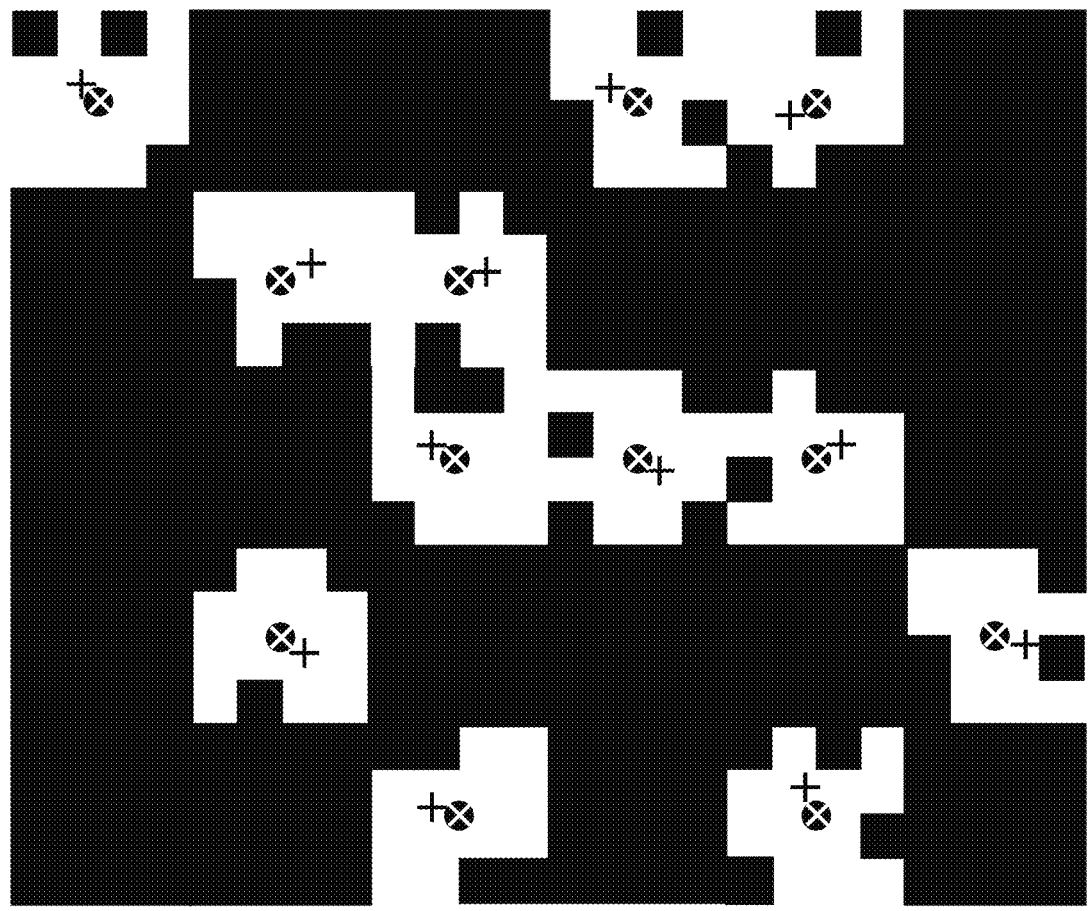
FIG. 83 shows an example of an image in which coordinate positions obtained as the centers of the cells by the first code are deviated from the original centers of the cells.

FIG. 83 shows an example of an image in which the coordinate positions obtained as the centers of the cells by the first code are deviated from the original centers of the cells. In FIG. 83, the positions indicated by the crosses are the coordinate positions obtained as the centers of the cells by the first code, and it is apparent that the positions are deviated from the centers of the cells. A method for obtaining appropriate center coordinate values of the cells indicated by the marks x from the deviated positions is as described with reference to FIG. 77.

Figure 84:
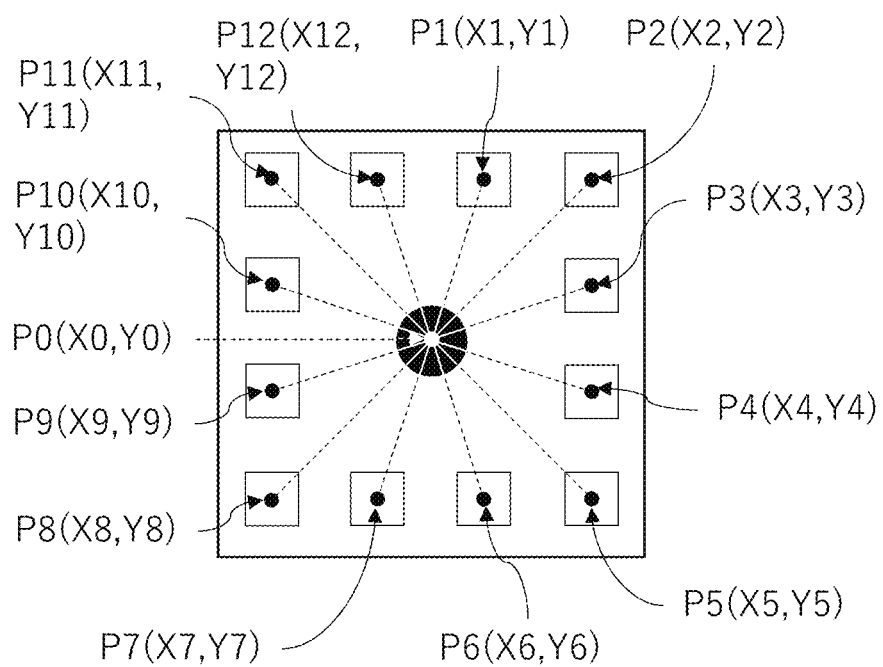
FIG. 84 is a figure showing the orientation of a second code and bounding boxes.

FIG. 84 is a diagram showing the orientation of a second code (as a rule of the second code, the orientation may be the same as the orientation of the first code) and square bounding boxes centered on the virtual points P1 to P8 set by specified distances and directions from the cell center position P0 of a reference dot, having the size of about 50% of the size of an information division cell. The virtual points are candidate arrangement positions for the information division cells set according to a rule of the second code. Here, the reading apparatus determines whether or not a bounding box includes a predetermined ratio of a dark-colored area shown as an information division cell, and acquires numerical data (based on this processing). The method of determining a dark-colored area is the same as that described with reference to FIGS. 66 to 70. An absolute threshold is set and if the ratio of the number of pixels having a gray value lower than the absolute threshold with respect to the number of pixels forming the bounding box exceeds a predetermined ratio, the reading apparatus determined the area an information division cell. The predetermined ratio is desirably about 50 to 75% or more in consideration of a printing deviation of about 20 to 30% with respect to the size of a reference dot and an information division cell depending on printing accuracy. Note that for the reading apparatus, to prevent an information division cell from being included in an adjacent bounding box, the size of a bounding box is set so that bounding boxes are separated by a predetermined distance. In the present example, the size is set at 50% of the size of an information division cell. However, it is desirable to set the size in consideration of the resolution of the camera at the time the composite code is photographed. If the resolution is high, the reading apparatus may change the size of the bounding box at the time of recognition to increase the recognition rate of the information division cell.

(Calculation of Cell Center Coordinate Values with Reference Division Cells Placed in Bright-Colored Cells)

A method in which reference division cells are arranged at the center of bright-colored cells for a second code, the reference division cell is searched for, and the cell center coordinate values are calculated is described with reference to FIGS. 85 to 88. FIG. 86 shows an example in which 25 division cells are generated by dividing a bright-colored cell into 5 in the vertical and horizontal directions, candidate arrangement positions for the information division cells are arranged in 16 division cells excluding the 9 division cells in the center, and a reference division cell is further arranged at the center of the bright-colored cell. As shown in FIG. 86, when a bright-colored cell (or a dark-colored cell) is divided and information is defined by dark-colored areas (bright-colored areas for a dark-colored cell) formed in the divided area (also referred to as division cells) which are not in contact with the reference dot, the divided dark-colored areas (bright-colored areas for a dark-colored cell) are referred to as information division cells. As shown in FIG. 86, when a bright-colored cell (or a dark-colored cell) is divided into a predetermined number, and a reference point is defined with a dark-colored area (bright-colored area for a dark-colored cell) formed in any of the divided areas, the dark-colored area (bright-colored area for a dark-colored cell) formed by a division that is defined as the reference point is referred to as a reference division cell. Similarly, when a cell is divided and information is defined by another area, the area is called an information division cell.

The number of information division cells that can be arranged when the dark-colored area included in a bright-colored cell is set to be 33% or less is (25/3)−1 (for the reference dot)=7, and thus the maximum number of information division cells that can be arranged one bright-colored cell is 7, and the amount of information of numerical data that can be defined corresponds to $_{16}C_7+_{16}C_6+_{16}C_5+_{16}C_4+_{16}C_3+_{16}C_2+_{16}C_1+_{16}C_0=26{,}333$ combinations. Since this is $2^{14.68}$ numerical data of 14 bits or more can be defined. Also, the number of information division cells that can be arranged when the dark-colored area included in a bright-colored cell is set to be 20% or less is (25/5)−1 (for the reference dot)=4, and thus the maximum number of information division cells that can be arranged one bright-colored cell is 4, and the amount of information of numerical data that can be defined corresponds to $_{16}C_4+_{16}C_3+_{16}C_2+_{16}C_1+_{16}C_0=2{,}517$ combinations. Since this is $2^{11.30}$, numerical data of 11 bits or more can be defined. Note that as shown in FIG. 45, printing one cell with 5×5 pixels can be performed with a 600 dpi printer.

Figure 85:
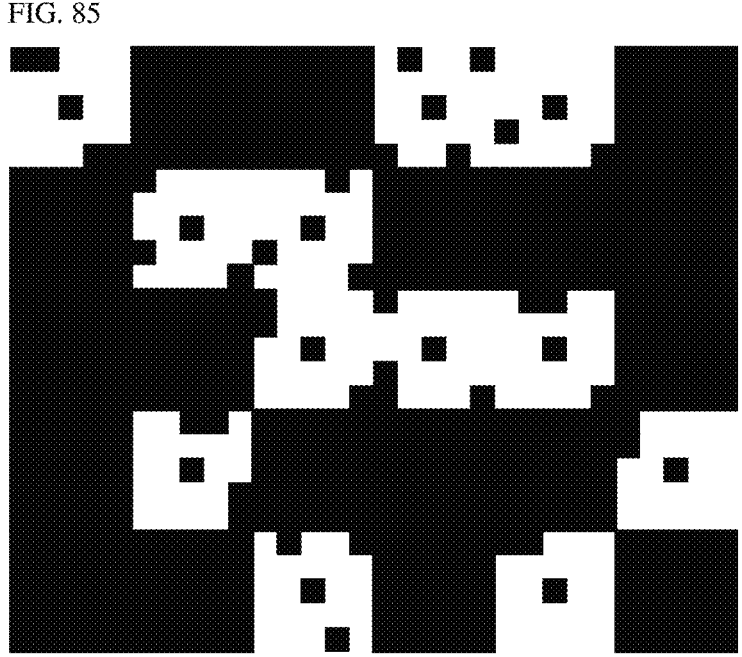
FIG. 85 is an example showing a part of a composite code.
Figure 86:
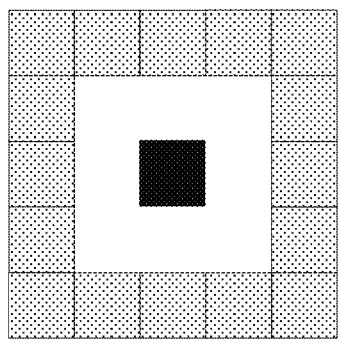
FIG. 86 is an example in which a bright-colored cell is divided vertically and horizontally each into five, and candidate arrangement positions for information division cells and a reference division cell are arranged.

FIG. 85 is an example showing a part of a composite code. and a division cell code is formed by arranging reference division cells and information division cells only in bright-colored cells. Although not shown, the reference division cells and the information division cells may be arranged in dark-colored cells. By recognizing the reference division cells, it is possible for a reading apparatus to accurately recognize the arrangement of information division cells which are arranged at a specified distance and in a specified direction from the center position of a reference division cell and defined with numerical data.

Figure 87:
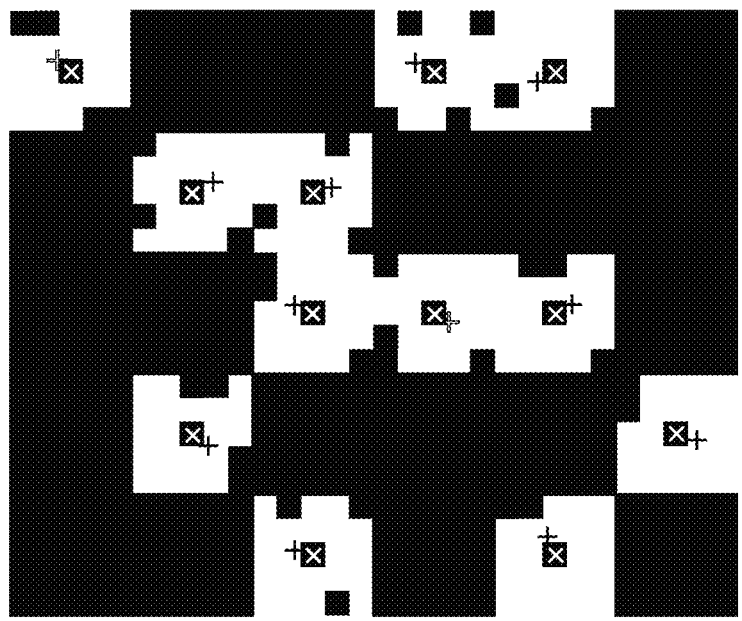
FIG. 87 shows an example of an image in which coordinate positions obtained as the centers of the cells by the first code are deviated from the original centers of the cells.

FIG. 87 is an example of an image in which the coordinate positions obtained as the centers of the cells by the first code are deviated from the original centers of the cells. In FIG. 87, the positions indicated by the crosses are the coordinate positions obtained as the centers of the cells by the first code, and it is apparent that the positions are deviated from the centers of the cells. A method for obtaining appropriate center coordinate values of the cells indicated by the marks x from the deviated positions is described below. The reading apparatus first searches for the positions of the reference division cells arranged in the bright-colored cells. As a method of searching, the reading apparatus determines whether or not a division cell near the center coordinate values of a bright-colored cell obtained by the selected first code is a reference division cell from the arrangement relationship with division cells arranged in other bright-colored cells. That is, the reading apparatus may determine whether or not the division cell corresponds to a division cell linearly arranged at a predetermined interval. If this condition is not satisfied, the reading apparatus then repeatedly performs determinations of whether or not the next closest division cell satisfies the above condition until a reference division cell is recognized On the other hand, the cell center coordinate values may be calculated by the method described with reference to FIG. 66, and the cell closest to the coordinate values may be set as a reference division cell.

Figure 88:
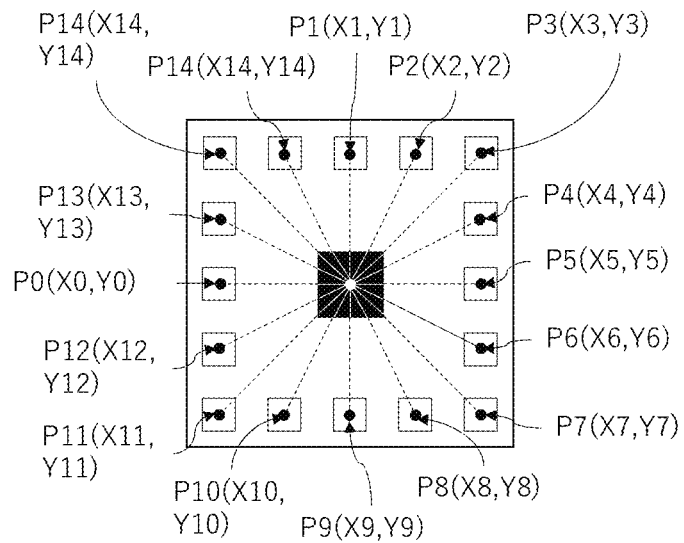
FIG. 88 is a figure showing the orientation of a second code and bounding boxes.

FIG. 88 is a diagram showing the orientation of a second code (as a rule of the second code, the orientation may be the same as the orientation of the first code) and square bounding boxes centered on the virtual points P1 to P8 set by specified distances and directions from the cell center position P0 of a reference dot, having the size of about 50% of the size of an information division cell. The virtual points are candidate arrangement positions for the information division cells set according to a rule of the second code. Here, the reading apparatus determines whether or not the bounding box includes a predetermined ratio of a dark-colored area shown as an information division cell, and acquires numerical data. The method of determining a dark-colored area is the same as that described with reference to FIG. 66. An absolute threshold is set and if the ratio of the number of pixels having a gray value lower than the absolute threshold with respect to the number of pixels forming the bounding box exceeds a predetermined ratio, the reading apparatus determined the area an information division cell. For a reading apparatus, the predetermined ratio is desirably about 50 to 75% or more in consideration of a printing deviation of about 20 to 30% with respect to the size of a reference dot and an information division cell depending on printing accuracy. Note that for a reading apparatus, to prevent an information division cell from being included in an adjacent bounding box, the size of a bounding box is set so that bounding boxes are separated by a predetermined distance. In the present example, for the reading apparatus, the size is set at 50% of the size of an information division cell. However, it is desirable to set the size in consideration of the resolution of the camera at the time the composite code is photographed. The reading apparatus may increase the recognition rate of an information division cell by making the size of the bounding box variable at the time of recognition if the acquired image has a sufficiently high-resolution.

(Calculation of the Center Coordinate Value of a Bright-Colored Cell with Reference Division Cells Placed in a Dark-Colored Cell)

A method of directly calculating cell center coordinate values using a bright-colored reference division cell arranged in a dark-colored cell without using the cell center coordinate values calculated by the first code will be described with reference to FIGS. 89 to 92. FIG. 90 shows an example in which 25 division cells are generated by dividing a bright-colored cell into 5 in the vertical and horizontal directions, and candidate arrangement positions for the information division cells are arranged in 24 division cells excluding the division cell in the center. The number of information division cells that can be arranged when the dark-colored area included in a bright-colored cell is set to be 33% or less is (25/3)=8, and thus the maximum number of information division cells that can be arranged one bright-colored cell is 8, and the amount of information of numerical data that can be defined corresponds to $_{24}C_8+_{24}C_7+_{24}C_6+_{24}C_5+_{24}C_4+_{24}C_3+_{24}C_2+_{24}C_1+_{24}C_0=1,271,626$ combinations. Since this is 220.28 numerical data of 20 bits or more can be defined. Also, the number of information division cells that can be arranged when the dark-colored area included in a bright-colored cell is set to be 20% or less is (25/5)=5, and thus the maximum number of information division cells that can be arranged one bright-colored cell is 5, and the amount of information of numerical data that can be defined corresponds to $_{24}C_5+_{24}C_4+_{24}C_3+_{24}C_2+_{24}C_1+_{24}C_0=55,455$ combinations. Since this is $2^{15.76}$ numerical data of 15 bits or more can be defined. Note that, as shown in FIG. 45, printing is possible with a 600 dpi printer. It is needless to say, printing can be performed with a printing machine having a resolution higher than 600 dpi.

Figure 89:
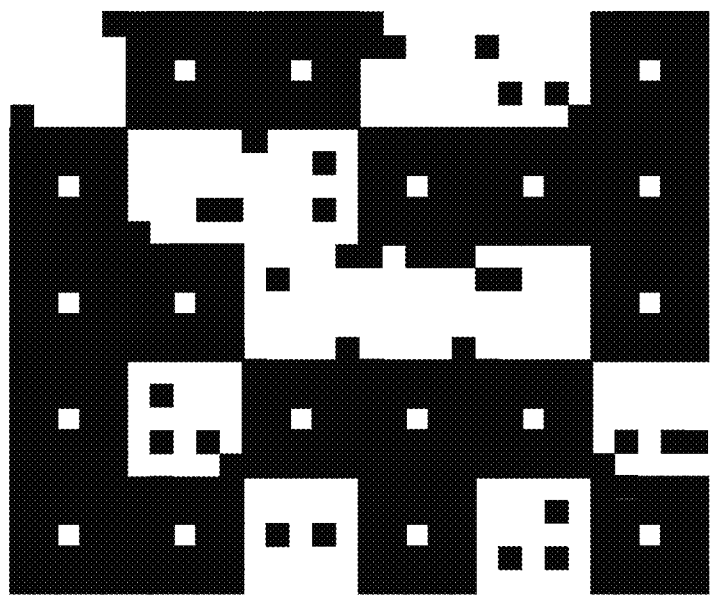
FIG. 89 is an example showing a part of a composite code.
Figure 90:
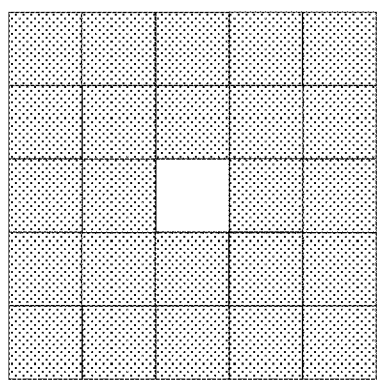
FIG. 90 is an example in which a bright-colored cell is divided vertically and horizontally each into five, and candidate arrangement positions for information division cells are arranged.

FIG. 89 is an example showing a part of the composite code, in which information division cells are arranged only in bright-colored cells and reference division cells are arranged only in dark-colored cells to form a division cell code. Although not shown, the information division cells may be arranged in dark-colored cells and the reference division cells may be arranged in bright-colored cells. With respect to the bright-colored reference division cells arranged in dark-colored cells, a reading apparatus can easily extract the bright-colored reference division cells from the continuous dark-colored area around the center coordinate position in a dark-colored cell of which center coordinate values are calculated from the first code. Instead of using the center coordinate values in a dark-colored cell calculated from the first code, a reading apparatus needs only to examine whether or not a bright-colored dot exists in an area where the dark-colored area is continuous.

Figure 91:
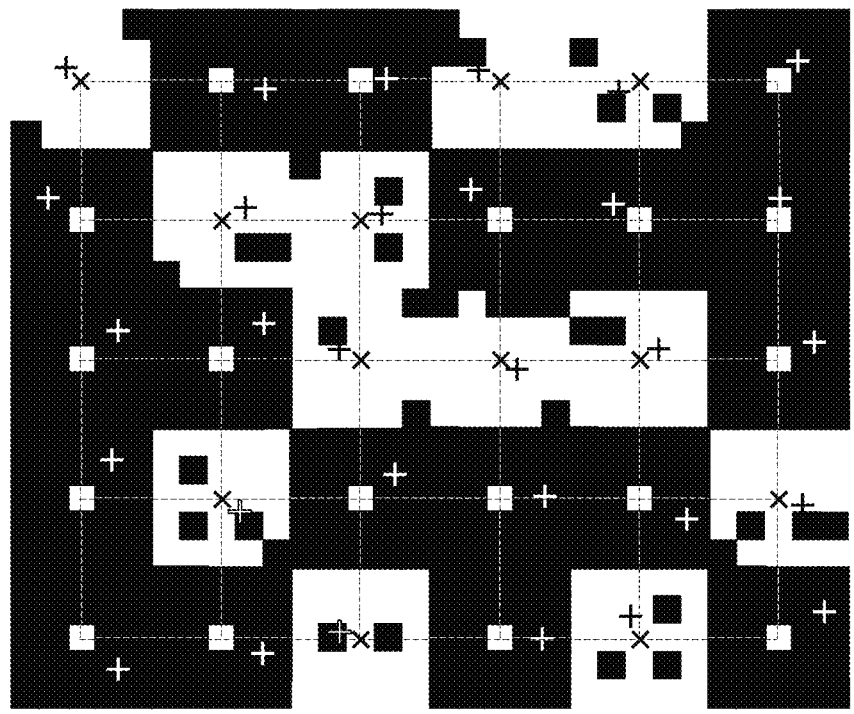
FIG. 91 shows an example of an image in which coordinate positions obtained as the centers of the cells by the first code are deviated from the original centers of the cells.

FIG. 91 is an example of an image in which the coordinate positions obtained as the centers of the cells by the first code are deviated from the original centers of the cells. In FIG. 91, the positions indicated by the crosses are the coordinate positions determined as the centers of the cells by the first code, and it is apparent that the positions are deviated from the centers of the cells. A method for obtaining appropriate center coordinate values of the cells indicated by the marks x from the deviated positions is described below. The reading apparatus first searches for the positions of the reference division cells arranged in the dark-colored cells. In a method of searching, using a predetermined threshold, the reading apparatus may search for a high-density area of the reference division cells from surrounding dark-colored cells with the center positions of a dark-colored cell of which coordinate values are obtained from the first code used as starting points, and the center positions of such areas may be determined and the center positions may be used as the center positions of the reference division cells. Next, the center positions of the reference dots are connected with virtual straight lines in the vertical and horizontal directions, and the coordinate values of the intersections are determined as the center coordinate values of the bright-colored cells. For bright-colored cells having no intersection, the center coordinate position may be obtained by the reading apparatus by interpolation or extrapolation using other intersections acquired in the vertical and horizontal directions.

Figure 92:
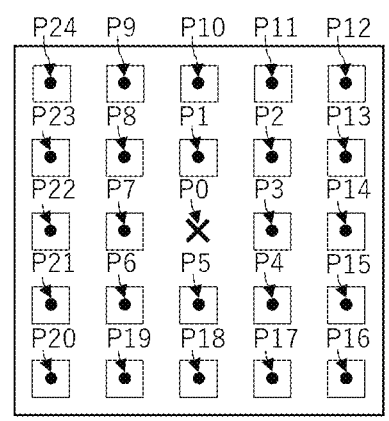
FIG. 92 is a figure showing the orientation of a second code and bounding boxes.

FIG. 92 is a diagram showing the orientation of a second code (as a rule of the second code, the orientation may be the same as the orientation of the first code) and square bounding boxes centered on the virtual points P1 to P24 set by specified distances and directions from the cell center position P0, having the size of about 50% of the size of an information division cell. These virtual points are candidate arrangement positions for the information division cells set according to a rule of the second code.

Here, the reading apparatus determines whether or not a bounding box includes a predetermined ratio of a dark-colored area shown as an information division cell, and acquires numerical data. A method of determining a dark-colored area and the specifications of the bounding boxes are as described with reference to FIGS. 86 to 88. Note that a dark reference division cell may be arranged at the center of a bright-colored cell. The reading apparatus may acquire numerical data using bounding boxes centered on virtual points P1 to P24 set by specified distances and specified directions from the center position of a reference division cell, with a dark-colored division cell in the vicinity of the center position of a bright-colored cell of which coordinate values are obtained by the reference division cell arranged in a dark-colored cell, as the reference division cell arranged in the bright-colored cell. In this—case, the number of information division cells that can be arranged in the bright-colored cell is reduced by one, and thus the amount of storable information is reduced.

Figure 93:
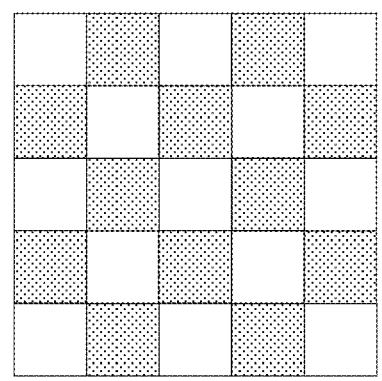
FIG. 93 is an example in which the candidate arrangement positions of the information division cells are arranged at twelve positions so that they are not adjacent to each other in the vertical and horizontal directions.
Figure 94:
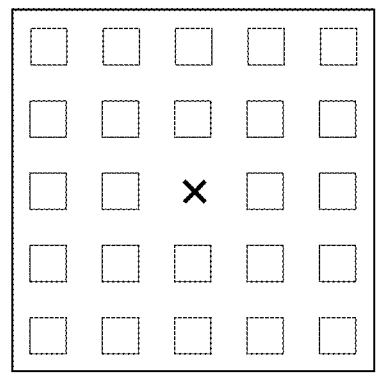
FIG. 94 is a diagram showing bounding boxes.
Figure 95:
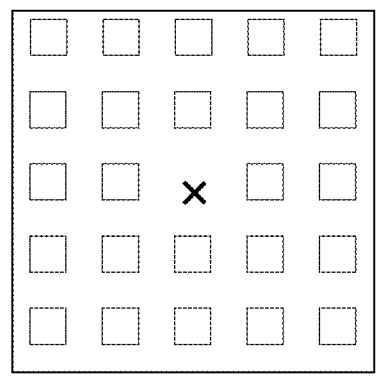
FIG. 95 is a diagram (1) showing a state in which the bounding boxes are moved.
Figure 96:
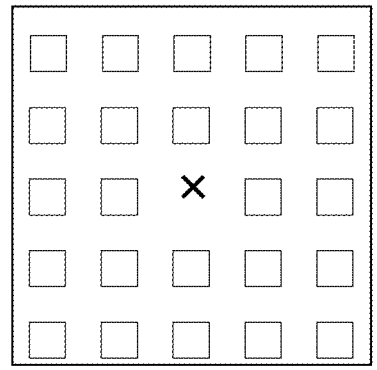
FIG. 96 is a diagram (2) showing a state in which the bounding boxes are moved.
Figure 97:
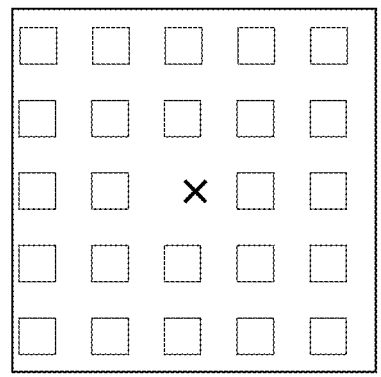
FIG. 97 is a diagram (3) showing a state in which the bounding boxes are moved.
Figure 98:
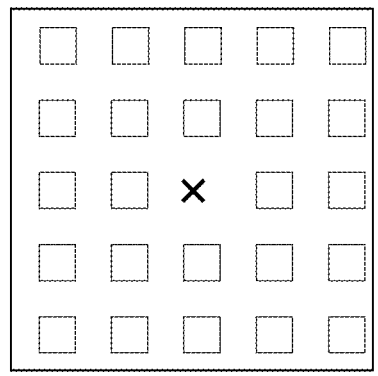
FIG. 98 is a diagram (4) showing a state in which the bounding boxes are moved.
Figure 99:
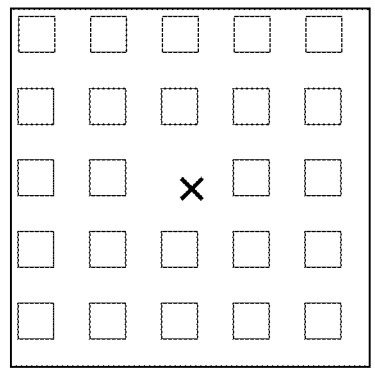
FIG. 99 is a diagram (5) showing a state in which the bounding boxes are moved.
Figure 100:
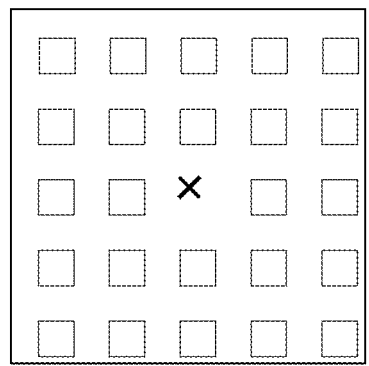
FIG. 100 is a diagram (6) showing a state in which the bounding boxes are moved.
Figure 101:
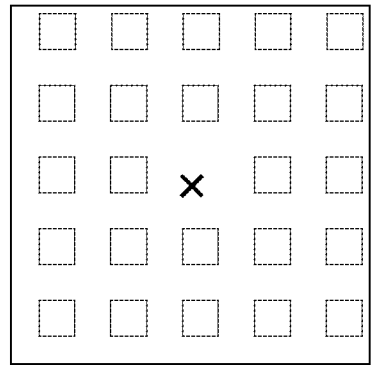
FIG. 101 is a diagram (7) showing a state in which the bounding boxes are moved.
Figure 102:
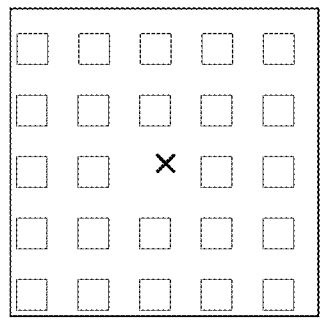
FIG. 102 is a diagram (8) showing a state in which the bounding boxes are moved.

In the present example, a large amount of numerical data can be defined in one cell. However, in addition to the coordinate values of the cell center required to be obtained with accuracy, it is necessary to secure a predetermined camera imaging resolution and printing accuracy. If they are not sufficient, the generation rate of misidentification will be high. To overcome this, it is necessary to apply an error correction code of a large size, but the amount of storable information is greatly reduced. FIG. 93 shows an example in which candidate information division cell arrangement positions of FIG. 90 are arranged at 12 positions so that they are side by side in the vertical and horizontal directions. Thus, for the bounding boxes in FIG. 94, if an information division cell is recognized at a position where it is not supposed to exist, an error is considered to have occurred. If such an error can be recognized, the size of the error correction code can be reduced, and it is possible to increase the amount of storable data. Furthermore, as shown in FIGS. 95 to 102, if the bounding boxes are moved and positions at which division cells that are not supposed to exist are no longer recognized, the setting of the bounding boxes is considered to be correct, and numerical data may be acquired. The amount of movement of the bounding boxes determined here can be used for other cells. Note that for the movement of the bounding boxes in FIGS. 95 to 102, more steps may be applied. The candidate information division cell arrangement positions in FIG. 90 may be in any arrangement provided that the candidate information division cell arrangement positions are not side by side.

(Composite Code Generation Processing)

The composite code generation processing in the tenth embodiment is the same as those in the first to the ninth embodiments except that a reference point is set in a cell. Therefore, in the composite code generation processing in the tenth embodiment, the processings exemplified in FIGS. 47, 49, 51, 53, 55, 57, and 59 are directly followed. Note that in these processings, the management server MS1 or the like may set reference points in cells of desire (that is, cells in which reference points are to be set). The management server MS1 or the like may, for example, include reference points in the second code when generating the second code.

<Setting of Bounding Boxes>

Figure 103:
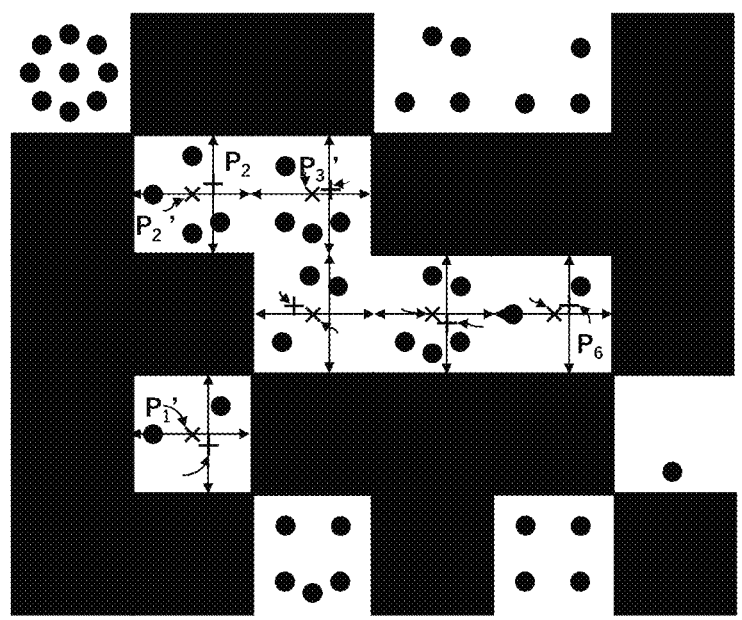
FIG. 103 shows an example of a composite code with a reference pattern.
Figure 104:
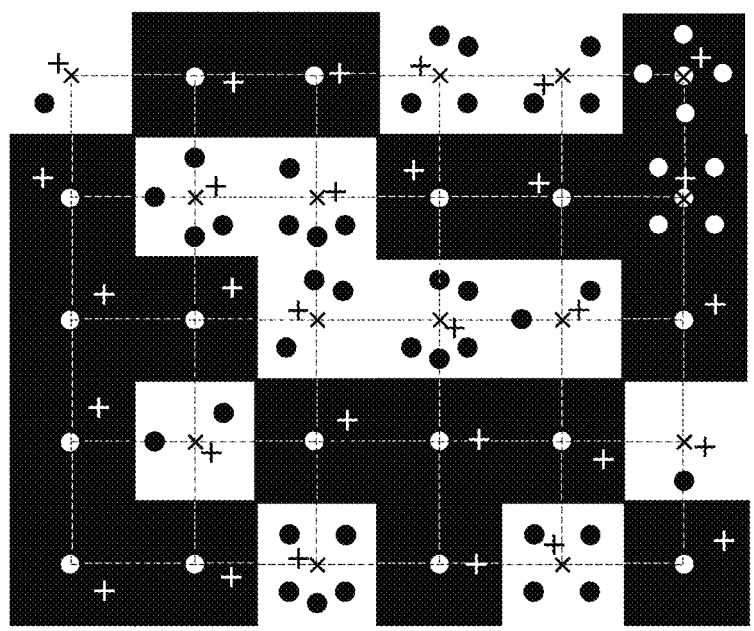
FIG. 104 shows an example of a composite code in which a reference pattern is divided and arranged into two cells.

When the cell center coordinate values are determined accurately, it is necessary to set the bounding boxes for acquiring numerical data accurately. As shown in FIG. 64, the virtual points P1 to P8 serving as the centers of the bounding boxes are defined by a geometrical arrangement relationship with the cell center position P0 based on distance and direction. This geometrical arrangement relationship is recorded in a storage medium of a composite code reader or software for acquiring numerical data from the second code. On the other hand, as shown in FIG. 103, as shown in the bright-colored cell at the upper-left of the composite code in FIG. 61, a geometrical arrangement relationship (reference pattern) between the cell center position P0 and the virtual points P1 to P8 using a plurality of reference dots in a cell at a predetermined position may be formed and may be recognized. Thus, the reference pattern can be obtained directly from the image of a composite code captured by a camera, the bounding boxes can be set more accurately, and thus numerical data can be obtained. Although not shown, a reference pattern may be formed either in dark-colored cells (bright reference dots) or in both bright and dark-colored cells. When the first code is a QR code, reference patterns may be arranged in predetermined cells forming the position detection patterns (finder pattern), the timing patterns, the alignment patterns, and the format information sections. Here, when the cell size is 0.3×0.3 mm and if the diameter of a dot is 0.045 mm, the percentage of the dots in a cell is $\pi \times (0.045/2)^2 \times 9/(0.3 \times 0.3)=0.159$ (15.9%), which does not exceed 20%. and Thus, there is no problem in reading the QR code. However, in the case of a QR code of the smallest cell size of 0.169×0.169 mm, the percentage of a dot in a cell exceeds 33%, thus causing a problem in the reading of the QR code. In such a case, the reference pattern may be divided into virtual points in the vertical and horizontal directions and virtual points in the oblique directions, and two types of patterns may be formed with five reference dots respectively in the first and the second dark-colored cells from the upper-right of the composite code in FIG. 74, as shown in FIG. 104. As a result, the percentage of the dots in a cell is $\pi \times (0.045/2)^2 \times 5/(0.169 \times 0.169)=0.278$ (27.8%), which does not exceed 33%. Thus, there is no problem in reading the QR code. These two types of patterns may be combined and used as a reference pattern. Of course, the reference pattern may be separated into three or more types to form a pattern over a plurality of cells, or may be arranged in at least one of dark-colored cells (bright reference dots) or bright-colored cells (dark reference dots). The plurality of different patterns may be used as independent reference patterns, and for cells in which information dots of different arrangement patterns for each are formed, corresponding bounding boxes may be set, and numerical data may be acquired.

Figure 105:
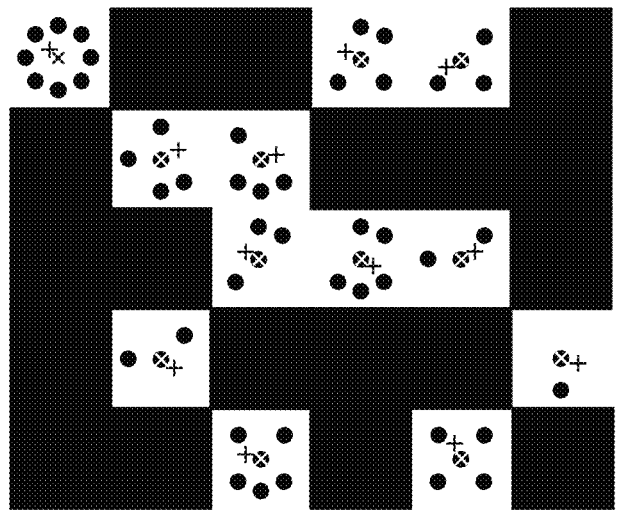
FIG. 105 shows an example of a composite code with a reference pattern.

FIG. 105 shows an example in which a reference pattern is formed in the composite code shown in FIG. 77. However, since a dot is not arranged at the center of the bright-colored cells in which information dots are arranged, the reference pattern can be easily recognized. Furthermore, when a reference pattern is formed in a dark-colored cell in which a bright reference dot is arranged at the center, the reference pattern can be easily recognized by the number of reference dots. Note that a reference pattern may be formed either in dark-colored cells (bright reference dots) or in both bright and dark-colored cells.

Figure 106:
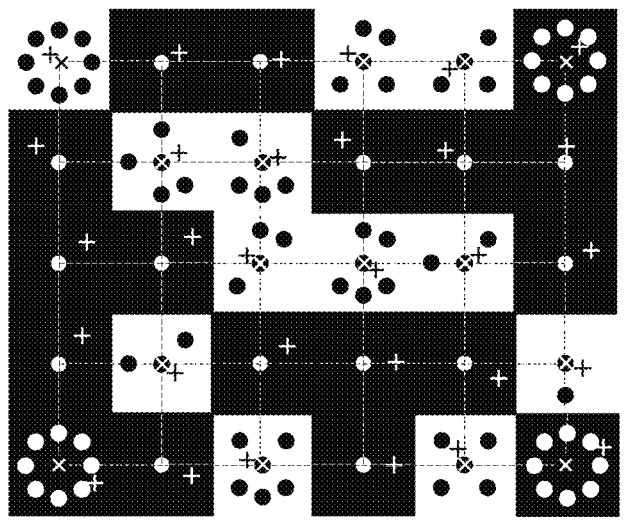
FIG. 106 shows an example of a composite code in which a plurality of reference patterns are arranged at predetermined intervals of bright and/or dark-colored cells.

FIG. 106 shows an example in which a plurality of reference patterns are arranged at predetermined intervals of bright and/or dark-colored cells of the composite code of FIG. 80. Thus, even if a QR code is imaged with deformed and the degree of deformation changes for each area, if bounding boxes of the second code formed in the surrounding cells can be set with a plurality of imaged reference patterns, numerical data can be acquired more accurately. In the present example, for information dots defining numerical data, since the cell center position P0 can be obtained accurately, and thus the center reference dot is not arranged, the reference pattern can be easily recognized. do not have the center reference dot arranged because, When arranging reference dots, the reference dots may be formed in cells having a predetermined arrangement. Note that even in examples of either FIGS. 61 to 78 or FIGS. 79 to 92, a plurality of reference patterns may be arranged at predetermined intervals of cells.

Figure 107:
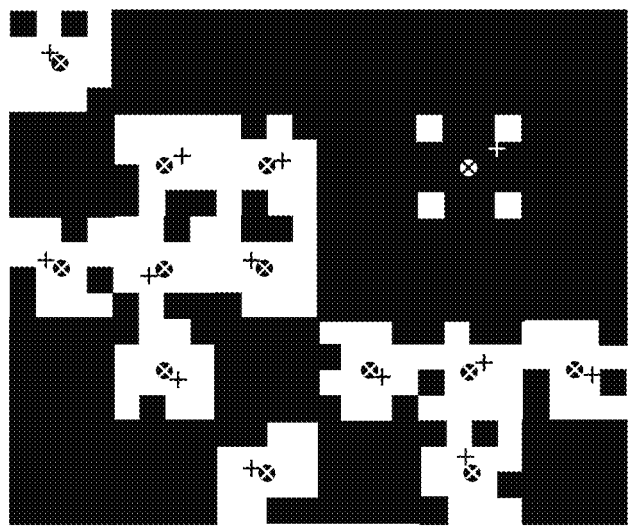
FIG. 107 shows an example of a composite code in which a reference pattern is arranged with reference dots and reference division cells.

FIG. 107 shows an example in which dark-colored cells (or bright-colored cells) of the composite code of FIG. 83 having their periphery surrounded by dark-colored cells (or bright-colored cells) have a reference pattern formed of a bright-colored (or a dark-colored) reference dot having the center position P0 in FIG. 84 and bright-colored (or a dark-colored) reference division cells having center positions of P2, P5, P8, and P11. By obtaining the center coordinate values of P2, P5, P8, and P11, the center positions of P1, P3, P4, P6, P7, P9, P10, and P12 can be calculated with interpolated, and bounding boxes centering around the virtual points P1 to P12 can be set. In addition, reference patterns may be similarly formed by replacing the reference dots in the center with reference division cells as in the composite code of FIG. 87. Furthermore, by setting the sizes of reference dots and/or reference division cells forming this reference pattern to be the same or to be easily recognized, by forming only the spacing by multiplying with a predetermined factor (similar enlargement), and by dividing the spacings by the predetermined factor (similar reduction) to acquire a reference pattern with an appropriate arrangement after acquiring their center coordinate values, it is possible to acquire with high accuracy the geometric arrangement relationship between the cell center position and the virtual points serving as the centers of the bounding boxes in accordance with specified distances and directions from the cell center position. The arrangement relation can be acquired with high accuracy. Note that it is needless to say that a similar form is possible in any of the examples shown in FIGS. 61 to 78 and FIGS. 89 to 92.

Figure 108:
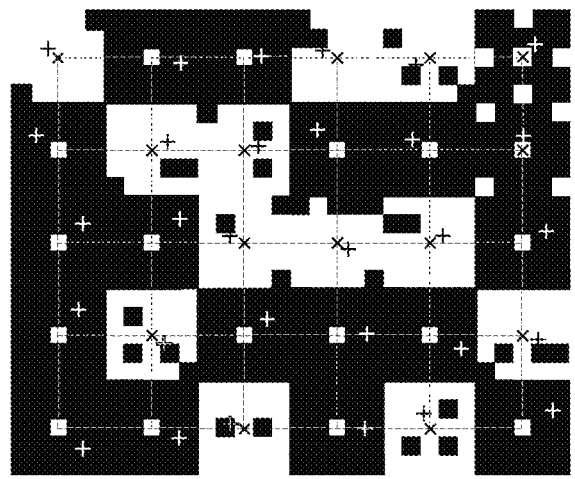
FIG. 108 shows an example of a composite code in which reference division cells are arranged in two division cells and cell pattern is used as a reference pattern.

FIG. 108 shows an example in which two types of patterns are formed by five bright-colored reference division cells respectively in the first and the second dark-colored cells from the upper-right of the composite pattern in FIG. 91. In the pattern in the first cell from upper-right, reference division cells are formed in the center and in the vertical and horizontal directions, and in the pattern of the second cell from the upper-right, reference division cells are formed in the center and in the oblique directions. First, as shown in FIG. 70, binarization processing is performed in the scanning line direction on the reference division cells formed in the center and in the vertical direction of the pattern in the first cell from the upper-right, and binarization processing is performed in the horizontal direction on the reference division cells. After derivation of the center coordinate values of the reference division cells P10, P14, P18, and P22 shown in FIG. 92, the 4 directions are derived by the 2 oblique lines passing through P0, which equally divides 2 orthogonal straight lines passing through the center coordinate positions of the 4 reference division cells in the cross directions from the center coordinate position P0 of the reference division cell in the center. Next, for the reference division cells formed at the center and obliquely to the center of the pattern in the second cell from the upper-right, binarization processing is performed in the 4 oblique directions with respect to the center coordinate position P0 calculated from the pattern in the first cell from the upper-right first stage and the center coordinate values of each of the reference division cells of P12, P16, P20, and P24 is obtained. Finally, these two types of patterns are merged and by performing interpolation based on P0, P10, P12, P14, P16, P18, P20, P22, and P24, P1 to P8, P9, P11, P13, P15, P17, P19, P21, and P23 may be obtained, and by using them as a reference pattern, bounding boxes may be set and numerical data may be obtained. For the above-described binarization processing, any method may be used, and the pattern forming a reference pattern may be arranged in at least one of the dark-colored cells (bright-colored reference division cells) and the bright-colored cells (dark-colored reference division cells). Here, when the cell size is 0.212×0.212 mm and if the side length of the division cells is 0.045 mm, the ratio of the reference division cells in the pattern forming the reference pattern to a cell is $0.045^2 \times 5/(0.212 \times 0.212) = 0.225$ (22.5%), which does not exceed 33%. Thus, there is no problem in reading the QR code.

As described above, when the optical axis of a camera is not perpendicular to the medium surface on which the QR code is formed (when the camera is inclined with respect to the medium) or when the medium is curved, the QR code is imaged in a deformed state. Therefore, although a correction is applied, since the cell center coordinate values cannot be obtained with accuracy, methods of acquiring numerical data defined to the cells without misidentification is described based on the acquired accurate cell center coordinate values and a reference pattern formed in a cell. Here, grid lines can be drawn based on reference dots or reference division cells as shown in FIG. 74, FIG. 80, FIG. 91, or with some other method. The areas surrounded by the grid lines reflect the size and shape of a cell near the positions, and the deformation state of a cell may be reflected in the geometrical arrangement relationship between the cell center and virtual points that are the centers of the bounding box set at a specified distance and in a specified direction from the cell center position to correct the arrangement of the bounding boxes and for use in the recognition of information dots and information division cells near the position. Thus, even if a QR code is imaged in a deformed state and the degree of deformation differs for each area, since a correction is performed based on the shape of a grid for each area, the QR code may be recorded in a storage medium of a composite code reading apparatus or in software for acquiring numerical data from the second code without forming a reference pattern on the composite code, and correction may be performed by using the geometric arrangement relationship. Note that the method of correcting the arrangement of the bounding boxes based on the grid lines may be used in combination with other examples. Furthermore, as a means for generating grid lines, boundaries between bright and dark-colored cells may be detected, and grid lines may be drawn along the boundaries. However, depending on the accuracy of printing or if the captured image obtained when the QR code is photographed is rotated or deformed, the boundaries of the pixels indicating brightness and darkness become uneven, and thus it is desirable to form the grid lines with smoothing or averaging the boundaries.

Although not shown, numerical data may be defined in a cell in which a mark indicating a reference point is formed by at least one of the shape, size, color, orientation, and arrangement pattern of the mark indicating it to be a reference point.

<Setting of the Orientation of a Second Code>

The described examples are based on the assumption that the orientation of the first code is used when acquiring numerical data of the second code. However, when the optical axis of a camera is not perpendicular to the medium surface on which the QR code is formed (when the camera is inclined with respect to the medium) or when the medium is curved, the QR code may be imaged in a deformed state, the degree of deformation may differ for each area, and the orientation of each cell may differ. Furthermore, there are cases where only the second code is obtained independent of the first code. Therefore, an example in which orientation is set by the second code itself is described.

Figure 109:
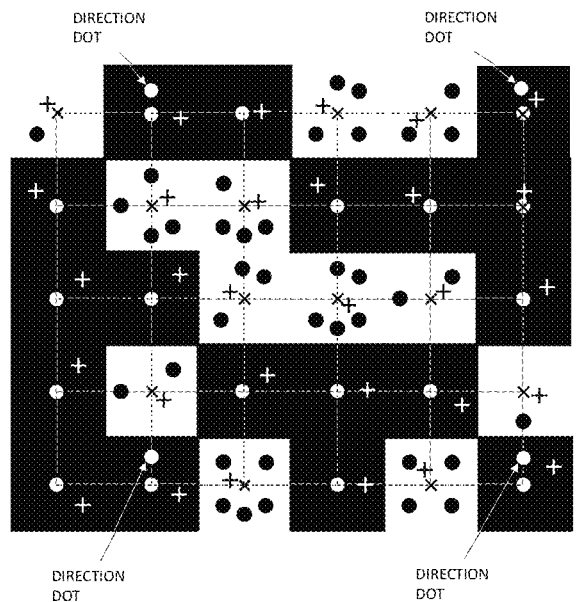
FIG. 109 shows an example of a composite code in which the orientation of the second code is set by adding direction dots.

FIG. 109 shows an example in which direction dots are added above predetermined reference dots of the composite code of FIG. 74, defining the orientation of the second code. The arrangement of a direction dot may be in any direction with respect to the reference dot, provided that the relationship with the direction of the second code is determined in advance. A direction dot and a reference dot can be easily distinguished by determining whether or not the dot is located at the center of the cell or whether or not it is located on a grid line formed by connecting the reference dots. The direction dots can be arranged in any way, but by arranging them at predetermined intervals, the degree of deformation of a captured QR code can be reflected, the orientation of the cell can be corrected, and accurate numerical data acquisition can be realized. In other words, in accordance with the orientation of the cell, the bounding boxes, where there is a geometric arrangement relationship between the cell center and virtual points that are the centers of the bounding boxes arranged at a specified distance and in a specified direction from the cell center position, are rotated to correct the arrangement of the bounding boxes for use in the recognition of information dots and information division cells nearby. Note that for a cell in which the above-mentioned direction dot is formed, the reference dot at the center may be omitted. In such a case, the orientation can be easily recognized by locating the direction dots above the intersections of the grid lines formed by connecting the reference dots. Furthermore, the orientation of the second code may be defined by forming a direction dot at a predetermined position in a cell. Although not shown, orientation may be defined based on the arrangement of two or more dots with which orientation can be recognized. Furthermore, orientation may be defined using division cells instead of direction dots, or marks with a shape with which orientation can be recognized. Upon forming information dots and information division cells, a specific arrangement for recognizing orientation may be set.

Figure 110:
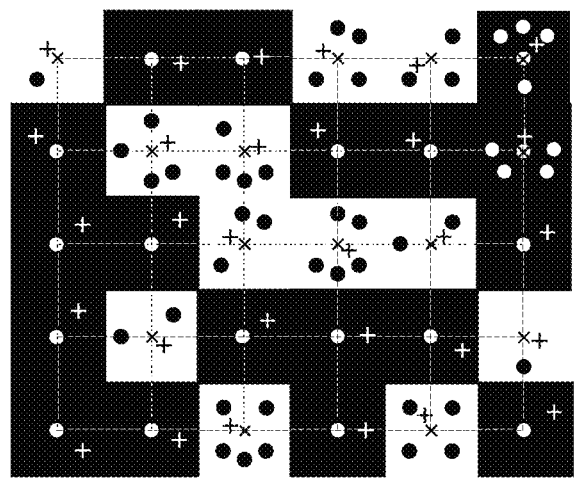
FIG. 110 shows an example of a composite code in which the orientation of the second code is set by changing the arrangement of the reference dots forming a reference pattern.

FIG. 110 shows an example in which the arrangement of reference dots constituting a reference pattern provided in the composite code of FIG. 104 is changed so as to define the orientation of the second code. In other words, in regards with the two types of patterns formed by five reference dots respectively in the first and the second dark-colored cells from the upper-right, neither has rotational symmetry and thus orientation can be defined. Since a reference pattern is formed by merging the two types of patterns, this example can be considered to be showing a reference pattern with an added direction function. The pattern examples of FIGS. 109 and 110 can be formed in at least one of bright-colored cells and dark-colored cells, and it is needless to say that the patterns can be used in combination with those of other examples.

[Computer Readable Recording Medium]

A program that causes a computer or other machine or apparatus (hereinafter, referred to as a computer or the like) to realize any of the above functions can be recorded in a recording medium readable by a computer or the like. Furthermore, the function can be provided by causing a computer or the like to read and execute the program in the recording medium.

Here, a recording medium readable by a computer or the like refers to a recording medium that stores information such as data, programs, and the like by electrical, magnetic, optical, mechanical, or chemical action and can be read by a computer or the like. Among such recording media, those removable from a computer or the like include, for example, a flexible disk, a magneto-optical disk, a CD-ROM, a CD-R/W, a DVD, a Blu-ray disk, a DAT, an 8 mm tape, memory cards such as a flash memory, and the like. Furthermore, recording media fixed to a computer or the like includes a hard disk, a ROM (Read Only Memory), and the like. Furthermore, an SSD (Solid State Drive) can be used as both a recording medium detachable from a computer or the like, or as a recording medium fixed to a computer or the like.

Eleventh Embodiment

The example below relates to a composite code in which the cells are formed in an ordered array, and the cells are provided at least with a predetermined area having a color enabling the identification of the cells. For the first code in which data is defined in accordance with the color of the predetermined area, at least a part of the cells are defined as special cells for forming the second code, and the cells are provided with an area excluding the predetermined area in which identifiable marks are provided, and data is defined by the shape, size, orientation, color, arrangement pattern, or the like, and the presence or absence of the marks. Since the composite code is based on the first code, cells unique to the first code are also included, and the orientations of the first code and the second code are set to be the same. Note that the marks used in this embodiment include the subcells in which information can be set and the dot patterns in which information is defined that are used in the first embodiment, and the information dots and information division cells that are used in the tenth embodiment. In the first and the tenth embodiments, as the first code, data is defined by identifying the brightness and darkness of the cells by the dominant color of the cells, but in the following examples, data is acquired by identifying the color of the predetermined areas which are mainly located at the center of the cell and the color of which is regarded as the color of the cells. That is, a reference point is arranged at the center of a predetermined area or at the center of a cell as a virtual point that defines the position information of a cell by coordinate values, and the color of the reference point or a small area including the reference point (at least a part of a predetermined area) is used to identify the color of the cell. Note that in the first and the tenth embodiments described above, the center may be defined as a predetermined area and the color of the cell may be changed so that the marks can be identified. Furthermore, it can be used in combination with the present example.

Furthermore, the various marks of the first, the fifth, and the tenth embodiments can be used in combination with the present embodiment. Here, the positions of reference points, the orientation of the code, the predetermined area, marks, divisions, and the like are exemplified as examples. However, provided that the reference point is arranged in a predetermined area, it may be located at any position, the orientations of the code may be different between the first code and the second code, and as for a predetermined area, mark, division, or the like, provided that they can be formed (displayed, printed, or the like) and read, they may have any shape, size, orientation, color, number, arrangement position, etc. Note that a division refers to an area formed by dividing a cell into a plurality of sections and arranged with a predetermined area or marks. And if there are a plurality of them, the shapes, sizes, orientations, colors, or the like may differ from each other. However, if the colors of the plurality of predetermined areas are different, it is a special case and the positions of the predetermined areas must be recognized. If the positions and colors can be recognized, more information can be stored by the combinations of the positions and the colors. In such a case, it is necessary to arrange the predetermined areas by discriminating them with predetermined areas in which reference points to be read for the first code are provided In a composite code, it is needless to say that there is a large difference in the amount of information that can be embedded in the first code and the second code. However, when the QR code is used as the first code, by using functional patterns such as the finder patterns, the timing patterns, the alignment patterns, and the like formed in a QR code to perform correction even if a QR code is deformed and imaged, the arrangement positions of each cell, that is, the orientation of the composite code and the reference point of the predetermined area of each cell is derived. Furthermore, by using a reference cell or the like defined in example 4 described below, it is possible to perform much more precise correction than possible with the original first code, and based on this correction, it is possible to recognize the arrangement positions of the marks with which numerical information is defined and to read data from the second code. Note that the elements for correcting the cell positions of the composite code are preferably in the same code. However, they may be anywhere including the exterior of the code. Furthermore, when the cells are divided into a plurality of divisions, a division may be used as a reference cell which is arranged so that the division is arranged separately by preventing divisions to make contact with each other. Note that in examples 1 to 16 described below, constituent elements may be incorporated mutually and may be used in any combination. Furthermore, the present embodiment may be used by incorporating constituent elements of the first to the tenth embodiments, and the first to the tenth embodiments may be used by incorporating constituent elements of the present embodiment.

Example 1

FIG. 111 shows an example of a part of the composite code. The cells forming the composite code are arranged in an ordered array, and for FIG. 112, descriptions are provided to make the structure of the composite code easy to understand. For marks for defining information in the cells in descriptions in FIG. 3 and after, names such as information dots, information division cells, information settable subcells, dot patterns for defining information, and the like are used, and, in a composite code, cells forming the second code in which numerical information is defined are referred to as special cells. Divisions 1-0 (1-00 and 1-01) for each special cell are shown with solid lines. These solid lines are not drawn in the actual composite code. The circular predetermined area 2-0 at the center is formed of a dark-colored area 2-01 (black) or a bright-colored area 2-00 (white), and each predetermined area excluded area 2-1 (2-10 and 2-11) is a bright-colored area 2-10. For the bright-colored areas, the boundary between the predetermined area 2-00 (white) and the predetermined area excluded area 2-10 (white) in a cell is indicated with a circular dotted line, but in the actual composite code, this dotted line is not drawn. It is desirable to have the predetermined area 2-0 (2-00 and 2-01) arranged at the center of a special cell, but provided that formation and reading can be performed, it may be anywhere in a special cell. Furthermore, the number of predetermined areas 2-0 (2-00 and 2-01) may be plural, provided that the colors are the same. For the recognition of the colors of these predetermined areas 2-0 (2-00 and 2-01), reference points indicated by + marks in FIGS. 113(c) and 113(d) are provided in the predetermined areas, and by reading the first code, the coordinate values of the reference points of all of the cells are calculated, and the coordinate values of the reference points indicated by + marks can be acquired. Note that the + marks are not drawn in the composite code. Then, the color of a cell is identified by recognizing the color of the reference point or a small area (at least a part of the predetermined area) including the reference point. In this example, the first code data is defined with the two colors of black of the dark-colored areas 2-01 and white of the bright-colored areas 2-00 surrounded by a dotted line. However, provided that the colors of the predetermined areas 2-0 can be distinguished from each other, the colors do not have to be black and white. For example, it is sufficient if the color, brightness level, and the like of a predetermined area of the cell can be read by a code reader and can be distinguished from each other. In addition, the number of colors may be three or more. For each cell, for 2 colors there is 1 bit, for 4 colors there are 2 bits, and for 8 colors there are 3 bits. In the case of 8 colors with a total of 3 bits including RGB and the colors of the mixtures of two of them (C, M, Y), the color of the mixture of all three (W), and the color if none (B), that is, in the case of white, black, red, green, blue, cyan, magenta, and yellow, identification is easy. In addition, by forming four levels from white to gray to black, and two levels for red, green, blue, cyan, magenta, and yellow (generation of two different colors each that can be distinguished from each other by differentiating brightness, saturation, hue, or the like), 6 bits of information can be defined in one cell.

The shape of the predetermined area 2-0 is circular in the present example, but it may be a shape surrounded by line segments, a circle, an approximate circle, a rectangle, a polygon, or arbitrary line segments or curves. Furthermore, the predetermined area 2-0 of a cell may have the same shape and size as the special cell 1-0. In such a case, the special cell 1-0 is filled with one color. Note that in the generation of a composite code with two colors, it is possible to print with only one color that can be distinguished from the color of the medium on which the composite code is formed, and together with the medium color, if the two colors can be identified as the colors of the cells, there is a high-cost advantage. FIG. 113 shows a method of defining data by the second code. FIG. 113(a) is an example of a cell in which the predetermined area 2-0 (center part) is a dark-colored area 2-01, and FIG. 113(b) is an example of a cell in which the predetermined area 2-0 (center part) is a bright-colored area 2-00. In either case, circular marks 3-0 (3-00 and 3-01) are placed with a predetermined distance at eight locations in the vertical, horizontal, and 45° oblique directions from the reference point of the corresponding cell of the first code. And, numerical information is defined in accordance with the color of the marks at their arrangement positions.

Figure 116:
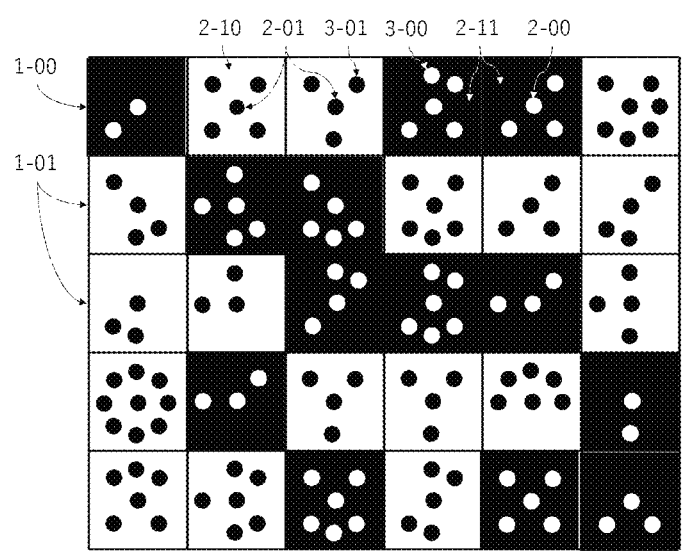
FIG. 116 is an example showing a part of a composite code in which the brightness or darkness of a cell is indicated by the brightness or darkness of its predetermined area, and the predetermined area excluded area has an opposite color.

In the present example, the reference point of a special cell 1-0 is arranged at the center of the cell, but the reference point may be arranged anywhere in the predetermined area provided that the color of the cell can be identified. In addition, the reference points arranged in the predetermined area, in a frame buffer (a two-dimensional image temporary storage area having XY coordinate axes) in which the captured composite code is recorded, may be obtained by calculations as described with reference to FIGS. 66 to 70, with the center coordinate values ($X_C$, $Y_C$) of the predetermined area 2-0 as the centroid of binarized n pixels (pixels) of which the center coordinate values of each pixel are ($X_i$, $Y_i$) as $X_C=(\Sigma X_i$, i=1 to n)/n and $Y_C=(\Sigma Y_i$, i=1 to n)/n. The color of this reference point or a small area (at least a part of the predetermined area) including the reference point is recognized as the color of a cell that can be distinguished from that of another. However, there are cases where the medium on which a composite code is formed is curved or the composite code is photographed with a camera tilted, and the composite code is significantly deformed, leading to a deviation of the coordinate values of the reference point calculated by reading the first code from the coordinate values of the reference point obtained from the imaged predetermined area 2-0. To allow the deviation, it is desirable to have the area of the predetermined area 2-0 be about 1/10 or more of the cell area so that the coordinate of the reference point of which values are calculated by reading the first code is included in the predetermined area. Note that when the surface on which composite code is formed retains its flat surface and it is photographed with a camera from the direct front (not tilted) or if the coordinate values of the reference point calculated upon reading the first code are deviated and the coordinate values are corrected so as to be included in the predetermined area 2-0, the area of the predetermined area may be about 1/20 or more of the cell area. As a correction method, in the composite codes of FIGS. 113(a) and 113(c), since the black colored dark-colored area 2-01, which is a predetermined area, is surrounded by a white-colored bright-colored area 2-10, by using any one of the various algorithms described in the fifth embodiment and the tenth embodiment, the predetermined area 2-0 of a cell can be easily extracted and by calculating the reference point of the predetermined area, correction can be performed with accuracy. However, with the composite codes of FIGS. 113(b) and 113(d), since a predetermined area cannot be extracted because it is a white colored bright-colored area 2-00, a reference point of a predetermined area of a white-colored bright-colored area 2-00 may be calculated by interpolation based on the reference points of the predetermined areas calculated for the composite codes of FIGS. 113(a) and 113(c). On the other hand, in the case of FIG. 116 described below, since the black colored dark-colored area 2-01 which is a predetermined area surrounded by a white-colored bright-colored area 2-10, and the white-colored bright-colored area 2-00 which is the predetermined area surrounded by a black colored dark-colored area 2-11, the predetermined area 2-0 of a special cell can be extracted, and thus any special cell can be accurately corrected by calculating the reference points of the predetermined areas 2-0.

The arrangement positions of the marks 3-0 are indicated by solid lined circles and are numbered from (1) to (8) (circled numbers in the figure, the same applies below). However, no solid lined circles or numbers are drawn in an actual composite code. Furthermore, the outer frame of the cells are shown with solid lines to make it easy to understand the geometrical relationship between a predetermined area 2-0, marks 3-0, and a special cell 1-0. However, this outer frame is also not drawn in an actual composite code. The centers of the mark 3-0 indicated by the x marks in FIGS. 113(*c*) and 113(*d*) are arranged at a predetermined distance (radius r indicated by the circular dotted line) from the reference point of the special cell 1-0 and arranged clockwise with respect to the orientation of the special cell 1-0 (upward direction of the composite code) with (1) at 0 degrees, (2) at 45 degrees, (3) at 90 degrees, (4) at 135 degrees, (5) at 180 degrees, (6) at 225 degrees, (7) at 270 degrees, and (8) at 315 degrees. The circular dotted line and the x mark are not drawn in the actual composite code. Similarly, they are not drawn in the following examples. In this example, each of the marks 3-0 from (1) to (8) are either bright-colored marks 3-00 (0, referring to bit information=0 or OFF, the same applies to 0 in the parentheses below) or dark-colored marks 3-01 (1, referring to bit information=1 or ON, the same applies to 1 in the parentheses below), and thus one mark defines one bit of information. Whether a mark is a bright-colored mark 3-00 (0) or a dark-colored mark 3-01 (1) is determined by identifying the color at the positions of x marks in FIGS. 113(*c*) and 113(*d*). This case is equivalent to a case where no mark 3-01 is placed in the predetermined area excluded area 2-10, and an arrangement where no marks 3-01 are placed can also be defined with information. Since there are eight mark 3-0 positions in one cell, it is possible to define 8-bit information in one cell. The 8-bit information is converted into data from the left in the order of (8), (7), (6), (5), (4), (3), (2), and (1). Of course, the order may be set in any manner. Regarding the definition of information by the marks 3-0, FIGS. 113(*c*) and 113(*d*) are examples in which circular marks are arranged in FIGS. 113(*a*) and 113(*b*), respectively, and the numerical information of 10100011 is defined in FIG. 113(*c*) and the numerical information of 11010110 is defined in FIG. 113(*d*).

In the present example, by reading the first code, the orientation of the code is recognized and thus the eight marks are arranged in predetermined directions from the reference point with a predetermined distance, but the predetermined direction and the predetermined distance may be set in anyway. Furthermore, as exemplified in the first and tenth examples, they may be arranged at any position in the cell. For example, instead of identifying the color of the position where the mark 3-0 is arranged as in the present example, combinations of arrangement patterns and code orientation which are both unique may be defined with numerical information.

The color of the mark 3-0 may be set to any color, as in the case of the color of the predetermined area 2-0 for identifying cells as described above, provided that the color is distinguishable. For each cell, for 2 colors there is 1 bit, for 4 colors there are 2 bits, and for 8 colors there are 3 bits. In the case of the eight colors, white, black, red, green, blue, cyan, magenta, and yellow, identification is easy. In addition, by forming four levels from white to gray to black, and two levels for red, green, blue, cyan, magenta, and yellow (generation of two different colors each that can be distinguished from each other by differentiating brightness, saturation, hue, or the like), 6 bits of information can be defined in one cell with one mark 3-0. Therefore, numerical information of 9 bits can be defined in one special cell 1-0 by combining the 8 arrangement positions (3 bits). Note that the plurality of colors that can be defined for the marks 3-0 may be set differently for each cell. This is because the colors of the marks 3-0 can be defined as numerical information of a cell if they can be distinguished from each other in the cell. Note that for the method of recognizing the color of the mark 3-0, in addition to recognizing the color of coordinate positions such as the center position included in the marks at the arrangement candidate positions of marks 3-0, any of the various bounding boxes described in example 10 may be used. In the present example, the mark 3-0 has a circular shape, but like the various marks exemplified in the first and the tenth embodiments, information may be defined by changing the shape (a shape surrounded by line segments, a circle, an approximate circle, a rectangle, a polygon, or arbitrary line segments or curves), the size, the orientation, and the like. The second code can define numerical information for each cell in accordance with the color, shape, size, orientation, and arrangement pattern of the marks 3-0. However, the method for defining numerical information for the second code may differ for each cell. This is because every cell is provided with an index depending on its position, and the cell indices can be obtained by reading the first code with a code reader. For the second code, the method of defining numerical information for each cell having an index may be set in advance. The data format information of the second code may be made to be acquired and the second code may be made to be read by storing such a method of defining numerical information, the error correction method, the data capacity, the data compression method, the encryption method, and the like as data format information in the first code and by having the first code be read. The special cell indices of the second code may be created based on this data format information and the cell indices of the first code.

Note that including the present example, all of the cells described in the figures described in the following examples are exemplified as special cells, but cells not shown that are not the special cells, similarly to the special cells, must have at least a predetermined area formed in the cell and the predetermined area must have a distinguishable color. Note that the cells other than the special cells may include cells having no predetermined area excluded area. That is, there may be cells where the whole area of each cell may have a distinguishable color like a conventional QR code.

Figure 114:
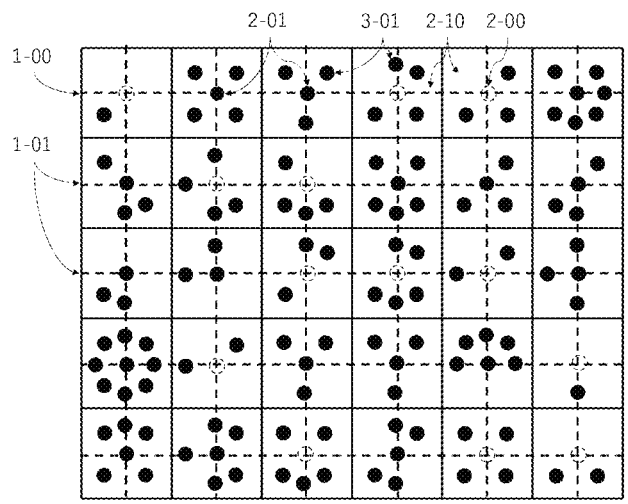
FIG. 114 is a diagram exemplifying a grid formed by connecting with virtual lines the reference points of dark-colored predetermined areas.

FIG. 114 shows a method of correcting a reference point detected upon imaging at a position deviated from the original position to the appropriate reference point. First, the position of the reference points arranged in the dark-colored cells are obtained using, for example, any of the various algorithms described in the fifth and tenth embodiments. Next, grid lines are formed by connecting the reference points with virtual straight lines in the vertical and horizontal directions, and the coordinate values of the grid points are determined to be the central coordinate values of the bright-colored cells. For bright-colored cells having no grid point, virtual grid lines may be drawn by interpolating or extrapolating at approximately equal intervals with a neighboring grid line to obtain the grid point.

The contents described in the present example can be applied to the composite codes described in the first embodiment, the fifth embodiment, the tenth embodiment, and the composite codes described hereafter. Furthermore, they may be used in any combination.

Example 2

Figure 115:
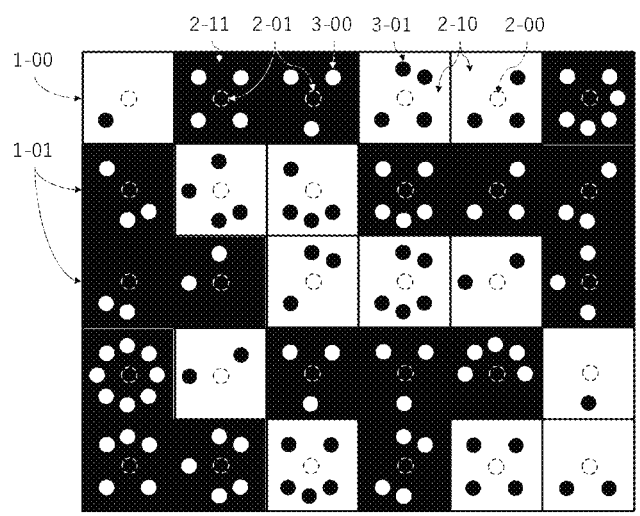
FIG. 115 is an example showing a part of a composite code in which the areas other than where the information dots are arranged are provided with the bright or dark color of the cells.

FIG. 115 shows an example of a cell in which when the circular predetermined area 2-0 at the center of a composite code shown in example 1 is a dark-colored area 2-01 (black), the predetermined area excluded area is set to be of the dark-colored 2-11, and when it is a bright-colored area 2-00 (white), the predetermined area excluded area is set to be of the bright-colored 2-10. A feature of the present example is that when the first code is an existing code such as a QR code or the like, the range that can be read by an existing code reader is widened. For example, for QR code readers, about half use the method of identifying the color at the center position of the cell and the about half that remains use the method of identifying the color of the whole cell. For the latter method, to recognize the predominant color of a cell as the distinguishable color of a special cell 1-0, the predetermined area 2-0 must have an area equal to or larger than a predetermined amount. In regards with the method of reading the QR code portion shown in FIGS. 111 to 113, only a code reader that performs identification with the color at the center position of a cell can be used, because the area of the predetermined area 2-0 of the cell is small. In the present example, by making the whole area excluding the area of the marks 3-0 be a predetermined area 2-0 having the color of the cell, the area of the predetermined area 2-0 can be widened, enabling existing QR code readers to read the QR code portion. If a reference point (center of the cell) for identifying the color of the cell is provided in the predetermined area, the QR code portion can be read with both of the above-mentioned reading formats. Note that in regards with for the area ratio of the predetermined area 2-0 to the cells, when the area of the predetermined area 2-0 and the area of the predetermined area excluded area 2-1 is about 1:1, it is not possible to determine which color the cell is. However, if the area of the predetermined area 2-0 and the area of the predetermined area excluded area 2-1 is about 2:1, it is possible to distinguish the two colors. That is, if the area ratio of the predetermined area 2-0 to the special cell 1-0 is 60% or more, the QR code portion can be read by a QR code reader that identifies the color of a cell by the color of the whole cell. More preferably, if the area ratio is ⅔ or more, recognition can be assured even if the photographing environment is bad. For identification by the color of the whole cell, recognition may be made by the color intensity (brightness or darkness), the hue (color), or the saturation (vividness) of the whole cell. In addition, discrimination may be possible by determining how many cells the predominant color of the cell corresponds to the original cell color upon increasing the color density of the predetermined area of the cell. For example, when white and gray are used as the two colors, by using black in the predetermined area of the gray cell, it becomes easier to determine the whole cell as a gray cell. Of course, the above reading method may be adopted in a dedicated composite code reader. The method of defining numerical information with the marks 3-0 arranged in the predetermined area excluded area 2-1 of the cells is the same as that described in the first example.

As a method of correcting a reference point detected upon imaging at a position deviated from the original position to the appropriate reference point, for example, one of the various algorithms described in the fifth and tenth embodiments may be used, and it is possible to calculate the position of a mark.

Example 3

There are cases where the medium on which a composite code is formed is curved or the composite code is photographed with a camera tilted, and the composite code is greatly deformed, and thus there are cases where the coordinates values of a reference point calculated by reading the first code are coordinate values outside the predetermined area. Therefore, it is necessary to calculate the coordinate values of a reference point of a predetermined area and correct them to the correct coordinate values of the reference point. However, in FIGS. 111 to 113, since the boundary between the bright-colored (white) predetermined area 2-00 and the bright-colored (white) predetermined area excluded area 2-10 cannot be recognized, the predetermined area 2-00 cannot be extracted.

Figure 117:
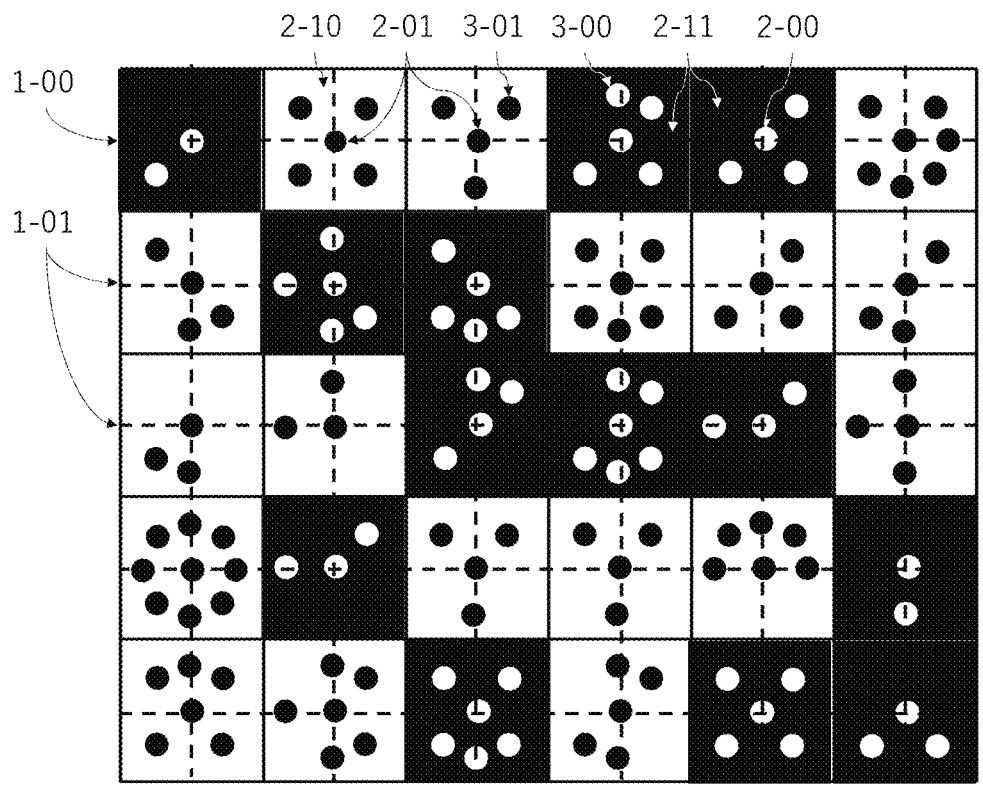
FIG. 117 is a diagram exemplifying a grid formed by connecting with virtual lines the reference points of bright-colored and dark-colored predetermined areas.

FIG. 117 shows a method of correcting a reference point detected upon imaging at a position deviated from the original position to the appropriate reference point. First, the positions of the reference points arranged in the bright-colored and dark-colored cells are obtained using, for example, one of the various algorithms described in the fifth and tenth embodiments. Next, the reference points are connected vertically and horizontally with virtual straight lines, and the coordinate values of the intersections are determined to be the central coordinate values of the bright and dark-colored cells.

Example 4

Figure 118:
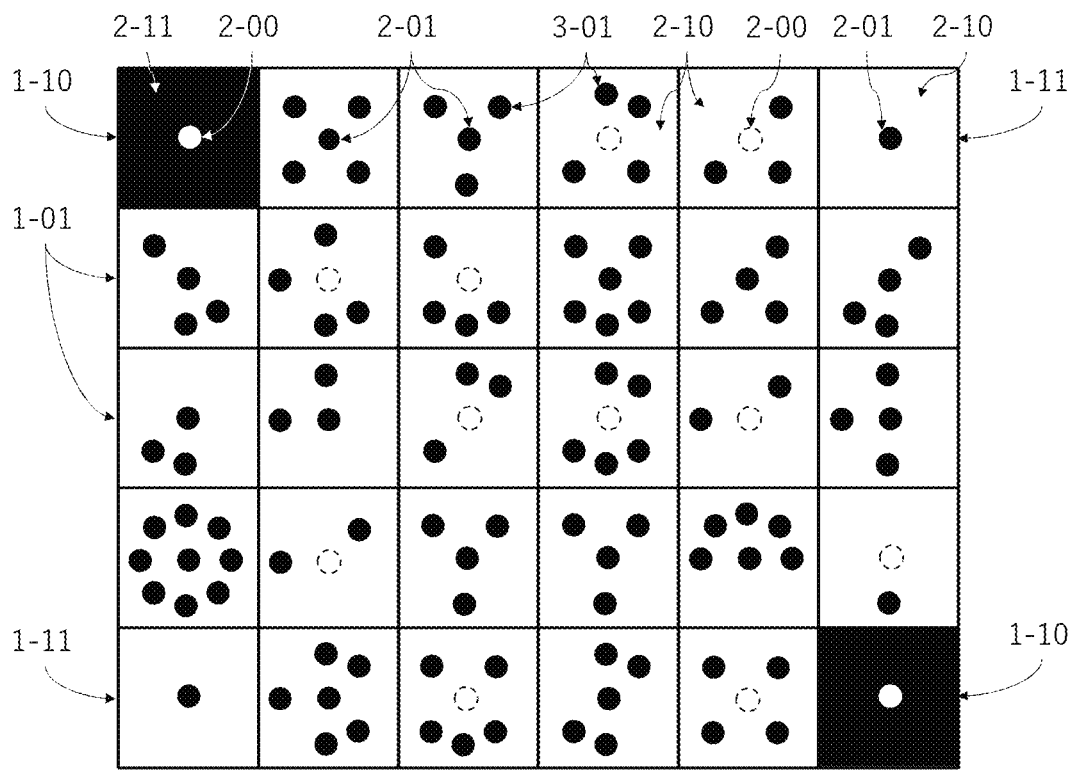
FIG. 118 is an example showing a part of a composite code in which bright-colored and dark-colored reference cells are arranged and information dots are shown in dark color.

FIG. 118 is an example showing reference cells 1-1 which are one type of special cell. Here, marks 3-0 are not arranged in the cells arranged in predetermined positions, and the predetermined area 2-0 of the cells are surrounded by a predetermined area excluded area 2-1 (an area having a color different from the color distinguishable as the color of the cell). The predetermined positions may be stored in a code reader or may be stored in the first code as the data format information of the second code. The method of storing position information of the reference cells 1-1 at predetermined positions may be applied to examples 5, 9, 10, and 12 described later. In this example, when the row number is from the top and the column number is from the left, the reference cells 1-1 are arranged at the predetermined positions of row 1-column 1, row 1-column 6, row 5-column 1, row 5-column 6 (the 4 corners). Thus, the extraction of the predetermined area 2-0 of a reference cell can be facilitated, and the coordinate values of the reference point are corrected as in the third example. In the reference cells 1-10 at row 1-column 1, row 5-column 6, a bright-colored predetermined area 2-00 is surrounded by a dark-colored predetermined area excluded area 2-11, and in those at row 1-column 6, row 5-column 1, a dark-colored predetermined area 2-01 is surrounded by a bright-colored predetermined area excluded area 2-10. In this example, the reference cells 1-1 are arranged, and interpolation is performed based on the reference points calculated from the predetermined areas 2-00 of the reference cells 1-10 and the other dark-colored predetermined areas 2-01, and the reference points of the bright-colored predetermined areas 2-00 are calculated, thus leading to the improvement of accuracy of cell identification. As an interpolation method, the calculated reference points may be connected by virtual lines in a grid shape, and the grid points in the bright-colored special cell may be used as reference points of the bright-colored predetermined areas 2-00. If the reference points of the bright-colored predetermined areas 2-00 are not formed as grid points, virtual grid lines may be drawn by interpolating or extrapolating at approximately equal intervals with a neighboring grid line to obtain the grid points, and they may be determined as the reference points of the predetermined areas 2-00. Since the reference points calculated from the dark predetermined areas 2-01 can also be used, although it depends on the number of cells that form the composite code, it is sufficient to place the reference cells 1-1 at intervals of 10 to 25 cells or more.

The reference points of the reference cells may be obtained using any of the various algorithms described in the fifth and tenth embodiments.

According to the present example, the coordinate values of reference points can be obtained with accuracy, and the data defined by the first and second codes can be obtained with accuracy even if the medium on which a composite code is formed is curved or the composite code is photographed with a camera tilted, and the composite code is greatly deformed. Note that this example may be applied to improve the recognition rate of existing two-dimensional codes such as the QR code, and more accurate coordinate values of the reference points may be obtained and used for cell identification. In such a case, the reference cells may be arranged at a predetermined interval, or in a predetermined range or all of the cells may be used as reference cells.

Figure 119:
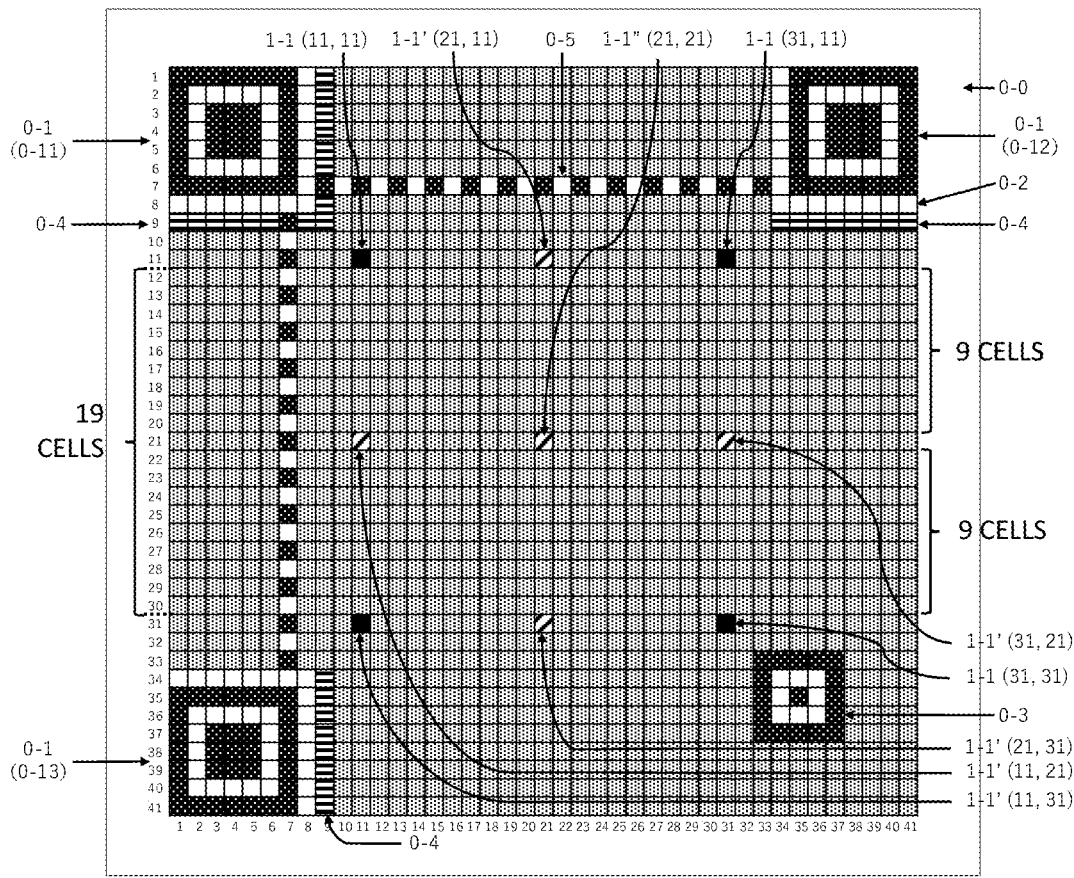
FIG. 119 is a diagram of an example of reference cells arranged in a version 6 QR code.

FIG. 119 shows an example in which the reference cells are arranged in a QR code of version 6 (41×41 cells). In the QR code, a quiet zone 0-0 is provided so as to surround the QR code, finder patterns 0-1 (0-11, 0-12, 0-13, respectively) are provided at upper-left, upper-right, and lower-left corners inside the quiet zone, and one or more alignment patterns 0-3 for correcting QR codes are arranged inward at predetermined positions from the vicinity of the lower-right. The alignment pattern 0-3 closest to an edge (quiet zone 0-0) is arranged with 4 cells in between from the edge. The QR code is provided with storage amount information corresponding to those of the versions 1 to 40 or the like, and format information sections 0-4 (data format information sections) that indicate how the data is arranged and what kind of data is arranged are provided near the 3 finder patterns 0-1. The timing patterns 0-5 are arranged from the upper-left finder pattern 0-11 to the upper-right finder pattern 0-12 in the horizontal direction, and from the upper-left finder pattern 0-11 to the lower-left finder pattern 0-13 in the vertical direction, starting from dark-colored cells with alternating bright and dark-colored cells. Furthermore, between an alignment pattern 0-3 and an alignment pattern 0-3, there are 11 to 25 cells depending on the version, and in line with the position of an alignment pattern 0-3, for the reference cells 1-1, as shown by the black cells in FIG. 119, as for the cells with cell numbers (11, 11), (31, 11), (31, 31), they are approximately 5 to 10 cells from the edges, and for the interval between a reference cell 1-1 and a reference cell such as between the cells with cell numbers (11, 11) and (31, 11), or (31, 11) and (31, 31), approximately 10 to 25 cells are appropriate. To form grid lines with high accuracy, it is desirable to arrange reference cells in the same row or column as shown. To improve the accuracy, the interval may be reduced to about half and the reference cells 1-1' at (21, 11) and (31, 21) with the hatched pattern in the figure, and also the reference cell 1-1" at (21, 11 21), or the like may be added. Although the reference cells are shown with a black or shaded pattern for the sake of clarity in the figure, they are actually cells in which reference marks or reference patterns are arranged. Like a QR code, the reference cells may be arranged at fixed positions, or the positions may differ for each composite code. For this kind of reference cell, it is desirable to make them recognizable by the above-mentioned special cell indices.

Figure 120:
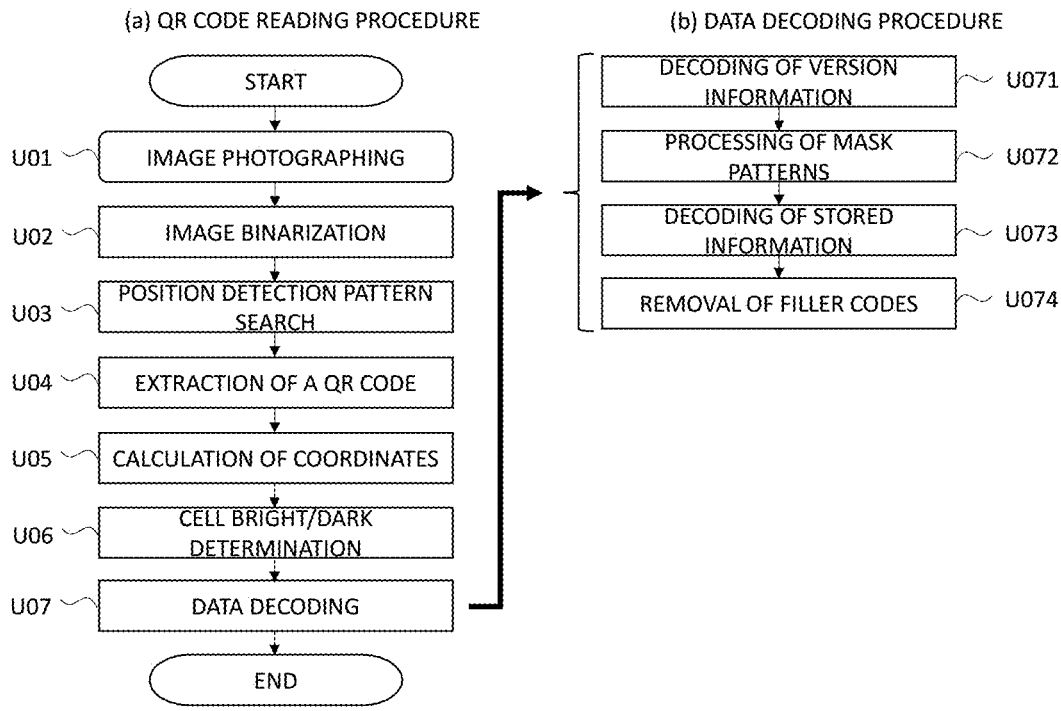
FIG. 120 is a flowchart exemplifying a QR code reading procedure.

An example of a QR code reading procedure will be described with reference to the flowchart of FIG. 120. A QR code is formed on printed material or displayed on a display or the like. First, the image is captured using a QR code reader. The QR code reader may be a QR code reader application installed on a smartphone or a dedicated QR code reader (U01). Depending on the method of photographing, the image may become somewhat unclear, but the image recorded in the frame buffer (a two-dimensional image temporary storage area having XY coordinate axes) is binarized to determine the brightness or darkness of each cell. (U02). Since the three finder patterns (position detection patterns) 0-1 occupy three corners of a QR code, which is convenient for extracting the QR code, the finder patterns 0-1 are searched for next. Since the finder pattern has a characteristic configuration of black:white:black:white:black=1:1:3:1:1, by using this as a lead, scanning is performed in the vertical, horizontal, or oblique directions, and the finder patterns are extracted. Also, one or more of the alignment patterns 0-3 are similarly extracted based on the characteristic configuration of black:white:black:white:black=1:1:1:1:1. (U03). Then, the QR code is extracted using the finder patterns 0-1 and the alignment patterns 0-3. (U04). The size, number, and position of the cells are calculated based on the center coordinate values of the three finder patterns 0-1 and the one or more alignment patterns 0-1, and in addition, the center coordinate values of each cell are obtained. The number of cells can be recognized together with the format information sections 0-4. Here, the timing patterns 0-5 may be used to calculate the number of arranged cells or the coordinate values of each cell. When a QR code is deformed when imaging, the center coordinates of all of the cells can be calculated by a projective transformation upon obtaining the center coordinate values of the three finder patterns 0-1 and alignment patterns 0-3. Furthermore, it may be possible to confirm whether the correction has been made correctly by using the timing patterns 0-5. (U05). Approximately half of the QR code readers determine the brightness or darkness of the cells based on the brightness or darkness of the center coordinate positions, and about half of the QR code readers that remain determine the brightness or darkness of the cells based on the average color intensity (brightness or darkness) of the whole cell, but since the center coordinate values are obtained and the distinction between cells is clear, it is possible to determine the brightness or darkness of the cells regardless of which method is used (U06). When the brightness or darkness of all of the cells becomes clear, the data is decoded and information is acquired (U07). The data decoding process includes model number information decoding (U071), mask pattern processing (U072), storage information decoding (U073), filler code removal (U074), and the like. Note that the mask pattern refers to a code pattern used for the process of optimizing the cell balance of bright and dark (black and white) to ensure the reading of a QR code, and the filling code refers to a temporary code that is used to fill the empty code word position does not indicate data when the number of code words does not fulfill the capacity of the symbol. Also, the process of decoding these data may be applied in the second code.

A method for reading the QR code is not limited to the method described above, and the QR code generated in accordance with the industrial standards may be read by any method for decoding data. Of course, the same applies when the QR code is used as the first code of a composite code.

Figure 121:
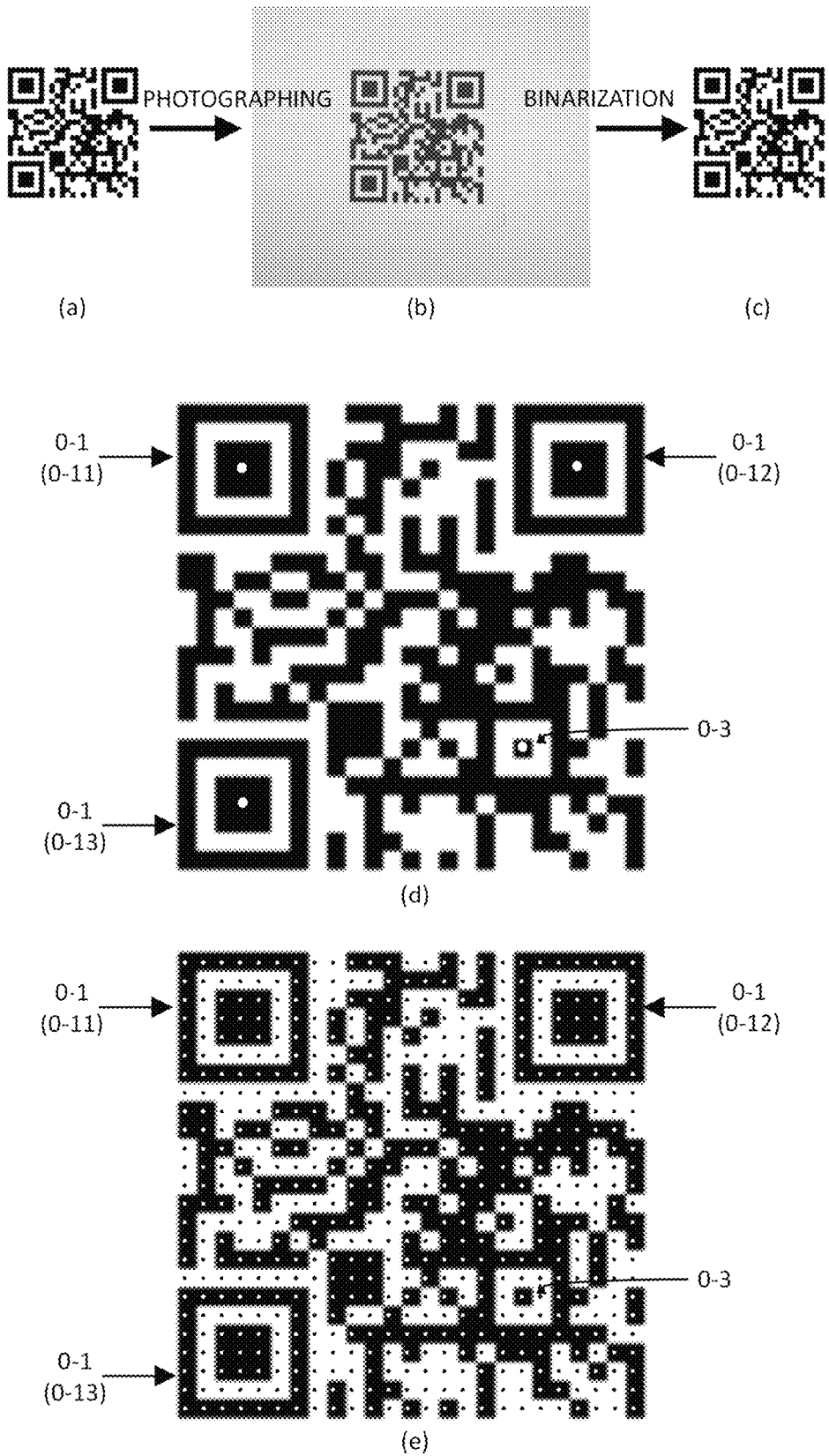
FIG. 121: (a) is an image of a formed QR code, (b) is an image of an actually imaged QR code, (c) is a binarized image of the imaged QR code, (d) is a diagram showing the center coordinates of the finder patterns and the alignment pattern, and (e) is a diagram showing the center coordinates of all of the cells.

FIG. 121 shows a process in which the coordinate values of each cell of a QR code is calculated in a QR code reading procedure. FIG. 121(*a*) shows an image of a QR code formed on printed material or displayed on a display or the like. FIG. 121(*b*) shows an image of the QR code captured by a reading apparatus. Thus, depending on the method of photographing, the image may become somewhat unclear. FIG. 121(c) is a QR code image obtained by binarizing the captured image. FIG. 121(d) is a diagram schematically showing the calculated center coordinate positions of the finder patterns 0-1 and the alignment pattern 0-3 as white circles. The actual coordinate position is a point and does not have the size of these white circles. Furthermore, such white circles are not drawn in the actual composite code. FIG. 121(e) shows a diagram in which the calculated center coordinate position of each cell is shown as a black circle in a bright-colored cell and as a white circle in a dark-colored cell for making understanding easy. The actual coordinate position is a point and does not have the size of these black circles or white circles. Furthermore, such black circles and white circles are not drawn in the actual composite code.

Figure 122:
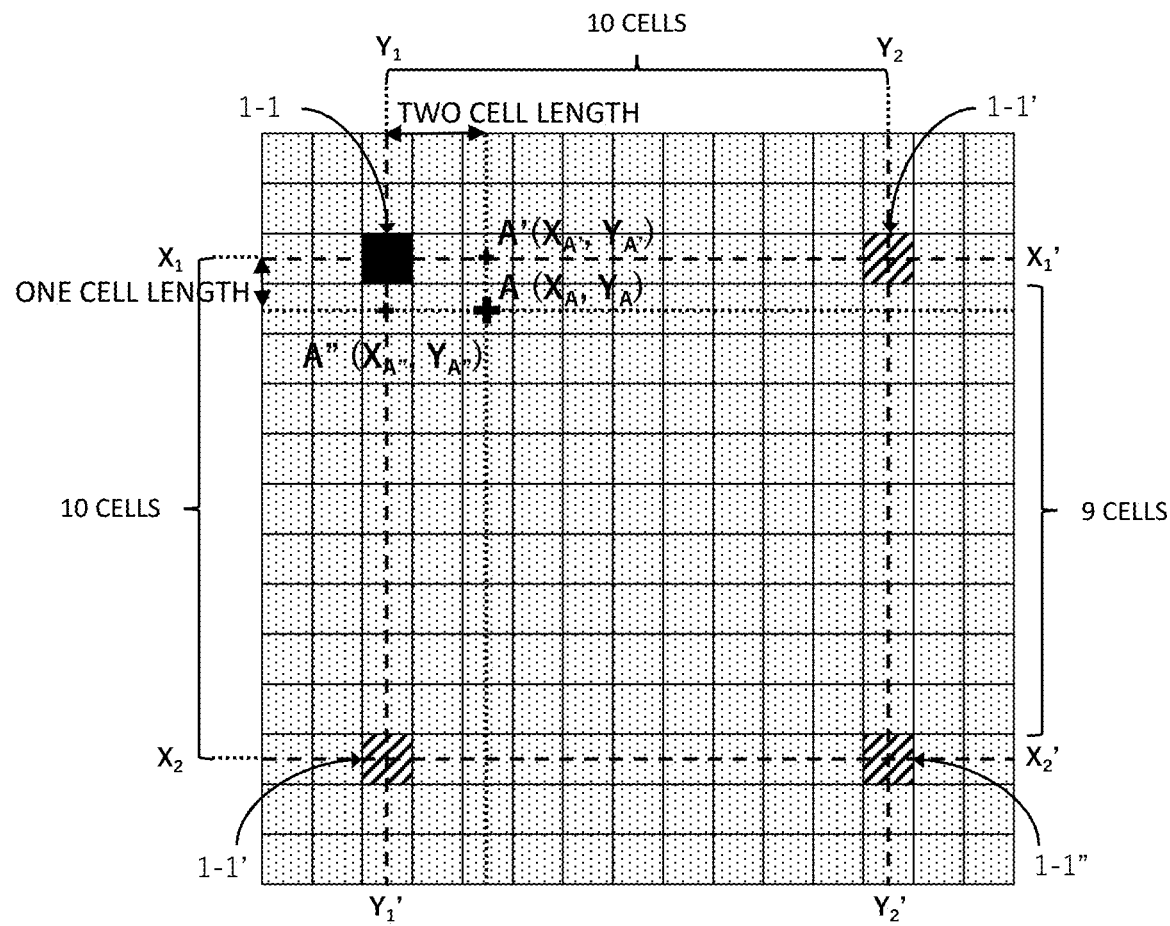
FIG. 122 is a diagram exemplifying a correction method of reference points by a grid based on reference cells.

FIG. 122 is an enlarged view of a part of the composite code of FIG. 119 and shows a method of correcting the reference point using this. After the reference points of the reference cells are obtained, the reference points are connected in a grid pattern with virtual lines (broken lines). Next, internal division points are obtained passing through the centers of each cell in the horizontal rows and vertical columns, and the internal division points in the same row or column are connected by virtual horizontal or vertical lines, respectively. In this way, each grid point of the formed grid line is obtained as a reference point of each cell. For example, since there is a distance of 10 cells between two reference points, the reference point A is obtained as a grid point of a virtual internal division line passing through a reference point A' obtained by internally dividing the distance by $2/10$ and A" obtained by internally dividing the distance by $1/10$.

In the QR code, since information is added with the second code while making use of the original characteristics of the first code, correction by the second code is performed while retaining the functional patterns of the first code. However, as a new code, it is possible to remove the alignment patterns 0-3 and correct the second code as an independent code by using reference cells or the like. In such a case, while the alignment pattern 0-3 used for correction or the like requires a total of 25 cells of 5×5, with only one reference cell, that is, with $1/25$, the same or a greater task can be achieved, and accordingly, the data area can be increased. Alternatively, a part of the alignment patterns 0-3 may be retained and used together with reference cells or the like. In such a case, reading cannot be performed with a conventional QR code reader and a new code reader is required.

Figure 123:
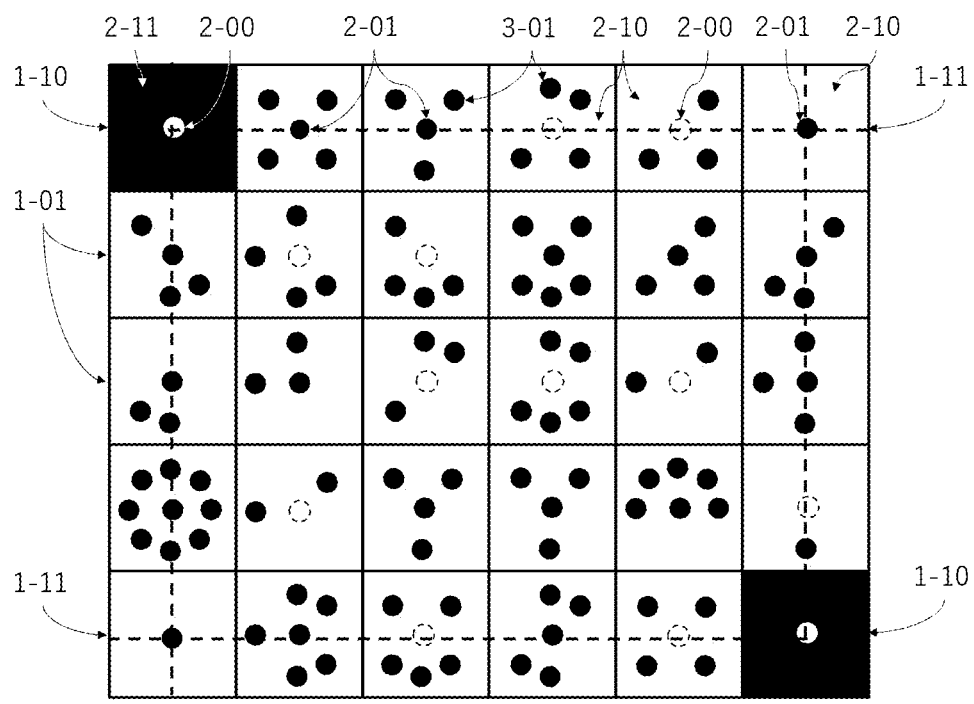
FIG. 123 is a diagram exemplifying a part of a grid formed by connecting with virtual lines reference points of bright-colored and dark-colored reference cells.
Figure 124:
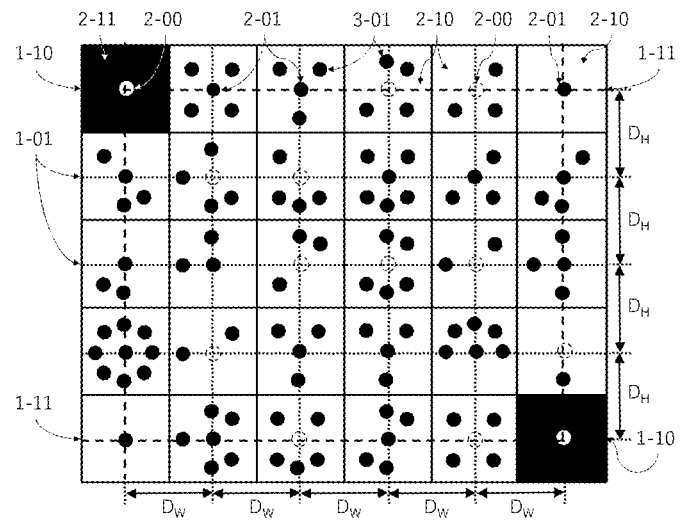
FIG. 124 is a diagram exemplifying a grid formed based on lines connecting reference points of bright-colored and dark-colored reference cells.

FIGS. 123 and 124 show more detailed virtual grid line drawing methods. First, as shown by the broken lines in FIG. 123, the reference points of the reference cells are connected by virtual lines. Next, as shown by the dotted lines in FIG. 124, internal division points or an external division points are obtained by interpolation or extrapolation of the broken lines, and when these points are connected, virtual grid lines passing through all of the cells can be formed, and with the grid points correction of the reference points of all of the cells is possible. Here, the horizontal and vertical grid lines are obtained by evenly dividing in the horizontal direction with a distance of $D_W$ and by evenly dividing in the vertical direction with a distance of $D_H$. Note that, although normally information is not added to the reference cells, it may be added. As for other special cells, they may be dummy cells to which no information is added. It is needless to say that if the amount of data of the second code is less than the storing capacity of information, a large number of cells of the first code that are not originally used as special cells may be provided as reference cells and used for correcting the reference points.

Example 5

Figure 125:
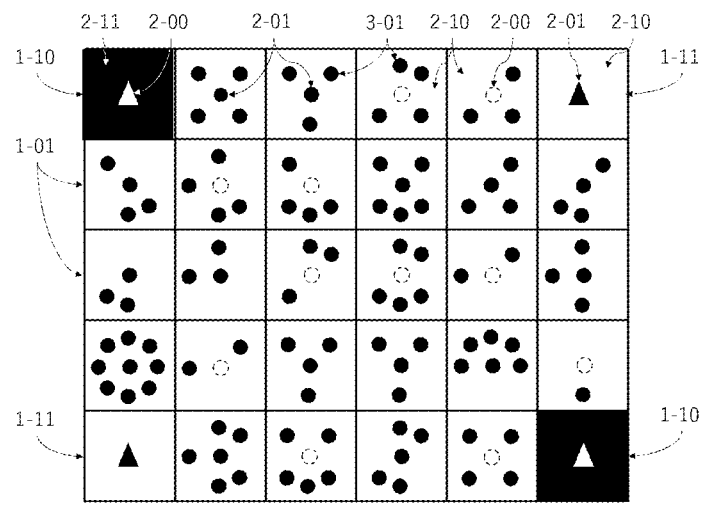
FIG. 125 is an example showing a part of a composite code in which bright-colored reference cells having a deformed predetermined area are arranged and information dots are shown in dark color.

FIG. 125 is an example in which the shape of the predetermined area 2-0 of a reference cell 1-1 of example 4 is an isosceles triangle with which orientation can be defined. Even if a captured composite code is greatly deformed and the correct orientation cannot be recognized, the orientation of a reference cell 1-1 can be accurately recognized with a predetermined area 2-0 of an isosceles triangle. Note that the shape of a predetermined area 2-0 of a reference cell 1-1 may be of any shape or size provided that the orientation can be recognized. Since the deviation of the orientation of a special cell 1-0 is smaller than the deviation of the coordinate values of a reference point, although it depends on the number of cells that form the composite code, it is sufficient to place the reference cells 1-1 at an interval of around 10 to 25 or more cells. Furthermore, the reference point of the predetermined area 2-0 of a reference cell 1-1 may be the centroid of an isosceles triangle. In such a case, it is desirable to have the centroid of the predetermined area and the center of the cell coincide. Even when the reference point and the centroid do not coincide, it is desirable to have the reference point and the center of the cell coincide. As a result, similarly to the fourth example, the coordinate values of the reference point of each cell can be obtained with accuracy. Note that numerical information may be defined by arranging marks 3-0 in this reference cell 1-1 with the avoidance of contact with the predetermined area 2-0. The same applies to a case where the predetermined area having other shapes or sizes is used. Of course, the reference points may be arranged in other positions.

Figure 126:
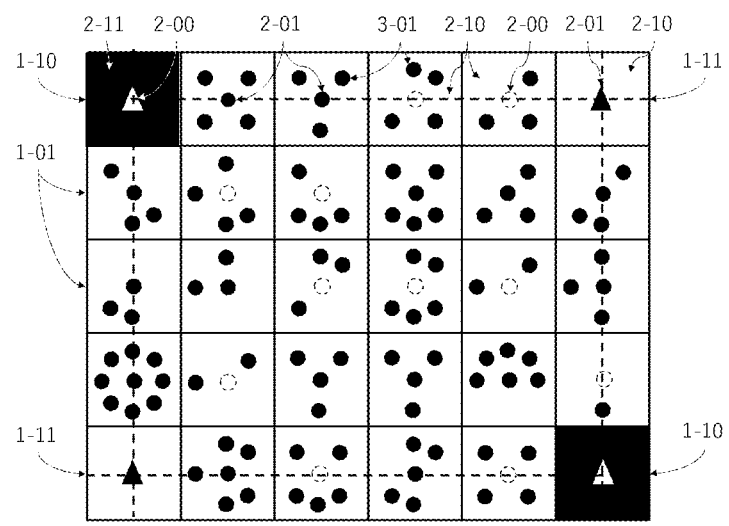
FIG. 126 is a diagram exemplifying a part of a grid formed by connecting with virtual lines reference points of bright-colored and dark-colored reference cells.

The reference points may be obtained using any of the various algorithms described in the fifth and tenth embodiments. FIG. 126 shows how to draw the grid lines. As an example of a case where the reference point of the predetermined area of a triangle and the center point of a cell coincide with each other, first, as shown by the broken lines, the reference points of the reference cells are connected by a line. Next, although not shown, for rows and columns in which no grid points exist, grid lines may be formed by interpolation or extrapolation and grid points may be obtained, as shown in FIG. 124.

Example 6

Figure 127:
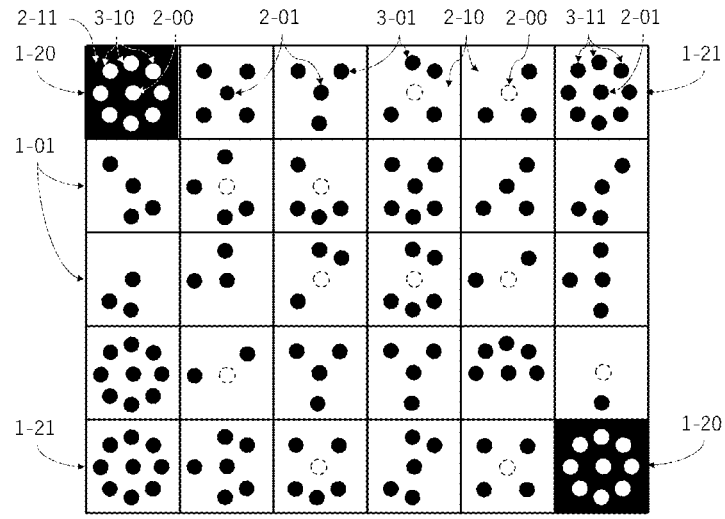
FIG. 127 is an example showing a part of a composite code where bright-colored and dark-colored reference cells in which a reference pattern is defined are arranged and information dots are shown in dark color.

FIG. 127 shows an example of a reference cell 1-2, which is one type of a special cell, in which a reference pattern is arranged, indicating clearly the geometrical relationship between the predetermined area 2-0 and the marks 3-0 in a special cell 1-0. All of the marks (reference marks 3-1) are arranged in the predetermined area excluded area 2-1 of a cell arranged at a predetermined position, and the predetermined area 2-0 of the cell is formed surrounded by the predetermined area excluded area 2-1 (an area having a color different from the color distinguishable as that of the cell). The predetermined position may be stored in a code reader or may be stored in the first code as data format information of the second code. Such a method of storing the position information of a reference cell 1-2 may be applied to examples 7, 11, and 13 described later. In the present example, when the row number is from the top and the column number is from the left, a reference pattern is formed in the cells at the predetermined positions of row 1-column 1, row 1-column 6, row 5-column 1, row 5-column 6 (4 corners). By calculating the center coordinate values of each mark 3-0 forming the reference pattern, even if an imaged composite code is largely deformed and the arrangement positions of the mark 3-0 are deviated from their original positions, it is possible to acquire numerical information with accuracy by referring to the reference patterns. In some cases, similar processing may be possible in other examples of the composite code having reference cells possessing reference patterns. In particular, being a method of calculating the mark positions of a special cell where it is difficult to distinguish the predetermined area and the predetermined area excluded area having the same bright color, it is effective as a method of supplementing the calculation method of obtaining reference points using grid lines formed based on reference points. Note that the arrangement positions of the marks 3-1 in the present example are the same as the candidate arrangement positions of (1) to (8) in FIGS. 113(*a*) and 113(*b*). However, the marks 3-1 may be arranged divided among a plurality of cells. For example, (1), (3), (5), (7) and (2), (4), (6), (8) can be formed in different neighboring cells and can be combined for use.

In the reference cells of row 1-column 1, row 5-column 6, the bright-colored predetermined area 2-00 is surrounded by a dark-colored predetermined area excluded area 2-11 and arranged with bright-colored reference marks 3-10, and in the reference cells 1-11 of row 1-column 6, row 5-column 1, the dark-colored predetermined area 2-01 is surrounded by a bright-colored predetermined area excluded area 2-10 and arranged with dark-colored reference marks 3-11. In the present example, since it is possible to accurately recognize the geometrical relationship between the reference points calculated from the predetermined areas 2-0 arranged at the center of the reference patterns and each mark 3-1 and also to obtained the reference points with accuracy, it is possible to accurately obtain reference points as in the fourth example. Note that since the deviation of each mark 3-0 with respect to a reference point is smaller than the deviation of the coordinate values of the reference point, although it depends on the number of cells that form the composite code, it is sufficient to place the reference patterns 1-1 at intervals of 10 to 25 cells or more.

Figure 128:
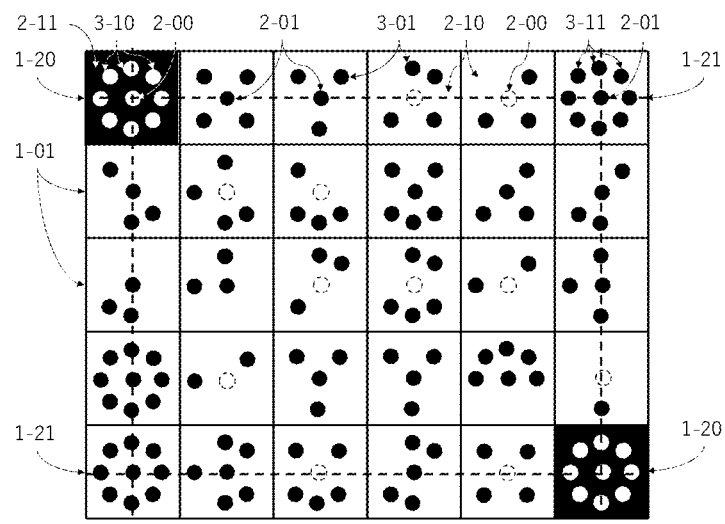
FIG. 128 is a diagram exemplifying a part of a grid formed by connecting with virtual lines reference points of bright-colored and dark-colored reference cells in which a reference pattern is defined.

The reference points may be obtained using any of the various algorithms described in the fifth and tenth embodiments. FIG. 128 shows how to draw the grid lines, and as shown by the broken lines, the reference points of the reference cells are connected by lines. Next, although not shown, for rows and columns in which no grid points exist, grid lines may be formed by interpolation or extrapolation and grid points may be obtained, as shown in FIG. 124. Note that the reference patterns may also be interpolated to obtain the geometrical relationship with more accuracy between the reference point of each special cell and each mark 3-0.

Also for reference cells configured with a reference pattern, the shape, size, orientation, color, number, arrangement position, or the like of the predetermined areas or marks may be of any type. Furthermore, when there is a plurality of them, the shapes, sizes, orientations, colors, or the like may be different from each other. In addition, provided that the reference points can be recognized, the color of the predetermined area and the predetermined area excluded area may be the same.

Example 7

Figure 129:
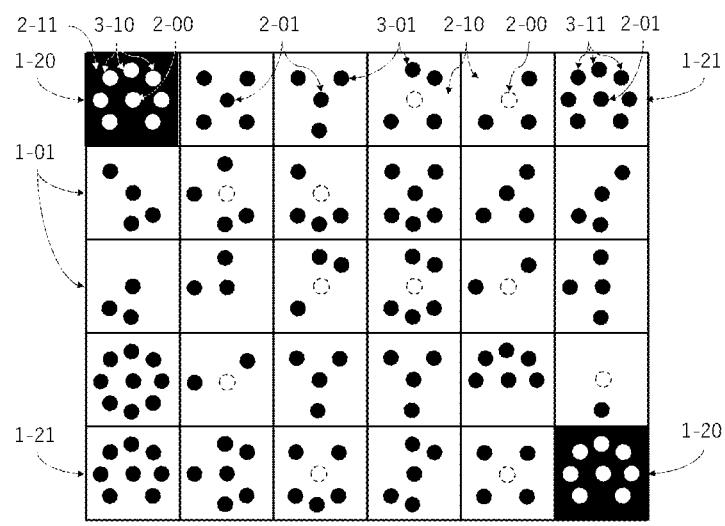
FIG. 129 is an example showing a part of a composite code where bright-colored and dark-colored reference cells in which a reference pattern is defined are arranged and information dots are shown in dark color.

FIG. 129 shows an example in which a reference pattern is formed by removing (5) from the marks (1) to (8) shown in FIGS. 113(*a*) and 113(*b*) in example 6. According to the present example, the arrangement pattern of the marks 3-1 is unique (non-rotationally symmetric), and thus orientation can be recognized, and since the reference pattern has a two-dimensional feature such as that in the sixth example, it is possible to obtain the same kind of effect as the effect described in the sixth example.

Figure 130:
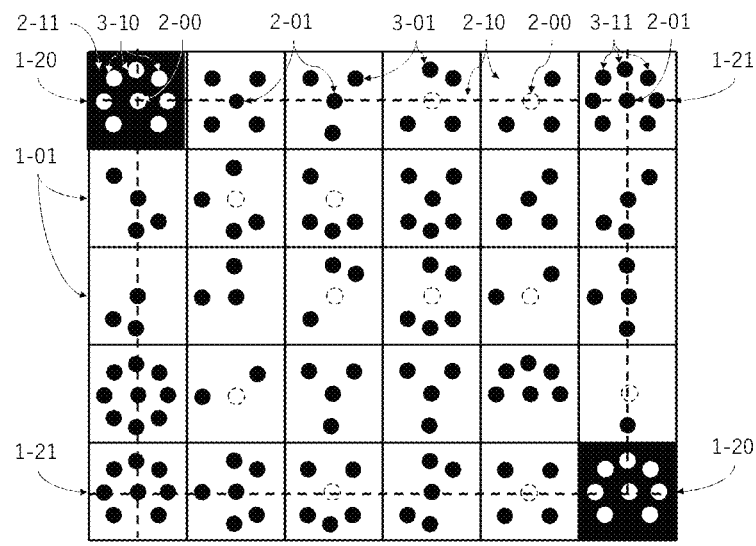
FIG. 130 is a diagram exemplifying a part of a grid formed by connecting with virtual lines reference points of bright-colored and dark-colored reference cells in which a reference pattern is defined.

The reference points may be obtained using any of the various algorithms described in the fifth and tenth embodiments. FIG. 130 shows how to draw the grid lines. First, as shown by the broken lines, the reference points of the reference cells are connected by lines. Next, although not shown, for rows and columns in which no grid points exist, grid lines may be formed by interpolation or extrapolation and grid points may be obtained, as shown in FIG. 124.

Example 8

Figure 131:
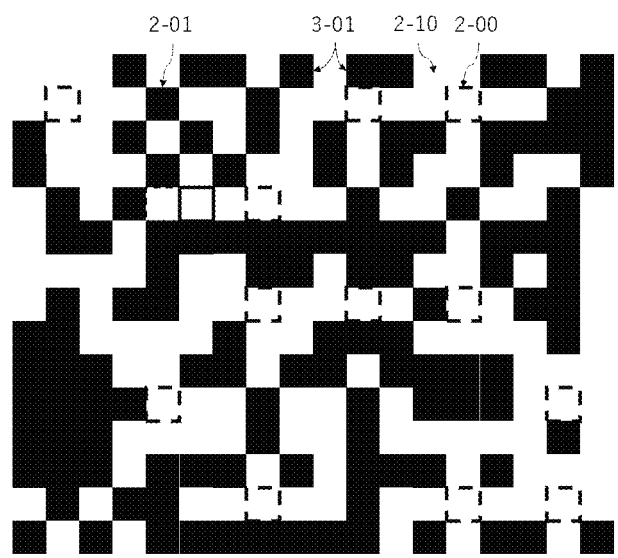
FIG. 131 is an example showing a part of a composite code showing the brightness or darkness of a cell by the brightness or darkness of its predetermined area.
Figure 132:
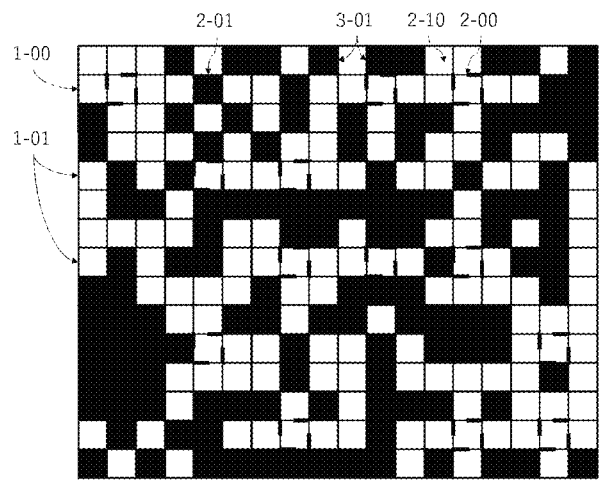
FIG. 132 is an example showing a part of a composite code showing the brightness or darkness of a cell by the brightness or darkness of its predetermined area.

FIG. 131 shows an example of a composite code in which a predetermined area 2-0 and the predetermined area excluded area 2-1 are formed in an area where a cell is divided into a plurality of areas as the second code, and marks 3-0 are arranged on the latter area. In drawings of FIG. 131 and related drawings thereafter, the bright-colored predetermined area is shown with dotted lines, but they are not drawn in the actual composite code. The cells forming the composite code are arranged in an orderly arrangement. Thus, in FIG. 132, to make the configuration of the composite code easy to understand, each special cell 1-0 (1-00 and 1-01) is drawn with solid lines for the outer frame, but the solid lines are not drawn in the actual composite code.

Figure 133:
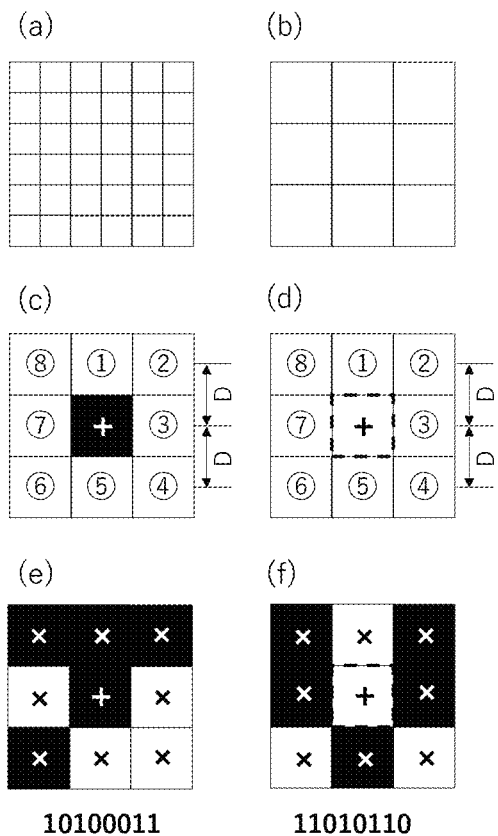
FIG. 133: (a) is a diagram showing a cell in 6×6 pixels, (b) is a diagram showing a cell in divisions of 2×2 pixels, (c) is a diagram showing the predetermined area of FIG. 133(b) in a dark color, (d) is a diagram showing the predetermined area in FIG. 133(b) in a bright color, (e) is a diagram showing a specific arrangement example of FIG. 133(c) along with corresponding numerical data.

In the present example, as shown in FIG. 133(*a*), in consideration of the degree of accuracy of the displaying and the reading resolution of smartphones widely distribution in the past, label printing at 300 dpi, and general office printers, it is desirable to form a special cell with divisions of 6×6 pixels or more. Note that when printing at 600 dpi, it is desirable to form a special cell with 12×12 pixels, but it is possible to read a special cell with 6×6 pixels if printing is performed with a high precision printing machine and if the camera has high-resolution. Since the general resolution of a camera of a current smartphone is 1980×1080 pixels (2.07 million pixels, full high-definition) or more, if this is regarded as the lower limit, to read a composite code generated in this way, it is desirable to recognize 2×2 (4×4 when printed with 12×12 pixels at 600 dpi) as one division in the division area, and thus for drawings in FIG. 131 and after, although the case of 6×6 pixels is used as a specific example, for convenience, one cell is shown as 3×3 divisions as shown in FIG. 133(*b*). The frames outlining these divisions are not drawn in the actual composite code. Note that since the resolution of a camera of current smartphones is becoming higher year by year, it may become possible to read predetermined areas 2-0 or marks 3-0 even if 2×1 divisions (2 pixels) in the division area are set as 1 division or 1 pixel is set as 1 division. Of course, the more the size of a cell is increased such as to 7×7 pixels, 8×8 pixels, 9×9 pixels, 10×10 pixels, or the like, the more information can be stored. In such a case, the composite code will have a large area. In this way, the configuration of a special cell is not limited to 6×6 pixels, and provided that the formation and reading are possible, a special cell may have any size and be configured with any number of pixels, and also, each division may have any shape and size, and the configuration may be of a combination of special cells of differing configurations.

The predetermined area 2-0 located with the same shape as the central division is formed with a dark-colored division 2-01 (black) in FIG. 133(c) and with a bright-colored division 2-00 (white) in FIG. 133(d), and the predetermined area excluded area 2-1 is shown with bright-colored divisions 2-10. In the bright-colored cell, a square dotted line is shown to clarify the boundary between the predetermined area 2-00 (white) and the predetermined area excluded area 2-10 (white), but this dotted line is not drawn in the actual composite code. To recognize the colors of these predetermined areas 2-0 (2-00 and 2-01), reference points indicated by + marks in FIGS. 133(c) to 133(f) are set within the predetermined areas, the first code is read, and the coordinate values of the reference points of all of the special cells 1-0 are calculated. The color of a cell is identified by recognizing the color of the reference point or a small area (at least a part of the predetermined area) including the reference point. In this example, data of the first code is defined by the two colors of black of the dark-colored predetermined area 2-01 and white of the bright-colored predetermined area 2-00 surrounded by a dotted line. However, provided that the colors of predetermined areas can be identified from each other, it is not necessary to have the colors be white and black. For example, provided that the colors can be identified from each other, the predetermined area can be read with a code reader with respect to color, level of brightness, or the like, and the number of colors may be three or more. For each cell, for 2 colors there is 1 bit, for 4 colors there are 2 bits, and for 8 colors there are 3 bits. In the case of 8 colors, identification is easy if they are white, black, red, green, blue, cyan, magenta, and yellow. In addition, by forming four levels from white to gray to black, and two levels for red, green, blue, cyan, magenta, and yellow (generation of two different colors each that can be distinguished from each other by differentiating brightness, saturation, hue, or the like), 6 bits of information can be defined in one cell.

The predetermined area of a cell may have the same shape, size, and orientation as the cell. In such a case, the cell 1-0 is filled with one color. Note that in the generation of a composite code with two colors, it is possible to print with only one color that can be distinguished from the color of the medium on which the composite code is formed, and together with the medium color, if the two colors can be identified as the colors of the cells, there is a high-cost advantage FIGS. 133(c) to 133(f) show a method of defining data in the second code. FIG. 133(c) shows an example of a special cell 1-0 in which the predetermined area 2-0 (central portion) is a dark-colored division 2-01, and FIG. 133(d) shows an example of a cell in which the predetermined area 2-0 (central portion) is a bright-colored division 2-00. In both cases, marks 3-0 (3-00 and 3-01) having the same shape and size as the divisions in which marks are to be arranged, are arranged at the eight positions in the vertical, horizontal, and 45° oblique directions from the reference point of the cell of the first code, information is defined by the colors of the marks at these arrangement positions. The coordinate values of the reference points of the special cells 1-0 are obtained from the first code in principle, but the coordinate values of the reference points for decoding the second code may be obtained from the second code. Furthermore, the coordinate values of the reference points for decoding the first code may be obtained from the second code. The method of using coordinate values of the reference points as described above may be applied to other examples.

In the present example, the reference points of the special cells 1-0 are arranged at the center of the cells, but the reference point may be arranged anywhere in a predetermined area 2-0 provided that the position enables the identification of the color of the cell. The color of this reference point or a small area (at least a part of the predetermined area) including the reference point is recognized as the color of a cell that can be distinguished from that of another.

However, there are cases where the medium on which a composite code is formed is curved or the composite code is photographed with a camera tilted, and the composite code is significantly deformed, leading to a deviation of the coordinate values of the reference point calculated by reading the first code from the coordinate values of the reference point obtained from the imaged predetermined area 2-0. To allow the deviation, it is desirable to have the area of the predetermined area 2-0 be about 1/10 or more of the cell area so that the coordinate of the reference point of which values are calculated by reading the first code is included in the predetermined area. Note that when the surface on which composite code is formed retains its flatness and it is photographed with a camera from the direct front (not tilted) or if the coordinate values of the reference point calculated upon reading the first code are deviated and the coordinate values of the reference point are corrected so as to be included in the predetermined area 2-0, the area of the predetermined area may be about 1/20 or more of the cell area In FIG. 133(c) and FIG. 133(d), the candidate arrangement positions of the marks 3-0 are shown by square solid lines indicating the divisions, and the numbers (1) to (8) are appended. However, neither these solid lines nor numbers are drawn in the actual composite code. Furthermore, outer frames of the cells are indicated with solid lines to make the geometrical relationship with the special cell 1-0 easy to understand, but neither are these outer frames drawn in the actual composite code. The center of the marks 3-0 indicated by the x marks shown FIGS. 133(e) and (f), are arranged clockwise with respect to the orientation of the special cell 1-0 (upward direction of the composite code), and (1) is in the 0° direction, (2) is in the 45° direction, (3) is in the 90° direction, (4) is in the 135° direction, (5) is in the 180° direction, (6) is in the 225° direction, (7) is in the 270° direction, and (8) is in the 315° direction, with a predetermined distance (the length D of one side of a division in the vertical and horizontal directions, and √2D in the oblique directions) from the reference point (center) of the special cell 1-0. In the first to seventh examples, the marks are placed at positions defined by specified directions and a specified distance, but it can be said there is a difference here in that both the directions and the distances are fixed. In this example, each of the marks 3-0 of (1) to (8) are either bright-colored divisions 3-00 (0: refers to bit information=0 or OFF, the same applies to 0 in the parentheses below) or dark-colored divisions 3-01, (1: refers to bit information=1 or ON, the same applies to 1 in the parentheses below), and thus 1 bit of information is defined. The determination of whether the color of a division is of a bright-colored division 3-00(0) or a dark-colored division 3-01(1) is made by recognizing and identifying the color at the x positions in FIGS. 133(e) and 133(f). Note that the color of the center of a division corresponding to the position where the mark 3-0 is arranged may be recognized for color identification. In the cases of the drawings of FIG. 133(c) and FIG. 133(d), they are equivalent to the cases where no marks 3-01 are arranged in the predetermined area excluded area 2-10, but such cells with no marks 3-01 can also be defined with information.

Since there are eight candidate arrangement positions for the marks 3-0 in one cell, 8-bit information can be defined in one cell. The 8-bit information is converted into data from the left in the order of (8), (7), (6), (5), (4), (3), (2), and (1). Of course, the order may be set in any manner. Regarding the definition of information by the marks 3-0, FIGS. 133(*e*) and 133(*f*) are examples in which marks having the same shape and size as the divisions in FIGS. 133(*c*) and 133(*d*) are arranged in the division area, respectively, and the numerical information of 10100011 is defined in FIG. 133(*e*) and the numerical information 11010110 is defined in FIG. 133(*f*).

Note that the method of forming divisions is arbitrary, and a division may have a rectangular shape, a triangular shape, a polygonal shape, or may be a division with curved lines. Furthermore, they may have any size or orientation. In the present example, the marks having the same shape as the divisions are arranged so as to fill the divisions. However, the marks may be arranged anywhere in the divided area, and provided that the marks can be formed and read, the marks may have any shape, size, orientation, or color, and be of any number. Furthermore, marks having different shapes, sizes, orientations, or colors, and are of different numbers may be arranged anywhere in the same cell or division.

Figure 134:
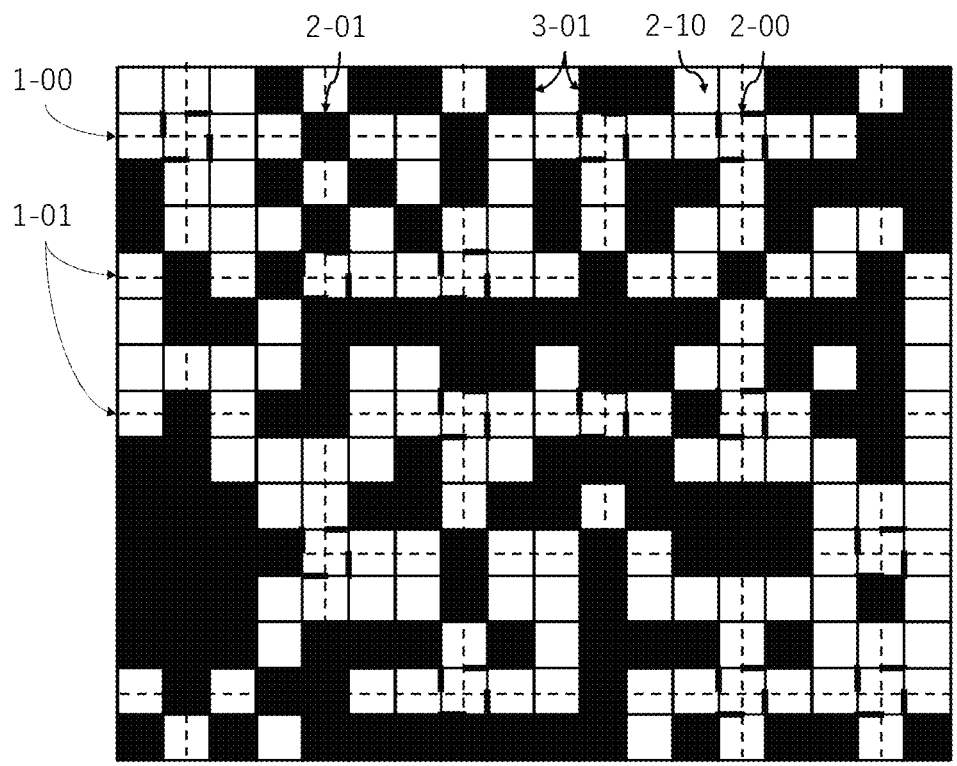
FIG. 134 is a diagram exemplifying a part of a grid formed by connecting with virtual lines reference points of bright-colored and dark-colored predetermined areas.

The reference points may be obtained using any of the various algorithms described in the fifth and tenth embodiments. FIG. 134 shows how to draw the grid lines. First, the reference points in the predetermined area of each special cell are connected by virtual lines. For the cells having no grid points, virtual grid lines may be interpolated or extrapolated and grid points may be obtained.

Example 9

Figure 135:
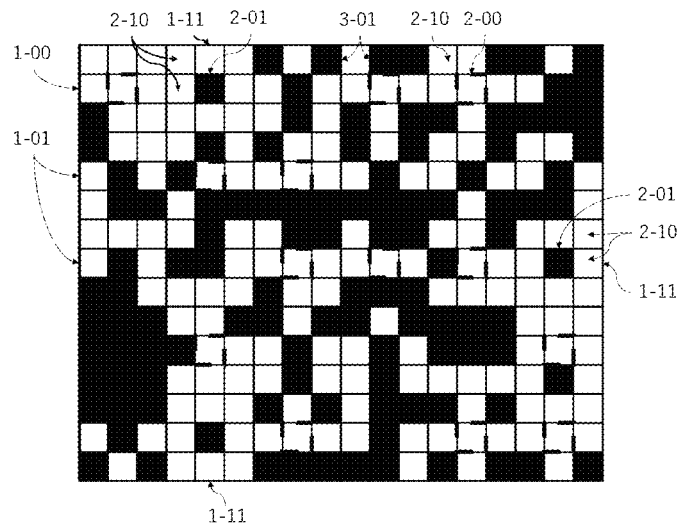
FIG. 135 is a diagram exemplifying a part of a composite code where dark-colored reference cells are arranged.

In FIG. 135, is an example in which marks 3-0 are not arranged in the cells arranged in predetermined positions, and the predetermined area 2-0 of the cells are surrounded by a predetermined area excluded area 2-1 (an area having a color different from the color distinguishable as the color of the cell). The predetermined positions may be stored in the code reader, or may be stored in the first code as data format information of the second code. In this example, when the row number is from the top and the column number is from the left, the reference cells 1-11 can be regarded as being arranged at the predetermined positions of row 1-column 2, row 3-column 6, and row 5-column 2. In any case, since the predetermined area 2-01 of the cells is surrounded by a predetermined area excluded area 2-10, the predetermined area 2-01 can be easily extracted, and accurate coordinate values of reference points can be obtained, and the coordinate values of other reference points can be corrected, as in the case of example 4. In this example, a dark-colored predetermined area 2-01 is arranged and a dark-colored special cell 1-01 in which marks 3-0 is not arranged is used as a reference cell 1-11. However, since the dark-colored special cells 1-01 are not necessarily arranged in a regular manner, there are cases where the reference cells 1-11 are arranged lopsidedly, and there is a possibility that the entire composite code cannot e corrected with evenly arranged reference points. Example 10 supplements this shortcoming.

Figure 136:
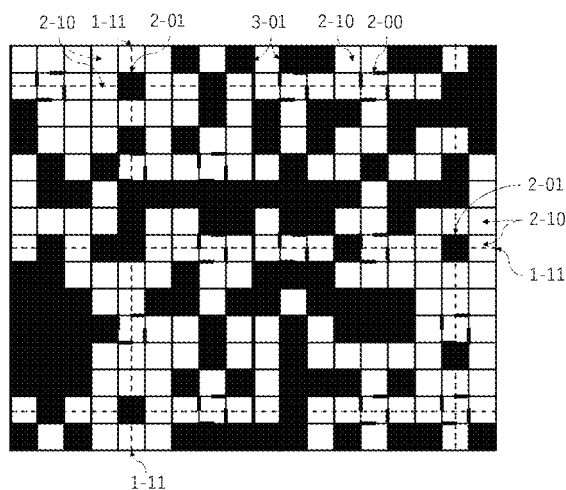
FIG. 136 is a diagram exemplifying a part of a grid formed by connecting with virtual lines reference points of dark-colored reference cells.

The reference points may be obtained using any of the various algorithms described in the fifth and tenth embodiments. FIG. 136 shows how to draw the grid lines. First, as shown by broken lines, the reference points of the reference cells are connected by virtual lines. Next, although not shown, in the rows and columns where no intersection exists, virtual grid lines may be formed by interpolation or extrapolation and grid points may be obtained, as shown in FIG. 124.

Example 10

Figure 137:
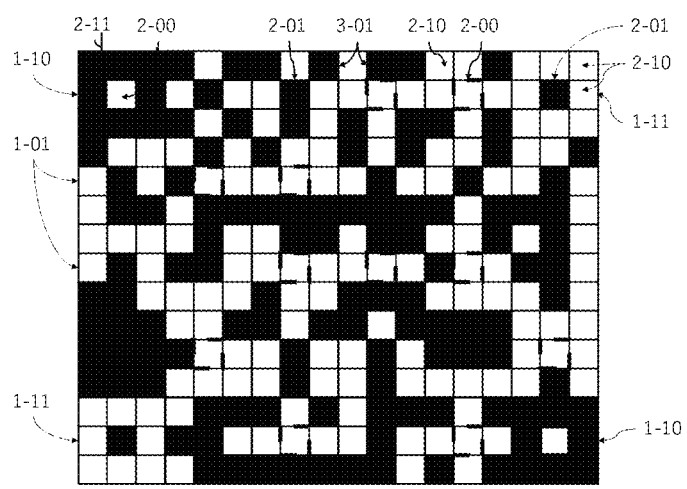
FIG. 137 is an example showing a part of a composite code where bright-colored and dark-colored reference cells are arranged.

FIG. 137 shows an example in which there are two colors of reference cells 1-1 arranged in accordance with a predetermined rule as shown in FIG. 118. In the reference cells 1-10 at row 1-column 1, row 5-column 6, the bright-colored predetermined area 2-00 is surrounded by a dark-colored predetermined area excluded area 2-11, and in the reference cells 1-11 at row 1-column 6, row 5-column 1, the dark-colored predetermined area 2-01 is surrounded by a bright-colored predetermined area excluded area 2-10. Therefore, similar to the ninth example and the like, it is possible to easily extract the predetermined areas 2-01 and obtain accurate coordinate values of the reference points. Compared to the ninth example, since the reference points calculated from the dark predetermined area 2-01 can also be used. although it depends on the number of cells that form the composite code, it is sufficient to place the reference cells 1-1 at intervals of 10 to 25 cells or more. Note that it is desirable to place at least a plurality of reference cells 1-1 in rows and columns in which at least special cells 1-0 are arranged. This is because if grid lines are drawn so as to include the reference points calculated from the reference cells 1-1 in the same row direction and column direction, all the reference points in the composite code can be obtained with accuracy from the grid points. If the reference cells 1-1 are arranged in a rectangular shape, it is easy to calculate the grid points with uniform accuracy. Furthermore, in the case of a large (large capacity) composite code formed by a large number of special cells 1-0, by arranging the reference cells 1-1 in a grid pattern, it is possible to address with certainty the curvature of a medium on which a composite code is formed and deformation when a composite code is photographed tilted by a camera, and it is possible to obtain the coordinate values of the reference points with accuracy and obtain the data defined by the first and second codes with accuracy. Note that such a reference point correction method can be used in all of the other examples, and can also be used to obtain cell position information of a conventional two-dimensional code such as a QR code having no second code.

Figure 138:
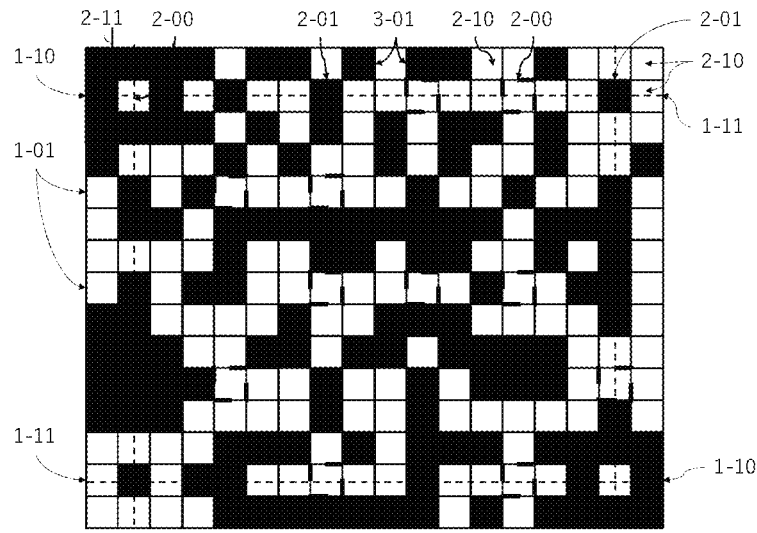
FIG. 138 is a diagram exemplifying a part of a grid formed by connecting with virtual lines reference points of bright-colored and dark-colored reference cells.

The reference points may be obtained using any of the various algorithms described in the fifth and tenth embodiments. FIG. 138 shows how to draw the grid lines. First, as shown by the broken lines, the reference points of the reference cells are connected by virtual lines. Next, although not shown, in the rows and columns where no intersection exists, virtual grid lines may be formed by interpolation or extrapolation and grid points may be obtained, as shown in FIG. 124.

Example 11

Figure 139:
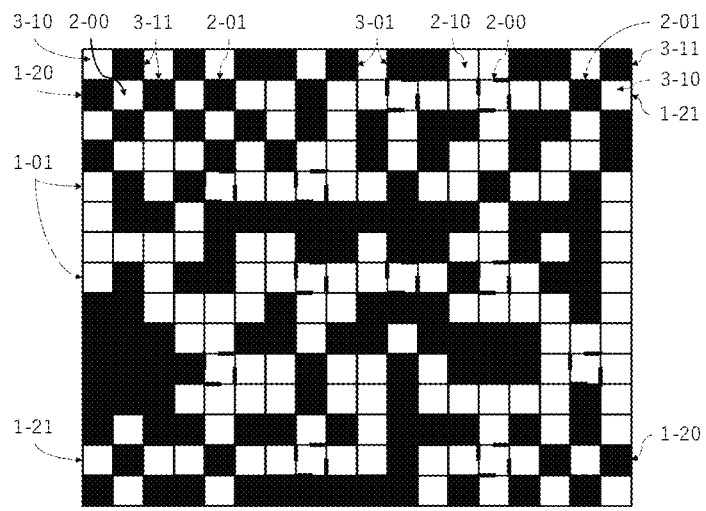
FIG. 139 is an example showing a part of a composite code where bright-colored and dark-colored reference cells in which a reference pattern is defined are arranged.

FIG. 139 shows an example of a reference pattern in which the geometrical relationship with a predetermined area 2-0 and marks 3-0 in a special cell 1-0 is indicated clearly. Regarding the reference cells 1-2 arranged at predetermined positions of the composite code, i) in the reference cells of row 1-column 1 and row 5-column 6, dark-colored reference marks 3-11 are arranged in the divisions on the left and right, above and below the bright-colored predetermined area 2-00, and bright-colored reference marks 3-10 are arranged in the 45° oblique directions, to form a reference pattern in reference cells 1-20. ii) in the reference cells of row 1-column 6 and row 5-column 1, bright-colored reference marks 3-10 are arranged in the divisions on the left and right, above and below the dark-colored predetermined area 2-01, and dark-colored reference marks 3-11 are arranged in the 45° oblique directions, to form a reference pattern in reference cells 1-21. As described above, since the predetermined area 2-0 is of a square shape in both the reference cells 1-20 and the reference cells 1-21, and the boundaries with the periphery can be recognized in regards with brightness and darkness, the coordinate values of the reference points can be obtained with accuracy. That is, the boundaries may be recognized by the vertical and horizontal lines, or the method of detecting dots may be used. As a result, even if the imaged composite code is greatly deformed and the coordinate values of the reference points obtained by the first code are deviated, they can be corrected. Furthermore, since the size of a predetermined area 2-0 (the same size as a reference mark 3-1) can be recognized with accuracy, from the boundaries of the bright-colored reference marks 3-10 and the dark-colored reference marks 3-10 arranged around the predetermined area 2-0, the center coordinate values of these marks 3-0 can be obtained with accuracy. Note that since the deviation of each mark 3-0 with respect to a reference point is smaller than the deviation of the coordinate values of the reference point, although it depends on the number of cells that form the composite code, it is sufficient to place the reference patterns at intervals of 10 to 25 cells or more.

Figure 140:
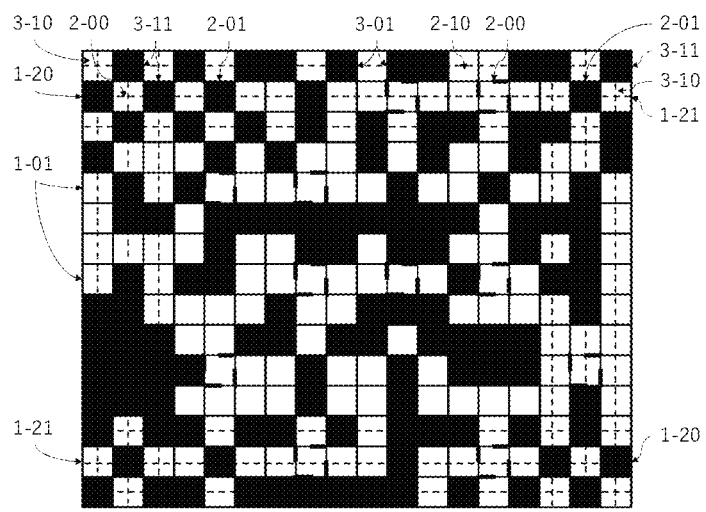
FIG. 140 is a diagram exemplifying a part of a grid formed by connecting with virtual lines reference points of bright-colored and dark-colored reference cells in which a reference pattern is defined.

The reference points may be obtained using any of the various algorithms described in the fifth and tenth embodiments. FIG. 140 shows how to draw the grid lines. First, as shown by the broken lines, the reference points of the reference cells are connected by virtual lines. Next, although not shown, for rows and columns in which no grid points exist, grid lines may be formed by interpolation or extrapolation and grid points may be obtained, as shown in FIG. 124. Furthermore, since the center coordinate values of each mark that defines the reference pattern are also obtained with accuracy, it is possible to use these for drawing grid lines for corrections. That is, it is possible to perform accurate corrections using marks in the place of predetermined areas. In the examples of FIGS. 128 and 130 as well, if the resolution is sufficiently high, grid lines can be drawn similarly.

Example 12

Figure 141:
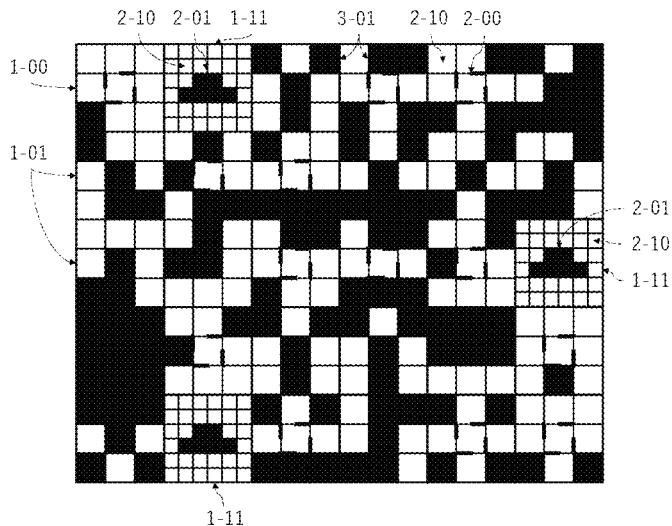

FIG. 141 shows an example in which a predetermined area 2-01 having a unique shape whose orientation can be recognized is arranged in the reference cells 1-1 of example 10 using the divisions described with reference to FIG. 133(*a*). Even if the captured composite code is greatly deformed and the correct orientation cannot be recognized, it is possible to recognize the orientation of the reference cell 1-1 with accuracy using the predetermined areas 2-01 having a unique shape. Note that the shape and size of a predetermined area 2-01 of a reference cell 1-1 may be of any shape and size, provided that orientation can be recognized. Since the deviation of the orientation of a special cell 1-0 is smaller than the deviation of the coordinate values of a reference point, although it depends on the number of cells that form the composite code, it is sufficient to place the reference cells 1-1 at intervals of 10 to 25 cells or more. Furthermore, the reference points of the predetermined areas 2-01 are preferably at the center of the reference cells 1-1, and the calculation formula of the first example can be used by applying a correction for obtaining the center coordinate values. As for the correction, since the shape of the predetermined area 2-01 is unsymmetrical in the vertical direction with regards with the center of the reference cell 1-1, and since it is formed with two pixels on the upper side and four pixels on the lower side, so that the center is deviated in the lower direction by half of $2/(2+4)=\frac{1}{3}$, $\frac{1}{6}$ pixels should be added. Note that since there is symmetry in regards with the horizontal direction, the x coordinate values do not need to be corrected. In the present example, the reference point arranged in the predetermined area can be obtained from the calculations of the center coordinate values $(X_C, Y_C)$ by $X_C=(\Sigma X_i, i=1 \text{ to } n)/n$ and $Y_C=\frac{1}{6}+(\Sigma Y_i, i=1 \text{ to } n)/n$ where the center coordinate values of each pixel are $(X_i, Y_i)$ and the centroid of the predetermined area is defined as the center of n pixels (pixels) which form the area and are binarized in accordance with the descriptions with reference to FIGS. 66 to 70 for the captured image of a composite code stored in the frame buffer (a two-dimensional image temporary storage area having XY coordinate axes), with $\frac{1}{6}$ pixels added in consideration of the shape and arrangement of the predetermined area 2-01. Thus, reference points can be obtained regardless of the shape and position of a predetermined area 2-01 by applying a correction as in the case described above.

Figure 142:
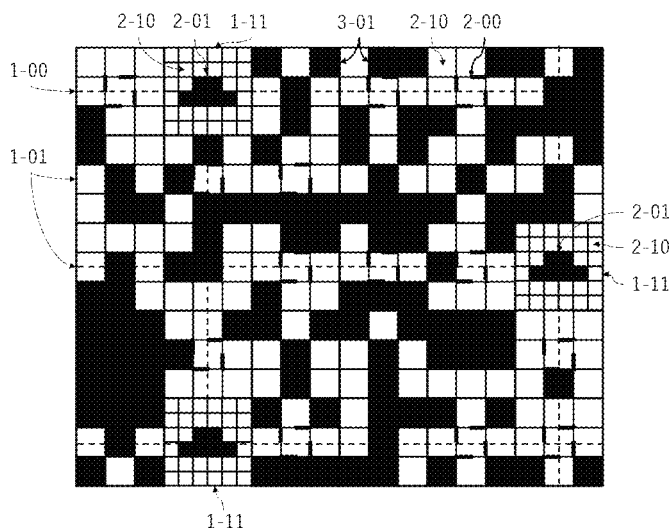

FIG. 142 shows how to draw the grid lines, in an example of a case where the reference point of a predetermined area coincides with the center of the cell rather than the centroid of the predetermined area, and first, as shown by the broken lines, the reference points are connected with virtual lines. Next, although not shown, in the rows and columns where no intersection exists, virtual grid lines may be formed by interpolation or extrapolation and grid points may be obtained, as shown in FIG. 124.

Example 13

Figure 143:
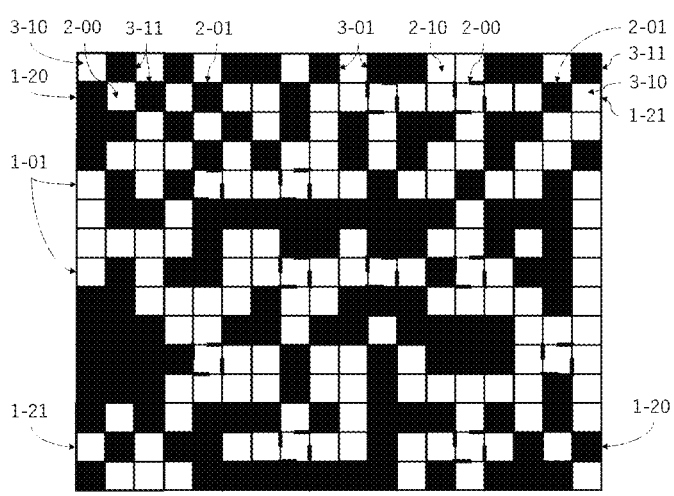
Figure 144:
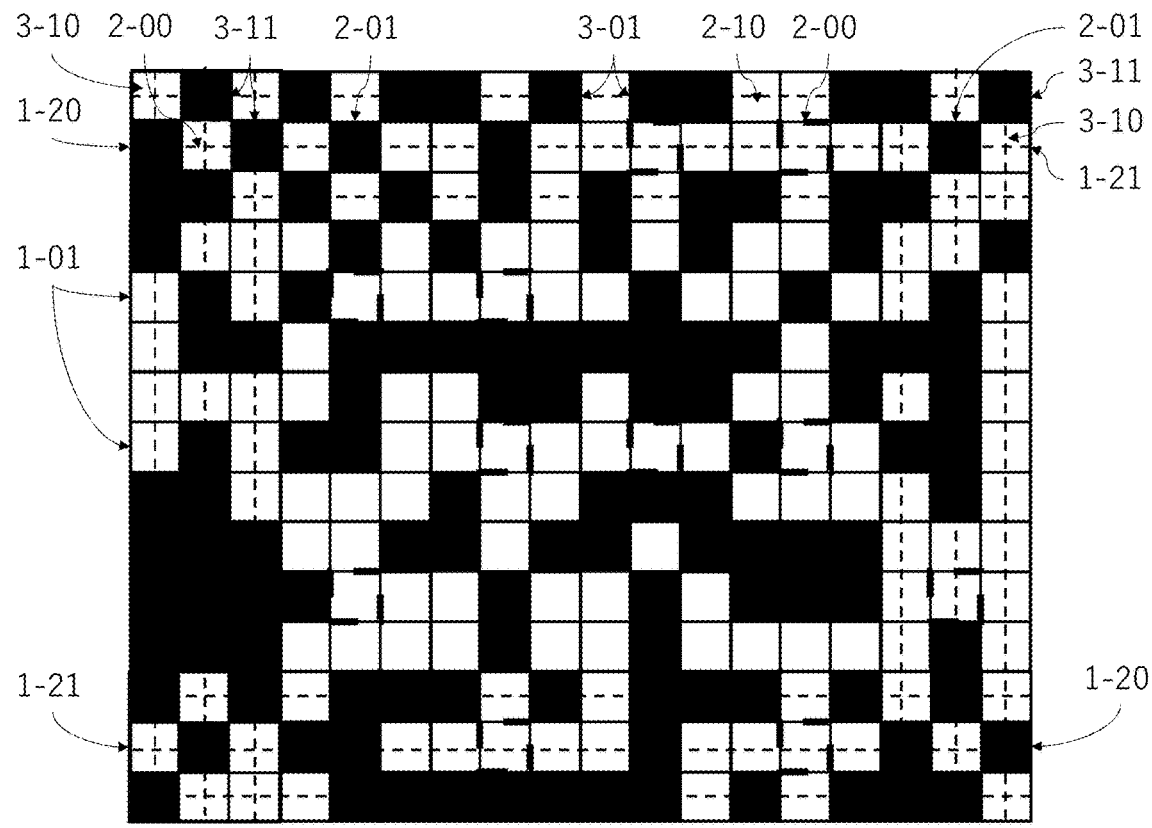

FIG. 143 shows an example of a reference pattern in which an element of orientation is added to the reference cell 1-2 of the eleventh example to indicate clearly the geometrical relationship with a predetermined area 2-0 and marks 3-0 in a special cell 1-0. As in the case of the eleventh example, the predetermined areas 2-0 are of square shape in both the reference cell 1-20 and the reference cell 1-21, and the boundaries with the periphery can be recognized in regards with brightness and darkness, the coordinate values of the reference points can be obtained with accuracy. That is, the boundaries may be recognized by the vertical and horizontal lines, or the method of detecting dots may be used. The difference with the eleventh example is that i) a dark reference mark 3-11 is arranged in the division in the lower-left 45° oblique direction with regards to the bright-colored predetermined area 1-20 of the reference cells at row 1-column 1 and row 5-column 6, thus forming a unique reference pattern that can indicate orientation, and ii) a bright reference mark 3-10 is arranged in the division in the lower-right 45° oblique direction with regards to the dark-colored predetermined area 1-21 of the reference cells at row 1-column 6 and row 5-column 1, thus forming a unique reference pattern that can indicate orientation. According to the present example, since the arrangement patterns of the marks 3-1 are unique (non-rotationally symmetric), it is possible to recognize orientation and to obtain the same kind of effect as the effect described in the seventh example The reference points may be obtained using any of the various algorithms described in the fifth and tenth embodiments. FIG. 144 shows how to draw the grid lines. First, as shown by the broken lines, the reference points of the reference cells are connected by virtual lines. Next, although not shown, for rows and columns in which no grid points exist, grid lines may be formed by interpolation or extrapolation and grid points may be obtained, as shown in FIG. 124. Furthermore, since the center coordinate values of each mark that defines the reference pattern are also obtained, it is possible to use these for drawing grid lines for corrections as in the case of FIG. 144.

Example 14

Since a code reader such as a current smartphone or the like is of high-resolution, even if the size of the marks 3-0 in examples 8 to 13 were half the size (a division from 2×2 to 1×2), they are sufficiently detectable. FIG. 145 shows an example in which, to obtain the reference points with high accuracy, the size of the predetermined area 2-0 is set to a 2×2 division as in examples 8 to 13, while the marks 3-0 are set to half the size with divisions of 1×2, to increase the number of divisions as compared with examples 8 to 13. Here, as shown in FIG. 145(*a*), as in the case of FIG. 133(*a*), 6×6 pixels are used as a reference, and FIG. 145(*b*) shows a specific example where one cell is divided in accordance with the sizes of the predetermined area and each mark. is described as. As in the cases of examples 8 to 13, the configuration of the special cell is not limited to 6×6 pixels, and provided that it can be formed and read, it may be of any size, and the number of vertical and horizontal divisions may differ. Furthermore, the shape, size, and orientation of each division may be of any type. Also, to obtain the reference points with high accuracy, it is desirable to have the predetermined area occupy the center division of the cell and to have the reference point be located at the center of the cell. However, the reference points may be anywhere provided that they can be formed and read. In this specific example, a 2×2 division is set as a predetermined area, and a 1×2 division is set as a mark, but they may be of any shape, size, orientation, or position provided that they can be formed and read. Also, they may be different in the same code. The features of the predetermined area in the present example are the same as those of the predetermined areas in examples 8 to 13.

FIG. 145(*c*) to FIG. 145(*f*) show a method of defining data in the second code. The predetermined area 2-0 located in the center division with the same shape is formed with a dark-colored predetermined area 2-01 (black) in FIG. 145(*c*) and a bright-colored predetermined area 2-00 (white) in FIG. 145(*d*), and here the predetermined area excluded area 2-1 is shown as a bright-colored predetermined area excluded area 2-10. In the bright-colored cells, a square dotted line is used to indicate clearly the boundary between the predetermined area 2-00 (white) and the predetermined area excluded area 2-10 (white) of the cell. This dotted line is not drawn in the actual composite.

In both FIG. 145(*c*) and FIG. 145(*d*), with respect to the reference point of the cell of the first code, the first division from the upper-right is set as a bright-colored division, and the second division from the upper-right is set as a dark-colored division with the divisions having the same shape and size as the division in which a mark is arranged, and the former is arranged as a bright-colored separation mark and the latter is arranged as a dark-colored header for indicating the starting point of data. Similarly, the first division from the lower-left is arranged as a bright-colored separation mark, and the second division is arranged as a dark-colored header. Thus, the first bright-colored division makes it easy to extract each header, and not only is the starting position of data made clear but also the dimensions of the mark can be obtained, and in addition, the position of each mark can be recognized with high accuracy. From the right header, mark numbers are assigned (1) to (8) clockwise with respect to the two outer rows, and the middle row is assigned (9) to (12) in a sequence from the left row, and information is defined by the colors of these 12 marks.

In the present example, the reference point of a special cell 1-0 is located at the center of the cell. However, provided that it is at a position where the color of the cell can be identified, the reference point can be located anywhere in the predetermined area 2-0.

In FIG. 145(*c*) and FIG. 145(*d*), the candidate arrangement positions of the marks 3-0 are shown by rectangular solid lines indicating divisions, and the numbers (1) to (12) are assigned, but these solid lines or numbers are not drawn in the actual composite code. Furthermore, the outer frames of the cells are indicated by solid lines to make the geometric relationship with the special cells 1-0 easy to understand, but neither are these outer frames drawn in the actual composite code.

In the present example, the marks 3-0 of (1) to (12) are bright-colored marks 3-00 (0: refers to bit information=0 or OFF, the same applies to 0 in the parentheses below) or dark-colored marks 3-01 (1: refers to bit information=1 or ON, the same applies to 1 in the parentheses below), and thus 1 bit of information is defined. Whether a mark is a bright-colored mark 3-00 (0) or the dark color mark 3-01 (1) is identified by recognizing the colors of the marks as in FIGS. 145(*e*) and 145(*f*). A cell in which no mark 3-01 is arranged can also be defined with information. Since there are 12 candidate arrangement positions for the marks 3-0 in one cell, 12-bit information can be defined in one cell. The 12-bit information is converted into data in the order of mark numbers (12) to (1). Of course, this order may be set in any manner. FIGS. 145(*e*) and 145(*f*) are examples in which marks of the same shape and size as the divisions in FIGS. 145(*c*) and 145(*d*), respectively, are arranged in the division area to define information, and the numerical information of 001010111010 is defined in FIG. 145(*e*) and the numerical information 101010101101 is defined in FIG. 145(*f*).

FIGS. 145(*e*) and 145(*f*) further show a specific example of a data scanning method. First, scanning is performed along an oblique line from the upper-right to the lower-left. In this scan, since an oblique line crosses the predetermined area, the predetermined area can be extracted and the reference coordinate value can be obtained with accuracy. Furthermore, since the bright-colored separation marks and the dark-colored header on both the left and right sides are crossed obliquely, their respective positions and dimensions are obtained. Once the header information is determined, the data defined by the marks is read in the order of the mark numbers by scanning the right column from the top to the bottom, the left column from the bottom to the top, and the center column from the top to the predetermined area, and then from the bottom to the predetermined area, based on the header information.

The examples given here are merely examples, and the header and the separation mark may be located anywhere provided that they can be formed and read. Also, the number of data marks may be increased by not placing a header or the like. Furthermore, the marks may be arranged in any manner, and if set in advance, the reading order may be different for each cell.

In addition, the method of forming divisions is arbitrary, and a division may have a rectangular shape, a triangular shape, a polygonal shape, or may be a division with curved lines. Furthermore, in the present example, the marks having the same shape as the divisions are arranged so as to fill the divisions. However, the marks may be arranged anywhere in the divided area, and provided that the marks can be formed and read, the marks may have any shape, size, orientation, or color, and be of any number. Furthermore, marks having different shapes, sizes, orientations, or colors, and are of different numbers may be arranged anywhere in the same cell or division. Furthermore, it is not necessary to have all of the special cells contain information data, and marks in each cell may include dummy marks.

Example 15

FIG. 146 shows examples of the arrangement of predetermined areas and marks and a method of defining information when the cell is divided by 8×8, as opposed to FIG. 133 and FIG. 145 in which the cell is divided by 6×6 for the second code. Of the contents described with reference to FIG. 133 and FIG. 145, those that would be duplicate descriptions are omitted below, but they can also be applied to the present example and may be used in combination. Furthermore, they are merely examples, and the cells of the composite code in the present example are not limited to these.

FIG. 146(*a*), 146(*d*), 146(*g*), 146(*j*), 146(*m*) show examples in which the arrangement positions of the marks 3-0 are provided at eight positions indicated by dotted lines in one cell, and 8-bit information can be defined in one cell. The 8-bit information is digitized by 1 bit each in the order of (8), (7), (6), (5), (4), (3), (2), and (1) from the left. FIG. 146(*p*) is an example in which the arrangement positions of the marks 3-0 are provided at 12 positions indicated by the dotted lines with respect to the predetermined area 2-0 indicated by the thick solid lines in one special cell, and 12-bit information can be defined in one special cell 1-0. The 12-bit information is digitized by 1 bit each in the order of (12), (11), (10), (9), (8), (7), (6), (5), (4), (3), (2) from the left. Each of the above-described marks is formed of 2×2 pixels for displaying on a smartphone and printing at 300 dpi. Note that when printing at 600 dpi, the marks are formed with 4×4 pixels. Note that in a cell, the thin solid lines indicating the divisions, the thick solid lines indicating the predetermined areas 2-0, and the dotted lines indicating the marks 3-0 are not drawn in the composite code.

FIGS. 146(*a*) to 146(*c*) show examples in which a void area is provided so that the marks 3-0 do not make contact with each other, and the predetermined area 2-0 is formed of 4×4 pixels. By recognizing the void area by a predetermined method, the arrangement of the marks can be obtained with accuracy. The color of the void area may be any color provided that it can be distinguished from the marks 3-01. There are a plurality of methods for recognizing the void area and the marks, and as described in reference with FIGS. 66 to 70 of the tenth embodiment and FIGS. 145(*e*) and 145(*f*), the marks 3-01 may be recognized by identifying the changing point of the colors of the marks on a line crossing over the void area. Note that other mark recognition methods described above may be used, or they may be combined to increase recognition accuracy. In FIGS. 146(*b*) and 146(*c*), the predetermined areas 2-0 are surrounded by a bright-colored predetermined area excluded area 2-10, and marks 3-01 is arranged in the area 2-10. Thus, the numerical information of 10011101 is defined in FIG. 146(*b*), and the numerical information of 01101010 is defined in FIG. 146(*c*). Note that in the present example, since a larger predetermined area 2-0 is placed, even if the reference point is slightly deviated, since it is included in the predetermined area 2-0, the cell color can be identified.

FIGS. 146(*d*) to 146(*f*), in contrast to FIGS. 146(*a*) to 146(*c*), show examples in which the predetermined area 2-0 is provided with a void area so that the predetermined area 2-0 does not make contact with the marks 3-01, and the predetermined area 2-0 is formed with 2×2 pixels. In the present example, the geometrical arrangement relationship between the predetermined area 2-0 and the marks 3-01 is clearer, and the recognition rate for the marks 3-01 can be improved. However, if the reference point is deviated because the predetermined area 2-01 is small, the color of the special cell 1-0 may be misidentified. This is because the area ratio of the predetermined area to the cell area is 4/64=0.0625, and when an image is photographed with the optical axis of the camera tilted with respect to the composite code formation surface, if the area ratio falls below ¹⁄₁₀, then the coordinate values of the reference point obtained with deviation upon the reading of the first code may not be included in the predetermined area 2-0, and a color different from the color of the predetermined area 2-0 may be recognized. As a correction method, the correction may be performed as in examples 9 to 13 including reference cells 1-1 or reference cells 1-2, or the predetermined area 2-01 may be recognized from the color near the reference point, the reference point may be corrected based on the predetermined area 2-01, and the marks 3-01 may be recognized from the geometrical arrangement relationship between the predetermined area 2-01 and the marks 3-01. Alternatively, the predetermined area 2-01 may be recognized by identifying the changing point of the colors of the marks on a line crossing over the void area.

FIGS. 146(*g*) to 146(*i*) show examples of the predetermined area 2-0 formed including the void areas provided in FIGS. 146(*a*) to 146(*c*). As a result, the area ratio of the predetermined area 2-0 is (4×4+2×8)/(8×8)=½ with respect to the area (the number of pixels) of the special cell 1-0. Although the numerical information is slightly reduced, by arranging at least two marks 3-0 having the same color as the predetermined area 2-0, the sum of the marks 3-0 having the same color as the predetermined area 2-0 can be determined to be (32+4×2)/64=0.625. Thus, since the ratio is 62.5% and the area ratio of the predetermined area to the cell area exceeds 60%, the QR code portion can be read by a QR code reader which identifies cells by the color of the whole cell. In this case, the numerical information of a special cell 1-0, originally 8 bits=256, is 256−($_8C_0+_8C_1$)=247, which is only a slight decreased of 9. It is more desirable to have at least three marks 3-0 of the same color arranged. As a result, (32+4×3)/64=0.6875, and the area ratio exceeds ⅔, and thus the QR code portion can be read even with a current QR code reader with reliability. In this case, the numerical information of a special cell 1-0 is 256−($_8C_0+_8C_1+8C_2$)= 219, and the numerical information is not significantly reduced. According to the above description, for QR code readers, about half which use the method of identifying the color at the center position of the cell and the about half that remain which use the method of identifying the color of the whole cell, both can read the QR code portion of a composite code, while having the amount of information of the second code be secured, and versatility is enhanced. In the present example, for the defined numerical information in binary numbers, the mark 3-01 is 1 and the mark 3-0 is 0. When a mark 3-0 of the same color as the predetermined area 2-0 is 1, in FIG. 146(*i*), numerical information of 10010101 is defined.

FIG. 146(*j*) to FIG. 146(*l*) show examples where the special cell 1-0 is provided with a void area so that the marks 3-01 do not come into contact with other adjacent cells, and the predetermined area 2-0 is formed of 2×2 pixels. As a result, the marks 3-01 can be clearly distinguished from other cells to prevent misidentification. Note that since the predetermined area 2-0 is 2×2 pixels and small, there is a possibility that the reference point is not obtained in the predetermined area 2-0, and thus, it is desirable to perform the same correction of the reference points as in the cases of FIGS. 146(*d*) to 146(*f*).

FIGS. 146(*m*) to 146(*o*) show examples where the void area in FIGS. 146(*j*) to 146(*l*) is provided as an area having the same color as the predetermined area 2-0 with separation to form the predetermined area 2-0. Thus, similarly to FIGS. 146(*g*) to 146(*i*), by arranging at least two or three marks 3-0 of the same color as the predetermined area 2-0, the area ratio is 62.5% or a value exceeding ⅔, respectively, and thus the QR code portion can be read by a QR code reader which identifies cell color by the color of the whole cell. Note that when a mark 3-0 of the same color as the predetermined area 2-0 is set to 1, the numerical information of 0010101 is defined in FIG. 146(*o*) as in FIG. 146(*i*). In the present example, numerical information is reduced as in FIGS. 146(*g*) to 146(*i*), but it is not greatly reduced, and thus the QR code portion of the composite code can be read with any kind of QR code reader, while having the amount of information of the second code be secured, and versatility is enhanced.

In FIGS. 146(*p*) to 146(*r*), it is possible to arrange up to 12 marks 3-01 around the predetermined area 2-0 of 4×4 pixels, and when a mark 3-0 of the same color as the predetermined area 2-0 is set to 1, the numerical information of 010111100111 is defined in FIG. 146(*q*), and 10101010111010 is defined in FIG. 146(*r*). When a mark 3-0 of the same color as the predetermined area 2-0 is set to 1, the numerical information of 010010100101 is defined in FIG. 146 (*r*). To recognize the twelve adjacent marks 3-0 with accuracy, it is necessary to recognize the coordinate values of the reference points and the geometric arrangement relationship between the reference points and the mark 3-0 with accuracy. As the recognition method for these, any of the methods already described in the examples may be implemented.

As in FIGS. 146(*s*) to 146(*u*), the predetermined area 2-0 in FIGS. 146(*p*) to 146(*r*) may be changed from 4×4 pixels to 2×2 pixels, and a void area may be provided between the predetermined area 2-0 and the marks 3-0 as in FIGS. 146(*d*) to 146(*f*). In such a case, by defining the area excluding the predetermined area 2-01 as a bright-colored area 2-10 in FIG. 146(*t*), and by defining the area excluding the predetermined area 2-00 as a dark-colored area 2-11 in FIG. 146(*u*), it is possible to provide an identifiable void area surrounding the predetermined area 2-0. As a result, in the present example, the predetermined areas 2-0 and the reference points can be recognized with accuracy, the geometrical arrangement relationship with the marks 3-0 becomes clearer, and the recognition rate of the marks 3-0 can be improved. Such an identifiable a void area surrounding the predetermined area 2-0 may be applied to FIGS. 146(*d*) to 146(*f*).

(Flowchart of a Composite Code Generation Procedure)

A procedure for generating a composite code will be described with reference to the flowchart of FIG. 147. As an example, a QR code is used as the first code.

As a procedure for generating the composite code shown in FIG. 147, first, the version of the QR code is determined in accordance with the amount of information to be stored, and a cell array based on the version is generated. Here, the error correction level is also determined. The error correction level may be changed as needed (U11). Next, the cells of the data area (the area excluding the areas of functional patterns essential for QR code correction such as the finder patterns, the separation pattern of the finder patterns, the timing patterns, the alignment patterns, and the like, and format information sections, model number information sections, and the like) are divided into a predetermined number of divisions (U12). A predetermined area is set in these cells, and data of the first code is defined (U13). Then, special cells are set based on the data to be stored in the second code. Note that cells not used as special cells of the second code need not be divided, and the shape of the predetermined area may be the same as the shape of the cells. That is, the cells may be cells of a conventional QR code. The data format information and the special cell indices of the second code may be stored in the reading apparatus, the first code, or the second code. Note that the special cell indices of the second code may be created based on the data format information of the second code and the cell indices of the first code. Alternatively, recognition may be made based on the shape of the predetermined areas and the presence or absence of marks. The second code may be stored by arranging special cells in the cells forming the above-described functional patterns of the original QR code (U14). Then, in accordance with the special cell indices, marks are arranged in divisions set based on numerical information defined for each cell to form the data (U15). If the reading order information is separately stored, the reading order may be changed. Reference cells defining reference points and reference patterns are arranged as necessary. Information may also be defined in the reference cells (U16).

(Specific Information and Specific Areas in a Composite Code)

In the ninth embodiment (definition of a composite code), from the phrase written "the second code having special information corresponding to at least a part of the said first code is exemplified by a second code with a digital signature to data expressed with a bar code or a character string such as that of alphanumeric characters, kanji, katakana, and hiragana which is a first code as in the fourth and the fifth embodiments," it is apparent that the description suggests that the specific information includes a digital signature, that is, encrypted information. Furthermore, from the descriptions that the following cases are also included in all of the electronic authentications described in FIGS. 47 to 54 of the sixth embodiment, the specific information including the encrypted information may be stored in the first code which includes the QR code or the second code which includes a dot code.

In a case where the encoded information of QR code data is encrypted into encrypted information by an encryption means and stored in the dot code.

In a case where the encoded information of QR code data is encrypted into encrypted information by an encryption means and stored in the QR code.

In a case where the encoded information of dot code data is encrypted into encrypted information by an encryption means and stored in the QR code.

In a case where the encoded information of dot code data is encrypted into encrypted information by an encryption means and stored in the dot code.

In a case where the encoded information of QR code data is encrypted into encrypted information by an encryption means and stored in the dot code, and the encoded information of dot code data is encrypted into encrypted information by an encryption means and stored in the QR code.

In a case where the encoded information of QR code data is encrypted into encrypted information by an encryption means and stored in the QR code, and the encoded information of dot code data is encrypted into encrypted information by an encryption means and stored in the dot code.

In a case where encrypted information obtained by encrypting the encoded information of a data string formed of QR code data and dot code data by an encryption means is stored in the QR code.

In a case where encrypted information obtained by encrypting the encoded information of a data string formed of QR code data and dot code data by an encryption means is stored in the dot code.

Furthermore, the specific information may include not only encrypted information but also encoded information, and similarly, from the descriptions that the following cases are also included in all of the electronic authentications described in FIGS. 55 and 56 of the sixth embodiment, the specific information including the encoded information may be stored in the first code which includes the QR code or the second code which includes a dot code.

In a case where the encoded information of QR code data is stored in the dot code.

In a case where the encoded information of QR code data is stored in the QR code.

In a case where the encoded information of dot code data is stored in the QR code.

In a case where the encoded information of dot code data is stored in the dot code.

In a case where the encoded information of QR code data is stored in the dot code and the encoded information of dot code data is stored in the QR code.

In a case where the encoded information of QR code data is stored in QR dot code and the encoded information of dot code data is stored in the dot code.

In a case where encoded information of a data string formed of QR code data and dot code data is stored in the QR code.

In a case where encoded information of a data string formed of QR code data and dot code data is stored in the dot code.

Not only in the case above, information other than data for forming information (including error correction codes) used by the user, such as data format information of the second code, may be stored as specific information in the first code and/or the second code. Also, it is desirable to store specific information in a specific area set in a partial area of the first or second codes. Note that when the QR code is used as the first code, the filling area may be used to store the specific information. The above-described specific information and/or specific area may be used in combination with other examples.

(Error Correction Coding and Data Storage in Special Cells)

Here, an example of error correction coding and data storage is shown below. (1) The number of special cells of the original QR code that can store the data is derived by the subtraction of the finder patterns 0-1, the finder pattern separation patterns 0-2, the timing patterns 0-5, the alignment patterns 0-3, the format information sections 0-4, and the like. For example, for QR code version 2, since 375 cells can be used as 8 bits each, the amount of information that can be stored is 375 bytes. In this case, by also giving the cells of the timing pattern 0-5 (16) the role of special cells, the number of data storable cells 375 is obtained by subtracting the total number of cells 250 of the finder patterns 0-1 (49×3=147), the separation patterns 0-2 (15×3=45), the alignment patterns 0-3 (25), and format information sections 0-4 (17+8×2=33) from the number of all of the cells (25×25=625). (2) The number of Reed-Solomon codes to be used is calculated. Since 375/255+1=2, the code length of each RS code is 375/2=187. (3) A Reed-Solomon code of a predetermined encoding rate is encoded. From $GF(2^8)$ (n, k, d)=(187, 148, 40), the amount of information after encoding is 148×2=296 bytes. (4) Interleaving is performed. The data is arranged in the order of RS1[0], RS2[0], RS1[1], RS2[1], and so on. (5) As with the data, the error correction code is stored from the upper-left to the right, then one row down, similarly from the left to the right. That is, as a whole, the data is stored from the upper-left to the lower-right.

The orders of the generation procedures described above are merely examples, and the order of execution may be changed provided that the generation of a composite code is not hindered. Furthermore, the procedures described in the second, the third, the sixth, and the seventh embodiments may be used, or the procedures may be used in combinations.

The composite code may be used by printing it on a printed matter or displaying it on a display such as that of a smartphone.

(Flowchart of a Composite Code Reading Procedure)

A procedure for reading a composite code will be described with reference to the flowcharts in FIGS. 148 to 151. The composite code may be printed or may be displayed on a display such as that of a smartphone.

(Reading Procedure A)

Shown in FIG. 148, is an example of a reading procedure when there is no correction by the second code, that is, when the data of the second code can be acquired by using correction elements of only the original first code, and the processing of the second code is performed after executing the processing of the first code.

First, a reading apparatus reads the composite code (U21). Next, the cell arrangement of the first code of the composite code is recognized, and then the reference points are recognized (U22). Then, the color of the cells in the predetermined areas is recognized in accordance with the cell indices of the first code (U23). Although the cell indices of a QR code are stored in the reading apparatus, if it is the first code of the original code, the cell indices of the first code may be stored in the composite code or it may be stored in the reading apparatus. The same processing is performed until the recognition of all of the cells of the first code is completed (U24). Next, integrated information (data) is generated from the numerical information of each cell of the first code (U25). If there is data format information of the second code in the data, it is used for the subsequent processing of the second code (U26). If there are special cell indices in the data format information of the second code, whether or not a cell is a special cell is recognized by referring to the special cell indices (U27). Then, numerical information defined by the shape and arrangement of the marks is acquired based on the special cell indices of the second code. If the reading order is specified in the data format information of the composite code, the reading may be performed in a different order from the reading order of the first code (U28). The same processing is performed until the reading of all of the cells is completed (U29). Subsequently, integrated information (data) is generated from the numerical information of the special cells of the second code based on the data format information of the second code (U30). Then, information processing corresponding to the second code is performed (U31).

Using a conventional QR code reader, an image of a composite code may be photographed to obtain and process only data of the QR code portion, or an image of the composite code may be read by a composite code reader.

(Reading Procedure B)

Shown in FIG. 149, is an example of a reading procedure when there is no correction by the second code, that is, when the data of the second code can be acquired by using correction elements of only the original first code as with FIG. 146, and the processing of the special cells of the second code is performed during the processing of the cells of the first code.

First, the reading apparatus reads the composite code (U21). Next, the cell arrangement of the first code of the composite code is recognized, and then the reference points are recognized (U22). Then, the color of the cells in the predetermined areas is recognized in accordance with the cell indices of the first code (U23). Although the cell indices of a QR code are stored in the reading apparatus, if it is the first code of the original code, the cell indices of the first code may be stored in the composite code or it may be stored in the reading apparatus. For each cell, whether or not the cell is a special cell registered in the second code is determined, that is whether a cell is a special cell is recognized by referring to the special cell indices (U29A). Then, numerical information defined by the shape and arrangement of the marks is acquired based on the special cell indices of the second code (U28). The same processing is performed until the recognition of all of the cells of the first code is completed (U24). Next, integrated information (data) is generated from the numerical information of each cell of the first code (U25). Then, information processing corresponding to the first code is performed. If there is format information of the second code in the data, it is used for the subsequent processing of the second code (U26). Subsequently, integrated information (data) is generated from the numerical information of the special cells of the second code based on the data format information of the second code (U30). Then, information processing corresponding to the second code is performed (U31).

Although not shown, U26 and U31 may be implemented last together.

Using a conventional QR code reader, an image of a composite code may be photographed to obtain and process only data of the QR code portion, or an image of the composite code may be read by a composite code reader.

(Reading Procedure C)

Shown in FIG. 150, is an example of a reading procedure when correction in the second code is performed in an early stage using reference cells in which a reference point or a reference pattern is defined, and the processing of the special cells of the second code is executed during the processing of the cells of the first code, as in FIG. 149.

First, the reading apparatus reads the composite code (U21). Next, the cell arrangement of the first code of the composite code is recognized, and then the reference points are recognized (U22). Here, the predetermined areas of the reference cells of the second code, in which predetermined areas are arranged, are recognized from the vicinity of the reference points obtained from the first code, and using any of the various algorithms described in the fifth and tenth embodiments, the reference points are corrected (U32A). Then, the color of the cells in the predetermined areas are recognized in accordance with the cell indices of the first code (U23). Although the cell indices of a QR code are stored in the reading apparatus, if it is the first code of the original code, the cell indices of the first code may be stored in the composite code or it may be stored in the reading apparatus. For each cell, whether or not the cell is a special cell registered in the second code is determined, that is whether a cell is a special cell is recognized by referring to the special cell indices (U29A). Then, numerical information defined by the shape and arrangement of the marks is acquired based on the special cell indices of the second code (U28). The same processing is performed until the recognition of all of the cells of the first code is completed (U24). Next, integrated information (data) is generated from the numerical information of each cell of the first code (U25). Then, information processing corresponding to the first code is performed. If there is format information of the second code in the data, it is used for the subsequent processing of the second code (U26). Subsequently, integrated information (data) is generated from the numerical information of the special cells of the second code based on the data format information of the second code (U30). Then, information processing corresponding to the second code is performed (U31).

Although not shown, U26 and U31 may be implemented last together. Furthermore, although not shown, the second code may be processed after the processing of the first code is completed, in the same manner as the reading procedure A.

Using a conventional QR code reader, an image of a composite code may be photographed to obtain and process only data of the QR code portion, or an image of the composite code may be read by a composite code reader.

(Reading Procedure D)

Shown in FIG. 151 is an example of a reading procedure when correction is performed based on the reference points within the predetermined areas of the special cells in an arrangement in which all of the reference points are can be obtained independently, instead of the reference cells in which a reference point or a reference pattern is defined in the second code, and the processing of the special cells of the second code is executed during the processing of the cells of the first code. An example is a composite code configured with cells in which dot patterns described with reference to FIGS. 112 to 114 and FIGS. 116 to 117 are arranged or division cells described with reference to FIGS. 146 (d) to 146 (f) and FIGS. 146 (s) to 146 (u). In the cells in which the dot pattern is arranged, the predetermined area and the marks of the same color as the predetermined area are separated via an area of the opposite color, and neither the predetermined area nor the marks of the same color as the predetermined area are in contact with the boundary of the cell. In the division cells, the predetermined area and the marks of the same color as the predetermined area are separated via an area of the opposite color. Therefore, in both cases, the extraction of the predetermined areas is easy, and the correction of the reference points is also easy from that viewpoint. In the cells in which the dot patterns are arranged, because of the separation, and in the division cells, because the candidate arrangement positions are fixed, the extraction of the marks is also easy. Note that it is desirable to have the predetermined areas of the second code be recognized from the vicinity of the reference points obtained from the first code.

First, the reading apparatus reads the composite code (U21). Next, the cell arrangement of the first code of the composite code is recognized, and then the reference points are recognized (U22). Then, the color of the cells in the predetermined areas are recognized in accordance with the cell indices of the first code (U23). Although the cell indices of a QR code are stored in the reading apparatus, if it is the first code of the original code, the cell indices of the first code may be stored in the composite code or it may be stored in the reading apparatus. For each cell, whether or not the cell is a special cell registered in the second code is determined, that is whether a cell is a special cell is recognized by referring to the special cell indices (U29A). Here, the reference points are corrected based on the predetermined areas of the special cells extracted using any of the various algorithms described in the fifth and the tenth embodiments (U32B). Then, numerical information defined by the shape and arrangement of the marks is acquired based on the special cell indices of the second code (U28). The same processing is performed until the recognition of all of the cells of the first code is completed (U24). Next, integrated information (data) is generated from the numerical information of each cell of the first code (U25). Then, information processing corresponding to the first code is performed. If there is format information of the second code in the data, it is used for the subsequent processing of the second code (U26). Subsequently, integrated information (data) is generated from the numerical information of the special cells of the second code based on the data format information of the second code (U30). Then, information processing corresponding to the second code is performed (U31).

Although not shown, U26 and U31 may be implemented last together. Furthermore, although not shown, the second code may be processed after the processing of the first code is completed in the same manner as the reading procedure A.

Using a conventional QR code reader, an image of a composite code may be photographed to obtain and process only data of the QR code portion, or an image of the composite code may be read by a composite code reader.

The orders of the reading procedures described above are merely examples, and the order of execution may be changed provided that the reading of the composite code is not hindered. Furthermore, the procedures described in the second, the third, the sixth, and the seventh embodiments may be used, or the procedures may be used in combinations.

(Example 16) Time-Series Composite Code

As in examples 1 to 13, by defining 8-bit numerical information in both the bright-colored and the dark-colored cells of the second code, data which is eight times or more of that of the first code can be stored. However, a huge amount of data can be stored by using time-series data in which only the second code changes with time. The shape, size, color, arrangement positions, or the like of the marks 3-0 forming the time-series data may be changed in the time direction to increase the amount of information. Here, the reason why the first code is not changed is that even if the first code were changed, the capacity would not be greatly increased, and reading with a conventional QR code reader or the like would not be possible.

Furthermore, since various kinds of information for reading the second code is stored in the first code, if various kinds of information (data format information) for reading the second code is read at least once, it is possible to read the second code that changes with time. However, in a case where the reference point coordinate values of each cell obtained from the first code is used for the second code, when the composite code is videotaped or consecutively photographed in a series and the composite code is recorded in frames, there are cases where the imaging position of the composite code is deviated due to camera shaking or the like, and it may be necessary to correct the deviated positions. A correction method is as follows.

i) As shown in FIG. 152, if the number of a composite code is i, the final composite code number is k, and the cell number specifying each cell is j, first of all, the center coordinate values ($_1x$, $_1y$) and the rotation angle ($_1\theta$) of the first composite code (composite code number: i=1) read and recorded are obtained. Next, for each composite code (i=2 to k) photographed and recorded thereafter, the central coordinate values ($_ix$, $_iy$) and the rotation angle ($_i\theta$) of the composite code are obtained, and the differences $\Delta_i x = {_i}x - {_1}x$, $\Delta_i y = {_i}y - {_1}y$, and $\Delta_i\theta = {_i}\theta - {_1}\theta$ of the central coordinate values of subsequent composite codes (1<i) are obtained. Here, if the reference point coordinate values of each cell obtained by the first code is ($_1x_j$, $_1y_j$), the distance from the central coordinate values of the composite code (i=1) to the reference points of each cell are $_1x_j - {_1}x$ and $_1y_j - {_1}y$, and thus the reference point coordinate values ($_ix_j$, $_iy_j$) of the cell number j of the composite code number i are obtained by the following equation.

$$\begin{bmatrix} _ix_j \\ _iy_j \end{bmatrix} = \begin{bmatrix} _1x_j \\ _1y_j \end{bmatrix} + \begin{bmatrix} \Delta_i x \\ \Delta_i y \end{bmatrix} + \begin{bmatrix} \cos\Delta_i\theta & \sin\Delta_i\theta \\ -\sin\Delta_i\theta & \cos\Delta_i\theta \end{bmatrix} \begin{bmatrix} \Delta_1 x_j \\ \Delta_1 y_j \end{bmatrix}$$

Note that most camera shakings are in-plane movements/rotations, and the above equation is an approximate equation on the assumption that the optical axis of the composite code reader is not tilted with respect to the surface of a composite code displaying apparatus such as a smartphone. Furthermore, when the inclination of the optical axis is also taken into consideration, a correction can be made based on the deformation state of the captured composite code (for example, deformation obtained from the coordinate values of the four corners).

ii) The first code may be read for each composite code (i=2 to k) captured after the first composite code (i=1), and only the reference point coordinate values of each cell may be obtained and used as the coordinate values of the reference points of each cell of the second code.

iii) Reference point coordinate values of the second code may be calculated using any of the various algorithms described in the fifth and the tenth embodiments, based on reference points or reference points included in reference patterns provided in reference cells of the second code of a composite code captured in each frame (i=2 to k) after frame one (i=1) or also reference points that can be obtained in special cells in which numerical information can be stored.

Although three methods are described above as methods of correcting reference point coordinate values of a second code, it is needless to say that the center coordinate values of each cell may be used as reference point coordinate values for two-dimensional codes such as QR codes.

FIG. 153 shows a graph in which the horizontal axis is the time axis (frame number) indicating the display of a time-series composite code, and 60 frames are displayed per second. In any case, a composite code having the same number may be displayed through several frames, and upon photographing with a reading apparatus and recording the plurality of frames, composite codes captured in a good condition may be analyzed. In FIG. 153(a) one piece of data is formed with composite codes numbered (1) to (10). Although the ten (k=10) composite codes forming a piece of data are displayed in four frames each here, the number of frames for display may be set in accordance with the frame rate of the display apparatus, the frame rate of the reading apparatus, and the quality of the images. The number (k) of composite codes forming one piece of data may be stored in the first code, and the number of each composite code may be stored in the second code. This allows the number of k composite codes to be read consecutively, regardless of the order in which they are read, or the direction from which the images are photographed. To improve reading accuracy, the number of k composite codes may be read twice or more and cross-checked to perform error checking. In a time-series composite code, 5 to 30 frames are displayed per second, and since the deviation of the position of the reference points of each cell of the composite code imaged next in the time direction is extremely small, and the identification of cells is easy by the recognition of reference points by tracking the slight movements of the reference points over a plurality of captured images, it is not difficult to specify the cell numbers. Note that if the frame rate of the display apparatus is N (the frame rate N of current smartphones is often 60 frames), the number of times the time-series composite code is displayed is M, and if M<N, the same composite code is consecutively displayed in N/M frames. Note that the same composite codes may be set to be displayed consecutively for L frames each. In each of FIG. 153(a) to FIG. 153(c), the same composite code is displayed consecutively in four frames. In FIG. 153(b), when the display of the ten composite codes forming the data is completed, information indicating the end of the data is displayed by displaying only the first code without displaying the second code in a predetermined number of frames. Thereafter, the ten composite codes forming the data are redisplayed. The predetermined frames may contain an image that is not related to the composite code, or may store information such as that of a header in another format. However, in this case, reading is not possible with an existing QR code reader. Furthermore, the number of composite codes k forming the data, the number of times the data formed by k (what number of times the present display is, and the like) is displayed, or the like may be stored. Note that as a header the predetermined frames may store including the second code, data for error checking, information for electronic signatures, and the like in addition to the above information. Although the predetermined number of frames is four frames for all of the cases here, provided that they can be read, they may be set in any way or may be set before the composite code (1). Note that it is needless to say that the k composite codes may be read passing over these predetermined frames. As shown in FIG. 153(c), dummy codes may be arranged so that the changing points of the code can be recognized without the composite code displayed. Preferably, this dummy code is of a single color. It is more desirable if the color were the color used in the composite code or the color of the periphery of the composite code. Furthermore, to have the first code be continuously recognized, the first code may be used as a dummy code. Thus, there are cases where motion blur or the like during photographing can be suppressed. Although FIG. 153(c) shows four frames, the number of frames is not limited provided that the effect can be obtained. Furthermore, a choice to only display the first code in the predetermined frames may be made. Then, if the first code is an existing two-dimensional code such as a QR code, a two-dimensional code reader can read the first code at any timing.

For the reading of a time-series composite code, as shown in FIG. 153, although the second code is displayed on the time axis by the formed data i=1 to k, there are cases where a part or all of the second code cannot be read. In such a case, it is possible to completely decode the formed data by performing error correction coding by providing a correlation between the frames on the time axis of the time-series data. In such a case, i) error correction may be performed on each piece of time-series numerical information arranged at the same position (special cells having the same cell number) as special cells in which the numerical information is stored. That is, as time-series numerical information of the cells, an error correction code may be provided only in a predetermined frame on the time axis. ii) On the other hand, for a plurality of special cells, an error correction code may be provided for all frames on the time axis of the cells. Furthermore, as with conventional error correction, the error correction code of a second code defined in a frame may be provided for each frame in which a plurality of special cells is arranged in a predetermined area of the composite code. Note that any combination of i), ii), or conventional error correction may be used to perform error correction coding.

Below, an example of a method of using the composite code described in the eleventh embodiment will be described. It is needless to say that there are no restrictions on the method of use, including authenticity determination and the electronic signature described in the sixth, the seventh, and the ninth embodiments.

(Example 17) Next-Generation Payment System (1)

When a store inputs items for purchase into a POS system (a simple POS system such that of a smartphone or tablet is sufficient), a composite code is displayed on a display. When the purchaser activates a dedicated payment application on the smartphone and reads the composite code, the item for purchase, the price, and the like are displayed. After confirming that there is no mistake and tapping the payment button, the purchaser's smartphone will display a composite code that allows for withdrawal, and a composite code reader on the store side (in addition to a dedicated reader, smartphones, tablets, or a camera connected thereto are sufficient) reads the code, and when the payment is approved by the settlement company, payment is completed at a predetermined time. If the payment application can always recognize the balance and the usage limit, it can store the data in an electronically signed composite code, including whether or not payment is possible, and display it on the purchaser's smartphone. Therefore, it is not necessary for the POS system on the store side to receive approval or the like via the Internet, and settlements are possible even in the event of a disaster or the failure of the Internet. If the store side reads the composite code displayed on the purchaser's smartphone using a corresponding dedicated settlement application, it is not necessary to obtain approval from the payment company on the spot. A settlement using the Internet may be performed based on the necessary information later. Furthermore, if a face photo of the purchaser is stored in a composite code displayed on the purchaser's smartphone to enhance security, the shop side can also perform personal identification at the same time. By having the face photo of a purchaser displayed for only a predetermined period of time, the data may be made not to remain on the store side to prevent leakage of personal information.

(Example 18) Next-Generation Payment System (2)

When a store inputs items for purchase into a POS system (a simple POS system such that of a smartphone or tablet is sufficient), a composite code is displayed on a display. When the purchaser activates a dedicated payment application on the smartphone and reads the composite code, the item for purchase, the price, and the like are displayed. After confirming that there is no mistake and tapping the payment button, a connection with the wireless point (address) of the store POS stored in the composite code is made via WiFi, BLE, BT, or the like, and payment information is transmitted from the purchaser's smartphone. Here, if the payment dedicated application is made to always recognize the balance and the usage limit, by making a local wireless connection between the purchaser's smartphone and the store side POS, the settlements or the like are possible even in the event of a disaster or the failure of the Internet without having to gain approval or the like by the purchaser's smartphone through the Internet. Furthermore, the wireless point of the store POS may be changed every time like a one-time password. As a method of the changing, it may be made time-dependent or the wireless point to be used may be randomly selected from a plurality of wireless points. If the store side authenticates the payment information transmitted from the purchaser's smartphone using the corresponding dedicated settlement application, it is not necessary to gain approval from the payment company on the spot. A settlement using the Internet may be performed based on the necessary information later. Also, after having the purchaser's smartphone connect to the wireless point (address) of the store-side POS using WiFi, BLE, BT, or the like and transmit payment information, the purchaser may be made to write a signature on the display connected to the store-side POS like when a conventional credit card is used. Of course, the signature may be made to be done on the touch panel of a smartphone or a tablet with a finger or a stylus pen. Furthermore, as in example 17, a face photo of the purchaser may be stored in a composite code for personal identification.

(Example 19) Personal Identification System for Tickets

To prevent resales and impersonation in regards with various tickets such as those of concerts, events, transportation, or the like, a personal photo is taken with a smartphone at the time of ticket acquisition, and the personal photo is stored together with the information of the acquired ticket in a composite code. When using the ticket, the ticket issuer-side reads the composite code displayed on the ticket user's smartphone, and authenticates the acquired ticket information and performs personal identification based on the displayed face photo together, and thus resales and impersonation can be prevented. In a case where a third party obtains the ticket and transaction to the third party is allowed, the personal photo may be provided to the third party. Also, when the acquirer is himself/herself, the person can select his own photographed picture. Furthermore, by photographing the face of the ticket user and reading the composite code at the same time using a composite code reader equipped with an ultra-high precision camera, with the smartphone displaying the composite code held in the vicinity of the face of the ticket user, it is possible to make an automatic confirmation by performing face authentication of whether or not the face of the ticket user and the face photo stored in the composite code reader are of the same person. Of course, the photographing of the face of the ticket user and the reading of the face photo stored in a composite code may be performed by different devices. Instead of face collation, the ball of a finger may be photographed and stored in the composite code reader, and fingerprint collation may be performed by reading the ball of the person's finger and the composite code at the same time.

(Example 20) Personal Identification Application

It is a dedicated application for a third party to perform personal identification, and a personal face photo is stored in a composite code so that a third party can perform personal identification in various scenes. When registering personal information in a personal identification application, in addition to photographing a picture of the person, predetermined personal information such as resident card address, family registration, my number, insurance card, license, passport, student ID, employee ID, and the like may be registered by entering or photographing, and the dedicated application providing organization makes an approval of the personal identity. It is more desirable to have a license, a passport, or the like on which a personal photograph is attached be simultaneously photographed and collated with the personal photograph stored in the composite code. The face changes with age, making it difficult to recognize the person. Therefore, the personal identification application periodically may notify the person to retake a personal photo by a voice alert or text alert. In such a case, the photographed picture is compared with the photograph stored in the composite code, and if they cannot be approved as those of the same person, it is determined that impersonation has occurred and the personal identification application is made to be unusable. As described above, by periodically taking photographs of the person and storing them in a composite code to trace face changes, the face changes will not be to a degree that a third party cannot make a personal identification. Even if there is a change in the makeup or a large face change due to face lifting, the personal identification application may always automatically recognize self-taken personal photos or personal photos taken by a third party, and if a large face change is detected, the person may be notified by alert to retake a personal photo even at irregular intervals. Furthermore, the latest self-taken personal photos or the latest personal photos taken by a third party may be stored in the composite code. Note that with a still image composite code, a color photograph at a level at which a person can be identified can be stored, while with a time-series composite code, a clearer color photograph or a short motion picture can be stored.

(Example 21) Transportation Information Providing Means

For the means of transportation such as buses and railways, various kinds of information such as those of routes, stations, nearby facilities, sightseeing, or the like can be stored in a composite code, and by posting the corresponding code on the interior of a transportation vehicle or in a station, passengers can obtain information that cannot be fit in an ordinary QR code from the composite code with a smartphone. By displaying a composite code on a display, it is possible to acquire information such as the present location, weather changes, or the like during traveling. With the information provided by a display set in a transportation vehicle, it was not possible to select wanted information at will, but since various kinds of information can be linked to a composite code, wanted information can be obtained with a smartphone. Also, when using a taxi, by storing routes from the departure point to the arrival point and the corresponding taxi fares in a composite code, and displaying the information on the display of the taxi side, passengers can check whether they are traveling on an appropriate route, and make code payments properly. With the spread of such service, it is possible to prevent rip-offs. On the passenger side, by linking a dedicated mobile map application and storing which route the passenger wants to use to reach a destination in a composite code, and by having the composite code reader of the driver read the code and having a navigator display or outputting audio information, it is possible for a passenger to convey his/her desired route to the driver adequately.

For the composite code of the present invention, by storing a second code in the area of a first code, a large amount of information can be stored in the same code area as compared with the case of having only the first code.

For example, when a composite code in which the first code is a QR code and the second code is a dot code is printed, the composite code can store an amount of 10 times or more information compared with when the QR code alone is printed. And when a composite code is displayed on a screen of a smartphone or the like, the composite code can store an amount of 100 times or more information compared with a QR code by adding color information to the dot code and changing the code with time.

Since a large amount of information can be stored, Japanese texts of several thousand characters, photographs, audio information, and the like can be stored without using the Internet, and thus it can be widely used from document management to entertainment, education, and tourism. In addition, the data stored in the QR code, that is, the first code, can be read by a conventional QR code reader.

Furthermore, the composite code according to the present invention is suitable for use in various types of authentication. For example, by printing a QR code that enables authenticity determination of an electronic signature or a URL or displaying on a smartphone owned by a user a QR code stored with own personal biometric information, the other party (including apparatuses) can easily perform personal authentication by reading it.

Furthermore, presently, since the specifications of the QR code are disclosed, anyone can issue a QR code, and a third party can issue the same code. However, with the composite code according to the present invention, since in addition to the QR code and the like, a mark (second code) such as a dot code is formed by a new secret algorithm, unique composite codes can be issued, and it is extremely unlikely that the same code will be issued by a third party, and thus security is extremely high. Furthermore, the QR code is easy to copy and imitate, and there is a possibility that the information stored in the QR code is acquired by an unintended third party by shoulder hacking or the like. However, with a composite code, the second code is difficult to view and imitate.

As described above, the composite code according to the present invention has many advantages that cannot be realized by conventional one-dimensional and two-dimensional codes.

<Other Aspects>

The present embodiment further includes the following aspects.

(Aspect 1)

A composite code, comprising:

a first code wherein a plurality of cells are orderly aligned, each cell of the said plurality of cells has a predetermined area, and data is defined by having one of two or more colors distinguishable from one another in the said predetermined area, and a second code in which a special cell having an area excluding the said predetermined area is formed at least in a part of the said plurality of cells, and data is defined by identifiable marks disposed at predetermined positions in the said area excluding the said predetermined area.

(Aspect 2)

The composite code according to Aspect 1, wherein the said data of the said second code is defined by the presence or absence of the said marks at the said predetermined positions.

(Aspect 3)

The composite code according to Aspect 1 or 2, wherein the said predetermined area is of an arbitrary shape.

(Aspect 4)

The composite code according to any one of Aspects 1 to 3, wherein at least a part of the cells other than the said special cells among the said plurality of cells have the said predetermined area and an area other than the said predetermined area, and the areas each has colors distinguishable from one another.

(Aspect 5)

The composite code according to Aspect 3, wherein the said predetermined area is surrounded by an area excluding the said predetermined area, and the areas each has colors distinguishable from one another.

(Aspect 6)

The composite code according to any one of Aspects 1 to 5, wherein a predetermined area in the said plurality of cells includes a reference point for recognizing a color of each cell.

(Aspect 7)

The composite code according to Aspect 6, wherein an arrangement position of a said mark is set based on the said reference point of at least one of the said special cells and/or cells other than the said special cells.

(Aspect 8)

The composite code according to Aspect 6, wherein an arrangement position of a said mark is set at least in a predetermined direction and with a predetermined distance from the said reference point of the said special cell.

(Aspect 9)

The composite code according to Aspect 6, wherein coordinate values of the said reference point of other said plurality of cells are calculated based on center coordinate values calculated from the said predetermined area identifiable as the said reference point.

(Aspect 10)

The composite code according to any one of Aspects 6 to 9, wherein a reference pattern, which is formed with an inclusion of an arrangement position of the said mark which is identifiable, the said reference point, and an orientation of a second code, is arranged in any one of the said plurality of cells.

(Aspect 11)

The composite code of Aspect 10, wherein the said data is defined based on a geometric relationship of the said mark with a reference point of the said plurality of cells and the said orientation of a second code, based upon the said reference pattern.

(Aspect 12)

The composite code of Aspect 10 or 11, wherein the said orientation of a second code is defined by any one of a shape, an arrangement of marks, and/or two or more marks of different sizes, forming the said reference pattern.

(Aspect 13)

The composite code according to any one of Aspects 6 to 12, wherein the said orientation of a second code is the same as the said orientation of a first code.

(Aspect 14)

The composite code according to any one of Aspects 6 to 9, wherein the said reference point is a center of each said cell.

(Aspect 15)

The composite code according to any one of Aspects 6 to 14, wherein the said reference point is a center of a predetermined area of each said cell.

(Aspect 16)

The composite code according to Aspect 15, wherein a center $(X_C, Y_C)$ of the said predetermined area comprising n number of binarized pixels is represented as $X_C=(\Sigma X_i, i=1$ to $n)/n$, $Y_C=(\Sigma Y_i, i=1$ to $n)/n$, where Di (Xi, Yi) is coordinate values of n (i=1 to n) pixels, in a two-dimensional photographed image (X, Y) with XY coordinates when the said composite code is photographed and recorded in a storage apparatus.

(Aspect 17)

The composite code according to any one of Aspects 1 to 16, wherein an area of the said predetermined area is 1/10 or more of an area of each said cell.

(Aspect 18)

The composite code according to any one of Aspects 1 to 16, wherein an area of the said predetermined area is 1/20 or more of an area of each said cell.

(Aspect 19)

The composite code according to any one of Aspects 1 to 18, wherein the said plurality of cells has a predetermined area such that a color of a predetermined area in the cell can be recognized as the color of each cell.

(Aspect 20)

The composite code according to any one of Aspects 1 to 19, wherein a color of the said each cell is distinguishable from one another by having a predetermined amount of color density of any one of the said two or more colors distinguishable from one another.

(Aspect 21)

The composite code according to any one of Aspects 1 to 20, wherein an area of the said predetermined area is about 60% or more of an area of each said cell.

(Aspect 22)

The composite code according to any one of Aspects 1 to 21, wherein a color of the said mark includes a same color as the said predetermined area in which the said mark is arranged.

(Aspect 23)

The composite code according to any one of Aspects 1 to 22, wherein an arrangement (a placement) position of the said mark is set in any one of areas formed by dividing at least an area excluding the said predetermined area of the said special cell into arbitrary shapes.

(Aspect 24)

The composite code according to Aspect 23, wherein the shape of the said mark is the same as the shape of the said divided area, and the said divided areas have the same color within.

(Aspect 25)

The composite code according to any one of Aspects 1 to 24, wherein the said marks each has one of the colors of one or more colors which can be distinguished from the color of the said predetermined area in the said predetermined position where the said mark is placed or in an area including the said predetermined position.

(Aspect 26)

The composite code according to any of Aspects 1 to 25, wherein the said second code is defined by at least one among a shape, a size, a color, an orientation, and an arrangement pattern of the said mark.

(Aspect 27)

The composite code according to Aspect 26, wherein the said mark has an arbitrary shape.

(Aspect 28)

The composite code according to any one of Aspects 1 to 27, wherein a color of the said mark includes at least a color among red, green, blue, cyan, magenta, yellow, black, white, and a color of the said predetermined area, with which the said marks can be distinguished from one another.

(Aspect 29)

The composite code according to any one of Aspects 1 to 28, wherein the size of the said marks is so that it is difficult to view from a predetermined distance.

(Aspect 30)

The composite code according to any one of Aspects 1 to 29, wherein the said composite code is formed on a medium or is shown on a display device by output from an electronic medium, a broadcast medium, a storage medium, or a communication medium, or is formed of digital information in an electronic medium.

(Aspect 31)

The composite code according to Aspect 30, wherein at least the said second code is formed of a plurality of codes, and the said plurality of codes is shown on a display device in a predetermined order in the time axis direction or are formed at predetermined positions of the said medium.

(Aspect 32)

The composite code according to Aspect 31, wherein a predetermined period of time during which there is no display is included between a plurality of codes displayed in a predetermined order in the direction of the said time axis.

(Aspect 33)

A composite code comprising: a first code in which data is defined by a plurality of cells orderly aligned, each of the cells of the said plurality of cells having a predetermined area, and the said predetermined area each having one of two or more colors that can be distinguished from one another, a second code in which data is defined by identifiable marks arranged at predetermined positions in an area excluding the said predetermined area in special cells forming at least a part of the said plurality of cells wherein a special area set at least in either the said first code or the said second code has special information corresponding to at least a part of an area excluding the special area of at least the said first code or the said second code.

(Aspect 34)

The composite code according to Aspect 33, wherein at least one of the said marks according to Aspects 1 to 32 is formed.

(Aspect 35)

The composite code according to Aspect 33 or 34, wherein at least a part of an area excluding the said special area includes at least a name, sex, a birth date, an address, a family registry, and biological information, and the like which is information for identifying an individual.

(Aspect 36)

The composite code according to any one of Aspects 33 to 35, wherein the said special information is encoded information encoded by a means of encoding at least a part of an area excluding the said special area.

(Aspect 37)

The composite code according to Aspect 36, wherein the said special information is encrypted information encrypted by a means of encrypting the said encoded information.

(Aspect 38)

The composite code according to Aspect 37, wherein the said encryption information can be decrypted into the said encoded information by a means of decrypting.

(Aspect 39)

The composite code according to Aspect 38, wherein at least a part of an area excluding the said special area comprises a program for causing an information processing apparatus to execute the said decrypting means.

(Aspect 40)

The composite code according to Aspect 38 or 39, wherein the said encryption information is information obtained by encrypting the encoded information using a secret key by the said encryption means, and the said decryption means decrypts the said encryption information using a public key.

(Aspect 41)

The composite code according to any one of Aspects 38 to 40, wherein the said encoding means is a hash function, an encoded information encoded by the said hash function is a hash value, an encrypted information encrypted by the said encrypting means is an encrypted hash value, and the said encrypted hash value can be decrypted by the said decrypting means into the said hash value.

(Aspect 42)

The composite code according to any one of Aspects 36 to 41, wherein the said special information is information represented by at least a part of an area excluding the said special area of at least one of the codes or is electronic signature information created by an electronic signature means based on the said encoded information, and the said electronic signature information can be verified to have a predetermined relationship with information represented by at least a part of an area excluding the said special area of at least one of the codes by a verification means.

(Aspect 43)

The composite code according to any one of Aspects 1 to 42, wherein at least one of a mark, a graphic or a text for showing the said composite code is formed in the said first code.

(Aspect 44)

A medium on which a composite code according to any one of Aspects 33 to 42 is formed or displayed.

(Aspect 45)

The medium according to Aspect 44, wherein at least a part of an area excluding the said special area according to any one of Aspects 33 to 42 corresponds to information corresponding to at least one of letters or images formed on the said medium converted into data, and the said composite code is formed in or in the vicinity of the area of the said information.

(Aspect 46)

A composite code reading apparatus comprising:

a first acquisition means for acquiring the said first code, a second acquisition means for acquiring the said second code, included in a composite code according to any one of Aspects 1 to 43.

(Aspect 47)

The composite code reading apparatus according to Aspect 46, wherein the said second code is acquired based on a reference point included in the said predetermined area according to any one of Aspects 6 to 18.

(Aspect 48)

The composite code reading apparatus according to Aspect 47, wherein a reference point of the said cell acquired by the said first acquisition means is corrected by coordinate values of the said reference point acquired by the said second acquisition means, and based thereon the said second code is read.

(Aspect 49)

The composite code reading apparatus according to Aspect 47 or 48, wherein a candidate arrangement position of the said mark is corrected using the said reference pattern according to any one of Aspects 10 to 12, and based thereon the said second code is read.

(Aspect 50)

The composite code reader according to any one of Aspects 46 to 49, wherein at least either the said first code and the said second code includes said information for identifying an individual, and the said information for identifying an individual is information concerning at least one of a name, sex, a birth date, an address, a family registry, and biological information.

(Aspect 51)

The composite code reading apparatus according to Aspect 50, comprising:

a third acquisition means for acquiring biological information and an output means for outputting agreement or disagreement with regards to a comparison upon comparing biological information acquired by the said third acquisition means and the said information for identifying an individual.

(Aspect 52)

The composite code reader according to Aspect 51, wherein at least one of the said first acquisition means, the said second acquisition means, the said third acquisition means, and the said output means functions by a processing by one or a plurality of processors.

(Aspect 53)
A composite code reading apparatus according to any one of Aspects 46 to 52 comprising:
a second encoding means capable of encoding as the encoding means according to Aspect 36,
wherein at least a part of an area excluding the special area of Aspects 33 to 42 is encoded into a second piece of encoded information by the said second encoding means.

(Aspect 54)
A composite code reading apparatus according to any one of Aspects 46 to 53, comprising a decrypting means, wherein encrypted information encrypted by an encrypting means according to Aspect 37 is decrypted by the said decrypting means into encoded information according to Aspect 36.

(Aspect 55)
The composite code reading apparatus according to Aspect 54 comprising:
a public key,
wherein the said encrypted information is encoded information encrypted by the said encrypting means using a secret key, and the said decrypting means decrypts the said encrypted information using the said public key.

(Aspect 56)
The composite code reading apparatus according to Aspect 54 or 55,
wherein a second piece of encoded information encoded by a second encoding means according to Aspect 53 and encoded information by decryption by the said decrypting means are collated to determine whether special information according to Aspect 33 agree or disagree.

(Aspect 57)
A composite code generation method for generating a composite code according to any one of Aspects 1 to 43,
wherein a computer executes a first generation step of generating a first code in which data is defined by having a plurality of cells orderly aligned, each having a predetermined area, and the said predetermined area each having one of two or more colors that can be distinguished from one another,
and a second generation step of generating a second code in which data is defined by identifiable marks arranged at predetermined positions in an area excluding the said predetermined area in special cells that form at least a part of the said plurality of cells.

(Aspect 58)
A composite code reading method for reading a composite code according to any one of Aspects 1 to 43
wherein a method of acquiring a first code in which data is defined by having a plurality of cells orderly aligned, each having a predetermined area, and the said predetermined area each having one of two or more colors that can be distinguished from one another,
and acquiring a second code in which data is defined by identifiable marks arranged at predetermined positions in an area excluding the said predetermined area in special cells that form at least a part of the said plurality of cells.

(Aspect 59)
A composite code generation program for generating a composite code according to any one of Aspects 1 to 43,
wherein a computer executes a first generation step of generating a first code in which data is defined by having a plurality of cells orderly aligned, each having a predetermined area, and the said predetermined area each having one of two or more colors that can be distinguished from one another,
and a second generation step of generating a second code in which data is defined by identifiable marks arranged at predetermined positions in an area excluding the said predetermined area in special cells that form at least a part of the said plurality of cells (Aspect 60)
A composite code reading program that reads a composite code according to any one of Aspects 1 to 43,
wherein the composite code reading program causes a computer to acquire a first code in which data is defined by a plurality of cells orderly aligned, each having a predetermined area and the said predetermined area each having one of two or more colors distinguishable from one another,
and to acquire a second code in which data is defined by identifiable marks arranged at predetermined positions in an area excluding the said predetermined area in special cells forming at least a part of the said plurality of cells.

(Aspect 61)
A composite code generation apparatus that generates a composite code according to any one of Aspects 1 to 43, comprising:
a first generation means that generates a first code in which data is defined by a plurality of cells orderly aligned, each having a predetermined area, and the said predetermined area each having one of two or more colors that can be distinguished from one another,
and a second generation method that generates a second code in which data is defined by identifiable marks arranged at predetermined positions in an area excluding the said predetermined area in special cells forming at least a part of the said plurality of cells.

EXPLANATION OF SIGNS

10 . . . INFORMATION PROCESSING APPARATUS
11 . . . CPU
12 . . . MAIN MEMORY APPARATUS
13 . . . EXTERNAL MEMORY APPARATUS
14 . . . DISPLAY APPARATUS
15 . . . OPERATION UNIT
16 . . . COMMUNICATION INTERFACE
17 . . . IMAGE INPUT INTERFACE
18 . . . IMAGE OUTPUT INTERFACE
CS1, CS2 CONTENT SERVER
MS1 . . . MANAGEMENT SERVER
UD1, UD2 . . . USER'S APPARATUS
0-0 . . . QUIET ZONE
0-1 . . . FINDER PATTERN
0-11 . . . UPPER-RIGHT FINDER PATTERN
0-12 . . . UPPER-LEFT FINDER PATTERN
0-13 . . . LOWER-RIGHT FINDER PATTERN
0-2 . . . SEPARATION PATTERN
0-3 . . . ALIGNMENT PATTERN
0-4 . . . FORMAT INFORMATION (FORMAT INFORMATION)
0-5 . . . TIMING PATTERN
1-0 . . . SPECIAL CELL
1-00 . . . BRIGHT SPECIAL CELL
1-01 . . . DARK SPECIAL CELL
1-1 . . . REFERENCE CELL DEFINING A REFERENCE POINT
1-10 . . . BRIGHT REFERENCE CELL DEFINING A REFERENCE POINT
1-11 . . . DARK DEFINING A REFERENCE POINT
1-2 . . . REFERENCE CELL DEFINING A REFERENCE PATTERN 1-20 . . . BRIGHT REFERENCE CELL DEFINING A REFERENCE PATTERN
1-21 . . . DARK REFERENCE CELL DEFINING A REFERENCE PATTERN
2-0 . . . PREDETERMINED AREA OF A CELL
2-00 . . . BRIGHT PREDETERMINED AREA OF A CELL
2-01 . . . DARK PREDETERMINED AREA OF A CELL
2-1 . . . AREA OF A CELL EXCLUDING PREDETERMINED AREA 2-0
2-10 . . . BRIGHT AREA OF A CELL EXCLUDING PREDETERMINED AREA 2-0
2-11 . . . DARK AREA OF A CELL EXCLUDING PREDETERMINED AREA 2-0
3-0 . . . MARK DEFINING INFORMATION
3-00 . . . BRIGHT MARK DEFINING INFORMATION
3-01 . . . DARK MARK DEFINING INFORMATION
3-1 . . . MARK DEFINING A REFERENCE PATTERN
3-10 . . . BRIGHT MARK DEFINING A REFERENCE PATTERN
3-11 . . . DARK MARK DEFINING A REFERENCE PATTERN

The invention claimed is:

1. A two-dimensional code formed on a medium, comprising:
a first code wherein a plurality of cells are arranged in a predetermined array shape and data is defined by two or more colors of the plurality of cells distinguishable from one another, and
at least one of the following first to third aspects:
(A) a first aspect wherein the two-dimensional code further comprises a second code formed by a predetermined rule different from that of the first code, each of the plurality of cells has a predetermined area, the second code is defined in special cells which form at least some of the plurality of cells, at least some of the special cells have an area excluding the said predetermined area, data of the second code is defined by identifiable marks disposed at predetermined positions in the said area excluding the said predetermined area, and an arrangement position of the said mark is set in any one of areas formed by dividing at least an area excluding the said predetermined area of the said special cells into arbitrary shapes;
(B) a second aspect wherein the two-dimensional code further comprises a second code formed by a predetermined rule different from the first code, the second code is biometric information, and the biometric information is obtained by encoding at least one of the following (1) to (3):
(1) an image photographed with a first image input unit mounted or connected to a two-dimensional code generation apparatus;
(2) an image stored in advance in the two-dimensional code generation apparatus; and
(3) information obtained by a predetermined method from the photographed image or the image stored in advance; and
(C) a third aspect wherein coordinate values of each of the plurality of cells of the first code-defining an arrangement of each of the cells are identifiable from at least a part of the predetermined array shape, at least one of the plurality of cells is a reference cell which is formed with a reference predetermined area including a reference point and one or more first surrounding areas arranged at least at a part around the reference predetermined area, the first surrounding areas are distinguishable from the reference predetermined area, and coordinate values of the reference point can be calculated.

2. The two-dimensional code according to claim 1, wherein, when comprising at least the first aspect, the said data of the said second code is defined by the presence or absence of the said marks at the said predetermined positions.

3. The two-dimensional code according to claim 1, wherein, when comprising at least the first aspect, at least a part of the cells other than the said special cells among the said plurality of cells have the said predetermined area and an area other than the said predetermined area, and the areas have colors distinguishable from one another.

4. The two-dimensional code according to claim 3, wherein the said mark is formed so as to be superimposed on each entire area of the one or more divided areas.

5. The two-dimensional code according to claim 1, wherein, when comprising at least the first aspect, at least the said second code is shown as time-series data on a display device in a predetermined order in the time axis direction, including and/or not including hidden sections.

6. The two-dimensional code according to claim 1, wherein, when comprising at least the second aspect, the biometric information is at least biometric information of a person who is a user of the two-dimensional code generation apparatus, and the biometric information of the person is at least one of an image photographed by the person with a first image input unit mounted to the two-dimensional code generation apparatus or information obtained by a predetermined method from the image.

7. The two-dimensional code according to claim 1, wherein, when comprising at least the third aspect, the identified coordinate values of the reference cell is obtained, the reference predetermined area of the reference cell is recognized based on the coordinate values, coordinate values of the reference point is calculated from the reference predetermined area, and coordinate values of the plurality of cells excluding the reference cell can be calculated based on the calculated coordinate values of the reference point.

8. The two-dimensional code according to claim 7 further comprising:
a center cell that is formed by one or more cells of the plurality of cells and includes a center coordinate point,
a second surrounding area having a plurality of cells around the center cell,
a third surrounding area having a plurality of cells around the second surrounding area, and
wherein the second surrounding area is distinguishable from the center cell, the third surrounding area is distinguishable from the second surrounding area, and a position of the center coordinate point can be calculated.

9. The two-dimensional code according to claim 1, wherein, when comprising at least the first aspect and the third aspect, the reference predetermined area is included in the predetermined area.

10. The two-dimensional code according to claim 1, wherein, when comprising at least the first aspect, the predetermined area is one or more first division areas among division areas formed by dividing at least one or more cells of the plurality of cells, and
the mark is formed on each entire area of at least one or more second areas being the division areas excluding the first division areas.

11. The two-dimensional code according to claim 1, wherein a color of each of the plurality of cells is recognized by a color of a center position of each of the plurality of cells.

12. A medium on which a two-dimensional code according to claim 1 is formed.

13. A two-dimensional code reading apparatus that reads a two-dimensional code according to claim 1.

14. A two-dimensional code generation apparatus that generates a two-dimensional code according to claim 1.

* * * * *